United States Patent
Groath et al.

(10) Patent No.: US 6,571,285 B1
(45) Date of Patent: May 27, 2003

(54) PROVIDING AN INTEGRATED SERVICE ASSURANCE ENVIRONMENT FOR A NETWORK

(75) Inventors: Steve G. Groath, Burnsville, MN (US); Myke L. Miller, Excelsior, MN (US); Christopher Sachse, Maplewood, MN (US); Jeremy D. Bloom, San Francisco, CA (US); Leslie T. Turkson, Eagan, MN (US); Timothy Lund, Lakeville, MN (US); Patrick J. Beskar, Mahotmedi, MN (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/470,776

(22) Filed: Dec. 23, 1999

(51) Int. Cl.⁷ ............................................. G06F 15/173
(52) U.S. Cl. ...................... 709/223; 709/223; 709/224; 370/352; 370/389
(58) Field of Search ................................. 709/500, 527, 709/680, 683, 614, 615, 224, 318, 223; 370/352, 389, 392, 383, 395, 390

(56) References Cited

U.S. PATENT DOCUMENTS 5,650,994 A * 7/1997 Daley .......................... 370/259
5,774,689 A * 6/1998 Curtis et al. ................. 709/500
5,867,495 A * 2/1999 Elliott et al. ................. 370/352
6,182,157 B1 * 1/2002 Schlener et al.

* cited by examiner

Primary Examiner—Patrice Winder
Assistant Examiner—Thu Ha Nguyen
(74) Attorney, Agent, or Firm—Oppenheimer Wolff & Donnelly LLP

(57) ABSTRACT

A method providing service assurance for a network to maintain an agreed upon Quality of Service. First, an alarm is generated to indicate a status of a network. The generation of the alarm comprises selecting a parameter of network to be monitored; determining a triggering level of the parameter; monitoring the parameter of an occurrence of the triggering level; and initiating alarm notification upon the monitored occurrence of the triggering level. Network event information is then dispatched upon generation of the alarm and is subsequently mapped. The data collected on the status of the network is then manipulated by concatenating the data collected on a network into a master file; reformatting the data into a standarized format; translating the data to key codes; sorting the data according to predetermined criteria; and concatenating the sorted data together. The data is then sorted in a database. Thereafter, network availability is conveyed graphically.

12 Claims, 37 Drawing Sheets

| TABLESPACE | DEFAULT STATUS | PHYSICAL REQUIREMENTS | RELATED TABLESPACES/ RELATIONSHIPS | DATAFILE | DATAFILE SIZE (MB) | OPERATING SYSTEM | DATABASE ID | ENTITY LOCATION |
|---|---|---|---|---|---|---|---|---|
| IPSADAT01 | On-Line | Data only-No indexes | IPSAIDX/Index tablespace | /files5/oradata/IP SA01/IPSA01ipsa dat01.dat | 100 | HP-UX 10.2 | IPSA01 | |
| IPSAIDX | On-Line | Index only | IPSADAT01/data tablespace | /files4/oradata/IP SA01/IPSA01idx 01.dbf | 20 | HP-UX 10.2 | IPSA01 | |
| SYSTEM | On-Line | | ALL | /files1/oradata/IP SA01/IPSA01syst em01.dbf | 60 | HP-UX 10.2 | IPSA01 | |
| TEMP01 | On-Line | | ALL | /files3/oradata/IP SA01/IPSA01tmp 01.dbf | 20 | HP-UX 10.2 | IPSA01 | |
| RBS01 | On-Line | Contains the 4 rollback segments for the database | ALL | /files2/oradata/IP SA01/IPSA01rbs 01.dbf | 30 | HP-UX 10.2 | IPSA01 | |

FIG. 12

| | | | | | |
|---|---|---|---|---|---|
| ELEMENTS | 2,000 | 2,500 | 5,000 | 10,000 | 20,000 | 50,000 |
| AVERAGE METRICS/ELEMENT | 10 | 10 | 10 | 10 | 10 | 10 |
| POLL FREQUENCY | 100 | 100 | 100 | 100 | 100 | 100 |
| DETAIL DATA RETENTION | 40 | 40 | 40 | 40 | 40 | 40 |
| DAILY ROLLUP DATA RETENTION | 400 | 400 | 400 | 400 | 400 | 400 |
| | | | | | | |
| DETAIL RECORDS/DAY | 2,000,000 | 2,500,000 | 5,000,000 | 10,000,000 | 20,000,000 | 50,000,000 |
| TOTAL DETAIL RECORDS | 80,000,000 | 100,000,000 | 200,000,000 | 400,000,000 | 800,000,000 | 2,000,000,000 |
| DAILY ROLLUP RECORDS/DAY | 20,000 | 25,000 | 50,000 | 100,000 | 200,000 | 500,000 |
| TOTAL DAILY ROLLUP RETAINED | 8,000,000 | 10,000,000 | 20,000,000 | 40,000,000 | 80,000,000 | 200,000,000 |
| TOTAL RECORDS | 88,000,000 | 110,000,000 | 220,000,000 | 440,000,000 | 880,000,000 | 2,200,000,000 |
| | | | | | | |
| TOTAL SPACE/TABLE (BYTES) | | | | | | |
| ELMNT_LOC_TB | 90,000 | 112,500 | 225,000 | 450,000 | 900,000 | 2,250,000 |
| NETWORK_ELMNT_TB | 204,000 | 255,000 | 510,000 | 1,020,000 | 2,040,000 | 5,100,000 |
| PERF_FACT_DAILY_TB | 208,000,000 | 260,000,000 | 520,000,000 | 1,040,000,000 | 2,080,000,000 | 5,200,000,000 |
| PERF_FACT_TB | 3,280,000,000 | 4,100,000,000 | 8,200,000,000 | 16,400,000,000 | 32,800,000,000 | 82,000,000,000 |
| PERF_METRIC_TIME_TB | 1,285,632,000 | 1,285,632,000 | 1,285,632,000 | 1,285,632,000 | 1,285,632,000 | 1,285,632,000 |
| PERF_METRIC_TB | 1,638 | 1,638 | 1,638 | 1,638 | 1,638 | 1,638 |
| | | | | | | |
| TOTAL SPACE NEEDED (BYTES) | 4,773,927,638 | 5,646,001,138 | 10,006,368,638 | 18,727,103,638 | 36,168,573,638 | 88,492,983,638 |
| TOTAL SPACE NEEDED (MB) | 4,662.04 | 5,513.67 | 9,771.84 | 18,288.19 | 35,320.87 | 86,418.93 |

FIG. 13

| TABLE | COLUMN | DATA TYPE | COLUMN SIZE (BYTES) | ROW SIZE (BYTES) | SPACE USED/ ROW (BYTES) |
|---|---|---|---|---|---|
| ELMNT_LOC_TB | ELMNT_LOC_CD | Varchar2(5) | 6 | | |
| | ELMNT_CITY_NM | Varchar2(30) | 31 | | |
| | ELMNT_STATE_DBRV | Varchar2(2) | 3 | 43 | 45 |
| EVENT_CD_TB | EVENT_CD | | | | |
| | EVENT_STRING | | | | |
| | EVENT_AVAIL_TYPE | | | | |
| | EVENT_PAIR | | | 3 | 11 |
| EVENTS_FACT_TB | ELMNT_KEY_CD | Number(10) | 7 | | |
| | PERF_TIME_KEY_CD | Number(10) | 7 | | |
| | EVENT_CD | | | | |
| | EVENT_DURATION | | | | |
| | EVENT_SEVERITY | | | | |
| | EVENT_CLASS | | | 17 | 19 |
| NETWORK_ELMNT_TB | ELMNT_KEY_CD | Number(10) | 7 | | |
| | ELMNT_NM | Varchar2(20) | 21 | | |
| | ELMNT_TYPE_CD | Varchar2(2) | 3 | | |
| | ELMNT_VNDR_NM | Varchar2(30) | 31 | | |
| | ELMNT_VNDR_MDL | Varchar2(20) | 21 | | |
| | ELMNT_VAL_DT | Date | 8 | | |
| | ELMNT_LOC_CD | Varchar2(5) | 6 | 100 | 102 |
| PERF_FACT_DAILY_TB | ELMNT_KEY_CD | Number(10) | 7 | | |
| | METRIC_KEY_CD | Number(10) | 7 | | |
| | PERF_TIME_KEY_CD | Number(10) | 7 | | |
| | DLY_MIN_AMT | | | | |
| | DLY_MAX_AMT | | | | |
| | DLY_MEAN_AMT | | | | |
| | DLY_MEDIAN_AMT | | | | |
| | DLY_STDDEV_AMT | | | 24 | 26 |
| PERF_FACT_TB | ELMNT_KEY_CD | Number(10) | 7 | | |
| | PERF_TIME_KEY_CD | Number(10) | 7 | | |
| | METRIC_KEY_CD | Number(10) | 7 | | |
| | PERF_METRIC_VAL | Number(25,5) | 15 | 39 | 41 |
| PERF_METRIC_TB | METRIC_KEY_CD | Number(10) | 7 | | |
| | METRIC_NM | Varchar2(30) | 31 | | |
| | METRIC_SRC | Varchar2(20) | 21 | | |
| | METRIC_INS | Varchar2(30) | 31 | | |
| | METRIC_SUB_INS | Varchar2(30) | 31 | 124 | 126 |
| PERF_METRIC_TIME_TB | PERF_TIME_KEY_CD | Number(10) | 7 | | |
| | PERF_DT | Date | 8 | | |
| | PERF_DAY | Number(2) | 2 | | |
| | PERF_MON | Number(2) | 2 | | |
| | PERF_YR | Number(4) | 3 | | |
| | PERF_HOUR | Number(2) | 2 | | |
| | PERF_MIN | Number(2) | 2 | | |
| | PERF_SEC | Number(2) | 2 | | |
| | PERF_DOW | Varchar2(9) | 10 | 370 | 372 |

FIG. 14

| | TIME TO LOAD (DIRECT) | TIME TO LOAD (CONVENTIONAL) | NUMBER OF ROWS LOADED | AMOUNT OF DATA (MB) | COMMENTS |
|---|---|---|---|---|---|
| EMPTY TABLE | 00:04:32 | 00:30:12 | 1,048,576 | 35 | |
| 1 MIL ROWS IN TABLE | 00:06:29 | 00:32:57 | 1,048,576 | 35 | INDEX WAS 10 MB LARGER FOR CONVENTIONAL LOAD. THIS SUGGEST SOME DEGREE OF FRAGMENTATION OCCURRED DURING LOAD WHICH WOULD REQUIRE WEEKLY INDEX MAINTENANCE |
| EMPTY TABLE | 00:14:49 | 01:31:47 | 3,145,728 | 106 | |
| 2 MIL ROWS IN TABLE | 00:08:49 | 00:35:49 | 1,048,576 | 35 | INDEX WAS 30 MB LARGER FOR CONVENTIONAL LOAD. THIS SUGGEST SOME DEGREE OF FRAGMENTATION OCCURRED DURING LOAD WHICH WOULD REQUIRE WEEKLY INDEX MAINTENANCE |
| EMPTY TABLE | 00:30:10 | 03:05:24 | 6,291,456 | 212 | |
| 3 MIL ROWS IN TABLE | 00:22:52 | 01:33:15 | 3,145,728 | 106 | HAD TO INCREASE THE SIZE OF THE INDEX TABLESPACE IN ORDER FOR THE NEW INDEX AND THE OLD INDEX TO MERGE AT THE END OF DIRECT LOAD. |

FIG. 15

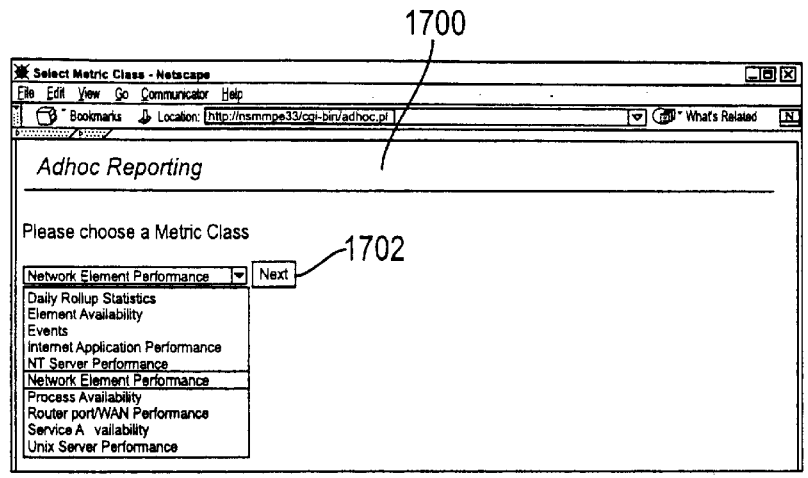
FIG. 17A
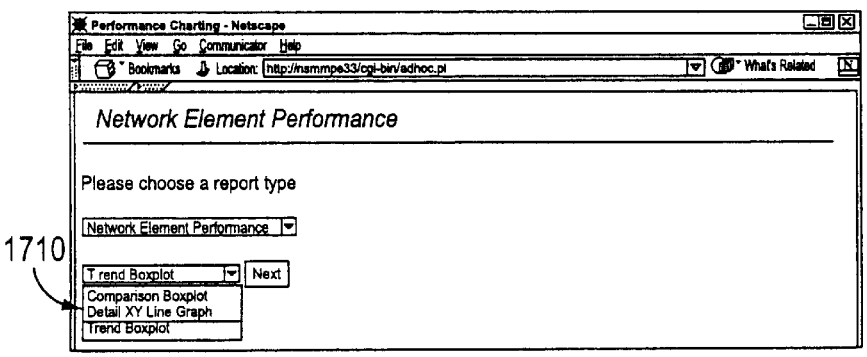
FIG. 17B
FIG. 18

Notes

1. The Object and Report columns list all the daily batch report types required
2. The total number of daily batch reports is listed in the column Batch Report Qty
3. Each batch report is one of seven Generic Report Types detailed on sheet 2
4. Data collection requirements driven by each report are given for Snmp and Patrol Metrics
5. The reports marked with an asterisk (*) are optional for Phase 2

| Object | Report | Generic Report Type | Graph type | y axis units | y axis range | x axis units | x axis range | Batch report qty |
|---|---|---|---|---|---|---|---|---|
| Router, Cisco 7500 | CPU Utilization Daily Detail | Daily detail | x-y line | % | 0-100 | hours | 24 | 2 |
| | CPU Utilization Daily Comparison | Daily comparison | boxplot | % | 0-100 | nodes | all routers | 1 |
| | CPU Utilization Trend | Monthly trend | boxplot | % | 0-100 | days | 30 | 2 |
| | Router Exceptions | Daily exception spectrum | spectrum | elements | all elements | | | 1 |
| Router Interfaces/WAN | Interface Utilization Daily Detail | Daily detail, n sub-objects | x-y line | % | 0-100 | hours | 24 | 2 |
| | Interface Utilization Trend | Monthly trend | boxplot | % | 0-100 | days | 30 | 4 |
| | Interface Utilization Daily Detail | Daily detail, n sub-objects | x-y line | packets/sec | 0-ifSpeed | hours | 24 | 2 |
| | Interface Utilization Trend | Monthly trend | boxplot | packets/sec | 0-ifSpeed | days | 30 | 4 |
| | Response Time Daily Detail* | Daily detail, n sub-objects | x-y line | seconds | 0-ifSpeed | hours | 24 | 0 |
| | Response Time Trend* | Monthly trend | boxplot | seconds | 0-ifSpeed | days | 30 | 0 |

| Batch report requirements | y axis metric name | SNMP metrics | Patrol metrics | Patrol Collector | Max/Min Precision |
|---|---|---|---|---|---|
| | Naming standard: | | | | |
| | <Description Units> | | | | |
| | Database variable name | | | | |
| Two router reports daily | CpuBusy_Percent | busyPer | N/A | N/A | |
| One report daily, comparing two routers | CpuBusy_Percent | busyPer | N/A | N/A | |
| Two router trend reports daily | CpuBusy_Percent | busyPer | N/A | N/A | |
| One report daily, showing exceptions for two routers | N/A | N/A | N/A | N/A | |
| Two router reports daily, each showing two interfaces | InterfaceUtilization_Percent | ifInOctets, ifOutOctets, ifSpeed | N/A | N/A | |
| Four interface reports daily | InterfaceUtilization_Percent | ifInOctets, ifOutOctets, ifSpeed | N/A | N/A | |
| Two router reports daily, each showing two interfaces | InterfaceUtilization_BPS | ifInOctets, ifOutOctets, ifSpeed | N/A | N/A | |
| Four interface reports daily | InterfaceUtilization_BPS | ifInOctets, ifOutOctets, ifSpeed | N/A | N/A | |
| | N/A | N/A | N/A | N/A | |
| | N/A | N/A | N/A | N/A | |

FIG. 19C

| | | | | | | |
|---|---|---|---|---|---|---|
| Unix servers | CPU Utilization Daily Detail | Daily detail | x-y line | % | 0-100 | hours | 24 | 1 |
| | CPU Utilization Trend | Monthly trend | boxplot | % | 0-100 | days | 30 | 1 |
| | Memory Utilization Daily Detail | Daily detail | x-y line | bytes | 0-100 | hours | 24 | 1 |
| | Memory Utilization Trend | Monthly trend | boxplot | bytes | 0-100 | days | 30 | 1 |
| | Network I/O Daily Detail | Daily detail | x-y line | % | 0-100 | hours | 24 | 1 |
| | Network I/O Trend | Monthly trend | boxplot | % | 0-100 | days | 30 | 1 |
| | Disk Percent Busy Daily Detail | Daily detail | x-y line | % | 0-100 | hours | 24 | 1 |
| | Disk Percent Busy Trend | Monthly trend | boxplot | % | 0-100 | days | 30 | 1 |
| | Unix Exceptions | Daily exception spectrum | spectrum | elements | all elements | hours | 24 | 1 |
| NT servers | CPU Utilization Daily Detail | Daily detail | x-y line | % | 0-100 | hours | 24 | 1 |
| | CPU Utilization Trend | Monthly trend | boxplot | % | 0-100 | days | 30 | 1 |
| | Memory Utilization Daily Detail | Daily detail | x-y line | % or bytes | 0-100 | hours | 24 | 1 |
| | Memory Utilization Trend | Monthly trend | boxplot | % or bytes | 0-100 | days | 30 | 1 |
| | Network I/O Daily Detail | Daily detail | x-y line | packets/sec | 0-100 | hours | 24 | 1 |
| | Network I/O Trend | Monthly trend | boxplot | packets/sec | 0-100 | days | 30 | 1 |
| | Disk Percent Busy Daily Detail | Daily detail | x-y line | % | 0-100 | hours | 24 | 1 |
| | Disk Percent Busy Trend | Monthly trend | boxplot | % | 0-100 | days | 30 | 1 |
| | NT Exceptions | Daily exception spectrum | spectrum | elements | all elements | hours | 24 | 1 |
| Network Elements (all hardware) | Network Availability Bar Chart | Daily availability bar chart | bar | % | 0-100 | elements | all elements | 1 |
| | Network Availability Spectrum* | Daily availability spectrum | spectrum | elements | all elements | hours | 24 | 0 |
| Internet Services (fault mgmt) | Process Availability Bar Chart | Daily availability bar chart | bar | % | 0-100 | processes | all processes | 1 |

FIG. 19D

| | | | | |
|---|---|---|---|---|
| One server report daily | CpuUtilization_Percent | N/A | CPUCpuUtil | VMColl | 0/100 - #.### |
| One server report daily | CpuUtilization_Percent | N/A | CPUCpuUtil | VMColl | 0/100 - #.### |
| One server report daily | MemoryFree_Pages | N/A | MEMFreeMem | VMColl | 0/+ - #.### |
| One server report daily | MemoryFree_Pages | N/A | MEMFreeMem | VMColl | 0/+ - #.### |
| One server report daily | NetworkTraffic_PPS | N/A | NETPacketsIn, NETPacketsOut | NETColl | 0/+ - #.### |
| One server report daily | NetworkTraffic_PPS | N/A | NETPacketsIn, NETPacketsOut | NETColl | 0/+ - #.### |
| One server report daily, showing two disks | DiskBusy_Percent | N/A | DSKPercentBusy | | 0/100 - #.### |
| One report daily, showing two disks | DiskBusy_Percent | N/A | DSKPercentBusy | | 0/100 - #.### |
| One report daily, showing exceptions from two servers | N/A | N/A | N/A | N/A | |
| One server report daily | CpuProcessorTime_Percent | N/A | CPUprcrProcessorTimePercent | CPUProcessorColl | 0/100 - #.### |
| One server report daily | CpuProcessorTime_Percent | N/A | CPUprcrProcessorTimePercent | CPUProcessorColl | 0/100 - #.### |
| One server report daily | MemoryFree_Mbytes | N/A | MEMmemAvailableBytes | MEMMemoryColl | 0/+ - #.### |
| One server report daily | MemoryFree_Mbytes | N/A | MEMmemAvailableBytes | MEMMemoryColl | 0/+ - #.### |
| One server report daily | NetworkTraffic_PPS | N/A | NETniPktsPerSec | NETNetworkInterfaceColl | 0/+ - #.### |
| One server report daily | NetworkTraffic_PPS | N/A | NETniPktsPerSec | NETNetworkInterfaceColl | 0/+ - #.### |
| One server report daily, showing two disks | DiskTime_Percent | N/A | PDpdDiskTimePercent | PDPhysicalDiskColl | 0/100 - #.### |
| One server report daily, showing two disks | DiskTime_Percent | N/A | PDpdDiskTimePercent | PDPhysicalDiskColl | 0/100 - #.### |
| One report daily, showing exceptions from two servers | N/A | N/A | N/A | N/A | N/A |
| One report showing all elements | N/A | N/A | N/A | N/A | N/A |
| One report showing all elements | N/A | N/A | N/A | N/A | N/A |
| One report showing 5 ISP apps | N/A | N/A | N/A | N/A | N/A |

| | | | | | | | | |
|---|---|---|---|---|---|---|---|---|
| | Process Availability Spectrum* | Daily availability spectrum | spectrum | processes | all processes | hours | 24 | 0 |
| | Service Availability Bar Chart | Daily availability bar chart | bar | % | 0-100 | services | all services | 1 |
| | Service Availability Spectrum* | Daily availability spectrum | spectrum | services | all services | hours | 24 | 0 |
| All objects (fault mgmt) | Daily Exception Report | Textual list of all events | text | N/A | N/A | N/A | N/A | 1 |
| | FTP Response Time Daily Detail* | Daily detail | x-y line | seconds | 0-max value | | | 0 |
| | FTP Response Time Trend* | Monthly trend | boxplot | seconds | 0-max value | | | 0 |
| | SMTP Response Time Daily Detail* | Daily detail | x-y line | seconds | 0-max value | | | 0 |
| | SMTP Response Time Trend* | Monthly trend | boxplot | seconds | 0-max value | | | 0 |
| | NNTP Response Time Daily Detail* | Daily detail | x-y line | seconds | 0-max value | | | 0 |
| | NNTP Response Time Trend* | Monthly trend | boxplot | seconds | 0-max value | | | 0 |
| | HTTP Response Time Daily Detail* | Daily detail | x-y line | seconds | 0-max value | | | 0 |
| | HTTP Response Time Trend* | Monthly trend | boxplot | seconds | 0-max value | | | 0 |
| | | | | | | | Total | 40 |

FIG. 19E

| | | | | |
|---|---|---|---|---|
| One report showing 5 ISP apps | N/A | N/A | N/A | N/A |
| One report showing 5 ISP apps | N/A | N/A | N/A | N/A |
| One report showing 5 ISP apps | N/A | N/A | N/A | N/A |
| One report daily showing all events | N/A | N/A | N/A | N/A |
| One report daily | FtpResponseTime_Seconds | N/A | ftpResponseTime | ftpMonitor |
| One report daily | FtpResponseTime_Seconds | N/A | ftpResponseTime | ftpMonitor |
| One report daily | SmtpResponseTime_Seconds | N/A | smtpResponseTime | smtpMonitor |
| One report daily | SmtpResponseTime_Seconds | N/A | smtpResponseTime | smtpMonitor |
| One report daily | NntpResponseTime_Seconds | N/A | nntpResponseTime | nntpMonitor |
| One report daily | NntpResponseTime_Seconds | N/A | nntpResponseTime | nntpMonitor |
| One report daily | HttpResponseTime_Seconds | N/A | httpResponseTime | httpMonitor |
| One report daily | HttpResponseTime_Seconds | N/A | httpResponseTime | httpMonitor |

FIG. 19F

| NOTES | | | | | | | |
|---|---|---|---|---|---|---|---|
| 1. "Object" may refer to an element, process, or service. | | | | | | | |
| Generic Report Type | Graph Type | Description | Scope | X-axis Units | X-axis Range | Y-axis Units | |
| Daily Detail | XY line graph | Shows all samples of a single metric from a single object over one day | 1 object, 1 metric | Hours & minutes | 24 hours | Metric value | |
| Daily Detail, N Sub-objects | XY line graph | Shows all samples of multiple metrics from a single object over one day | n objects, 1 metric | Hours & minutes | 24 hours | Metric value | |
| Daily Object Comparison | Boxplot | Compares distributions of a single metric across multiple objects for one day | n objects, 1 metric | Objects | n objects | Metric value | |
| Monthly Trend | Boxplot | Shows changes in distributions of a single metric over one month | 1 object, 1 metric | Days | 30 days | Metric value | |
| Daily Availability Bar Chart | Bar Graph | Compares percent availability for multiple services or objects for one day | n objects, 1 availability | Objects | n objects | Percent | |
| Daily Exception Spectrum | Spectrum | Shows exceptions for multiple objects as points over time. | n objects, n exceptions | Hours & minutes | 24 hours | Objects | |
| Daily Exception Text Report | Text List | Text list of all events over one day, with columns for date-time, event string, code, and severity. | n objects, n exceptions | N/A | N/A | N/A | |
| Daily Availability Spectrum* | Spectrum | Shows up/down status as a continuous color-coded line over time: red=down, green=up. | n objects, 1 availability | Hours & minutes | 24 hours | Objects | |

FIG. 20

| 1st Menu choice | 2nd menu choice | 3rd menu choice | 4th menu choice | 5th menu choice | 6th menu choice | 7th menu choice | Metric(s) |
|---|---|---|---|---|---|---|---|
| Select Metric Class | Select Report Type | Select Element(s) | Select Location(s) | Select start date | # of days | | |
| default | N/A | all | all | yesterday | 1 | | |
| | | | | | | | |
| Element Availability | Percent Availability Bar Graph | <element name> | <element location> | <start date> | <days> | | N/A |
| Service Availability | Percent Availability Bar Graph | <element name> | <element location> | <start date> | <days> | <service> | N/A |
| Process Availability | Percent Availability Bar Graph | <element name> | <element location> | <start date> | <days> | <process> | N/A |
| Events | Exception Spectrum | <element name> | <element location> | <start date> | <days> | | N/A |
| Network Element Performance | Detail XY Line Graph | <element name> | <element location> | <start date> | <days> | | Cpu Utilization (busyper) |
| | Trend Boxplot | <element name> | <element location> | <start date> | <days> | | Cpu Utilization (busyper) |
| | Comparison Boxplot | <element name> | <element location> | <start date> | <days> | | Cpu Utilization (busyper) |
| Router port/WAN Performance | Detail XY Line Graph | <element name> | <element location> | <start date> | <days> | <instance> | Interface Utilization (ifIn/OutOctects) |
| | Trend Boxplot | <element name> | <element location> | <start date> | <days> | <instance> | Interface Utilization (ifIn/OutOctects) |
| | Comparison Boxplot | <element name> | <element location> | <start date> | <days> | <instance> | Interface Utilization (ifIn/OutOctects) |
| Unix Server Performance | Detail XY Line Graph | <element name> | <element location> | <start date> | <days> | <instance> | Cpu Utilization, Memory Utilization, Network Utilization, Disk Percent Busy |
| | Trend Boxplot | <element name> | <element location> | <start date> | <days> | <instance> | Cpu Utilization, Memory Utilization, Network Utilization, Disk Percent Busy |
| | Comparison Boxplot | <element name> | <element location> | <start date> | <days> | <instance> | Cpu Utilization, Memory Utilization, Network Utilization, Disk Percent Busy |
| NT Server Performance | Detail XY Line Graph | <element name> | <element location> | <start date> | <days> | <instance> | Cpu Utilization, Memory Utilization, Network Utilization, Disk Percent Busy |
| | Trend Boxplot | <element name> | <element location> | <start date> | <days> | <instance> | Cpu Utilization, Memory Utilization, Network Utilization, Disk Percent Busy |
| | Comparison Boxplot | <element name> | <element location> | <start date> | <days> | <instance> | Cpu Utilization, Memory Utilization, Network Utilization, Disk Percent Busy |
| Internet Application Performance* | Detail XY Line Graph | <element name> | <element location> | <start date> | <days> | | Response Time |
| | Trend Boxplot | <element name> | <element location> | <start date> | <days> | | Response Time |
| | Comparison Boxplot | <element name> | <element location> | <start date> | <days> | | Response Time |
| Daily Rollup Statistics | Detail XY Line Graph | <element name> | <element location> | <start date> | <days> | <metric name> | <rollup statistic> (min, max, mean, std dev, sample size) |

FIG. 21

| SNMP/PATROL METRICS | DESCRIPTION | PLATFORMS | UNITS |
|---|---|---|---|
| busyPer | Provides the percent of CPU usage over the first 5 second period in the scheduler. | Router | percentage |
| ifInOctets | The total number of octets received on the interface, including framing characters. | Router Interface | octets |
| ifOutOctets | The total number of octets transmitted out of the interface, including framing characters. | Router Interface | octets |
| ifSpeed | An estimate of the interface's current bandwidth in bits per second. For interfaces which do not vary in bandwidth or for those where no accurate estimation can be made, this object should contain the nominal bandwidth. | Router Interface | bits per second |
| CPUCpuUtil | Displays the percentage of CPU utilization. | UNIX | percentage |
| MEMFreeMem | Displays the number of pages of memory available. | UNIX | pages |
| NETPacketsIn | Displays the total number of incoming packets within a sample interval. | UNIX | packets |
| NETPacketsOut | Displays the total number of outgoing packets within a sample interval. | UNIX | packets |
| DSKPercentBusy | Displays the percentage of time that the device is busy servicing a transfer request. | UNIX | percentage |
| CPUprcrProcessorTimePercent | Displays a percentage of the elapsed time that a processor is busy executing a non-idle thread. | NT | percentage |
| MEMmemAvailableBytes | Displays the size of the virtual memory currently on the zeroed, free, and standby memory lists. | NT | megabytes |
| NETniPcktsPerSec | Displays the rate that the packets are sent and received on the network. | NT | packets per second |
| PDpdDiskTimePercent | Displays the percentage of elapsed time that the disk spends servicing read or write requests. | NT | percentage |

FIG. 22

| Date-Time | Element | Event string | Duration | Severity |
|---|---|---|---|---|
| 01/12/1998 06:34:12 | nsmmws16 | CPU Utilization over 80% | | Critical |
| 01/12/1998 08:01:23 | nsmmws09 | Host down | 3:24:43 | Critical |
| 01/12/1998 16:54:52 | twmmnt02 | FTP service down | 0:19:42 | Critical |

FIG. 30

PROVIDING AN INTEGRATED SERVICE ASSURANCE ENVIRONMENT FOR A NETWORK

FIELD OF THE INVENTION

The present invention relates to service assurance environments and more particularly to an integrated service assurance environment for a network.

BACKGROUND OF THE INVENTION

A network system architecture enables multiple applications like voice, data and video to be mixed over the network that comprises switching nodes and communications links. Networks for these applications generally have been designed for a particular type of application, such as teleconferencing applications. Different types of applications, however, have diverse requirements.

"Quality of Service" or "QoS" parameters in part define these requirements. In the case of ATM networks, such parameters may include errored cell ratio (ECR), cell loss ratio, fixed delay and delay variation parameters. Applications may also indicate a set of parameters called a "traffic contract" that relates to the bandwidth required from the network. The Errored Cell Ratio (ECR) value is the ratio of the ATM cells in error to all the ATM cells sent during some interval. The remaining parameters are described later. Each application may have a maximum or minimum acceptable value for each parameter and a requested value for each parameter.

As previously indicated, networks are implemented with switching nodes and communications links. The communications links typically have been based upon conventional telephony transmission systems and comprised fiber optic, microwave or wireline links. Fiber optic links transfer typically an error rate of $10^{-9}$; microwave and wireline connections, $10^{-7}$. More recently, communications links have begun to comprise terrestrial and satellite mobile wireless communications links and cable television systems. Each of these communications links are prone to introducing errors at significantly greater rates.

Some present ATM networks attempt to overcome such errors by implementing a transformation process in the form of a correction, or data manipulation, technique at each switching node on a "per-communications link" basis. That is, the network is designed such that certain links operate with a transforming process that is not alterable on a dynamic basis. For example, it is fairly common that satellite systems have a single error correcting code that operates over the entire bit stream passing over the link, notwithstanding the specific application. Using error correcting codes, such as forward error correction (FEC) codes, requires significant amounts of redundant information to be sent with each block of bits wherein a "block" may comprise a partial ATM cell, a single ATM cell or a plurality of ATM cells. This redundant information adds "overhead" to the transfer. This, in turn, reduces the bandwidth available for transporting an ATM cell. To be effective, an error correcting code must also match the anticipated error burst characteristics of the transmission system; systems that are subject to longer bursts require larger codewords or interleaving or both. Interleaving adds significant amounts of fixed delay to that already present in the transmission system. Such fixed delays manifest themselves, for example, as awkward conversation and user discomfort in a teleconferencing application or even as motion sickness and disorientation in a virtual reality application.

Despite the foregoing efforts, network failures are inevitable, and there is a need of monitoring network performance for the purpose of maintaining a predetermined agreed upon QoS.

SUMMARY OF THE INVENTION

A method providing service assurance for a network to maintain an agreed upon Quality of Service. First, an alarm is generated to indicate a status of a network. The generation of the alarm comprises selecting a parameter of network to be monitored; determining a triggering level of the parameter; monitoring the parameter of an occurence of the triggering level; and initiating alarm notification upon the monitored occurrence of the triggered level. Network event information is then dispatched upon generation of the alarm and is subsequently mapped. The data collected on the status of the network is then manipulated by concatenating the data collected on a network into a master file; reformatting the data into a standarized format; translating the data to key codes; sorting the data according to predetermined criteria; and concatenating the sorted data together. The data is then stored in a database. Thereafter, network availability is conveyed graphically.

BRIEF DESCRIPTION OF THE DRAWINGS

The invention will be better understood when consideration is given to the following detailed description thereof. Such description makes reference to the annexed drawings wherein:

FIG. 12 illustrates an exemplary database configuration chart of an embodiment of the present invention;

FIG. 13 illustrates an exemplary report indicating required table space allotments in a database;

FIG. 14 depicts an exemplary report which lists statistics relating to the data in the database in accordance with one embodiment of the present invention;

FIG. 15 is an exemplary report indicating times to load various amounts of data in accordance with an exemplary embodiment of the present invention;

FIG. 17A depicts a main ad hoc screen for navigating when making an ad hoc request for a report in accordance with an embodiment of the present invention;

FIG. 17B illustrates a graphical user interface for selecting a report type in accordance with one embodiment of the present invention;

FIG. 18 illustrates a form which receives report criteria in accordance with one embodiment of the present invention;

FIG. 19 illustrates exemplary batch reporting requirements in accordance with one embodiment of the present invention;

FIG. 20 lists generic report types;

FIG. 21 shows exemplary ad hoc reporting requirements in accordance with one embodiment of the present invention;

FIG. 22 illustrates sample metric information in accordance with an embodiment of the present invention;

FIG. 30 depicts an exception test report in accordance with an embodiment of the present invention;

DETAILED DESCRIPTION OF THE PREFERRED EMBODIMENTS

Figure 1:
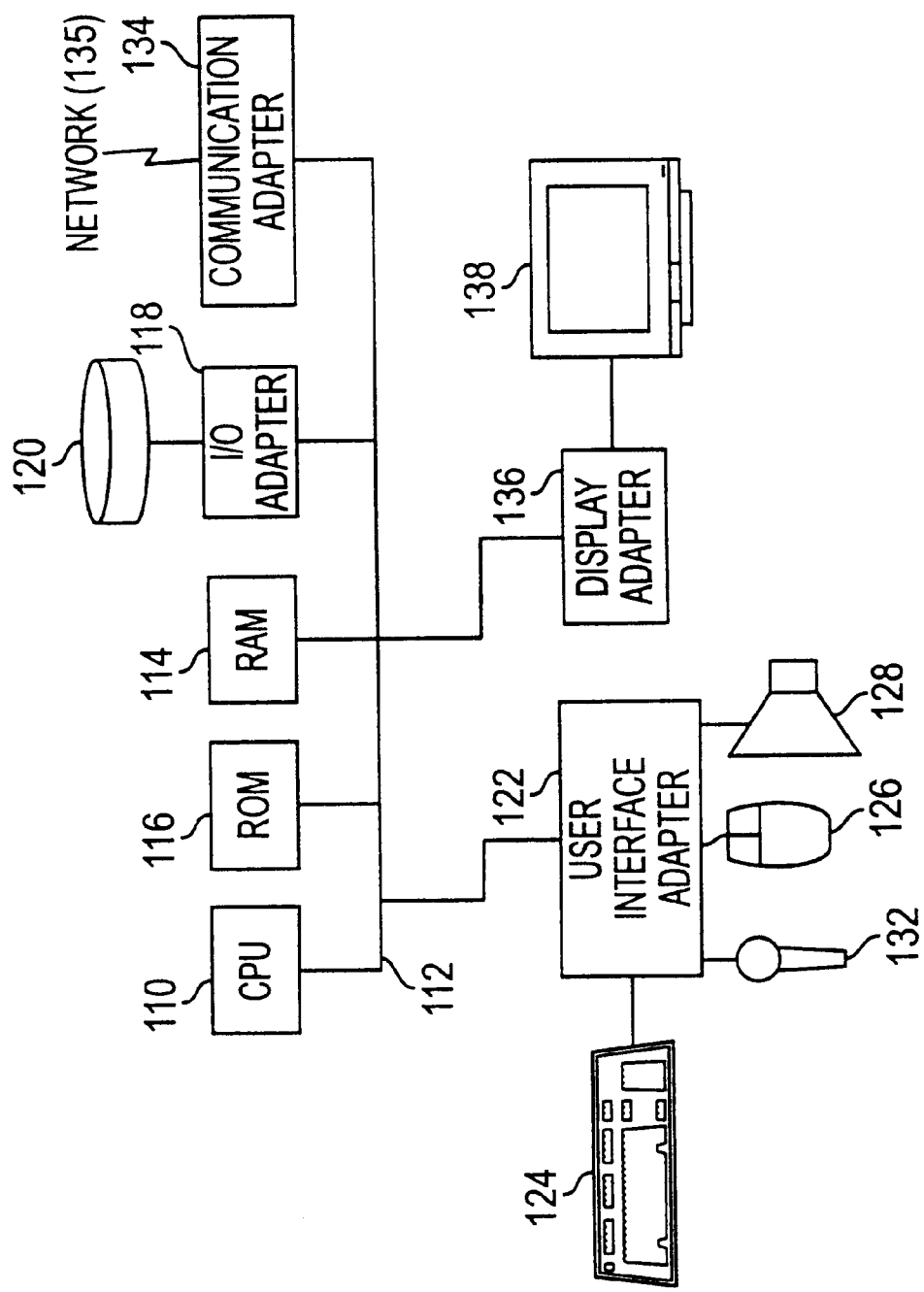
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Bemers-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Overall Architecture

One embodiment of the present invention is composed of multiple software programs which are linked together to create an architecture which is capable of monitoring a network for events and checking system functions and resources. Such events can include alarms, faults, alerts, etc. Other embodiments of the present invention may each include an individual software program.

Reports on system performance, errors, etc. can be generated and output. For example, the reports may depict to operators/administrators of the network what is happening inside the network in real-time. This allows the administrators to respond to problems before disruptions to service occur.

Figure 2:
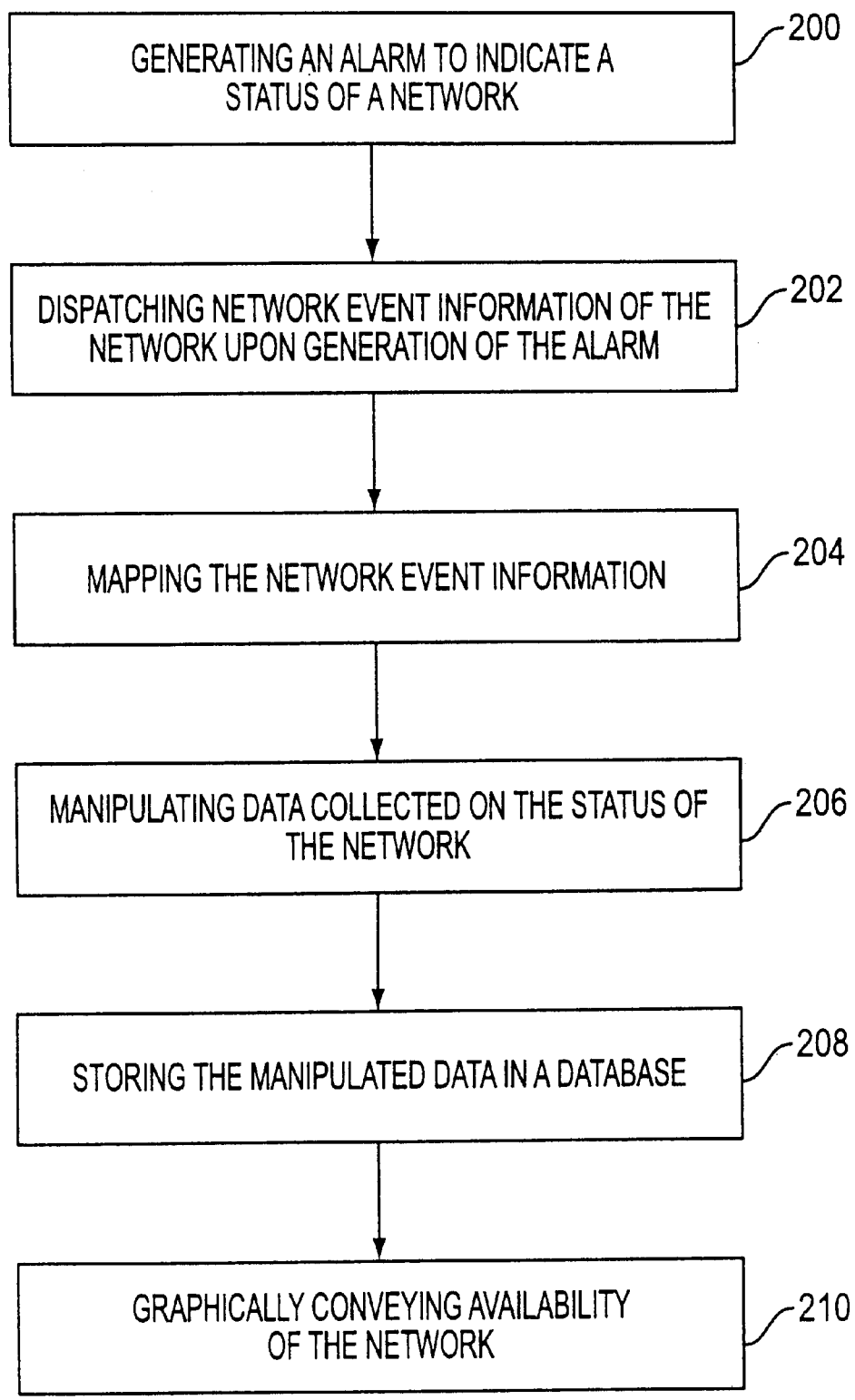
FIG. 2 illustrates an embodiment of the present invention which provides service assurance for a network.

Accordingly, FIG. 2 illustrates an embodiment of the present invention which provides service assurance for a network. In operation 200, an alarm is generated to indicate a status of a network. Network event information of the network is dispatched in operation 202 upon generation of the alarm after which the network event information is mapped in operation 204. The data collected on the status of the network is manipulated and stored in a database. See operations 206 and 208. In operation 210, availability of the network is conveyed graphically.

Collector

A collector may be used to collect system information including events and performance data and route pertinent portions of the system information to a notifier. program which informs a system administrator of the system information. One example of a collector is Netcool® manufacture by Micromuse Inc., whose headquarters are located at 139 Townsend St., San Francisco, Calif. 94107.

Notifier

In one aspect of the present invention, a notifier may form part of the architecture or may stand alone. The notifier is a configurable decision engine that determines how to dispatch system information to users. Notification actions can include initiating alphanumeric pages, trouble tickets, log messages, and external scripts. The notifier is integrated closely with the collector and is able to forward alerts to specific individuals based on the contents of the alert and the time/day it was. The notifier also allows an alert to trigger more than one type of notification. This enables functionality like creating a trouble ticket before paging so that the trouble ticket number can be sent along with an alphanumeric page.

The notifier creates integration between the Collector, and any of a number of other programs which may include an alphanumeric paging program and/or a trouble tickets generation program. Preferably, the notifier can be modified to integrate with existing systems. The notifier may be written in the PERL language.

Figure 3:
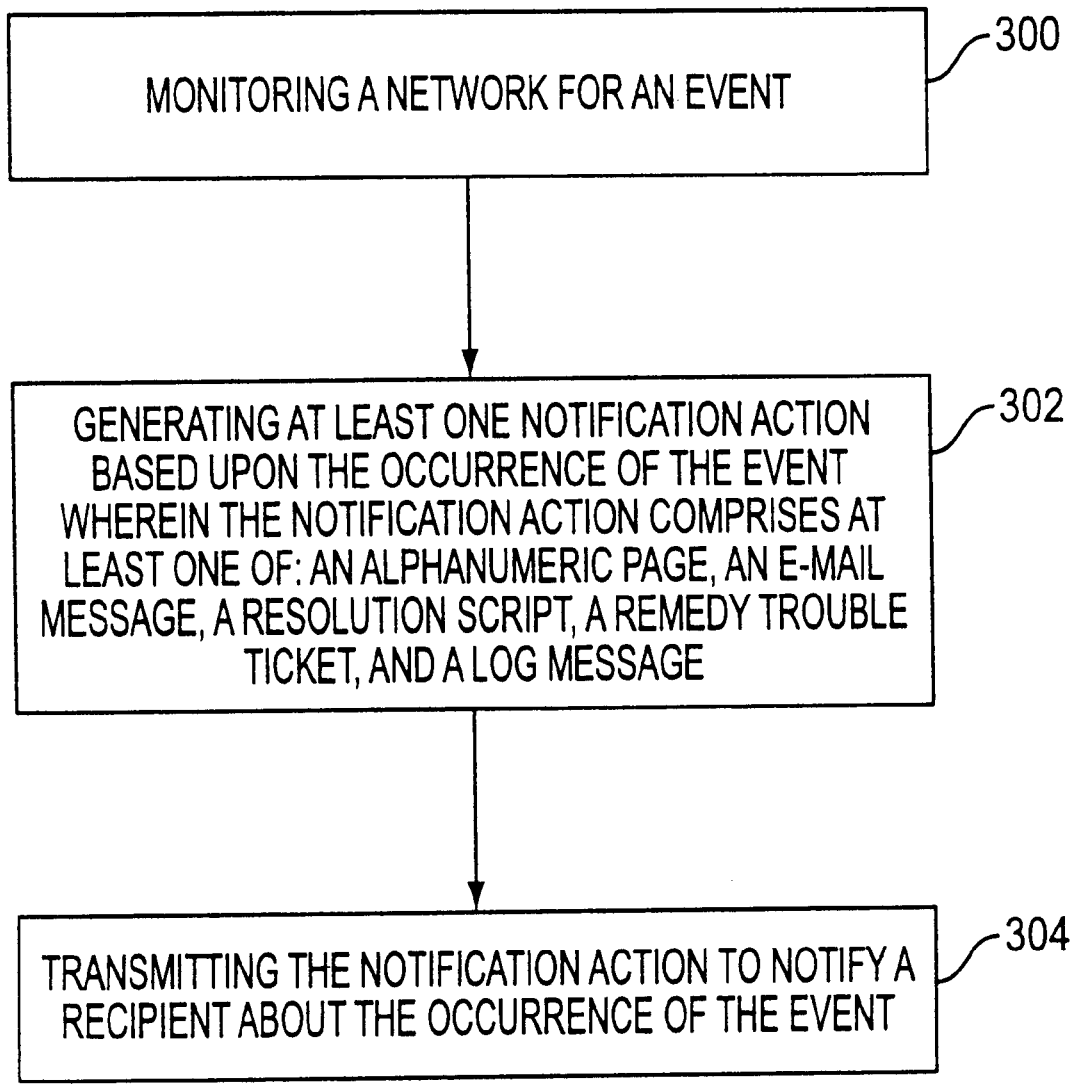
FIG. 3 illustrates one embodiment of the present invention for dispatching network event information of a network with service assurance capabilities.

Accordingly, FIG. 3 illustrates one embodiment of the present invention for dispatching network event information of a network with service assurance capabilities. In operation 300, a network is monitored for an event. Thereafter, in operation 302, at least one notification action is generated based upon the occurrence of the event. The notification action may include an alphanumeric page, an e-mail message, a resolution script, a remedy trouble ticket, and/or a log message. Further, the notification action may be transmitted in operation 304 to notify a recipient about the occurrence of the event.

In one aspect of the present invention, the step of generating the notification action further includes the steps of: determining the type of event that occurred, and generating at least one notification action associated with the determined type of event. Further, the order in which notification actions are generated upon the occurrence of the event may be based upon the determined type of event.

In another aspect of the present invention, the step of transmitting the notification action may further include the steps of: determining characteristics of the occurred event, selecting at least one recipient for receiving the notification action based upon the determined characteristics of the occurred event, and transmitting the notification action to the selected recipient.

In still yet another aspect of the present invention, the step of transmitting the notification action may further include the step of determining the time of occurrence of the occurred event. Such selection of the recipient for receiving the notification action may be further based upon the occurrence time of the occurred event. In addition, the occurred event may be compared to a list of scheduled events such that the generation of the notification action may be inhibited when the occurred event matches of the listed scheduled events.

Automation Programs

Automations are a configurable function in the collector. Automations enhance the collector's functionality by adding intelligence and/or automating tasks. Exemplary automations include:

Fault/Resolution Pairing—each resolution alert received (e.g. Link Up) will trigger an automation to try and find its corresponding fault notification (Link Down, which would have been generated earlier) by matching the node and the problem uniquely. When a F/R pair is found, the resolution alert is removed and the fault alert is cleared (no longer a "critical" or "warning" status). Additional information can be added to the alert including the duration of the fault.

Event and Notification Logging—when a notification is sent out by the notifier, an automation can update the alert for which a notification was generated to indicate what action was taken (page, trouble ticket number, logged, etc;).

Maintenance—all cleared alerts can be removed from the event list after a specified period, reducing distractions from the operators.

Data Acquisition

In another embodiment of the present invention, Data Acquisition scripts are programs which coordinate the collection and transfer of application logs to a central location. Data Acquisition can be used so that log files containing performance statistics gathered by a monitoring program can be transferred to a central server for processing by the Performance Data Manipulator (see below). The Data Acquisition scripts may be written in PERL Performance Data Manipulator (PDM)

In an embodiment of the present invention, a PDM is a script that processes log files that have been collected by Data Acquisition in order to load the data into a database. The PDM converts the log files from formats specific to a particular monitoring program into a common format. PDM then formats the file based on data warehousing techniques which include converting nodes and performance metrics to key codes which are stored in the database. The coded data file is then bulk loaded into the database. The PDM may be written in PERL.

Database Data Warehouse design

An embodiment of the present invention includes a database schema for storing and reporting on network element performance data. The schema should be built for the efficient storage, processing, and aging of performance data.

Time Key Preloader

The Time Key Preloader is a script that supports the efficient loading of data in the database. In prior art database systems, due to the use of "key codes" in the design of databases a unique time key needed to be created for each entry stored in the database. The original solution to this was to create a time key every time an entry was received. This is inefficient. One embodiment of the present invention includes the Time Key Preloader which pre-generates time keys for every second, minute, five minutes, and/or hour, etc. of the day all at once using a direct interface to the database. Thus, the time key for the time an alert or metric is received becomes associated with the alert or performance metric. The Time Key Preloader may be written in PERL.

Figure 4:
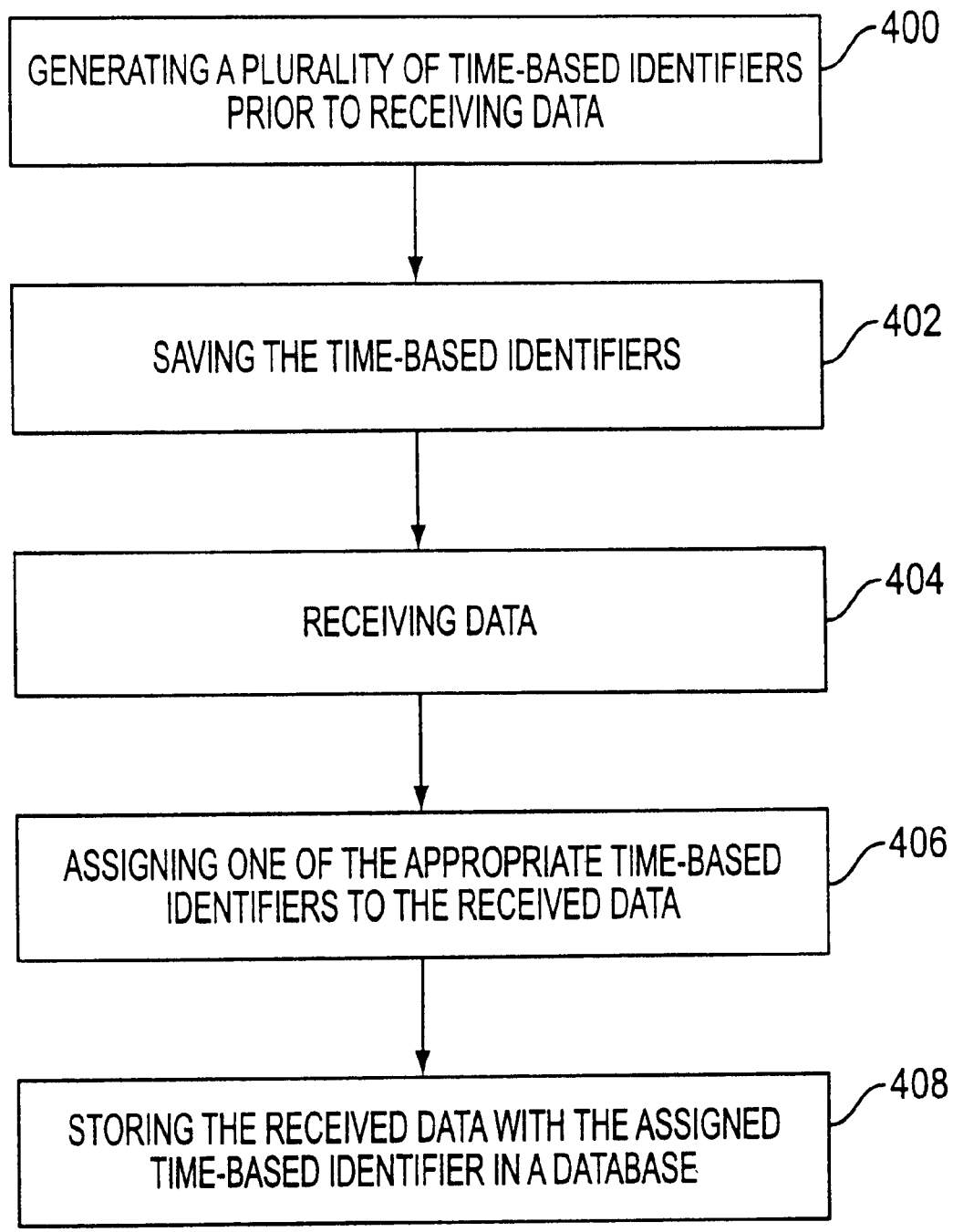
FIG. 4 illustrates an embodiment of the present invention for assigning time-based identifiers to data stored in a database.

FIG. 4 illustrates an embodiment of the present invention for assigning time-based identifiers to data stored in a database. First, prior to receiving data, a plurality of time-based identifiers are generated in operation 400. Next, in operation 402, the time-based identifiers are saved. Upon receipt of data in operation 404, one of the appropriate time-based identifiers is assigned to the received data in operation 406. In operation 408, the received data is stored with the assigned time-based identifier in a database.

In one aspect of the present invention, the time-based identifiers are generated for every second, minute, and hour of every day at once. The time-based identifiers may be generated using an interface to the database. Further, the time-based identifiers may be stored in a database separate from that in which the data is stored.

In yet another aspect of the present invention, the received data relates to a parameter of a network. Further, the data may be stored for service assurance purposes on the network.

Event Correlator and Manager (ECM)

One embodiment of the present invention includes an event correlation application which uses behavior models to correlate network conditions, identify critical problems, filter out superfluous events and take appropriate actions. An example of an ECM is NerveCenter manufactured by Seagate Software, 920 Disc Drive, Scotts Valley, Calif. 95067.

Patroller

An embodiment of the present invention includes a patroller which discover the environment of a network, continuously surveys related systems, and/or initiates alarms based on preset parameters. An example of a Patroller is BMC Patrol manufactured by BMC Software, BMC Software, Inc., 2101 CityWest Blvd., Houston, Tex. 77042-2827.

Alarm Definitions

Alarm Definitions are customizations to an ECM which allow for event correlation and alarm suppression. Preferably, the Alarm Definitions are specific to particular networks in order to add automated intelligence for problem resolution and to reduce unneeded alarm traffic sent to operators.

Automation Scripts and Knowledge Modules

Automation scripts allow the automation of application and system management tasks. Automation scripts may monitor application health and perform corrective actions when the status of an application changes. Other functions may include sending SNMP traps when specific conditions are detected in an application or system.

Reporting Interface Development, Customer Service Integration Module

One embodiment of the present invention provides the ability to correlate network events to individual customers (or providers in a Managed Network Services world) and notify customer service representatives of known outages affecting customers through a web interface. This allows proactive notification to customers of problems that affect them as well as builds confidence in customers calling to report problems that the provider is aware of.

DATA COLLECTION

Data Collection Overview

Figure 5:
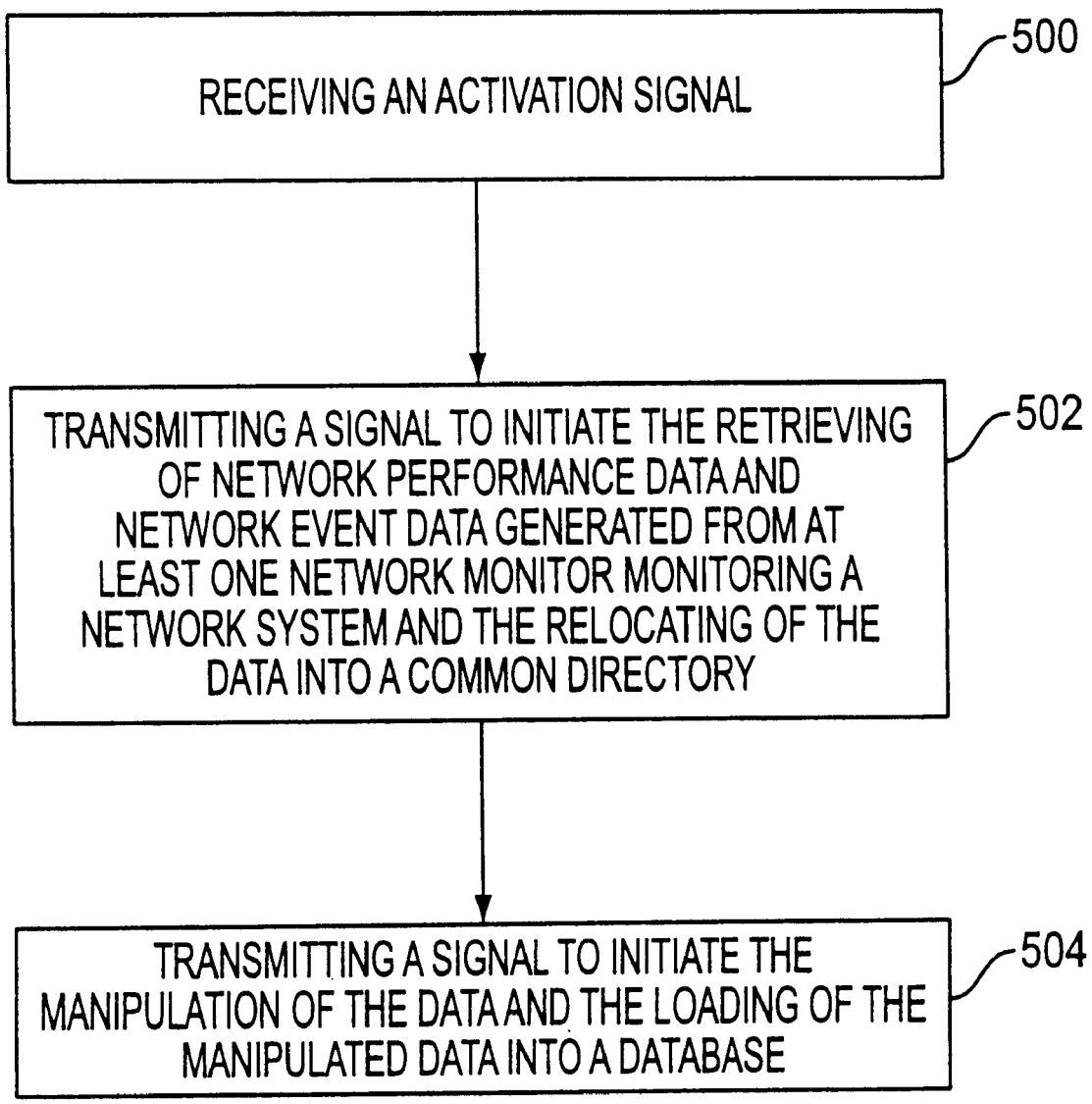
FIG. 5 is a flowchart illustrating an embodiment of the present invention for collecting data.

Referring to FIG. 5, in one embodiment of the present invention, an activation signal is received in operation 500. Upon receipt of the activation signal, a signal is transmitted in operation 502 to initiate the retrieving of network performance data and network event data generated from at least one network monitor. Such network monitor is adapted for monitoring a network system and the relocating of the data into a common directory. Then, in operation 504, the signal is transmitted to initiate the manipulation of the data and the loading of the manipulated data into a database.

In one embodiment, the signal to initiate the manipulating and storing of the data initiates a controller program that transmits a signal to initiate the manipulation of the data. Such controller program transmits a signal to initiate the calculation of statistics from the data, and further transmits a signal to initiate the assigning of key codes to the data.

In another aspect of the present invention, the controller program also transmits a signal to initiate the sorting of the data, and further transmits a signal to initiate the concatenating of the data. Still yet, the controller program transmits a signal to initiate the loading of the data into the database.

As an option, the present invention may further transmit a signal to initiate a clean archive program for deleting files from an archive directory, a signal to initiate a table extract program for extracting data from tables stored in the database, a signal to initiate a trigger reporting program for generating reports, a signal to initiate a purge record program for deleting records from the database, and a signal to initiate a database backup program for backing up data stored on the database.

Figure 6A:
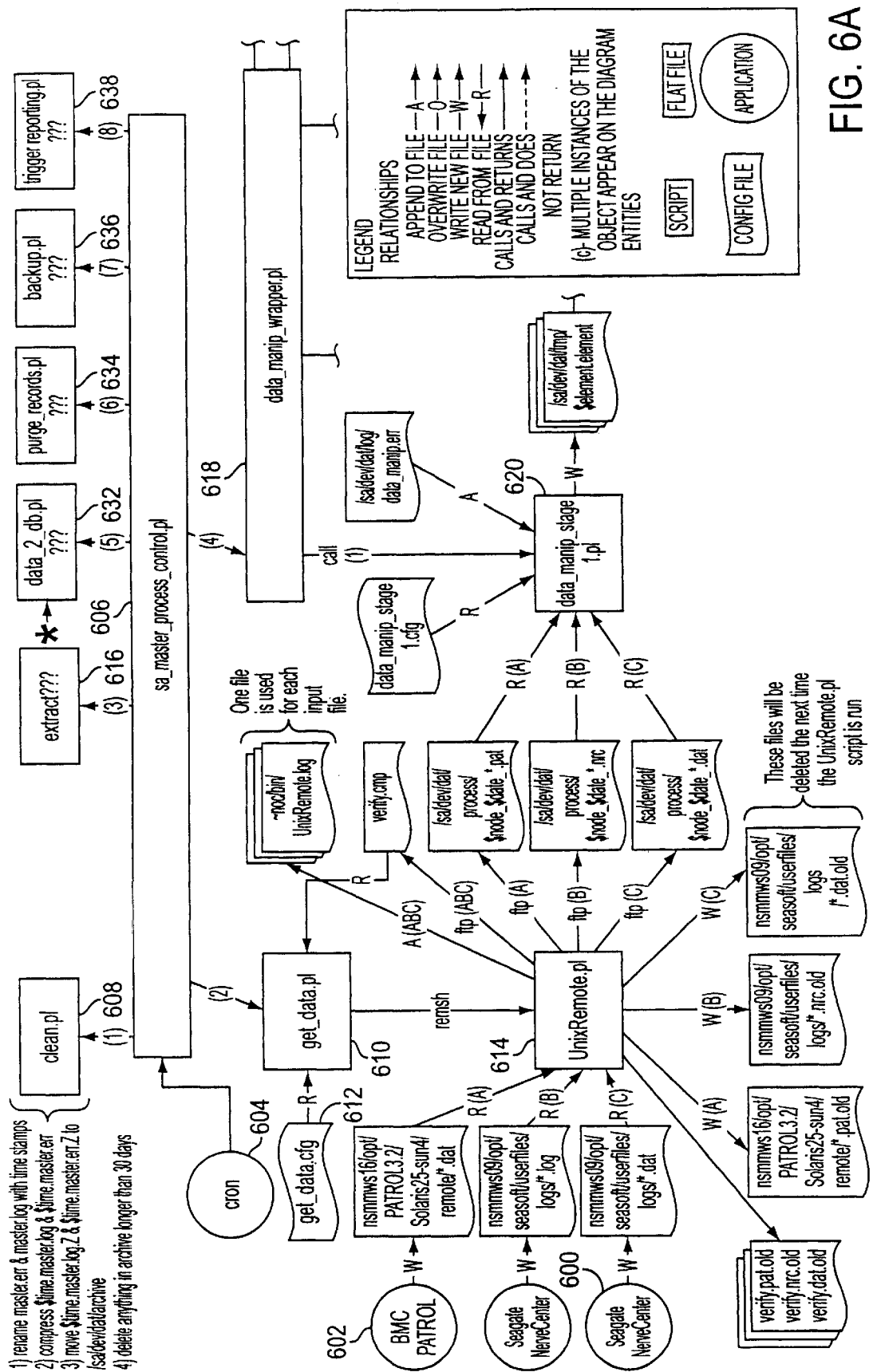
FIG. 6 is a flowchart that provides an overview of a data collection process of one embodiment of the present invention.
Figure 6B:
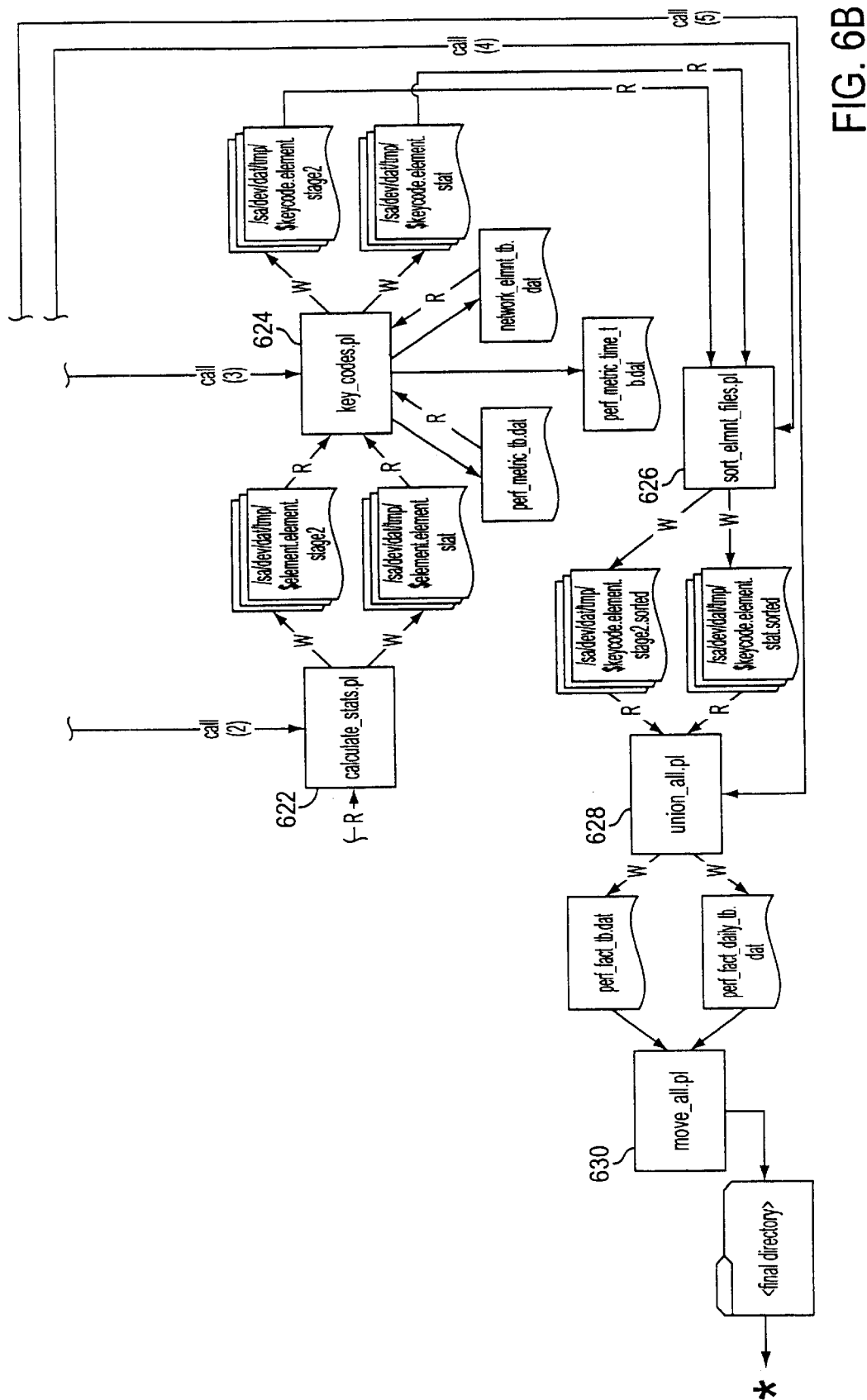

The following subsections describe an embodiment of the present invention that controls the collection, manipulation and storage of network performance data and network event data of a network with service assurance capabilities and provides an exemplary step-by-step overview of the flow of data from collection to when it's loaded into the database. FIG. 6 is a flowchart that provides an overview of a data collection process of one embodiment of the present invention.

In this exemplary embodiment, Seagate NerveCenter will be used as the Event Correlator and Manager 600 and BMC Patrol will be used as the Patroller 602.
Applications The data collection is started by the network monitory applications creating their ASCII text data files. These files are generally stored locally on the machines they are running on. Specifics on where these files should be stored are located in the installation & configuration instructions for each application.
cron The cron 604 process daily activates the processing scripts. The .crontab file should be modified on the system which will do the actual processing of the files.

The cron process starts one script, sa_master_process_control.pl 606, which then begins the rest of the processes
sa_master.process_control.pl The sa_master_process_control.pl script 606 does not actually move or manipulate any of the data files, but instead starts other scripts which will move and-manipulate the data to the appropriate locations and into the required formats. There are 8 sequential steps to this process, each beginning after the previous has finished. The steps are as follows:

1. clean.pl 608
2. get_data.pl

The get_data.pl script 610 is designed to move files from the systems where the data is being collect to the /sa directory structure where it will then be further processed. There are three options that this script can do. The three options are (a) to move files locally on a Unix system, (b) to move files from a remote Unix system, and (c) to move files from a remote NT system.

The script gets its settings from a configuration file named get_data.cfg 612. The most important part is the configuration section for each application:

```
#******************* Host Identification ************************
#$NodeName~$Location~$SourcePath~$SourceExt~$Target Path~$TmpExt~$Mov
eMethod~$Archive~$ArchivePath~#$ArchivePath~$ArchiveExt~$TransferType~$Platform~$Targ
etExt~$DestHost~$LogFile~$UnixRemoteScript
#*********************Example******************************
***
nsmmws16~remote~/opt/PATROLLER/Solaris25-sun4/remote/~.dat~/sa/dev/dat/pr
ocess/~.tmp~move~yes~/opt/PATROLLER3.2/Solaris25-sun4/remote/~.old~ftp~Un
ix~.pat~twmmdb02~/files0/home/noc/bin/UnixRemote.log~/files0/home/noc/bin/Un
ixRemote.pl
```

Use the definition above and the example as a guide on adding more applications and host systems.

For moving files remotely from a Unix system, the UnixRemote.pl script 614 is called using remsh. Once UnixRemote.pl finishes, the verify.cmp file is used to make sure that all the files were properly transferred.
UnixRemote.pl UnixRemote.pl 614 is called using remsh on the system which the files are to be moved. It first deletes the *.old files, which are the data files from the previous day. Then the current data files are renamed to $node_$date_*.$extension. A verify.cmp file is created to later verify that all the files are transferred. The *.$extension files and the verify.cmp file are then transferred to the /sa directory structure, usually by ftp. Once that's done, the old files are archived by change $extension to $extension.old, which flags them for deletion the next day.

3. extract 616
4. data_manip_wrapper.pl

The data_manip_wrapper.pl script 618 controls the action manipulation of the data by calling a number of subscripts, each performing it's own function. Each script is called when the previous script has finished.
data_manip_stage1.pl The data_manip_stage1.pl script 620 is the main script which massages the data. If new applications are added, this is the script which will need to be modified. This script takes the individual data files in the /sa directory structure, reads in the data_manip_stage1.cfg configuration files, manipulates the data so that it's in the format defined by data_manip_stage1.cfg, and then outputs files in the form of $element.element.

calculate_stats.pl

The calculate_stats.pl script 622 calculates the mean, max, min, sample, and standard deviation for each .element file. The output of the script is $element.element.stage2 and $element.element.stat for each .element file.

key_codes.pl

The key_codes.pl script 624 uses perf_metric_tb.ext and network_element_tb.ext to look up the codes associated with the node or element being monitored. It assigns the key code as the name of the file (i.e. keycode.element.stage2 and keycode.element.stat). It also produces perf_metric_time_tb.dat.

sort_elmnt_files.pl

The sort_elmnt_files.pl 626 sorts all of the keycode.element.stage2 and keycode.element.stat files and renames them keycode.element.stage2.sorted and keycode.element.stat.sorted.

union_all.pl

The union_all.pl script 628 takes the keycode.element.stage2.sorted files and concatenates them into perf_fact_tb.dat and the keycode.element.stat.sorted files and concatenates them into perf_fact_dly_tb.dat.

move.pl

The move_all.pl script 630 moves perf_fact_tb.dat, perf_fact_dly_tb.dat and perf_metric_time_tb.dat to /files6/ipsa/data loads/data_files.

5. data_2_db.pl 632
6. purge_records.pl 634
7. backup.pl 636
8. trigger_reporting.pl 638

Call Script

This script does system calls and utilizes FTP to run other scripts. It calls the scripts in a specific order and logs successes and failures.

Scripts on other machines

If scripts need to be run on other machines, FTP should be used. With FTP, a configuration file is needed to house user and password information. Also, an account may have to be set up on that machine to be able to run that script.

NT Account

From the NT host:

Open Microsoft Internet Information Service (IIS), from there open Internet Services Manager Right-Click on SA Ftp Site. Click on home directory and make sure this is share, not local. Add path, Network Share path, and make sure that Write and Log Access is accessed.

In the Security Accounts tab, make sure that the radio button for "Not allow anonymous connections is clicked.

In the FTP Site tab, make sure that the connections are limited to 1.

In the Directory Security tab, make sure the radio button for Denied Access is clicked and add the domain for the server that is attempting the FTP.

UNIX

The user and password being used to FTP must be supported by the system being accessed.

FTP example

```

# Trigger daily reporting
#Create $ReportingScript in /sa/dev/dat/tmp with string "This file is used to trigger
the daily reporting process"
open (FILE,>$SACommon::SATempDir${ReportingScript}) || die "not able to
open $ReportingScript ($!)";
print FILE "This file is used to trigger the daily reporting process";
#Transfer the file to $NTHost
$ftp = Net::FTP->new("$NTHost");
$ftp->login("$User", "$Password");
$ftp->cwd("$NTPath");
$Return = $ftp->put("$SACommon::SATempDir$ {ReportingScript}",
"$NTPath\$ReportingScript");
$ftp->quit;
#Process the return value
if(O != $Return) {
    &SACommon::WriteLog("FTP of$ReportingScript failed");
}elsif(0 == $Return) {
    &SACommon::WriteErrorLog("FTP of $ReportingScript was successful");
}
#Delete $ReportingScripts file from /sa/dev/dat/tmp
close (FILE);
unlink ($SACommon::SATempDir$ {ReportingScript});
```

Scripts on Local machines

The local scripts are called with a system call then logged successful or failure.

System command example

```

#Call Cleanup Utility
$Return = (system($SACommon::SABinDir/$CleanupScript));
if(0 != $Return) {
    &SACommon::WriteLog("$CleanupScript was successful");
}elsif(0 == $Return) {
    &SACommon::WriteErrorLog("$CleanupScript failed to run");
}
```

Order of Scripts Called
1. Cleanup Utility 608
2. Data Acquisition Utility 610
3. Table Extract 616
4. Data Manipulation 618
5. Data Loader 632

6. TPSA_ProcessTheBatchQueue.txt (Reporting SPSS) 638

7. Purge Records 634

8. Backup 636 get_data.pl script

The get_data.pl script, along with the get_data.cfg file, retreves data from both local and remote hosts and relocates it in a common directory. The get_data.pl script also uses the UnixRemote.pl script, which resides on the remote UNIX machines from which data is being acquired. A similar script could also be designed for use with remote NT machines. The get_data.cfg file is the configuration file used to define all program specific information and parameters. There are additional variables and settings defined in the SACommon.pm Perl module, which is located in /sa/usr/mod/. In general, SACommon.pm contains global variables and sub-routines.

Configuration File (get_data.cfg):

The following is an example of what the configuration file entries look like. Each line is read by get_data.pl and then acted on according to the logic defined in the script.

```
#********************** Host Identification Section (continuous line)
*******************
$NodeName~$Location~$SourcePath~$SourceExt~$TargetPath~$TmpExt~$Move
Method~$Archive~
$ArchivePath~$ArchiveExt~$TransferType~$Platform~$TargetExt~$DestHost~$L
ogFile~$UnixRemoteScript
#**************************Example (continuous
line)**************************************
nsmmws16~remote~/opt/PATROLLER/Solaris25sun4/remote/test/~.dat~/sa/dev/dat
/process/~.tmp~
move~yes~/opt/PATROLLER/Solaris25sun4/remote/test/~.old~ftp~Unix~.pat~twm
mdb02~/files0/home/noc/bin/UnixRemote.log~/files0/home/noc/bin/UnixRemote.pl
```

The information contained in each entry is unique to the data being retrieved. The "~" character is used as field delimiter throughout the file. Following is a description of the fields that must be defined for each entry:

$NodeName—DNS name or alias for the local/remote host from which files need to be collected.

$Location—Options include "local" or "remote".

$SourcePath—Complete source path designating the directory from which data will be retrieved.

$SourceExt—File extension used to designate which files need to be collected.

$TargetPath—Complete target path designating the destination directory, on $DestHost, where files should be transferred to.

$TmpExt $MoveMethod $Archive $ArchivePath $ArchiveExt $TransferType $Platform $TargetExt $DestHost—DNS name or alias for the host where files will to be transferred to. It is not necessary for the destination host to be the system calling get_data.pl.

$LogFile $UnixRemoteScript

There is a single variable, $ScriptName, defined locally within get_data.pl. It is recommended for use with the WriteErrorLog and WriteLog sub-routines provided in SACommon.pm. This is a static variable, and should not need to be changed unless the name of the script is changed.

Data acquisition local and remote

Figure 7:
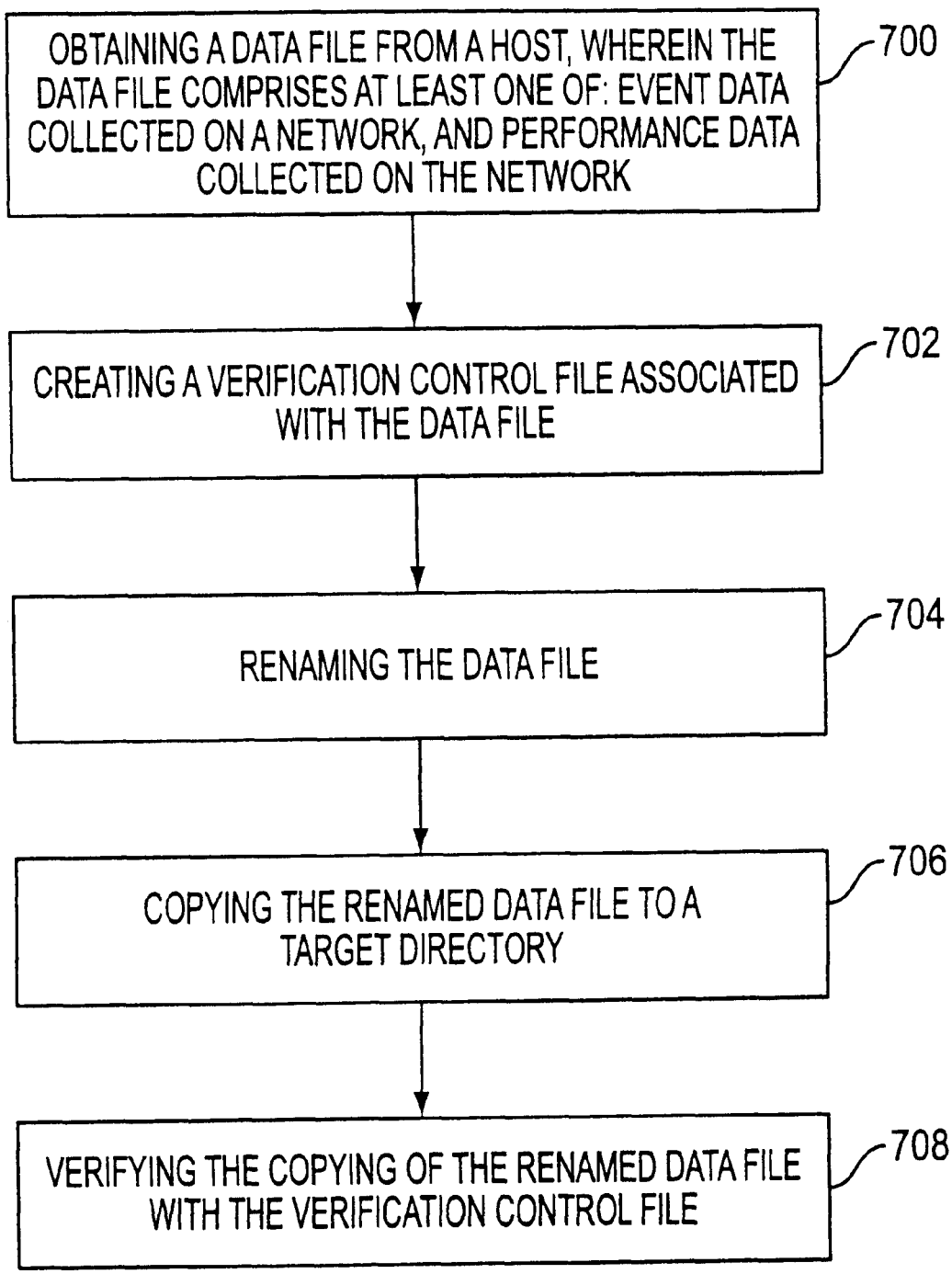
FIG. 7 illustrates an embodiment of the present invention for retrieving and relocating event and performance data of a network with service assurance capabilities.

FIG. 7 illustrates an embodiment of the present invention for retrieving and relocating event and performance data of a network with service assurance capabilities. First, in operation 700, a data file is obtained from a host. The data file includes event data collected on a network and/or performance data collected on the network. In operation 702, a verification control file is created that is associated with the data file. The data file is renamed in operation 704 and copied to a target directory in operation 706. Thereafter, the copying of the renamed data file is verified with the verification control file in operation 708.

In one aspect of the present invention, information is added to the renamed data file relating to host name, date, and application extension. Further, the type of host is determined from which the data file was obtained. The type of host is selected from a local host and/or a remote host.

In another aspect of the present invention, a platform of the determined host is determined when the host is determined to be a remote host. Further, the verification control file may be copied with the renamed data file to the target directory. In addition, the data file may be archived.

In yet another embodiment, previously archived data files may be deleted. Further, a move method may be determined for the data file. A temporary copy of the data file may be created based on the move method. Such move method includes moving the data file and/or copying the data file.

Figure 8:
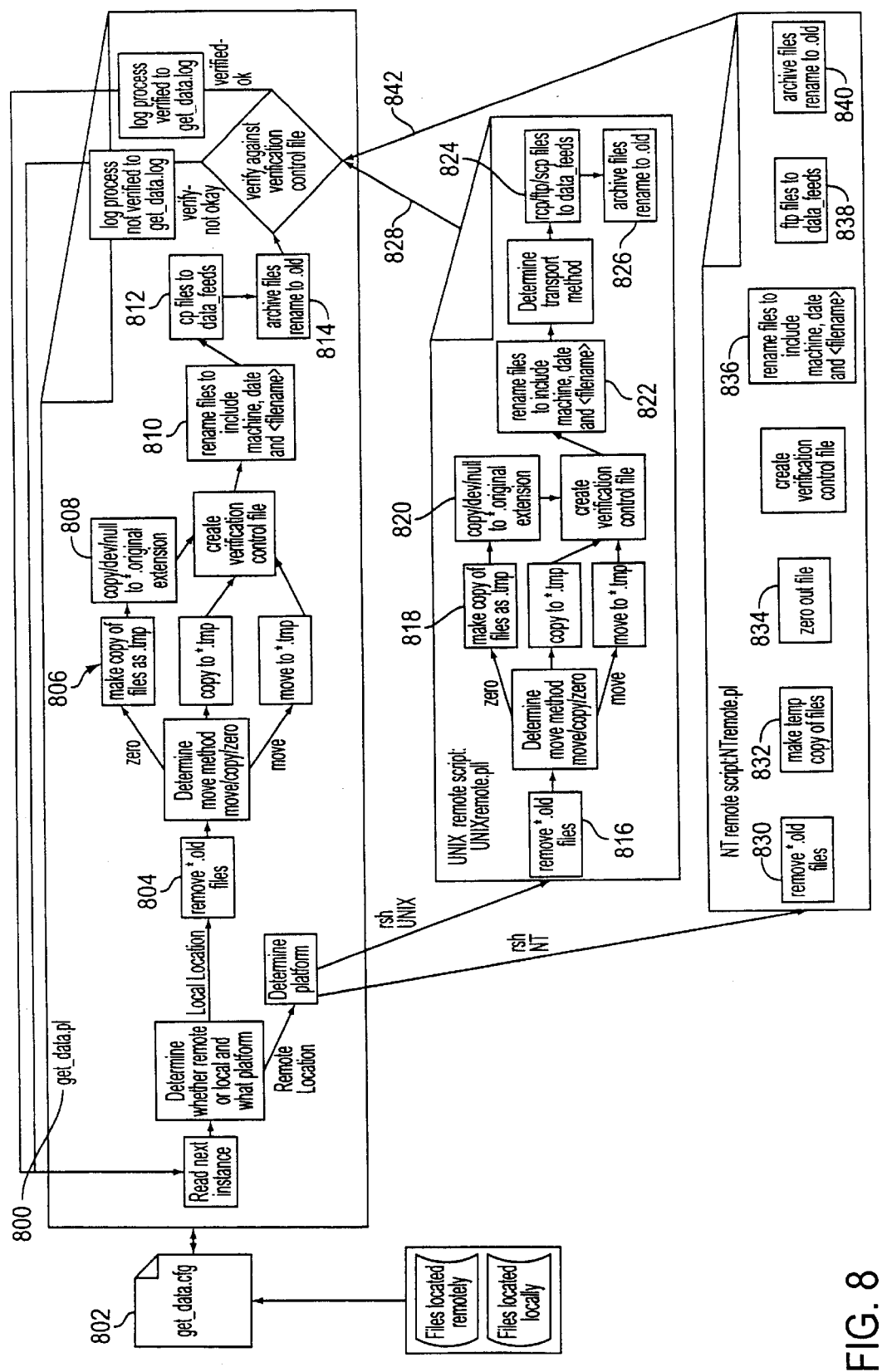
FIG. 8 illustrates operation of the main data acquisition script (get_data.pl) for each entry in the configuration file (get_data.cfg) during data acquisition in accordance with one embodiment of the present invention.

FIG. 8 illustrates operation of the main data acquisition script (get_data.pl) 800 for each entry in the configuration file (get_data.cfg) 802. As shown in FIG. 8, the main data acquisition script (get_data.pl) reads the configuration file (get_data.cfg) once, at the beginning of processing, and stores necessary information in memory. Specifically, user and password are stored as variables, and the host entries are stored as an array. Each host entry is then processed in order:

1. If the data files are local, the get_data.pl script will execute the following steps.

Remove old archived files. 804

If the files are to be moved, they are renamed with .tmp. 806

Parse the system data and reconfigure for file renaming. 808

Rename the files, add machine name, date and application extension. 810

Copy the files to the target directory. 812

Archive the moved files, rename by appending .old to the file name. 814

2. If the data files are remote and Unix, the remote shell command is used to run the UnixRemote.pl script, which resides on the remote machines. UnixRemote.pl will execute and perform the following steps remotely.

Delete old archived files. 816

If the files are to be moved, they are renamed with .tmp. 818

Parse the system data and reconfigure for file renaming. 820

Rename the files, add machine name, date and application extension. 822

Ftp the files to the target directory and create a verification file. 824

Archive the moved files, rename by appending old to the file name. 826

It returns to get_data.pl and get_data.pl continues to execute the verification of the FTP. (To be able to execute FTP commands, the Net::FTP Perl module must be used). 828

3. If the data files are remote and the platform is NT, the remote shell command will be used to run a script that will reside on the remote machine. The script will execute the following steps remotely.

Delete old archived files. 830

If the files are to be moved, they are renamed with .tmp. 832

Parse the system data and reconfigure for file renaming. 834

Rename the files, add machine name, date and application extension. 836

Ftp the files to the target directory and create a verification file. 838

Archive the moved files, rename by appending .old to the file name. 840

It returns to get_data.pl and get_data.pl continues to execute the verification of the FTP. (To be able to execute FTP commands, the Net::FTP Perl module must be used). 842

Data Manipulation Scripts

The scripts contained in the general function of data manipulation are: data_manip_stage1.pl, calculate_stats.pl, key_codes.pl, sort_elmnt_files.pl, union_all.pl and move_all.pl. The combination of these scripts takes the data from /sa/dev/dat/process, manipulates it and performs mathematical computations on it then moves it to the /files6/ipsa/data_loads/data_files so that the SQL loader can load it into the database.

Detailed Description of Modules data_manip_stage.pl

The data_manip_stage1.pl script is the main script which manipulates the data. If new applications are added, this will need to be modified. This script takes the individual data files in the configuration files, manipulates the data so that it is in the format defined by data_manip_stage1.cfg and then outputs files in the form of <element>.element. This manipulation of data has several steps:

Filters out records that contain metrics we do not use for reporting,

Filters out fields we do not use for reporting

Reorders the fields we do want into the order <element>, <metric>, <instance>, <date-time stamp>, <value>

Converts raw metric names to standard metric names (according to a table)

Converts Date Time Stamps to Standard calculate_stats.pl

The calculate_stats.pl script calculates the mean, maximum, minimum, sample size, and standard deviation for each metric in each *.element file. The output of the script is <element>.element.stage2 and <element>.element.stat for each .element file. The format of the *.stat files is <element>, <metric>, <instance>, <min>, <max>, <mean>, <standard dev>, <sample size>.

key_codes.pl

The key_codes.pl script uses perf_metric_tb.ext and network_element_tb.ext to look up the codes associated with the node or element being monitored. It assigns the key code to the name of the file in place of the element name (i.e. <keycode>.element.stage2 and <keycode>.element.stat). It also produces perf_metric_time_tb.dat, which is a list of all of the unique date-time stamps appearing in the raw data and their corresponding epoch times (the number of seconds since Jan 1, 1970)

sort_elmnt_files.pl

The sort_elmnt_files.pl sorts all of the <keycode>.element.stage2 and <Keycode>.element.stat files and renames them <keycode>.element.stage2.sorted and <keycode>.element.stat.sorted.

union_all.pl

The union_all.pl script takes the <keycode>.element.stage2.sorted files and concatenates them into perf_fact_tb.dat and the <keycode>.element.stat.sorted files and concatenates them into perf_fact_dly_tb.dat.

move_all.pl

The move_all.pl script moves perf_fact_tb.dat, perf_fact_dly_tb.dat and perf_metric_time_tb.dat to /files6/ipsa/data_loads/data_files.

Data Manipulator Sample Raw Data

Patroller Data

---

File 1: nsmmpe29_1999_902194516.dat

„nsmmpe29,HISTORY_Propagator,HISTORY_Propagator,GetHistoryData,1999-08-03 19:35:04,0

„nsmmpe29,NT_CPU,CPU_0,CPUprcrProcessorTimePercent,1999-08-03 19:42:51,1.83103

„nsmmpe29 NT_CPU,CPU_0,CPUprcrProcessorTimePercent,1999-08-03 19:57:51,2.2381

„nsmmpe29,NT_CPU CPU_0,CPUprcrProcessorTimePercent,1999-08-03 20:12:52,3.98922

„nsmmpe29,NT_CPU,CPU_0,CPUprcrProcessorTimePercent,1999-08-03 20:27:52,1.52942

-continued

„nsmmpe29,NT_MEMORY NT_MEMORY,MEMmemAvailableBytes,1999-08-03 19:34:41,4.14453
„nsmmpe29,NT_MEMORY,NT_MEMORY,MEMmemAvailableBytes,1999-08-03 19:49:41,2.4375
„nsmmpe29,NT_MEMORY NT_MEMORY,MEMmemAvailableBytes,1999-08-03 20:04:41,1.85156
„nsmmpe29,NT_MEMORY,NT_MEMORY,MEMmemAvailableBytes,1999-08-03 20:19:41,1.19531
„nsmmpe29,NT_MEMORY,NT_MEMORY,MEMmemAvailableBytes,1999-08-03 20:34:41,1.14844
„nsmmpe29,NT_NETWORK,2,NETniPcktsPerSec,1999-08-03 19:46:55,10.9169
„nsmmpe29,NT_NETWORK,2,NETniPcktsPerSec,1999-08-03 20:01:55,11.5108
„nsmmpe29,NT_NETWORK,2,NETniPcktsPerSec,1999-08-03 20:16:55,11.514
„nsmmpe29,NT_NETWORK,2,NETnipcktsPerSec,1999-08-03 20:31:55,12.0128
File 2: nsmrnws09_1999_901881775.dat
„nsmmws09,CPU,CPU,CPUCpuUtil,1999-07-31 04:46:42,4
„nsmmws09,CPU,CPU,CPUCpuUtil,1999-07-31 05:01:47,2
„nsmmws09,CPU,CPU,CPUCpuUtil,1999-07-31 05:16:52,3
„nsmmws09,CPU,CPU,CPUCpuUtil,1999-07-31 05:31:57,2
„nsmmws09,DISK,sd4,DSKPercentBusy,1999-07-31 04:42:14,0
„nsmmws09,DISK,sd4,DSKPercentBusy,1999-07-31 04:57:14,4
„nsmmws09,DISK,sd4,DSKPercentBusy,1999-07-31 05:12:15,0
„nsmmws09,DISK,sd4,DSKPercentBusy,1999-07-31 05:27:15,0
„nsmmws09,MEMORY,MEMORY,MEMFreeMem,1999-07-31 04:46:42,37184
„nsmmws09,MEMORY,MEMORY,MEMFreeMem,1999-07-31 05:01:47,37172
„nsmmws09,MEMORY,MEMORY,MEMFreeMem,1999-07-31 05:16:52,37168
„nsmmws09,MEMORY,MEMORY,MEMFreeMem,1999-07-31 05:31:57,37168
„nsmmws09,NETWORK,le0,NETPacketsIn,1999-07-31 04:43:05,6660
„nsmmws09,NETWORK,le0,NETPacketsIn, 1999-07-31 04:58:06,6423
„nsmmws09,NETWORK,le0,NETPacketsIn, I999-07-31 05:13:06,6822
„nsmmws09,NETWORK,le0,NETPacketsIn, 1999-07-31 05:28:07,6285
„nsmmws09,NETWORK,le0,NETPacketsOut, 1999-07-31 04:43:05,168
„nsmmws09,NETWORK,le0,NETPacketsOut, 1999-07-31 04:58:06,118
„nsmmws09,NETWORK,le0,NETPacketsOut, 1999-07-31 05:13:06,199
„nsmmws09,NETWORK,le0,NETPacketsOut, 1999-07-31 05:28:07,118
File 3: twmmnt02_1999_901997338.dat
„twmmnt02,HISTORY_Propagator,HISTORY_Propagator,GetHistoryData,1999-08-01 12:48:56,0
„twmmnt02,NT_CPU,CPU_0,CPUprcrProcessorTimePercent,1999-08-01 13:02:42,0.835579
„twmmnt02,NT_CPU CPU_0,CPUprcrProcessorTimePercent,1999-08-01 13:17:42,0.776552
„twmmnt02,NT_CPU,CPU_0,CPUprcrProcessorTimePercent,1999-08-01 13:32:42,0.795792
„twmmnt02,NT_CPU CPU_0,CPUprcrProcessorTimePercent,1999-08-01 13:47:42,0.786594
„twmmnt02,NT_MEMORY,NT_MEMORY,MEMmemAvailableBytes,1999-08-01 13:02:49,21.4688
„twmmnt02,NT_MEMORY,NT_MEMORY,MEMmemAvailableBytes,1999-08-01 13:17:49,21.5703
„twmmnt02,NT_MEMORY,NT_MEMORY,MEMmemAvailableBytes,1999-08-01 13:32:49,16.7617
„twmmnt02,NT_MEMORY,NT_MEMORY,MEMmemAvailableBytes,1999-08-01 13:47:49,16.8359
„twmmnt02,NT_NETWORK,2,NETniPcktsPerSec,1999-08-01 13:02:40,14.9904
„twmmnt02,NT_NETWORK,2,NETniPcktsPerSec,1999-08-01 13:17:40,15.0483
„twmmnt02,NT_NETWORK,2,NETniPcktsPerSec,1999-08-01 13:32:40,14.8512
„twmmnt02,NT_NETWORK,2,NETniPcktsPerSec,1999-08-01 13:47:40,15.0225
„twmmnt02,NT_PHYSICAL_DISKS,DISK_0,PDpdDiskTimePercent,1999-08-01 13:02:40,0
„twmmnt02,NT_PHYSICAL_DISKS,DISK_0,PDpdDiskTimePercent,1999-08-01 13:17:40,0
„twmmnt02,NT_PHYSICAL_DISKS,DISK_0,PDpdDiskTimePercent,1999-08-01 13:32:40,0
„twmmnt02,NT_PHYSICAL_DISKS,DISK_0,PDpdDiskTimePercent,1999-08-01 13:47:40,0

Event Correlation and Manager Data

File 1: ifdata.log
Time=08/11/1999 09:39:27 Tue, LogId=22248, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
, GenericTrapNumber=, Enterprise=, SpecificTrapNumber=,Instance=26, Object=
ifEntry, Attribute ifSpeed=100000000 Attribute ifInOctets=464859949 Attribute
ifOutOctets=312935185
Time=08/11/1999 09:39:27 Tue, LogId=22249, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
, GenericTrapNumber=, Enterprise=, SpecificTrapNumber=, Instance=27, Object=
ifEntry, Attribute ifSpeed=100000000 Attribute ifInOctets=0 Attribute
ifOutOctets=0
Time=08/11/1999 09:39:27 Tue, LogId=22250, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
GenericTrapNumber=, Enterprise=, SpecificTrapNumber=, Instance=28, Object=
ifEntry, Attribute ifSpeed=100000000 Attribute ifInOctets=0 Attribute
ifOutOctets=0
Time=08/11/1999 09:39:27 Tue, LogId=22251, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
GenericTrapNumber=, Enterprise=, SpecificTrapNumber=, Instance=29, Object=
ifEntry, Attribute ifSpeed=3705032704 Attribute ifInOctets=0 Attribute
ifOutOctets=0
Time=08/11/1999 09:39:27 Tue, LogId=22252, Severity=Normal,
PropertyGroup=SA_Router_Collection_Group, Node=nsmmrt03,
Alarm=IfDataLogger, Ostate=Ground, Trigger=ifData, Nstate=Ground, TrapTime=
GenericTrapNumber=, Enterprise=, SpecificTrapNumber=, Instance=1, Object=
ifEntry, Attribute ifSpeed=10000000 Attribute ifInOctets=1522731264 Attribute
ifOutOctets=2554292181
Time=08/11/1999 09:39:27 Tue, LogId=22253, Severity=Normal,
PropertyGroup=SA_Router_Collection_Group, Node=nsmmrt03,
Alarm=IfDataLogger, Ostate=Ground, Trigger=ifData, Nstate=Ground, TrapTime=
GenericTrapNumber=, Enterprise=, SpecificTrapNumber=, Instance=2, Object=
ifEntry, Attribute ifSpeed=10000000 Attribute ifInOctets=0 Attribute ifOutOctets=0
Time=08/11/1999 09:39:27 Tue, LogId=22254, Severity=Normal,
PropertyGroup=SA_Router_Collection_Group, Node=nsmmrt03,
Alarm=IfDataLogger, Ostate=Ground, Trigger=ifData, Nstate=Ground, TrapTime=
GenericTrapNumber=, Enterprise=, SpecificTrapNumber=, Instance=3, Object=
ifEntry, Attribute ifSpeed=10000000 Attribute ifInOctets=0 Attribute ifOutOctets=0
Time=08/11/1999 09:39:27 Tue, LogId=22255, Severity=Normal,
PropertyGroup=SA_Router_Collection_Group, Node=nsmmrt03,
Alarm=IfDataLogger, Ostate=Ground, Trigger=ifData, Nstate=Ground, TrapTime=
GenericTrapNumber=, Enterprise=, SpecificTrapNumber=, Instance=4, Object=
ifEntry, Attribute ifSpeed=10000000 Attribute ifInOctets=0 Attribute ifOutOctets=0
Time=08/11/1999 09:39:27 Tue, LogId=22256, Severity=Normal,
PropertyGroup=SA_Router_Collection_Group, Node=nsmmrt03,
Alarm=IfDataLogger, Ostate=Ground, Trigger=ifData, Nstate=Ground, TrapTime=
GenericTrapNumber=, Enterprise=, SpecificTrapNumber=, Instance=5, Object=
ifEntry, Attribute ifSpeed=10000000 Attribute ifInOctets=958056 Attribute
ifOutOctest=3610555

File 2: lsystemdata.log
Time=08/11/1999 09:18:26 Tue, LogId=22153, Severity=Normal,
PropertyGroup=SA_Router_Collection_Group, Node=nsmmrt04e2-1,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=4
Time=08/11/1999 09:18:28 Tue, LogId=22154, Severity=Normal,
PropertyGroup=SA_Router_Collection_Group, Node=nsmmrt03,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=4
Time=08/11/1999 09:33:38 Tue, LogId=22219, Severity=Normal,
PropertyGroup=SA_Router_Collection_Group, Node=nsmmrt04e2-1,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=2
Time=08/11/1999 09:33:40 Tue, LogId=22220, Severity=Normal,
PropertyGroup=SA_Router_Collection_Group, Node=nsmmrt03,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=7
Time=08/11/1999 09:48:43 Tue, LogId=22283, Severity=Normal,
PropertyGroup=SA_Router_Collection_Group, Node=nsmmrt04e2-1,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=2
Time=08/11/1999 09:48:45 Tue, LogId=22284, Severity=Normal,
PropertyGroup=SA_Router_Collection_Group, Node=nsmmrt03,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=10
Time=08/11/1999 10:03:49 Tue, LogId=22347, Severity=Normal,
PropertyGroup=SA_Router_Collection_Group, Node=nsmmrt04e2-1,
Alarm=lsystemDataLogger, Ostate=Ground, Trigger=lsystemData,
Nstate=Ground, TrapTime=, GenericTrapNumber=, Enterprise=,
SpecificTrapNumber=, Instance=0, Object=lsystem, Attribute busyPer=4

-continued

Time=08/11/1999 10:03:51 Tue, LogId=22348, Severity=Normal, PropertyGroup=SA_Router_Collection_Group, Node=nsmmrt03, Alarm=lsystemDataLogger, Ostate=Ground, Trigger=lsystemData, Nstate=Ground, TrapTime=, GenericTrapNumber=, Enterprise=, SpecificTrapNumber=, Instance=0, Object=lsystem, Attribute busyPer=6
Time=08/11/1999 10:18:56 Tue, LogId=22417, Severity=Normal, PropertyGroup=SA_Router_Collection_Group, Node=nsmmrt04e2-1, Alarm=lsystemDataLogger, Ostate=Ground, Trigger=lsystemData, Nstate=Ground, TrapTime=, GenericTrapNumber=, Enterprise=, SpecificTrapNumber=, Instance=0, Object=lsystem, Attribute busyPer=3
Time=08/11/1999 10:18:58 Tue, LogId=22418, Severity=Normal, PropertyGroup=SA_Router_Collection_Group, Node=nsmmrt03, Alarm=lsystemDataLogger, Ostate=Ground, Trigger=lsystemData, Nstate=Ground, TrapTime=, GenericTrapNumber=, Enterprise=, SpecificTrapNumber=, Instance=0, Object=lsystem, Attribute busyPer=3 before it is loaded into the database. Primarily, the raw data files need to be concatenated, reformatted, translated to key codes, and sorted. In addition, the data loader will also perform statistical calculations on the data for daily "roll-up" reports to be loaded into the database.

Body Section

Patroller Data

Performance data from Patroller collectors is in the following text log file format:

Desired Metrics and their Standard or Derive Metrics

TABLE 1

| SNMP metrics | Patroller metrics | Standard or Derived Metric |
| --- | --- | --- |
| busyPer | n/a | CpuBusy_Percent |
| ifInOctects, ifOutOctets, ifSpeed | n/a | InterfaceUtilization_Percent |
| ifInOctets, ifOutOctets, ifSpeed | n/a | InterfaceUtilization_BPS |
| n/a | CPUCpuUtil | CpuUtilization_Percent |
| n/a | MEMFreeMem | MemoryFree_Bytes |
| n/a | NETPacketsIn, NETPacketsOut | NetworkTraffic_PPS |
| n/a | DSKPercentBusy | DiskBusyPercent |
| n/a | CPUprcrProcessorTimePercent | CpuProcessorTime_Percent |
| n/a | MEMmemAvailableBytes | MemoryFree_Bytes |
| n/a | NETniPcktsPerSec | NetworkTraffic_PPS |
| n/a | PDpdDiskTimePercent | DiskTime_Percent |
| n/a | ftpResponseTime | FtpResponseTime_Seconds |
| n/a | smtpResponseTime | SmtpResponseTime_Seconds |
| n/a | nntpResponseTime | NntpResponseTime_Seconds |
| n/a | httpResponseTime | HttpResponseTime_Seconds |

```
„<element name>,<object type>,<instance>,<metric name>,<date time>,<metric value>
...A sample file (found in nsmmws16:/opt/PATROLLER3.2/Solaris25-Sun4/remote/):
„nsmmws09,CPU,CPU,CPUCpuUtil,1999-07-30 14:58:13,25
„nsmmws09,CPU,CPU,CPUCpuUtil,1999-07-30 15:13:18,52
„nsmmws09,CPU,CPU,CPUCpuUtil,1999-07-30 15:28:24,32
„nsmmws09,DISK,fd0,DSKPercentBusy,1999-07-30 15:03:15,0
„nsmmws09,DISK,sd4,DSKPercentBusy,1999-07-30 15:03:15,0
„nsmmws09,DISK,sd4,DSKPercentBusy,1999-07-30 15:18:15,4
„nsmmws09,DISK,sd4,DSKPercentBusy,1999-07-30 15:33:15,0
„nsmmws09,MEMORY,MEMORY,MEMFreeMem,1999-07-30 14:58:13,24008
„nsmmws09,MEMORY,MEMORY,MEMFreeMem,1999-07-30 15:13:18,23548
„nsmmws09,MEMORY,MEMORY,MEMFreeMem,1999-07-30 15:28:24,23544
```

Data Loader

The purpose of the data loader in the SA toolkit is to perform recommended operations on the gathered event data After parsing and reordering, the format is:

<element>, <metric name>, <instancename>, <date time>, <metric value>

Finally, the element name and metric name must be translated to their corresponding key codes and the date time must be converted to the format consistent with the database:

16838, 236998718,6293,54

Event Correlator and Manager (ECM) Data

Performance data from ECM collectors is in the following text log file format: (note: fields in italics are do not have values for poll data):

---

Time=<datetime>, LogId=<LogID>, Severity=<Severity>, PropertyGroup=<PropertyGroup>, Node=<Node>, Alarm=<Alarm>, Ostate=<Ostate>, Trigger=<Trigger>, Nstate=<Nstate>, TrapTime=<TrapTime>, GenericTrapNumber=<GenericTrapNumber>, Enterprise=<Enterprise>, SpecificTrapNumber=<SpecificTrapNumber>, Instance=<,[instance_value]>, Object=<[base_object_name]>, Attribue<[attributename]>=value....

---

. . . a sample file (found in /opt/seasoft/userfiles/logs/ifdata.log)

---

Time=08/11/1999 09:39:27 Tue, LogId=22248, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
, GenericTrapNumber=, Enterprise=, SpecificTrapNumber=, Instance=26, Object=
ifEntry, Attribute ifSpeed=100000000 Attribute ifInOctets=464859949 Attribute
ifOutOctets=312935185
Time=08/11/1999 09:39:27 Tue, LogId=22249, Severity=Normal,
PropertyGroup=SA_Router_Collection_Group, Node=nsmmrt04e2-1,
Alarm=IfDataLogger, Ostate=Ground, Trigger=i #ata, Nstate=Ground, TrapTime=
, GenericTrapNumber=, Enterprise=, SpecificTrapNumber=, Instance=27, Object=
ifEntry, Attribute ifSpeed=100000000 Attribute ifInOctets=0 Attribute
ifOutOctets=0
Time=08/11/1999 09:39:27 Tue, LogId=22250, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
, GenericTrapNumber=, Enterprise=, SpecificTrapNumber=, Instance=28, Object=
ifEntry, Attribute ifSpeed=100000000 Attribute ifInOctets=0 Attribute
ifOutOctets=0
Time=08/11/1999 09:39:27 Tue, LogId=22251, Severity=Normal,
PropertyGroup=SA_Router_Collection_Group, Node=nsmmrt04e2-1,
Alarm=IfDataLogger, Ostate=Ground, Trigger=ifData, Nstate=Ground, TrapTime=
, GenericTrapNumber=, Enterprise=, SpecificTrapNurnber=, Instance=29, Object=
ifEntry, Attribute ifSpeed=3705032704 Attribute ifInOctets=0 Attribute
ifOutOctets=0

---

After parsing and reordering, the format is:

<element>, <metric name>, <instance name>, <datetime>, <metric value>

Finally, the element name and metric name must be translated to their corresponding key codes and the date time must be converted to the format consistent with the database:

16838, 236998718,6293,54

High Level Architecture Description

Figure 9:
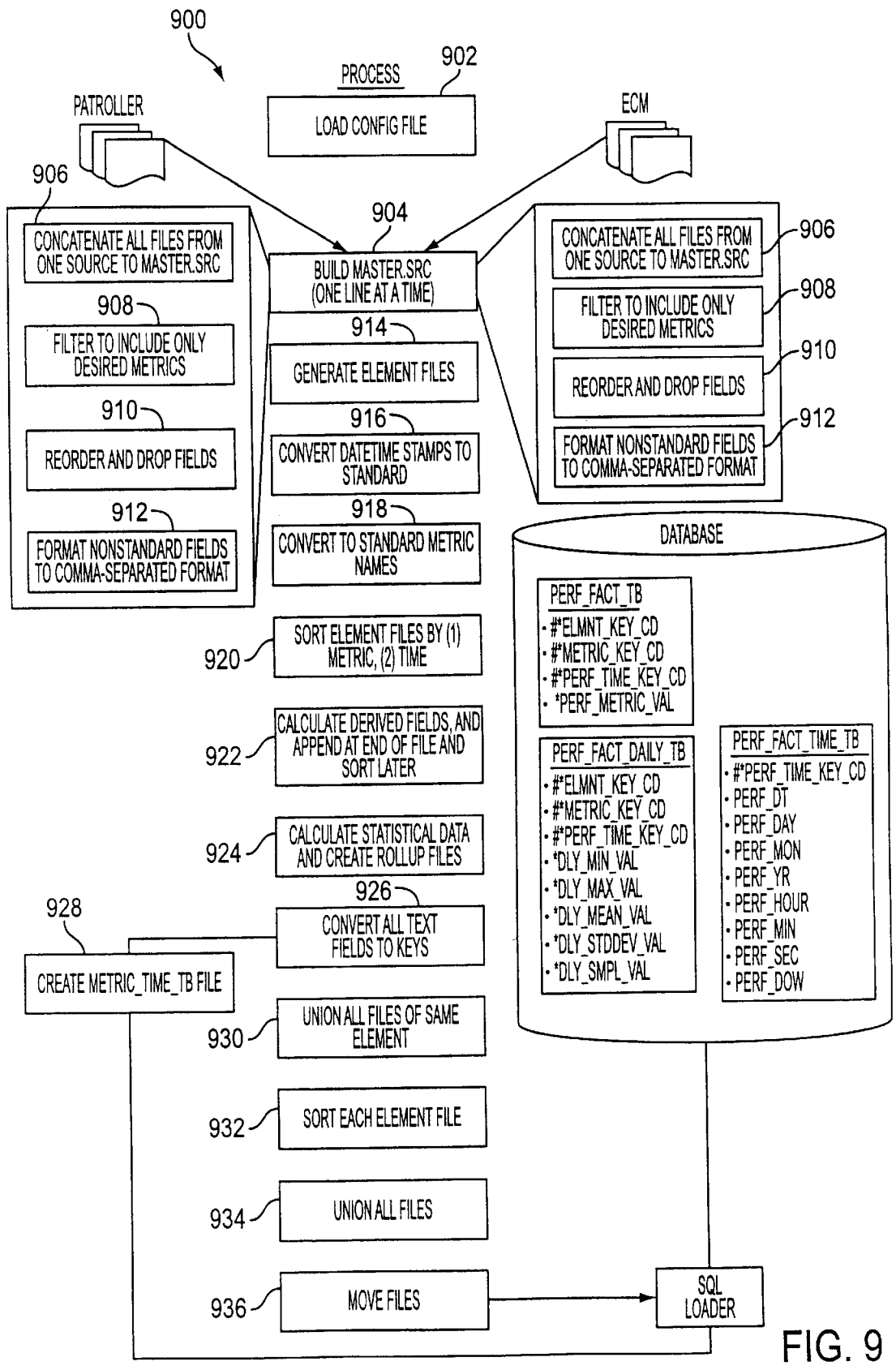
FIG. 9 illustrates an exemplary configuration of an architecture of the present invention for manipulating data using a Patroller and an Event Controller and Manager.

FIG. 9 illustrates an exemplary configuration of an architecture 900 of the present invention for manipulating data using a Patroller and an ECM.

Load Config File 902

Inputs: Configuration file.

Description: This subroutine will open the configuration file, read in the required values to three arrays and close the configuration file.

Outputs: Three arrays: @SectionNames, @SectionMarker, @SectionValues. @SectionNames will contain all of the section titles found in the Config file, (SECTION_GENERAL, SECTION_CONCATENATE_ FILES, SECTION_REORDER_FIELDS . . . ); @Section-Values will contain each line from the config file (that isn't a section header, a blank line, or a comment) as a single element; @SectionMarker will contain the index number of the last line of each section. This way, you can pull out just the elements of the @SectionValues array that you need for a given functional block.

Concatenate All Files 904

Inputs: All log files in the directory sa/prd/dat/process/ECM and sa/prd/dat/process/Patroller. ECM data will have a .nrc extension, Patroller data will have a .pat extension.

Description: This subroutine will concatenate all files from a given source into one master file. For each file in the directory (/ECM and /Patroller), it will read in each line, and:

Concatenate to master (actually done last) 906

Filter to only include desired metrics (delete line if it isn't listed as a desired metric) 908

Reorder and drop fields (split on "," and put in proper order: <element>, <metric>, <time>, value). 910

Format non-standard fields into standard comma separated format. For each element file with a nonstandard field format (such as ECM's dual value fields with a metric=value format), this subroutine will convert these nonstandard fields to standard fields. 912

Outputs: The files master.nrc and master.pat.

Generate Element Files 914

Inputs: Master.nrc and master.pat. (Proper order, comma separated, all text).

Description: For each master file, this subroutine will read each line, create an element file for each unique element, and write the line to the appropriate file.

Outputs: The files element1.elemnrc, felement2.elemnrc, . . . (for all elements found in master.nrc) and the files element1el.elempat, felement3.elempat (for all elements found in master.pat).

Convert Date-Time Stamps to Standard 916

Inputs: Element files. (*.elemnrc, *.elempat, proper order, comma separated, all text)

Description:. Convert the current date time stamps to a standard format (e.g. the 1999-07-30 15:42:13 format found in Patroller files would be converted to . . . )

Outputs: Element files.

Convert to Standard Metric Names 918

Inputs: Element files. (*.elemnrc, *.elempat, proper order, comma separated, all text).

Description: For each element file, this function will lookup each metric name in a hash or flatfile. If found, it will convert it to standard. Else, it's already standard.

Outputs: (Expanded) Element files.

Sort Element files by Metric Time 920

Inputs: Element files (*.elemnrc, *.elempat, proper order, comma separated, all text).

Description: This subroutine will perform and ordered sort on each element file, sorting first by metric, then by time stamp.

Outputs: Element files.

Calculate Derived Fields 922

Inputs: Element files. (*.elemnrc, *.elempat, proper order, comma separated, all text, sorted by metric and timestamp).

Description: For each element file, this subroutine will read each line and search for all metrics (at a given time) required to calculate derived metrics, calculate the given derived metric, create a new line for this derived metric, and append this line to the end of the file.

Outputs: Element files.

Calculate Statistical Data and create Rollup Files 924

Inputs: Element files. (*.elemnrc, *.elempat, proper order, comma separated, all text, sorted by metric and timestamp, derived metrics at end of file).

Description: For each element file, this subroutine will
1) read each line for a given metric,
2) store each value into a temp array,
3) calculate min, max, mean, standard dev., and sample size,
4) create a new line (<element>, <metric>, <time>, <min>, <max>, <mean>, <stddev>, <n>),
5) write this line to a newly created rollup file and
6) repeat for the next metric.

Outputs: Original element files (unchanged), rollup files stats.elemdailypat, stats.elemdailynrc Convert all Text Fields to Key Codes 926

Inputs: Element files (*.elemnrc, *.elempat, proper order, comma separated, all text, sorted by metric and timestamp, derived metrics at end of file), and rollup files.

Description: For each file, this subroutine will read each line, convert each text field to a key code (according to a lookup table in a hash or file, except for the time field, which will be calculated), and write the line to a temp file. When all lines have been converted, the source file will be deleted, and the temp file will be moved to the source file.

For each file and for each unique time stamp, create a new line with the new calculated time key cd (<perf_time_key_cd>, <dt>, <day>, <mon>, <yr>, <hour>, <min>, <sec>, <dow>) and write to a file perf_metric_time_tb.dat file. (This file then should be collapsed to remove duplicate time stamps from different elements). 928

Outputs: (Encoded) element files and rollup files.

Union All Files of Same Element 930

Inputs: Element files (*.elemnrc, *.elempat, proper order, comma separated, all key codes, sorted by metric and timestamp, derived metrics at end of file), and rollup files (all key codes)

Description: This subroutine will concatenate all files of the same element, regardless of collector source (*.pat, *.nrc, . . . ) into a *.elemall files.

Outputs: All-Element files: felement1.elemall, felement2.elemall, . . .

Sort Each Element File 932

Inputs: All-Element files (see A.10)

Description: This subroutine will sort each file first by metric, then by time stamp.

Outputs: All-Element files

Union All Files 934

Inputs: All-Element files, Rollup files (see A.10)

Description: This subroutine will concatenate all *elemall files into perf_fact_tb.dat, and all rollup files into perf_fact_daily_tb.dat.

Outputs: Database load files: perf_fact_tb.dat, perf_fact_daily_tb.dat

Move Files 936

Inputs: A files ready to be archived or moved to sql loader (perf_fact_tb.dat, perf_fact_daily_tb.dat, perf_metric_time_tb.dat)

Description: This subroutine copies and/or moves files to any arbitrary location on a local drive.

Outputs: Copies and/or moves files to /files6/ipsa/data_loads/data_files/ on twmmdb02.

TABLE 2

| Metric Names | | |
|---|---|---|
| SNMP metrics | Patroller metrics | Standard or Derived Metric |
| busyPer | n/a | CpuBusy_Percent |
| ifInOctects, ifOutOctets, ifSpeed | n/a | InterfaceUtilization_Percent |
| ifInOctets, ifOutOctets, ifSpeed | n/a | InterfaceUtilization_BPS |
| n/a | CPUCpuUtil | CpuUtilization_Percent |
| n/a | MEMFreeMem | MemoryFree_Bytes |
| n/a | NETPacketsIn, NETPacketsOut | NetworkTraffic_PPS |
| n/a | DSKPercentBusy | DiskBusy_Percent |
| n/a | CPUprcrProcessorTime | CpuProcessorTime_Percent |

TABLE 2-continued

Metric Names

| SNMP metrics | Patroller metrics | Standard or Derived Metric |
| --- | --- | --- |
| n/a | Percent MEMmemAvailableBytes | MemoryFree_Bytes |
| n/a | NETniPcktsPerSec | NetworkTraffic_PPS |
| n/a | PDpdDiskTimePercent | DiskTime_Percent |
| n/a | ftpResponseTime | FtpResponseTime_Seconds |
| n/a | smtpResponseTime | SmtpResponseTime_Seconds |
| n/a | nntpResponseTime | NntpResponseTime_Seconds |
| n/a | httpResponseTime | HttpResponseTime_Seconds |

Configuration of Event Correlator and Manager

This section describes how to configure the Event Correlator and Manager (UNIX) to collect performance data. It covers the process of adding property groups, creating polls, and building alarms to collect basic performance statistics from CISCO routers. Although the examples are specific to CISCO routers, the concepts and processes introduced are transitive, and can be used to implement collection for other types of SNMP devices.

Figure 10:
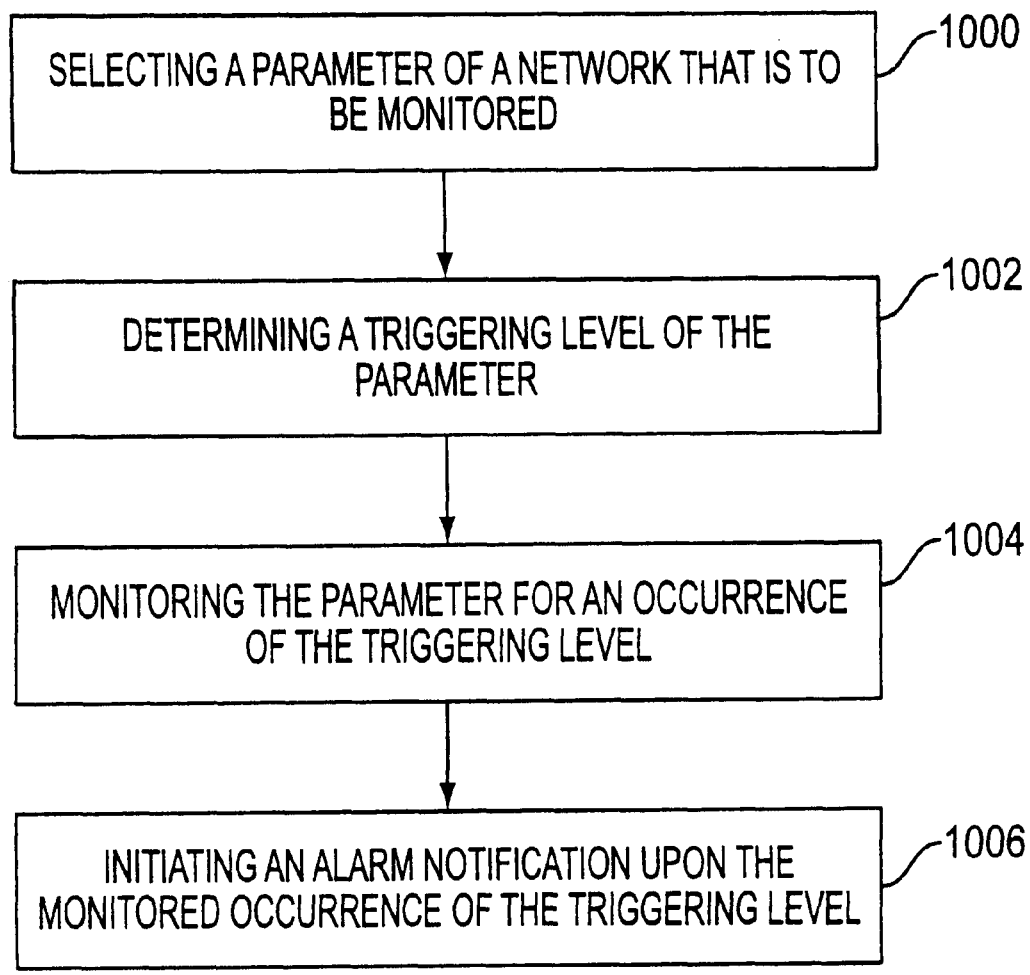
FIG. 10 depicts an embodiment of the present invention which generates an alarm to indicate a status of a network for service assurance purposes.

Accordingly, FIG. 10 depicts an embodiment of the present invention which generates an alarm to indicate a status of a network for service assurance purposes. Such purposes can include identifying errors and faults, monitoring system resources, anticipating problems, etc. Once a parameter of a network that is to be monitored is selected in operation 1000, a triggering level of the parameter is determined in operation 1002. In operation 1004, the parameter for an occurrence of the triggering level is monitored. If the triggering level is reached, an alarm is initiated in operation 1006.

In one aspect of the present invention, the alarm is named for identification purposes. Optionally, the parameter can be adapted to be monitored for a plurality of components of the network. In such an embodiment, a separate alarm notification may be initiated for each of the components upon the monitored occurrence of the triggering level thereon.

As an option, the alarm notification may be stored upon its initiation. Preferably, the alarm notification is stored until the occurrence of a user action.

Assumptions:
The ECM MIB definition for your network hardware has been added to the MIB file.

Starting the client
Start the ECM Client as 'noc', if it is not already running.
Using the Server/Connect menu selection, connect to the network management station as (i.e. nsmmws 16) as 'noc'.
Using the Server/Resync menu selection, resynchronize the ECM database with the platform database containing managed nodes (i.e. HP NNM).

Create a new 'Property Group'
Property groups allow categorization of managed devices into groups. The groups can be based on device types, location, priority, supported MIBs, business function, or any other useful characteristic. Polls or alarms can be restricted to the members of one or more property groups.
Select the Admin/Property Group List menu option to open the Property Group List.
Select the MIB to Group button to open the MIB to Property Group window.
Select the MIB of interest from those listed in the MIB list. For our example, select MIB-II.
Type a unique name in the Property Group Name field, and then select OK. For this example, enter "SA_Router_Collection_Group".

Adding a property to a property group
Adding properties to an existing property group enables one to take advantage of the flexibility of property groups. Properties may need to be added if it is desired to:
Make a property group unique by adding a property that isn't in any other group. By assigning the unique property group to selected devices, you can manage those devices differently from other devices.
Make polls and/or alarms apply to devices belonging to that property group.
Monitor a base object on a group of devices when the base object isn't listed as a property in the devices' property group.

For the purposes of this example, the "lsystem" base object property will be added, defined in the cscoe.asn1 MIB definition; as well as a custom property to make the property group unique.
From within the Property Group List window, select SA_Router_Collection_Group from the list of groups
Click inside the New Property field, type the name of the new property, and select Add. For our example, type "SA Router_Collection_Property".
Repeat the previous step to add the "lsystem" property.
Select Save
Close the Property Group List window Assigning property groups
In the following example, SA_Router_Collection_Group, the property groups created in the previous section, will be assigned to a single router.
Open the Node Definition window for the device.
Select the property group you would like associated with this device from the pop-up list in the Group field.
Select Save, and close the Node Definition window.

Create a new 'Poll'
Open the 'Polls' list from the Patroller console using the Admin/Polls . . . menu selection.
Select 'Add' from the Polls window.
Configure the poll
Leave 'Object Type' as Poll
Change 'Name' to a new name
Set the desired poll rate.
Type a new name for the 'Poll Trigger'. Use a name similar to the name you gave to this poll.
Leave False Trigger blank
Leave Property as 'NO_PROP'
Select 'Set Poll Condition'
(a) Select the 'Base Object' from which you want to collect data. This base object directly correlates to the base object of the SNMP MIB.

(b) Select the desired 'Attributes' from the base object and drag them into the 'Expression' box using the middle mouse button. For each Attribute selected, change the 'Rel Op' field to 'present' and click the 'Add' button. When all attributes have been selected, click the 'Apply' button.

Example Poll

Poll=lsystemDataPoll
   Poll rate=15 min
   True Trigger=lsystemDataTrigger
   Property=SA_Router_Collection_Property
   Poll condition:
     Base object=lsystem
     lsystem.avgBusy1 present and
     lsystem.avgBusy5 present and
     lsystem.busyPer present Create a new "Alarm"
   Open the 'Alarm Definitions' list from the Patroller console using 'Admin-> Alarm Definitions . . . ' selection.
   Select 'Add' from the Alarm window.
   Configure the new Alarm.
     Select a new name for the Logging alarm.
     Select the property of the device group you want to collect data from.
     Select the 'State Diagram' button.
     Using the 'New State' button, create 2 states called 'Ground' and 'Logging'. The 'Severity' of both states should be set to 'normal'.
     Using the 'New Transition' button, create a transition from 'Ground' to 'Logging'. The trigger for this transition should be the name of the 'Poll Trigger' you defined in section 3.1.4. Select 'Apply'. Under 'Action' select 'Log' and type the name of the log file where you want the data stored in the 'Arguments' field . Note: use the name of the trigger with a '.log' extension for the log name. Do not enter a path name as all data is stored in the pre-defined ECM logging directory.
     Create the same transition from 'Logging' to 'Logging'.
     In the 'Alarm Configuration View' select 'On' and 'Apply'.

Note/Caution:
   When designing a logging alarm based on two states (i.e. ground and logging), be aware that a new 5K instance of the alarm may be instantiated and remain in memory for each object within the defined scope. For example, a subobject scoped alarm with two states, ground and logging, created to collect interfaced data from a router would be instantiated once for each interface on all routers in the target property group. Because this alarm contains two states, ground and logging, the alarm remains in memory until manually stopped as it never returns to the ground state. One method of avoiding this unnecessary overhead is to create the logging alarm with only one state, ground, and a single transition from ground to ground.

Example Alarm

Design is Ground to Ground, with a single transition based on the 'lsystemDataTrigger' defined in the example poll above.
Alarm=lsystemDataLogger
   Property=SA_Router_Collection_Property
   Scope=node
   State List:
     Ground-Normal
   Transition List:
     Ground→Ground Trigger=ifDataTrigger
     Action=Log to file:
     Ifdata.log
     Verbose enabled Update the Nerve Center Schema files
   The ECM schema file(s) (e.g. ecm_schema.def) are used by the SA data management subsystem to define and upload data into SAS datasets.
     Edit the file '/perf/CONFIGS/NERVEC_schema.def'
       Add to the end of this file a section for the new data you are collecting. The section should start with a single line to define the new 'TABLE' name, multiple lines for the attributes being collected, and a single line indicating the end of the table definition with the label 'ENDTABLE'.
       Add the 'TABLE' line. This line has 5 fields separated by commas.
Field 1—'TABLE' label
Field 2—Name of new SAS dataset. This field should be no longer than 6 characters.
Field 3—Name of the 'Poll Trigger'.
Field 4—Name of the Alarm.
Field 5—INDEXED or NONINDEXED. Type INDEXED if this is to be and INDEXED dataset. An INDEXED dataset contains data with multiple instances for a single device. For example, collecting router interface data for each interface on a router would be INDEXED, while collecting CPU data from a single CPU on a router would be NONINDEXED.

Example

TABLE,NCSWRMON,RMOND ata,NC_RMONDataLogger,INDEXED
   Add a line for each attributed collected. These lines have 5 fields separated by commas.
Field 1—Name of the SAS Dataset defined in the 'TABLE' line.
Field 2—New name of the attribute. This name must be 7 characters or less.
Field 3—Name of the 'Poll Trigger'.
Field 4—Name of the Attribute being collected by ECM.
Field 5—Type of data. (STRING, C2 RATE, GAUGE, INT)
   STRING: Alphanumeric string.
   C2RATE: If the data is a rising counter, the label will tell SAS to convert it to a rate for the interval in which is was collected.
   GAUGE: If the data is already a rate or a percentage. SAS will do no conversion.
   INT: If the data is an integer (Ex: Interface number)

Example

NCSWRMON,INBITS,RMONData, etherStatsDataSource,STRING
   Add a line to signify the end of the configuration section. This line has 3 fields separated by commas.
Field 1—'ENDTABLE' label
Field 2—Name of new SAS dataset.
Field 3—Name of the ECM Alarm.

Example

ENDTABLE,NCSWRMON,NC_RMONDataLogger

Database

Figure 11:
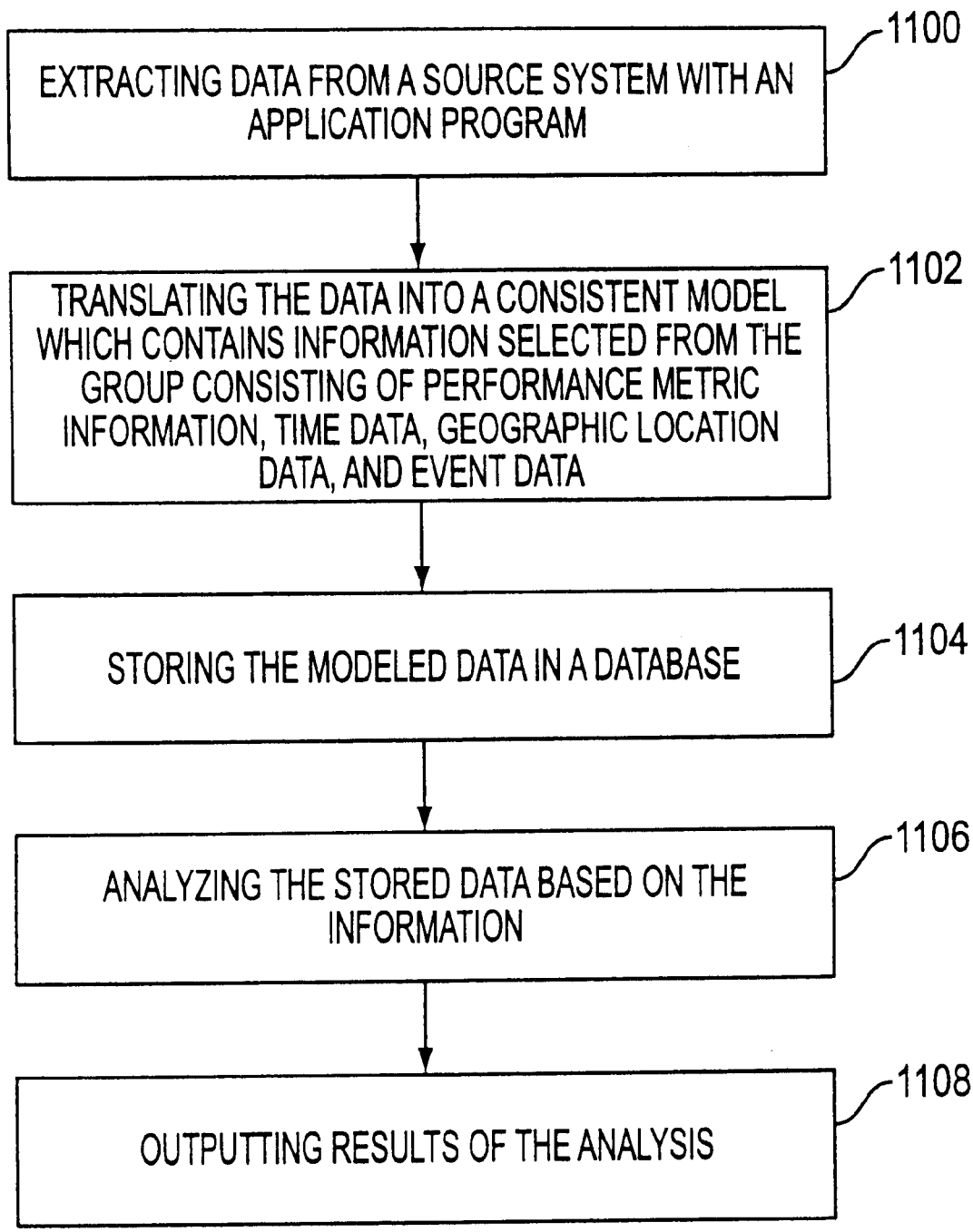
FIG. 11 illustrates an embodiment of the present invention used to develop a database.

One embodiment of the present invention, shown in FIG. 11, is used to develop a database. Data is extracted from a source system with an application program in operation 1100. The data is translated into a consistent model in operation 1102. The model contains information selected from one or more of performance metric information, time data, geographic location data, and event data. The modeled data is stored in a database in operation 1104. The data is analyzed in operation 1106 based on the information and the results of the analysis are output. It should be noted that the data may be analyzed before or after storing.

In one aspect of the present invention, the data is extracted using a plurality of application programs. Further, the information may include performance metric information, time data, geographic location data, and event data.

In yet another aspect of the present invention, the results may be outputted by way of reports and charts. Further, identifiers may be assigned to groups of the data. The data can also be stored in a plurality of databases including a first database for development purposes, a second database for testing purposes, and a third database for production purposes.

Refer to the following sections for more detailed information and additional embodiments.

Database Design

The database for the Service Assurance Toolkit can be designed as a data warehouse. This design offers greater performance and flexibility, which will enable the database to evolve in future releases of the Service Assurance Toolkit. The architecture for a successful data warehouse, by which we mean the end-to-end tools and processes, will vary from implementation to implementation. A typical data warehousing architecture should include, as a minimum:

- Multiple extract programs from one or more operational systems, to retrieve the source data for the warehouse.
- A data repository ("Operational Data Store") containing the extracted data in an appropriate model.
- A tool to analyze and display the data as reports and charts.

The design of the SA database should also be independent of any relational DBMS. By doing this the SA toolkit will be more portable across platforms and will allow us to better meet client needs. Also, the design of the database may contain all necessary information to meet the requirements laid out in the reporting requirement document. For the SA toolkit, the data model should contain information such as:

- Network element information.
- Performance Metric information.
- Detailed time data
- Network element geographic location data
- Network element event data The design of the database can utilize surrogate keys to uniquely identify records. This will be done to increase query performance as well as to add flexibility to the database design. However, this adds complexity to the data manipulation because look-ups on the surrogate keys will need to take place.

Physical Database

The SA toolkit may be built on the Oracle RDBMS platform. While this is a specific platform, the physical design of the database can be independent of Oracle and portable to the major players in the RDBMS world i.e. Sybase, Informix, DB2, Microsoft, etc.

Development Environment

The database environment will have one database for the entire development process. However, for larger networks, more databases can be installed. For example, three databases may be installed—one database each for the devel, test, and production environments.

The installation and file system structure for the database will follow an Optimal Flexible Architecture (OFA). OFA is a set of 13 guidelines or goals to follow in order to standardize the database environment.

Database Backup/Recovery

Backups of the SA database will meet the following requirements:

- The backup script utility may be written in perl. Perl allows scripts to be more portable across hardware platforms.
- The backup utility can be executed by the UNIX cron utility. It could also be executed by the Windows NT AT scheduler if running on the NT platform.
- Cold backups will be run at least once a week. This requires database down time.
- Exports of the database will take place every evening at the end of the nightly batch schedule.

Database Objects

All database objects (DDL, scripts, code) will be placed under source control. This will be done to allow for versioning when databases for other environments are implemented. This also places these objects in a centralized location for easy access.

Data Management, Retention and Volume

Data Volume

The estimated volume of detailed data is 2,000,000 rows per day. The physical design of the database will be built to handle this volume while remaining flexible enough to handle a large increase in volume.

Data Manipulation

Due to the fact surrogate keys will be used to uniquely identify records, a look-up process needs to occur in the data manipulation process. A perl script will be written to extract surrogate key information from the database to flat files. The data manipulation process will use these files to generate flat files in a format that can be loaded into the database tables.

During the nightly batch window, all the detailed level data will be rolled up into daily summary data.

Data Loading

The detailed records will be loaded in via a perl script which utilizes an SQL*Loader utility. While all of the major RDBMS vendors have some sort of data loading utility, they are all different syntactically. Thus, this script may need to change depending on the type of database. For phase 2, the detailed data may be loaded once a day during the nightly batch run.

Daily rollup data will also be loaded via the load script at the same time the detail records are loaded. This is possible because all of the data manipulation is occurring outside of the RDBMS.

Data Retention

Phase 2 recommends detailed level data to be retained for 40 days and daily rollup data retained for 13 months. A perl script will be written to purge this data once is has expired. This process will run nightly, before the actual loading of the data occurs.

Database Developer

The purpose of this section is to outline the steps taken to install a Database Developer portion of the present invention on a server. The following examples will teach how to install the Database Developer on both a Windows NT Workstation and a HP 9000 Server. This section should also be applicable to install the Database Developer on different servers. "Dbse" throughout the description of the present invention denotes a database program.

Minimum System Requirements

The minimum system requirements should be determined before installation of the Database Developer. Exemplary minimum system requirements are:

Each Client Workstation
- 90 MHz processor
- 32 Mb RAM, 1 Gb hard disk
- 60–680 Mb available disk space (depending on the components you choose to install
- Windows NT 4.0/95
- SQL*Net Client 2.3.4
- TCP/IP Adapter
- SQL*Plus 3.3.4
- CD-ROM drive On the Server (for each Repository created).
- 125 Mb in the SYSTEM tablespace
- 20–330 Mb in other tables for the Repository data
- 16–28 Mb available RAM for the System Global Area Pre-Installation Steps
- Verify the system requirements are met at each client workstation
- Verify the Server is correctly installed and accessible on the network
- Verify the database instance you wish to use has been created and functions correctly Client Installation
1. Log on to the client workstation as a user with administrative privileges but not as an administrator
2. Close all other applications
3. Insert the Database Developer media into a media reading device, (e.g., insert a CD into the CD-ROM drive)
4. In the Installation Settings dialog box:
   a) Type the name of the license owner for this product
   b) Select DEFAULT_HOME for Home Name
   c) Select English for Home Language
   d) Click OK
5. Select Yes in all Update message boxes to update out-of-date products
6. Select No in all Up to Date message boxes to avoid reinstalling products
7. Select OK in all General Information and System Support Files message boxes to acknowledge message
8. Select OK to acknowledge the products that will be installed
9. Select OK to acknowledge that Installation is complete
10. Configure SQL*Net as follows:
    a) Click Start→Programs→SQL for Windows NT→SQL Net Easy Configuration
    b) Choose Add Database Alias and click OK
    c) In the Choose Database Alias box, type the database alias you wish to use and click OK
    d) Choose TCP/IP in the Choose Protocol dialog box and click OK
    e) In the Choose Protocol/Server Name and Database Instance dialog box:
       i. Type the name of the server where the database is located
       ii. In the Database Instance field, type the name of the database
       iii. Click OK, click Yes
    f) Select Exit SQL*Net Easy Configuration, click OK
    g) Click OK Server Installation (Example)

Activities at the Database Server
1. Log on to the UNIX Server that holds the database
2. Start the database instance, if not already running
3. Verify that TNS Listener is running
4. Log onto SQL*Plus as system
5. In SQL*Plus, verify that the procedural option has been installed
   a) Execute the following SQL statement:
   SQL> create or replace procedure test as x varchar2
      (10)
      2 begin
      3 if x is null then null
      4 end if
      5 end
      6 /
   Warning: Procedure created with compilation errors.
   SQL> drop procedure test;
   Procedure dropped.
   b) If the SQL statement returns an error (as above), continue to step c. Otherwise go to step 5.
   c) Run the following SQL script to install the option where dbse_home is the location where dbse is installed (C:\DBSNT):
   SQL>@dbse_home/rdbms/73/admin/catproc.sql
6. Create two tablespaces, one for Repository Data and another for Repository Index, of size 100 Mb each
7. Create one tablespace for small rollback segments (recommended four rollback segments @ 10 Mb each)
8. Create one large tablespace for the rollback statement used during installation. The size of this rollback segment should be as big as possible (recommended at least 100 Mb). In this tablespace, create one rollback segment and put it online (this rollback segment and tablespace can be removed after install)
9. Take all rollback segments offline except the SYSTEM rollback segment and the one created in step 8
10. Check the size of the SYSTEM tablespace. You will need at least 125 Mb of free space for the installation.
11. Create the Repository owner and grant connection and resource roles
12. Check the settings in the INITxxx.DBA (where xxx is the name of the database) file and change if necessary.
13. If any changes were made to INITxxx.DBA in the previous step, shut down and restart the database. Make sure to close any SQL*Plus windows that are open. Once the database is restarted successfully, exit Server Manager Activities at the Client
1. Log on to the Client Workstation as a user with administrative privileges but not as an administrator
2. Log on to the database using SQL*Plus
3. Create a role called OWNER
   a) Execute the following SQL statement where home is the directory where the Database Developer was installed:
   SQL>home\repadm20\utl\ckrorole.sql
   b) Issue all privileges that apply to the Repository owner
4. Grant the role created in step 3 to the Repository owner
5. Close any SQL*Plus windows that are open
6. Start the Repository Administration Utility
7. Connect as the Repository owner 8. Click the View Privileges button and verify the required system privileges and roles are granted for the Repository owner. If privileges and roles are correct, continue by clicking Cancel
9. Click the View Tablespace button to check whether the SYSTEM tablespace is fragmented. If the SYSTEM tablespace is not fragmented, continue by clicking Cancel
10. Click the View Parameters button to verify the parameters are set correctly. If they are correct, continue by clicking Cancel
11. Click the Install button on the Repository Administration Utility window
12. Choose Small, Medium, or Large in the Repository Size box according to the expected initial size of the Repository and click the Estimate button
13. Click the Pre-Check button to view a list of system privileges. Insure all privileges have a check mark under the "Has Privilege?" column. If so, continue by clicking OK
14. Click the Tablespace button to view all available tablespaces. Insure there is sufficient space in each tablespace. If so, continue by clicking Cancel
15. Assign tablespaces for indexes by using the dropdown lists under Index Tablespaces and for tables using the dropdown lists under Table Tablespaces using the tablespaces created in step 6
16. Start installation by clicking on the Start button. NOTE: expect this step to take 2–3 hours
17. When you see the message box saying Operation Complete, click OK, then Cancel
18. Examine the log files to ensure that there are no errors and warnings. These files can be deleted if they contain no errors or warnings and all post-installation procedures run correctly
19. Delete temporary tablespace/rollback segment
20. Put all other rollback segments online Automatic Startup and Shutdown of Database This section will outline the steps to setup automatic database startup and shutdown procedures on a HP 9000 server. This process is operating system dependent, but a similar procedure should be applicable for other servers. Consult the correct installation guide for the exact process for the particular server you are working with.

Required Files

The following files are required for automatic startup and shutdown. Some of the files will be created in the process, some are already created, while others are symbolic links.

/sbin/init.d/dbse

This file contains the main script for the database startup and shutdown. It can be created from /sbin/init.d/template. This script will start the database with the command su - dbse -c dbstart and shut it down with the command su - dbse -c dbstop.

/etc/rc.config.d/dbse

This file contains assignment statements that will enable automatic startup and shutdown procedures. It will be created during configuration.

/etc/rc1.d/K100bse->/sbin/init.d/dbse

This file is a link to the /sbin/init.d/dbse script. Depending on the three-digit number after the "K", the script will be executed in ascending order at shutdown. The value after "K" should be as small as possible so the database is one if the first processes to be shutdown.

/etc/rc2.d/S990dbse->/sbin/init.d/dbse

This file is a link to the /sbin/init.d/dbse script. Depending on the three-digit number after the "S", the script will be executed in ascending order at startup. The value after "S" should be as large as possible so the database is one if the first processes to be shutdown.

/etc/dbstab

This file defines which databases are started automatically. The dbse installer creates this file. It simply needs to be modified. If the database is created manually, this file needs to be created.

Create /sbin/init.d/dbse script

Make a copy (but do not remove) /sbin/init.d/template and name it /sbin/init.d/dbse.

Create /etc/rc.config.d/dbse file

Create a file named dbse in the /etc/rc.config.d/ directory. In this file, include the following assignment statements:

DBSE_START=1

Export DBSE_START

Edit the /etc/dbstab file

This file will already be created if the installer program is used to create the database. This file includes all database that are to be started automatically at system boot. An entry for each database instance will be listed in this file in the format where Y indicates automatic startup and shutdown is activated and N indicates it is not activated:

DBSE_SID:DBSE_HOME: {Y|N}

For each database in which you want to invoke automatic startup and shutdown, make changes as necessary to activate automatic startup and shutdown.

Create a link from /sbin/rc1.d/Kxxxdbse to /sbin/init.d/dbse

The scripts in the directory /sbin/rc1.d are executed when the system is shut down. Scripts are executed in ascending order determined by the three-digit number after the "K" (where the number is xxx of the filename Kxxxdbse). This number defines ordering between all scripts located in the /sbin/rc1.d directory. Number the script as low as possible in order to ensure that dbse is shut down before any other processes.

Create a link from /sbin/rc2.d/Sxxxdbse to /sbin/init.d/dbse

The scripts in the directory /sbin/rc2.d are executed when the system is started. Scripts are executed in ascending order determined by the three-digit number after the "S" (where the number is xxx of the filename Sxxxdbse). This number defines ordering between all scripts located in the /sbin/rc2.d directory. Number the script as high as possible in order to ensure that dbse is shut down before any other processes.

/sbin/init.d/dbse

```
#!/sbin/sh

PATH=/sbin:/usr/sbin:/usr/bin
export PATH
rval=0
set_return () {
    x=$?
    if [ $x -ne 0 ]
    then
        echo "EXIT CODE: $x⇆
        rval=1
    fi
}
case $1 in
start_msg)
    echo "Start Dbse"
    ;;
stop_msg)
    echo "Stop Dbse"
```

-continued

```
      ;;
'start')
      if [ -f/etc/rc.config.d/dbse
      then
            ./etc/rc.config.d/dbse
      else
            echo "ERROR:/etc/rc.config.d/dbse MISSING"
            exit 2
      fi
      if [ ${DBSE_START} -eq 1 ]
      then
            echo "Starting Dbse"
            su - dbse -c dbstart
            set_return
      else
            rval=2
      fi
      ;;
'stop')
      if [ -f/etc/rc.config.d/dbse]
      then
            ./etc/rc.config.d/dbse
      else
            echo "ERROR:/etc/rc.config.d/dbse MISSING"
            exit 2
      fi
      if [ ${DBSE_START} -eq 1 ]
      then
            echo "Stopping Dbse"
            su - dbse -c dbshut
            set_return
      else
            rval=2
      fi
      ;;
*)
      echo "Usage: $0 {start|top}"
      ;;
esac
exit $rval
```

Manual Startup and Shutdown of Database

This section will outline the processes to start and stop a database on a HP 9000 server. It will also outline the process to start and stop a Listener Service. This process should be applicable for different versions of UNIX and databases on various other types of servers.

Database Startup Procedure

The following steps can be used when starting a database in UNIX version HP UX 10.2. To verify that the database has been started properly, see the section below entitled "Verifying the database is started/stopped."

1. Log on to UNIX as system user
2. Enter system user's password
3. Check environment table to be sure that the DBSE_SID is set to the database instance that you wish to start→env
4. Start Server Manager→svrmgrl
5. Connect to the system user→connect /as sysdba
6. Start the database→startup
7. Exit Server Manager→exit Database Shutdown Procedure The following steps can be used when stopping a database in UNIX. To verify that the database has been stopped properly, see section five below.

1. Log on to UNIX as system user
2. Enter system user's password
3. Check environment table to be sure that the DBSE_SID is set to the database instance that you wish to start→env 4. Start Server Manager→svrmgrl
5. Connect to the system user→connect /as sysdba
6. Start the database→shutdown
7. Exit Server Manager→exit Verifying the database is started/stopped It is possible to check if the database is started or stopped after completing the steps above. To do so, follow these steps.

1. At the command line type→ps-ef|grep system_user (where system_user is the system user's name that you are logged on as)
2. Look for an entry such as the following→ora_pmon_SID (where SID is the database instance name)

If you find an entry such as the one above, the database is running. If not, the database is shutdown. If you do not get the expected results, redo the database startup or shutdown procedure set forth above.

Listener

The Listener is a utility that handles database connection requests. It may have a service for all databases. If a database is started while the Listener is already running, it may be necessary to restart the Listener.

a. Check if Listener is started for the database instance

At the UNIX prompt, enter the command lsnrctl status. Under the heading "Services Summary . . . ", check that there is an entry reading "SID has 1 service handler(s)." (where SID is the desired database instance). If there is an entry for the desired SID, then the Listener is started. Otherwise the listener is not started.

b. Start the Listener

To start the listener, type lsnrctl start at the UNIX prompt. After this has completed, verify the listener is started by following the steps above in section 6.1.

c. Stop the Listener

It is recommended to stop the listener when the server is shutdown. To do this type lsnrctl stop at the UNIX prompt.

Database Configuration

FIG. 12 illustrates an exemplary database configuration chart. Table 3 provides a key to FIG. 12.

TABLE 3

| Key: | |
|---|---|
| O/S | Operating system at current location. Values include HP-UX, NT. |
| Tablespace: | Name of database tablespace |
| Default status: | Indication of whether tablespace should be on-line/off-line during normal environment operation. |
| Physical require ments: | Indication of such things as requirements to have data vs. index tablespaces on separate system disks. |
| Related tablespaces/ relationships: | List of other tablespaces and their relationships to the current tablespace. For example, the related tablespace might be an index counterpart to the current tablespace, or it might be a data partitioning counterpart, etc. |
| Datafile: | Name of a database datafile which is part of the current tablespace. |
| Datafile size: | Size, in MB of the current database datafile. |

TABLE 4

| File Descriptors | Default Status | File name(s) | File size |
| --- | --- | --- | --- |
| | | | |

TABLE 5

Key:

| | |
| --- | --- |
| File Descriptors | Description of the file or file groups which will reside outside of the database |
| Default status | Condition of file at time of database startup-available, off-line |
| File name(s) | Name(s) of files to be created |
| File size | Size of files to be created |

Environment: Development Location: Development database Server

TABLE 6

| Tablespace | Group Permitted Access | Type of Access |
| --- | --- | --- |
| IPSADAT01 | SPSS_DEVEL | Unlimited |
| | ALL | Read-Only |
| IPSAIDX | SPSS_DEVEL | Unlimited |
| | ALL | Read-Only |
| USERS | ALL | Unlimited |
| SYSTEM | DBA | Unlimited |
| TEMP01 | ALL | Unlimited |

TABLE 7

Key:

| | |
| --- | --- |
| Tablespace | Name of database tablespace |
| Group Permitted Access | Name of security group (see security document) permitted access to current tablespace. |
| Type of Access | Type of access allowed to tablespace, such as unlimited, quota per user, etc. | init.dbs Configuration

```
db_name = IPSA01
db_block_size = 8192
sort_area_size = 102400
db_file_multiblock_read_       # LARGE
count = 32
db_block_buffers = 10000       # LARGE
shared_pool_size = 70000000    # X LARGE
log_checkpoint_interval = 10000
processes = 100                # MEDIUM
nls_date_format = "DD-Mon-YYYY HH24:MI:SS"
dml_locks = 200                # MEDIUM
log_buffer = 65536             # des 2k
open_cursors = 400             # des 2k
sequence_cache_entries = 10    # SMALL
sequence_cache_hash_buckets = 10  # SMALL
max_dump_file_size = 10240     #limit trace file size to 5 Meg each
# If using private rollback segments, place lines of the following
# form in each of your instance-specific init.ora files:
# rollback_segments = (name1, name2)
```

-continued init.dbs Configuration

```
rollback_segments = (r01,r02,r03,r04)
# Global Naming -- enforce that a dblink has same name as the db it
connects to global_names = TRUE
# adversely affect performance. On some non-VMS ports the db_block_
cache_*
# debugging modes have a severe effect on performance.
_db_block_cache_protect = true   # memory protect buffers
compatible = 7.3.4
# By default, this is false.
lock_shared_memory = true
# reads entire SGA into memory on startup. Will take longer to startup
database
# define two control files by default
control_files = (/files0/ipsa/vendor/dbse/links/IPSA01/IPSA01ctrl01.ctl,
/files0/ipsa/vendor/dbse/links/IPSA01/IPSA01ctrl02.ctl,
/files0/ipsa/vendor/dbse/links/IPSA01/IPSA01ctrl03.ctl,
/files0/ipsa/vendor/dbse/links/IPSA01/IPSA01ctrl04.ctl)
background_dump_dest = /files0/ipsa/vendor/dbse/admin/IPSA01/bdump
user_dump_dest = /files0/ipsa/vendor/dbse/admin/IPSA01/udump
core_dump_dest = /files0/ipsa/vendor/dbse/admin/IPSA01/cdump
```

Database Cold Backup

This section will describe the required files needed to run cold_backups. It will outline the recommended steps to configure cold_backups (written in Perl) to run on a database. Finally, this section will discuss how to execute the script. The location of the cold_backups script can be anywhere in the database's directory system.

Required files/directories

The following list of files and directories need to be created before cold_backups will run. These files are described bellow and common naming conventions are given. Also, an OFA directory structure location is specified.

System Identification (SID) File

This file should contain a list of one or more system ids, dbse home, and dbse base. Every system id will be shutdown, backed up, and restarted. The values of this file are also used to set the correct environment of the SID. The format of this file must be of the form: SID,DBSE_HOME, DBSE_BASE. There are no spaces between fields. Also, it is important that there are no blank lines in this file. A common naming convention for this file is cold_sids. The file is best housed with other files related to the backup.

SQL*Plus Script File

This script will generate a complete list of files that need to be backed up. A common naming convention is unix_script.sql. This file will be located in the directory specified for sql scripts.

Password Script

The contents of this file can be found in Appendix B or in O:\Performance\QoSM\Product Development\Database\Doc\getpass. This script allows the user's password to be used within the script without hard-coding the password into it. A common naming convention is getpass. This file should be housed in the unix directory. NOTE: the password is not encrypted so it is important that an unauthorized user does not execute this script at the command line. Also, if the password scripts is used within another script it is important the password is not echoed to the screen.

Backup Directory

The backup directory will store the backup files. The naming convention for this directory is {SID}_cold where SID is the system id. The file is best housed in the current directory (described below in "Current Directory").

Configuration of Variables

Directory paths and file names are hard coded in the cold_backups script. Therefore it is recommended to configure these variables to suit the file structure of the particular database the backup is to be performed on. The following are variables that need to be specified for the system in which the script is run on. These variables are grouped together at the beginning of the script. Look for the commented section entitled "Variable List" to locate the variables within the script.

Current Directory ($Current_Dir)

This variable is set to the directory location in which the backup directory (described above in "Backup Directory"), log file (described below in "Log"), system id file (described above in System Identification (SID) File), and temporary directory (created during execution of the backup and deleted after its completion) are kept. This directory can be placed anywhere.

SID File ($SID_File)

This file, described above in System Identification (SID) File, is located in the current directory. This file contains a list of system ids and environment variables for all databases that need to be backed up. The files has a strict format that must be followed for the script to run in the cron.

Script File ($Script_File)

This file is described above in "SQL*Plus Script File."

Log ($Log)

This file contains messages and errors generated from cold_backup. A common naming convention is cold.log. The log file is created in the current directory (see section 4.2 above) by cold_backups. The log file will be kept in an archived form, also in the current directory, for one previous backup and it will be named *.old where * represents the filename you designate as the log file.

User ($User)

This variable designates which user has export privileges.

Mail Program ($Mailer)

This variable is set to a command line mail program. The mail program is used to notify the Database Administrator of problems occurred during execution of the backup or to inform the Administrator of a successful backup.

File Mount Point ($Mount_point)

This variable is set to the directory structure mount point.

DBA ($DBA)

This variable is set to the Database Administrator that is responsible for getting email messages.

How to Execute

Manually

The cold_backups script can be run manually by having a user execute the script. Since the backup requires that the database be shutdown, inform all database users of the downtime. Expect up to fifteen minutes for the backup. In order to run the script manually go to the directory where the script is located. Check the permissions, and set if necessary. At the command line, type cold_backups. The script will run without user interaction. The script is complete when the prompt returns.

Crontab

It is possible to schedule the backup using the UNIX crontab. To create a new crontab or to edit an existing one, type crontab -e at the UNIX command line. To list the entries in the crontab, type crontab -l at the command line. Entries in the crontab file are lines of six fields separated by spaces or tabs. An asterisk (*) in fields one through five indicates all legal values. Values can be separated by commas (for a list of values) or hyphens (for inclusive range). The fields are as follows:

TABLE 8

| Field | Acceptable Data |
|---|---|
| 1-minute | 0–59 |
| 2-hour | 0–23 |
| 3-month day | 1–31 |
| 4-month | 1–12 |
| 5-weekday | 0–6 (Sunday is 0) |
| 6-command | Complete path of executable |

By using the crontab, it is possible to schedule daily, weekly, or monthly backups during non-peak hours. Since the backup requires that the database be shutdown, inform all database users of the expected downtime. Expect up to fifteen minutes for the backup. Check the permissions of cold_backups before the first backup and set if necessary.

SQL*Plus Script File set echo off
set heading off
set embedded on
set pagesize 1000
set termout off
spool &1
select name from v$datafile;
select member from v$logfile;
select name from v$controlfile;
spool off
set termout on
set heading on
set feedback on
set embedded off
exit Password Script

```
#!/bin/sh
#----------------------------------------------------------#
# Script_name: getpass
# Description: This script will be used to retrieve the  #
#       appropriate password from the .password #
file. It can be used from the command #
line to retrieve a password or from a #
shell script to eliminate hard coding of #
passwords. The .password file is located #
in $DBSE_HOME, with the executable #
#       located in $DBSE_HOME/bin. #
#       #
Dependencies: getpass requires one file, .password #
#
SID_FILE: Contains a list passwords for #
#       system, sys, and dbse. #
#       #
# Command syntax: getpass USERNAME #
#----------------------------------------------------------#
# what shell do we use?
SHELL=/usr/bin/sh
where is our home?
DBSE_HOME=/files2/ipsa/vendor/dbse/product/7.3.4; export DBSE_HOME
# what path do we look for?
PATH=/usr/bin:/bin:${DBSE_HOME}/bin; export PATH
who are we retrieving the password for
if[$1]
then
USER=$1
else
echo""
echo "USAGE: getpass 'username'"
echo""
exit 1
fi
make sure the .password file exist
```

-continued

```
if[ ! -s $DBSE_HOME/.password]
then
echo""
echo "ERROR: this machine does not appear to have a password file"
echo""
exit 1
fi
get the appropriate password
PASSWORD='cat $DBSE_HOME/.password|grep -i "${USER} "|awk'
{print $2}"
BAD_SIDS='cat $DBSE_HOME/.password|grep -i "${USER} "|awk'
{print $3}"
OLD_PASS='cat $DBSE_HOME/.password|grep -i "${USER} "|awk'
{print $4}"
# if a password was found, print it to the screen
if[$PASSWORD]
then
echo "${PASSWORD}"
print a message if passwords appear to not be synced between databases
if[$BAD_SIDS]
then
BAD_SIDS='echo ${BAD_SIDS}|cut-c2-100'
echo""
echo "WARNING:\tThe password for ${USER} may not be
synchronized"
echo "\t\tbetween all databases. The database(s) ${BAD_SIDS}
appear(s)"
echo "\t\tto use the old password '${OLD_PASS}'"
echo""
fi
else
echo""
echo"ERROR: ${USER} is not a supported username"
echo""
exit 1
fi
```

Crontab Examples

The following is an entry of a crontab. The cold_backups script will be backed up at. 2:30am daily.

/files2/db/dev/backup1/cold backups>crontab-1

30 2* * * /files2/db/vendor/dbse/admin/general/unix/ cold_backups/cold_backups

If both fields are specified in an entry, they are cumulative. For example:

0 0 1,15*1/files2/db/vendor/dbse/admin/general/unix/ cold_backups/cold_backups

This crontab entry runs at midnight on the first and fifteenth of each month, as well as every Monday. To specify days in only one field, set the other field to asterisk (*). For example:

0 0 * *1/files2/db/vendor/dbse/admin/general/unix/cold_ backups/cold_backups

This crontab entry runs only on Mondays.

Database Export Backup

This section will describe the files needed to run export_backups. It will outline the recommended steps to configure export_backups (written in Perl) to run on a database. Finally, this section will discuss how to execute the script. The location of the export_backups script should be in admin/general/unix (following OFA standards).

The export_backups script performs a full database export on a database by using an export utility. This script is meant to run daily and the backup files are stored in a cycle that can be configured to suit the needs of the client. For an explanation of the backup cycle and naming convention, see the sections below entitled "Configuration of Backup Cycle" and "How to Execute."

Required files/directories

The following list of files and directories need to be created before export_backups will run. These files are described bellow and common naming conventions are given. Also an OFA directory structure suggestion is given.

System Identification (SID) File

This file should contain a list of one or more system ids and the corresponding values of dbse home and dbse base. Every system id listed in this file will be backed up using the export utility. The values in this file are also used to correctly set the environment variables. The format of this file will be: SID,DBSE_HOME,DBSE_BASE. There are no spaces, only commas, separating the fields. Also, it is important that there are no blank lines in this file. A common naming convention for this file is export_sids. The file is best housed in the current directory (described below in "Current Directory").

Day File

This file will contain the current day number of the backup cycle. The backup cycle is commonly four weeks in length but it can be set at any interval (see section five below on configuration of cycle variables). The day file will contain an integer between one and the maximum day number of the cycle (29 for a four-week cycle). It is important that there are no blank lines in this file. The user will need to create this file before the initial execution of the backup and after that the file will update itself. It is a good idea to have the day number correspond to the current weekday. For example, a one in the day file will correspond with Sunday and a four will correspond with Wednesday. A common naming convention is day_file.dat. This file is best housed in the current directory (described below in "Current Directory").

Password Script

This script needs to be configured for the system. This script allows the user's password to be used within the script without hard-coding the password into it. A common naming convention is getpass. This file should be located in \admin\general\unix. NOTE: the password is not encrypted so it is important that an unauthorized user does not execute this script at the command line. Also, if the password scripts is used within another script it is important the password is not echoed to the screen.

Backup Directory

The backup directory will store the backup files. The naming convention for this directory is {SID}_exp where SID is the system id. The file is best housed in the current directory (described below in "Current Directory ").

Configuration of Variables

Directory paths and file names are hard coded in the export_backups script. Therefore it is recommended to configure these variables to suit the file structure of the particular database the backup is to be performed on. The following are variables that need to be specified for the system in which the script is run on. These variables are grouped together at the beginning of the script. Look for the commented section entitled "Variable List" to locate the variables within the script.

Current Directory ($Current_Dir)

This variable is set to the directory location in which the backup directory (described above in "Backup Directory"), log file (described below in "Log"), SID file (described above in "System Identification (SID) File"), and day file (described above in "Day File") are kept. This directory can be placed anywhere.

Day File ($Day_File)
This file is described above in "Day File".
SID File ($SID_File)
This file is described above in "System Identification (SID) File."
Log ($Export_Log)
This file contains messages and errors generated from export_backup. A common naming convention is export.log. During execution, the log file is opened and the entries will be appended to the existing file. If the file does not exist, the script will create a new log file with the name you designate here. Old log files will be kept in an archived form, also in the current directory, and will contain the logged entries for an entire backup cycle. The archived file will be named *.yyyymmmdd (as in 2001Dec31) where * represents the filename you designate as the log file. The archive will occur if the day file contains the last day of the cycle.
User ($Exp_User)
This variable designates which user has export privileges.
Mail Program ($Mailer)
This variable is set to a command line mail program. The mail program is used to notify the Database Administrator of problems occurred during execution of the backup or to inform the Administrator of a successful backup.
DBA ($DBA)
This variable is set to the Database Administrator that is responsible for getting email messages.
Configuration of Backup Cycle
The backup cycle can be changed to suit the particular requirements for the database. There are six cycle variables in the script that need to be configured if the cycle is changed. They are located in the top portion of the script in a section entitled "Cycle Variables" immediately following the "Variable List" described above in section four. The values of these variables are used to name the backup file and to determine the schedule for when the backup files rollover.
Maximum Day Files ($maxday)
This variable should be set to the maximum number of daily backup files that are kept minus one. For example, if seven daily backups are kept, this value should be set to six. The naming scheme for the daily backup files is such that day00 is the current day's backup and day06 is six days ago.
Week Ending Day ($week_start)
This variable is a string and should be set to the three letter abbreviation of the week day name in which you want the weekly backup files to rollover. For example, if you want the week backup files to roll over on Sundays you would set this variable to "Sun".
Maximum Week Files ($maxweek)
This variable should be set to the maximum number of weekly backup files that are kept minus one. On the week ending date, the weekly backup files will be rolled back and day07 will become week01. For example, if you want to keep four weekly backup files, this variable should be set to three.
Maximum Cycle Days ($maxcycledays)
This variable should be set to the total number of days in the backup cycle plus one. The value of this variable will be the largest possible value that is in the day file (see section 3.2 above). For a four-week cycle, the maximum cycle days variable should be set to twenty-nine (4 weeks*7 days per week+1 day=29 cycle days). A value of fifty-seven would represent an eight week cycle (8*7+1=57). When the value in the day file is the same as the maximum cycle days variable the cycle backup will occur.
Cycle Increment ($inc_value)
Weekly backups will be kept in longer cycle increments for long term storage. The value of this variable should be set to the increment value. This variable comes into effect when rolling back the week files (described in section 5.3). For example, if you want to keep backups in four-week intervals (starting at the last weekly backup) you would set this variable to four.
Maximum Cycle Files ($maxcycle)
This variable should be set to the maximum number of backup files that are kept minus the cycle increment value. For example, if you want to keep backup files for fifty-two weeks (one year) and your increment value is four, the value of this variable should be forty-eight. If the day in the day file is equal to the maximum cycle days, the weekly backup files will be rolled back in increments designated by the increment cycle variable. For example, week04 would become week12 if the increment value were eight.
How to Execute
Manually
The export_backups script can be run manually by having a user execute the script. Since the backup requires that the database be shutdown, inform all database users of the downtime. Expect up to fifteen minutes for the backup. In order to run the script manually go to the directory where the script is located. Check the permissions, and set if necessary. At the command line, type export_backups. The script will run without user interaction. The script is complete when the prompt returns.
Crontab
It is possible to schedule the backup using the UNIX crontab. To create a new crontab or to edit an existing one, type crontab -e at the UNIX command line. To list the entries in the crontab, type crontab -l at the command line. Entries in the crontab file are lines of six fields separated by spaces or tabs. An asterisk (*) in fields one through five indicates all legal values. Values can be separated by commas (for a list of values) or hyphens (for inclusive range). The fields are as follows:

TABLE 9

| Field | Acceptable Data |
| --- | --- |
| 1-minute | 0-59 |
| 2-hour | 0-23 |
| 3-month day | 1-31 |
| 4-month | 1-12 |
| 5-weekday | 0-6 (Sunday is 0) |
| 6-command | Complete path of executable |

By using the crontab, it is possible to schedule daily, weekly, or monthly backups during non-peak hours. Since the backup requires that the database be shutdown, inform all database users of the expected downtime. Expect up to fifteen minutes for the backup. Check the permissions of export_backups before the first backup and set if necessary.

Password Script

```
#!/bin/sh
#----------------------------------------------------------#
# Script_name: getpass #
# Description: This script will be used to retrieve the #
#          appropriate password from the .password #
file. It can be used from the command #
```

-continued

```
#       line to retrieve a password or from a         #
#       shell script to eliminate hard coding of     #
#       passwords. The .password file is located     #
#       in $DBSE_HOME, with the executable           #
#       located in $DBSE_HOME/bin.                   #
#                                                     #
Dependencies: getpass requires one file, .password #
#
# SID_FILE: Contains a list passwords for            #
#       system, sys, and dbse.                        #
#                                                     #
# Command syntax: getpass USERNAME                   #
#----------------------------------------------------#
# what shell do we use?
SHELL=/usr/bin/sh
where is our home?
DBSE_HOME=/files2/ipsa/vendor/dbs/product/7.3.4; export DBSE_HOME
# what path do we look for?
PATH=/usr/bin:/bin:${DBSE_HOME}/bin; export PATH
who are we retrieving the password for
if[$1]
then
USER=$1
else
echo""
echo "USAGE: getpass 'username'"
echo""
exit 1
fi
make sure the .password file exist
if[!-s $DBSE_HOME/.password]
then
echo""
echo "ERROR: this machine does not appear to have a password file"
echo""
exit 1
fi
get the appropriate password
PASSWORD='cat $DBSE_HOME/.password|grep -i "${USER} "|awk '
{print $2}"
BAD_SIDS='cat $DBSE_HOME/.password|grep -i "${USER} "|awk '
{print $3}"
OLD_PASS='cat $DBSE_HOME/.password|grep -i "${USER} "|awk '
{print $4}"
# if a password was found, print it to the screen
if[$PASSWORD]
then
echo"${PASSWORD}"
# print a message if passwords appear to not be synced between databases
if[$BAD_SIDS]
then
BAD_SIDS='echo ${BAD_SIDS}cut -c2-100'
echo ""
echo "WARNING:\tThe password for ${USER} may not be
synchronized
echo "\t\tbetween all databases. The database(s) ${BAD_SIDS }
appear(s)"
echo "\t\tto use the old password '${OLD_PASS}'"
echo ""
fi
else
echo ""
echo "ERROR: ${USER} is not a supported username"
echo ""
exit 1
fi
```

Data Loading Script

The script data_loader is used to load comma delimited data from a text file into a Database by using SQL*Loader. The script can create a control file for this process if one is needed. This script can be run from the cron to load data into many tables, or it can be run from the command line on a single table. It is also possible to do a data re-load using data_loader. The script performs error checking and reports via email to a specified administrator of success or failure. The script may be written in Perl.

Configuration

Environment Variables

Environment variables relevant to the Database need to be set. Specifically, the following environment variables need to be set: DBSE_SID, DBSE_HOME, DBSE_BASE, HOME, and PATH (to include the location of the dbse bin directory and the directory that holds the scripts used by this procedure). To configure these variables, look for the section in the code entitled setting environment variables. Set the values of $SID, $Home, and $Base. Verify that the path is correct when setting the PATH environment variable.

Directory Structure

A directory structure should be set up to house the different types of files required and produced by data_loader. The six types of files required include data files (*.dat), control files (*.ctl), log files (*.log), bad files (*.bad), data definition files (*.ddl), and archived files (files from the previous five categories).

| $Current_dir | | | | | |
|---|---|---|---|---|---|
| $Data_dir | $Control_dir | $Log_dir | $Bad_dir | $Archive_dir | $DDL_dir |

File Names

The files used/created by the data_loader script should have a standardized format. The log files (.log) and bad files (.bad) are named with a date stamp to make the files unique for archiving purposes. The current format of the date stamp is ddMonYYYY. The value of $Date_stamp should be changed to suit the frequency of the data loading. The naming convention should be table_name.date_stamp.extension or in the case of the log file generated by the data_loader script data_loader.date_stamp.log. The data files (.dat) should be named table_name.dat. However, after loading is complete all data files are copied to the archive directory and renamed with a date stamp as in the manner described above. The control files (.ctl) will be named table_name.ctl and will never have a date stamp because they are not archived. The ddl files should be named index_name.ddl.

SQL Scripts and Stored Procedures

This script uses a variety of SQL scripts and stored procedures. The scripts should be located in their own directory (following the OFA directory structure). Set $SQL_dir to this directory location. In order for these scripts to function properly, the table owner must have the ability to select from any table (grant select any table table_owner). The SQL scripts and stored procedures used by data_loader are as follows:

TABLE 10

| Script Name | Type | Input | Output | Functionality |
|---|---|---|---|---|
| get_index | script | table name | table_name.idx | Spool the index names of the given table to the output file. (section 0) |
| drop_index_p | procedure | index name | none | Drops the given index (section 0) |
| create_ctl | script | table name | table_name.ctl | Calls the stored procedure create_ctl_p and spools the control_tb table entries to the output file. (section 0) |
| create_ctl_p | procedure | table name | control_tb | Inserts rows into control_tb to create control file (section 0) |
| p_exec | procedure | string | none | Executes the SQL command passed as a parameter (section 0) |
| sp_kill_users_p | procedure | none | none | Kills SPSS user processes (section 0) |
| get_direct_load | script | table name | table_name.dir load | Spools the index names that are in direct load state of the given table to the output file (section 0) |

Input and Output Files
Required Files
    table_list (file containing a list of tables to load—used if no table is indicated at run time)
    table_name.dat (comma delimitated file containing data to load into table_name)
    index_name.ddl (used to create indexes that were dropped)
    table_name.date_stamp.dat (copy of table_name.dat after load for archiving purposes)
Files Generated
    data_loader.date_stamp.log (log file generated by data_loader)
    table_name.idx (generated by the SQL script get_index, it is deleted at the end of the script—see section 0)
    table_name.ctl (file is generated by SQL script create_ctl if a '-c' is indicated at run time—see section 0)
    table_name.date_stamp.log (log file generated by SQL*Loader—see section 0 for an explanation of the date stamp)
    table_name.date_stamp.bad (bad file generated by SQL*Loader—see section 0 for an explanation of the date stamp)
    table_name.dirload (file generated by SQL script get_direct_load, it is deleted if the files has zero size—see section 0 for an explanation)
Messaging
    The data_loader script will send email to an administrator to report success or failure of the data loading process. Set $Mailer to the text string that will execute the mailer in command line mode. Set $DBA to the email address of the administrator.
Users
    The data_loader script will need to log on to SQL*Plus and SQL*Loader a number of times for a variety of purposes. A variable name should be set for each schema name that will be utilized. Do not hard-code the schema password in the script. Instead use getpass.
Options with SQL*Loader
    The following options are used with SQL*Loader:
    control=$Control_file (see section 0)
    log=$Log_file (see section 0)
    bad=$Bad_file (see section 0)
    skip=$Skip_number (default is zero, only changes if doing reload, see section 0)
    errors=100
    direct=TRUE
    silent=ALL
Options Executing data_loader
data_loader
    Get tables to be loaded from file (table_list)
    Do not create a control files
    Skip zero records while loading
data_loader-c schema_name
    Get tables to be loaded from file (table_list)
    Create control files for all tables
    schema_name is the owner of the tables
    Skip zero records while loading
data_loader -t table_name
    Table to be loaded is table_name
    Do not create control file
    Skip zero records while loading
data_loader -r table_name skip_number
    Table to be loaded is table_name
    Do not create control file
    Skip skip_number records while loading
Procedure
    The following is the procedure the data_loader script follows to load data into a database.

TABLE 11

| Step | Activity/Action |
|---|---|
| 1 | Read in and set parameters<br>Set database environment<br>Set directory structure variables<br>Set SQL Script directory<br>Set Mailer program and Administrator<br>Set Failure Flag to false (0) |
| 2 | For each user, set user name and get password using getpass |
| 3 | Archive old log files and bad files |
| 4 | Set the date stamp for load |

TABLE 11-continued

| Step | Activity/Action |
|---|---|
|  | Create data_loader.date_stamp.log |
| 5 | Push the table name to be loaded into an array. Get this information either from a file (table_list) or from a parameter |
| 6 | Find the current indexes on the tables to be loaded<br>Drop the indexes that are not on the primary key(s) |
| 7 | If necessary, create control files for each table that is to be loaded<br>Check that the control file was created successfully |
| 8 | Alter the database to allow only users with RESTRICTED PRIVLEDGES to log on<br>Kill user processes that are do not have RESTRICTED PRIVLEDGES |
| 9 | Set the files names of the data file, control file, log file, and bad file<br>Check to insure the input files exist, abort loading if they do not |
| 10 | Start SQL*Loader |
| 11 | Check load results by scanning the log file for errors<br>Check if there is a bad file generated by SQL*Loader |
| 12 | Repeat steps 9–11 for all tables to be loaded |
| 13 | Alter database to allow ALL USERS to log on |
| 14 | Recreate indexes that were dropped in step 6 |
| 15 | Check to see if there are any indexes on the loaded table that were left in direct load state<br>If there are, send a message to the Administrator<br>If not, delete the generated file<br>Delete the file generated by the get_index SQL script |
| 16 | Check the value of the failure flag (it will be set to true if any errors occurred at any time during the process above)<br>Email the Administrator to report success or failure |
| 17 | Archive the data files (if the load is not a re-load) by copying the data file to the archive directory and renaming it to include a date stamp |

Scripts

The following is the scripts reference above are used by data_loader. The bolded lines should be configured to the particular system being used.

```
getpass (Born Shell)
#!/bin/sh
#--------------------------------------------------------#
# Script_name: get_pass        #
#                              #
# Description: This script will be used to retrieve the  #
#              appropriate password from the password    #
#              file. It can be used from the command     #
#              line to retrieve a password or from a     #
#              shell script to eliminate hard coding of  #
#              passwords. The password file is located   #
#              in $DBSE_HOME, with the executable        #
#              located in $DBSE-HOME/bin.       #
#                              #
# Dependencies: getpass requires one file, .password     #
#                              #
# SID_FILE: Contains a list passwords for    #
#      system, sys, and dbse.        #
#                              #
# Command syntax: getpass USERNAME             #
#--------------------------------------------------------#
#what shell do we use?
SHELL=/usr/bin/sh
where is our home?
DBSE_HOME=/files0/ipsa/vendor/dbse/product/7.3.4; export DBSE_HOME
#what path do we look for?
PATH=/usr/bin:/bin:${DBSE_HOME}/bin; export PATH
who are we retrieving the password for
if[ $1 ]
then
    USER=$1
else
    echo " "
    echo "USAGE: getpass 'username'"
    echo " "
    exit 1
fi
make sure the .password file exist
if [ ! -s $DBSE_HOME/.password ]
then
    echo " "
    echo "ERROR: this machine does not appear to have a password file"
    echo " "
    exit 1
fi
get the appropriate password
PASSWORD=`cat $DBSE_HOME/.password|grep -i "${USER} "|awk'{print $2}'`
BAD_SIDS=`cat $DBSE_HOME/.password|grep -i "${USER} "|awk'{print $3}'`
OLD_PASS=`cat $DBSE_HOME/.password|grep -i "${USER} "|awk'{print $4}'`
#if a password was found, print it to the screen
if[ $PASSWORD ]
then
    echo "${PASSWORD}"
    #print a message if passwords appear to not be synced between databases
    if[ $BAD_SIDS ]
    then
        BAD_SIDS=`echo ${BAD_SIDS}|cut -c2-100`
        echo " "
        echo "WARNINC:\tThe password for ${USER} may not be synchronized"
        echo "\t\tbetween all databases. The database(s) ${BAD_SIDS} appear(s)"
        echo "\t\tto use the old password '${OLD_PASS}'"
        echo " "
    fi
else
    echo " "
    echo "ERROR: ${USER} is not a supported username"
    echo " "
    exit 1
fi
get_index (PL/SQL Script)
SET ECHO OFF
REM Procedure Name: get_index
REM
REM Description: Procedure creates a file with a list of current indexes
VARIABLE T_Name varchar2(30)
SET SERVEROUTPUT OFF
SET VERIFY OFF
SET FEEDBACK OFF
SET FLUSH OFF
SET TRIMSPOOL ON
SET TERMOUT OFF
ACCEPT T_Name char
SET PAGES 0
SET HEADING OFF
SPOOL /files6/ipsa/data_loads/&T_Name..idx
select index_name from dba_indexes where table_name = UPPER('&T_Name');
SPOOL OFF
SET TERMOUT ON
SET SERVEROUTPUT OFF
SET VERIFY ON
SET FEEDBACK ON
SET ECHO ON
drop_index_p (PL/SQL Stored Procedure)
CREATE OR REPLACE PROCEDURE drop_index_p (IN_IndexName IN VARCHAR2)
AS
    ws_stmt     varchar2(100);
    ws_owner    varchar2(30);
CURSOR c_index_owner (IN_IndexName VARCHAR2)
IS
SELECT table_owner
FROM dba_indexes
WHERE index_name = UPPER(IN_IndexName);
BEGIN
```

```
        OPEN c_index_owner(IN_IndexName);
        FETCH c_index_owner INTO ws_owner;
        ws_stmt := 'DROP INDEX '||ws_owner||'.'||IN_IndexName;
        p_exec (ws_stmt);
        CLOSE c_index_owner;
END drop_index_p;
/
show errors;
create_ctl (PL/SQL Script)
SET ECHO OFF
REM Procedure Name: create_ctl
REM Description: Procedure created control file required by SQL*Loader
REM        Uses create_ctl_.sql to generate control file
REM Tables Accessed: All_Tab_Columns (Data Dictionary Table)
VARIABLE T_Name varchar2(30)
SET SERVEROUTPUT OFF
SET VERIFY OFF
SET FEEDBACK OFF
SET TRIMSPOOL ON
SET TERMOUT OFF
SET FLUSH OFF
ACCEPT T_Name char
delete control_tb;
commit;
EXECUTE CREATE_CTL_P('&T_NAME');
SET PAGES 0
SET HEADING OFF
SPOOL /files6/ipsa/data_loads/control_files/&T_Name..ctl
select line_text from control_tb order by line_nbr;
SPOOL OFF
SET TERMOUT ON
SET SERVEROUTPUT OFF
SET VERIFY ON
SET FEEDBACK ON
SET ECHO ON
create_ctl_p, (PL/SQL Stored Procedure)
**Note-there should be a table used specifically for this procedure
(control_tb) with the columns
        LINE_NBR number(3) and LINE_TEXT varchar2(100).
CREATE OR REPLACE PROCEDURE create_ctl_p
        (IN_TableName IN user_tab_columns.table_name%TYPE)
AS
    WS_RecNo   number(2) := 0;
    WS_line_ctr  number(3) := 0;
    WS_index_name varchar2(30);
CURSOR c_index_name(IN_TableName IN
user_tab_columns.table_name%TYPE) is
    SELECT index_name
    FROM sys.dba_indexes
    WHERE sys.dba_indexes.table_name = UPPER(IN_TableName)
    AND sys.dba_indexes.index_name like 'PK%';
CURSOR c_user_tab_columns(IN_TableName
user_tab_columns.table_name%type) is
    SELECT column_name,
        data_type,
        data_length
    FROM user_tab_columns
    WHERE user_tab_columns.table_name UPPER(IN_TableName);
BEGIN
    OPEN c_index_name(IN_TableName);
    FETCH c_index_name INTO WS_index_name;
    insert into control_tb values (WS_line_ctr,'UNRECOVERABLE');
    WS_line_ctr := WS_line_ctr + 1;
    insert into control_tb values (WS_line_ctr,'LOAD DATA');
    WS_line_ctr := WS_line_ctr + 1;
    insert into control_tb values (WS_line_ctr,'INFILE
        "/files6/ipsa/data_loads/data_files/'||IN_TableName||'.dat"');
    WS_line_ctr := WS_line_ctr + 1;
    insert into control_tb values (WS_line_ctr,'APPEND');
    WS_line_ctr := WS_line_ctr + 1;
    insert into control_tb values (WS_line_ctr,
    'INTO TABLE'||IN_TableName);
    WS_line_ctr := WS_line_ctr + 1;
    insert into control_tb values (WS_line_ctr,'SORTED INDEXES
('||WS_index_name||')');
    WS_line_ctr := WS_line_ctr + 1;
    insert into control_tb values (WS_line_ctr,'FIELDS
TERMINATED BY '||'","');
    WS_line_ctr := WS_line_ctr + 1;
    insert into control_tb values (WS_line_ctr,'(');
    WS_line_ctr := WS_line_ctr + 1;
    FOR c_rec in c_user_tab_columns(IN_TableName) LOOP
        IF WS_RecNo = 0 then
            IF c_rec.data_type = 'DATE' THEN
                insert into control_tb values
                    (WS_line_ctr,c_rec.column_name||
'DATE "MM/DD/YYYY HH24:MI:SS"');
            ELSE
                insert into control_tb values
                    (WS_line_ctr,c_rec.column_name);
            END IF;
            WS_RecNo := 1;
        ELSE
            IF c_rec.data_type = 'DATE' THEN
                insert into control_tb values
                    (WS_line_ctr,','||c_rec.column_name||
'DATE "MM/DD/YYYY HH24:MI:SS"');
            ELSE
                insert into control_tb values
                    (WS_line_ctr,','||c_rec.column_name);
            END IF;
        END IF;
        WS_line_ctr := WS_line_ctr + 1;
    END LOOP;
    insert into control_tb values (WS_line_ctr,')');
EXCEPTION
    WHEN NO_DATA_FOUND THEN
        DBMS_OUTPUT.PUT_LINE('The table does not exist:');
END;
/
show errors
p_exec (PL/SQL Stored Procedure)
CREATE OR REPLACE PROCEDURE p_exec (IN_String IN varchar2)
AS
    c_cursor INTEGER;
    WS_ret INTEGER;
BEGIN
    c_cursor := DBMS_SQL.OPEN_CURSOR;
    DBMS_SQL.PARSE(c_cursor IN_String, DBMS_SQL.V7);
    WS_ret := DBMS_SQL.EXECUTE(c_cursor);
    DBMS_SQL.CLOSE_CURSOR(c_cursor);
END;
/
sp_kill_users_p (PL/SQL Stored Procedure)
CREATE OR REPLACE PROCEDURE sp_kill_users_01
AS
    ws_sid          number(22);
    ws_serial#      number(22);
    ws_stmt         varchar2(100);
    ora_err_code    BINARY_INTEGER;
CURSOR c_current_sessions IS
    SELECT sid
        ,serial#
    FROM sys.v$session
    WHERE username = 'SPSSUSER'
    AND status <> 'KILLED';
BEGIN
    ora_err_code := 0;
    IF NOT c_current_sessions%ISOPEN THEN
        OPEN c_current_sessions;
    END IF;
    LOOP
        FETCH c_current_sessions INTO ws_sid
                ,ws_serial#;
        IF c_current_sessions%NOTFOUND THEN
            IF (c_current_sessions%ROWCOUNT = 0) THEN
                RAISE NO_DATA_FOUND;
            END IF;
            CLOSE c_current_sessions;
            EXIT;
        END IF;
        ws_stmt := 'ALTER SYSTEM KILL
        SESSION'"'||ws_sid||','||ws_serial#||'"';
        p_exec (ws_stmt);
    END LOOP;
    CLOSE c_current_sessions;
EXCEPTION
    WHEN OTHERS THEN
```

```
            ora_err_code := SQLCODE;
            /* CLOSE c_current_sessions; causes invalid cursor error*/
END sp_kill_users_01;
/
show errors
get_direct_load (PL/SQL)
SET ECHO OFF
REM Procedure Name: get_direct_load
REM Description: Procedure creates a list of files with direct load status
VARIABLE T_Name varchar2(30)
SET SERVEROUTPUT OFF
SET VERIFY OFF
SET FEEDBACK OFF
SET TRIMSPOOL ON
SET TERMOUT OFF
SET FLUSH OFF
ACCEPT T_Name char
SET PAGES 0
SET HEADING OFF
SPOOL/files6/ipsa/data_loads/&T_Name..dirload
select index_name from dba_indexes where table_name =
            UPPER('&T_Name') AND status = 'DIRECT LOAD';
SPOOL OFF
SET TERMOUT ON
SET SERVEROUTPUT OFF
SET VERIFY ON
SET FEEDBACK ON
SET ECHO ON
```

Data Loading Parameter Reporting

FIG. 13 illustrates an exemplary report indicating required table space allotments in a database. FIG. 14 depicts an exemplary report which lists statistics relating to the data in the database. FIG. 15 is an exemplary report indicating times to load various amounts of data. See the section entitled "REPORTING" below for more information about creating and using such reports.

Data Loading Archive Cleaner

The script clean_archives is used to delete files from the archive directory used by the data loading script data_loader. The script can use the Perl Module DataManip to compute the date stamp of the files that are to be deleted. This module can be obtained from the Perl web site (http://www.perl.com/pace/pub). The files put in the archive directory by the data loading script data_loader will have a date stamp in the file name. This script will compute a date x days ago. It will then delete all the files in the archive directory that match that date. Depending on the frequency of data loading, the date stamp may include a time stamp as well. It may be more feasible to delete the archived files that match the day and not the time.

Configuration

Variables $Archive_dir (this variable will represent the location where the archive files are located)

$Days (this variable will represent the number of days ago to compute, default is seven)

Executing clean_archives clean_archives [days]

If a number days is a parameter, it will computer days number of days ago and delete those files If no date is passed, the default of seven days is used

Procedure

The following is the procedure the clean_archives script follows to remove files from the archive directory:

TABLE 12

| Step | Activity/Action |
| --- | --- |
| 1 | Read in and set days parameter, if necessary OR set days to the default |
| 2 | Computer the date to be deleted |
| 3 | Open the archive directory and read in the file names |
| 4 | For each files name, check to see if the date stamp on that file matches the date computed in step 2 |
|   | If it matches, delete the file |

Purge Records Script

The script purge_records is used to delete records from a Database. The script runs a PL/SQL script that deletes records from tables after a certain length of time. This script can be run from the cron or from the command line. The script performs error checking and reports via email to a specified administrator of success or failure. This script may be written in Perl.

Configuration

Environment Variables

Environment variables relevant to the Database need to be set. Specifically, the following environment variables need to be set: DBSE_SID, DBSE_HOME, DBSE_BASE, HOME, and PATH (to include the location of the dbse bin directory and the directory that holds the scripts used by this procedure). To configure these variables, look for the section in the code entitled setting environment variables. Set the values of $SID, $Home, and $Base. Verify that the path is correct when setting the PATH environment variable.

Directory Structure

A directory structure should be set up to house the files generated by purge_records. See section 0 for a list and description of these files.

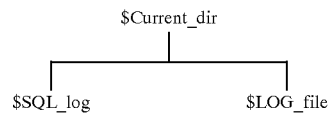

File Names

The files used/created by the purge_records script should have a standardized naming format. The log file generated by the purge_records script will be named purge.log. This file will hold a months worth of log entries. At the first day of the month, it will be renamed purge.log.date_stamp. The current format of the $Date_stamp is MonYYYY, however $Date_stamp can be changed if more frequent archiving of the log file is necessary.

The file generated by the SQL Script is called purge.sql.log. This file is the spooled output of the SQL Script. It will be checked for errors/exceptions. If none are found, it is deleted. If there are errors found, it is renamed purge.sql.log.date_stamp with the date stamp format as described above.

SQL Script

This script uses a SQL script called purge_records. The scripts should be located in its own directory (following the OFA directory structure). Set $SQL_dir to this directory location. The SQL script used by purge_records is as follows:

TABLE 13

| Script Name | Type | Input | Output | Functionality |
|---|---|---|---|---|
| purge_records | script | none | purge.sql.log | Deletes rows of tables that are past the specified date (section 0) |

Output Files
Files Generated
    purge.sql.log (log file generated by SQL script purge_records)
    purge.log (log files generated by this script)
Messaging
    The purge_records script will send email to an administrator to report success or failure of the purging process. Set $Mailer to the text string that will execute the mailer in command line mode. Set $DBA to the email address of the administrator.
Users
    The purge_records script will need to log on to SQL*Plus to execute the SQL script purge_records. A variable name should be set to the schema that owns the tables that are going to be purged. Do not hard-code the schema password in the script. Instead use getpass.
Executing purge_records
    The purge_records script does not accept any parameters. It can be run from the command line or from the cron. To execute the script, type purge_records.
Procedure
    The following is the procedure the purge_records script follows to load data into a database.

TABLE 14

| Step | Activity/Action |
|---|---|
| 1 | Set database environment<br>Set directory structure variables<br>Set SQL Script directory<br>Set log file name variables |
| 2 | Create a new log file purge.log if one does not exist, or open an existing purge.log for appending |
| 3 | Set the mailer program and administrator's email address |
| 4 | Set the date stamp for load<br>For the schema owner, set the user name and get password using getpass<br>Set the fail flag to false (0) |
| 5 | Log onto SQL*Plus<br>Execute the SQL script purge records |
| 6 | Check to see if a the SQL script generated a log file<br>If so, scan the log file for errors. If errors are found set the fail flag to true. Print to the log file the number of rows that were deleted<br>If the log file does not exist, the script did not run correctly. Set the fail flag to true. |
| 7 | Check the value of the failure flag (it will be set to true if any errors occurred at any time during the process above)<br>If the flag is false the purge was successful. Delete the log file generated by the SQL script and send an email report to the administrator<br>If the flag is true the purge was unsuccessful. Rename the file generated by the SQL script to include the date stamp and send an email report to the administrator |
| 8 | If it is the first day of the month, rename purge.log to include the date stamp.<br>Otherwise print the date/time to the log and close it |

Scripts
    The following is the scripts reference above are used by purge_records. The bolded lines should be configured to the particular system you are using.

```
getpass (Born Shell)
#!/bin/sh
#---------------------#
#Scipt_name: get_pass #
#                     #
#Description: This script will be used to retrieve the #
#appropriate password from the password #
#file. It can be used from the command #
line to retrieve a password or from a #
shell script to eliminate hard coding of #
passwords. The .password file is located #
in $DBSE_HOME, with the executable #
#located in $DBSE_HOME/bin #
#Dependencies: get pass requires one file, password #
#SID_FILE: Contains a list of passwords for #
#system, sys, and dbse. #
#Command syntax: getpass USERNAME #
#-------------------#
#what shell do we use 48
SHELL = /usr/bin/sh
#where is our home?
DBSE_HOME =/files0/ipsa/vendor/dbse/product/
7.3.4; export DBSE_HOME
#what path do we look for?
PATH=/usr/bin:/bin:${DBSE_HOME}/bin; export PATH
who are we retrieving the password for
if[$1]
then
USER =$1
else
echo ""
echo "USAGE: getpass 'username'"
echo""
exit 1
fi
#make sure the password file exist
if[!-s $DBSE_HOME/.password]
then
echo
echo "ERROR: this machine does not appear to have a password file"
echo ""
exit 1
fi
get the appropriate password
PASSWORD='cat $DBSE_HOME/.password|grep-i "${USER}"|
awk'{print $2}"
BAD_SIDS ='cat $DBSE_HOME/.password|grep-i "${USER}"|
awd '{print $3}"
OLD_PASS='cat $DBSE_HOME/.password|grep -i"${USER} "|
awk '{print $4}"
#if a password was found, print it to the screen
if[$PASSWORD]
then
echo "${PASSWORD}"
print a message if passwords appear to not be synced between databases
if[$BAD_SIDS]
then
BAD_SIDS ='echo ${BAD_SIDS}|cut -c2-100'
echo ""
echo "WARNING: The password for ${USER} may not be synchronized"
echo " between all databases. The database(s) ${BAD_SIDS} appear(s)"
echo "t to use the old password '${OLD_PASS}'"
echo ""
fi
else
echo " "
echo "ERROR: $ {USER} is not a supported username"
echo " "
exit 1
fi
purge_records (SQL Script)
SET ECHO ON
SBT FEEDBACK ON
SET FLUSH OFF
SET HEADING OFF
SET SERVEROUTPUT ON
SET TERMOUT OFF
```

```
-continued

SET VBRIFY OFF
SPOOL /fiIes6/ipsa/purge/purge.sql.log
REM *purge records in PERF_FACT_TB table
delete from PERF_FACT_TB where
PERF_FACT_TB.PERF_TIME_KEY_CD
in
(select PERF_METRIC_TIME_TB.PERF_TIME_KEY_CD
from PERF_METRIC_TIME_TB
where
to_char(PERF_METRIC_TIME_TB.PERF_DT, 'MM/DD/YYYY')
<=(select to_char(sysdate - 40, 'MM/DD/YYYY') from dual));
REM *Purge records in EVENTS_FACT_TB table
delete from EVENTS_FACT_TB where
EVENTS_FACT_TB.PERF_TIME_KEY CD in
(select PERF_METRIC_TIME_TB.PERF_TIME_KEY_CD
from PERF_METRIC_TIME_TB
where
to_char(PERF_METRIC_TIME_TB.PERF_DT, 'MM/DD/YYYY')
<=(select to_char(sysdate -40, 'MM/DD/YYYY') from dual));
RBM *purge records in PERF_FACT_DLY_TB table
delete from PERF_FACT_DLY_TB where
PERF_FACT_DLY_TB.PERF_TIME_KEY_CD in
(select PERF_METRIC_TIME_TB.PERF_TIME_KEY CD
from PERF_METRIC_TIME_TB
where
to_char(PERF_METRIC_TIME_TB.PERF_DT, 'MM/DD/YYYY')
<=(select to_char(sysdate - 397, 'MM/DD/YYYY') from dual));
SPOOL OFF
```

Database Table Data Extractor

The script table_extract is used to extract data from a Database table and write it to a flat file in a comma delimitated format. The purpose of this script is to extract the data from non-fact tables. Therefore, there not all tables can be extracted. The script can be configured to extract data from as many tables as required. The script may be written in Perl.

Configuration

Environment Variables

Environment variables relevant to the Dbse Database need to be set. Specifically, the following environment variables need to be set: DBSE_SID, DBSE_HOME, DBSE_BASE, HOME, and PATH (to include the location of the dbse bin directory and the directory that holds the scripts used by this procedure). To configure these variables, look for the section in the code entitled setting environment variables. Set the values of $SID, $Home, and $Base. Verify that the path is correct when setting the PATH environment variable.

Users

The table_extract script will need to log on to SQL*Plus to execute the SQL script table_extract. A variable name should be set to the schema that owns the tables that are going to be extracted. Do not hard-code the schema password in the script. Instead use getpass (see below).

PL/SQL

For every table that is to be extracted, a corresponding PL/SQL select statement is required. Determine which columns should be extracted and what, if any, filters are applicable.

d. utput Files

Files Generated table_name.dat (contains data returned from the select statement for table_name in a comma delimitated format)

Executing table_extract table_extract table_name ouput_directory

Extract data from table_name

Put file table_name.dat into output_directory

Procedure

The following is the procedure the table_extract script follows to extract data from a database into a text file.

TABLE 15

| Step | Activity/Action |
|------|-----------------|
| 1 | Read in and set parameters (table_name and output_directory) Set database environment |
| 2 | For each user, set user name and get password using getpass |
| 3 | Log on to SQL*Plus Set SQL system variables Set Spool to be output_directoiy/table_name.dat |
| 4 | Execute the correct select statement for table_name, if non exist print out an error |
| 5 | Log off SQL*Plus |
| 6 | The output file table_name.dat will now be in a format that has extra spaces between fields. Open the file and remove all extra white space Rewrite the file in the correct format |

Scripts

The following is the script reference above this is used by purge_records. The bolded lines should be configured to the particular system you are using.

getpass (Born Shell)

```
#!/bin/sh
#Script_name get_pass
#-------------------#
#Description: This script will be used to retrieve the #
#appropnate password from the .password #
file. It can be used from the command #
line to retrieve a password or from a #
shell script to eliminate hard coding of #
passwords. The .password file is located #
in $DBSE_HOME, with the executable #
#located in $DBSE_HOME/bin.#
#          #
Dependencies: getpass requires one file, .password #
#
SID_FILE: Contains a list passwords for #
#system, sys, and dbse.#
#          #
#Command syntax: getpass USERNAME#
#-------------------#
#what shell do we use?
SHELL=/usr/bin/sh
where is our home?
DBSE_HOME=/files0/ipsa/vendor/dbse/product/
7.3.4; export DBSE_HOME
#what path do we look for?
PATH=/usr/bin: /bin: ${DBSE_HOME}/bin; export PATH
#who are we retrieving the password for
if[$1]
then
USER=$1
else
echo
echo "USAGE: getpass 'usemamep'"
echo " "
exit 1
fi
make sure the .password file exist
if[!-s $DBSE_HOME/.password]
then
echo " "
echo "ERROR: this machine does not appear to have a password file"
echo" "
exit 1
fi
get the appropriate password
PASSWORD='cat $DBSE_HOME/.password|grep -i
"${USER}"|awk'{print $2}"
BAD_SIDS='cat $DBSE_HOME/.password|grep -i
```

-continued

```
"${USER}"|awk '{print $3}"
OLD_PASS='cat $DBSE_HOME/.password|grep -i
"${USER}"|awk '{print $4}"
#if a password was found, print it to the screen
if [$PASSWORD]
then
echo "${PASSWORD}"
print a message if passwords appear to not be synced between databases
if[$BAD_SIDS]
then
BAD_SIDS='echo ${BAD_SIDS}|cut -c2-100'
echo ""
echo "WARNING: The password for $ {USER} may not be sychronized"
echo " between all databases. The database(s) $ {BAD_SID}appear(s)"
echo " to use the old password '$ {OLD_PASS}'"
echo ""
fi
else
echo " "
echo "ERROR: $ {USER}is not a supported usemame"
echo " "
exit 1
fi
```

REPORTING

Figure 16:
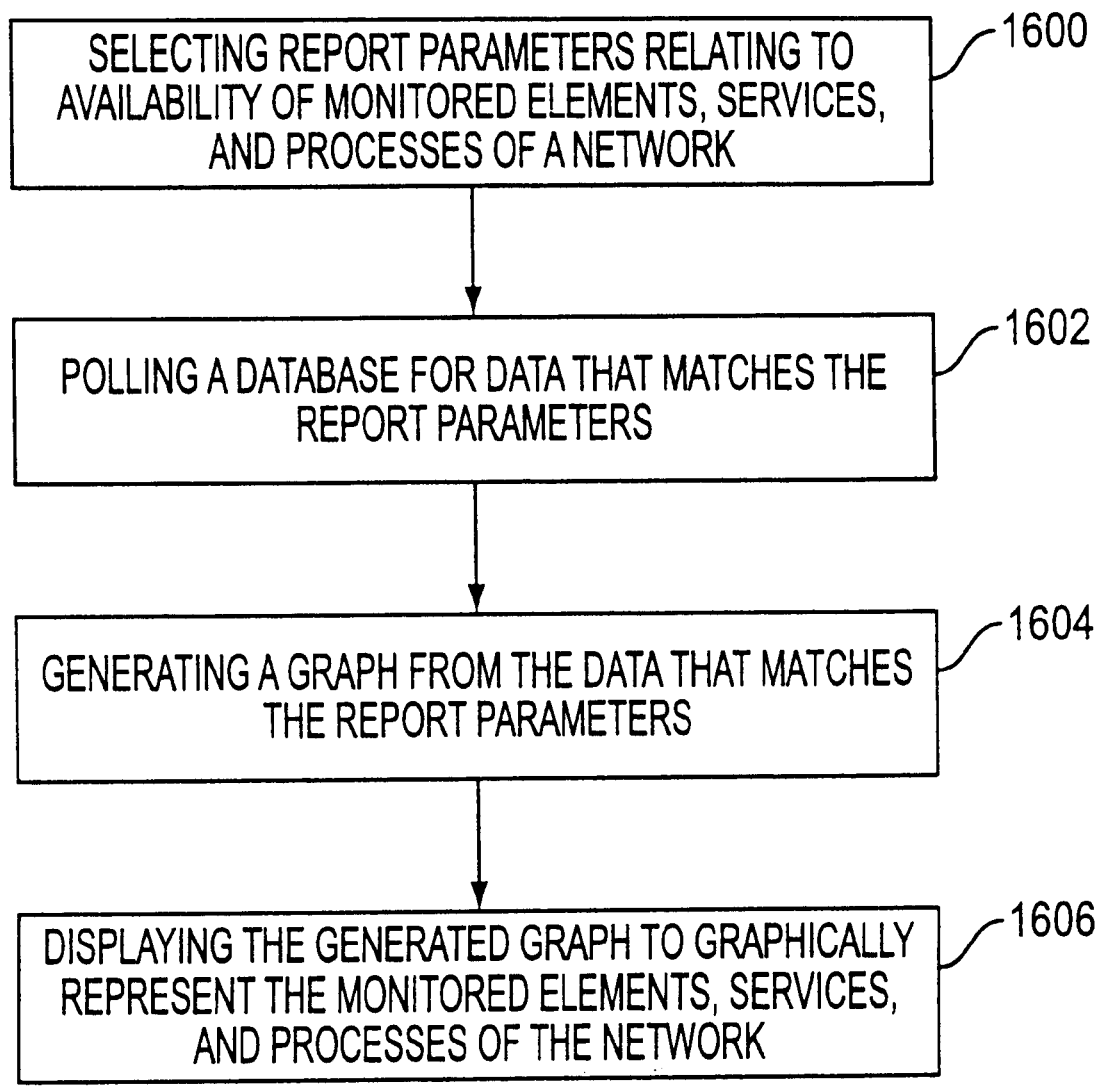
FIG. 16 depicts an embodiment of the present invention which graphically conveys availability in a network with service assurance capabilities

FIG. 16 depicts an embodiment of the present invention which graphically conveys availability in a network with service assurance capabilities. In operation 1600, report parameters are selected relating to availability of monitored elements, services, and processes of a network. A database is polled in operation 1602 for data that matches the report parameters. A graph is generated in operation 1604 from the data that matches the report parameters. In operation 1606, the generated graph is displayed to graphically represent the monitored elements, services, and processes of the network.

In one aspect of the present invention, the step of selecting the report parameters further includes the steps of selecting at least one metric class parameter relating to the activity of the network, selecting a graph type parameter, and selecting at least one report criteria parameter relating to the activity of the network. The generated graph may be of the selected graph type parameter.

In another aspect of the present invention, a selectable list of metrics parameters, a selectable list of graph type parameters, and a selectable list of report criteria may be displayed. Further, the graph type parameter may be dependant upon the selected metric class parameter. The report criteria parameter may also be dependant upon the selected graph type parameter.

In one embodiment, the graph type parameter may be a line graph, a bar graph, a boxplot graph, and/or a spectrum graph. In addition, the graph may displayed via a browser.

More details follow.

IPSA Batch and Ad hoc Reporting

This section provides an overview of the IPSA reporting process. It sequentially covers the procedures for implementing both batch reporting and web-based ad hoc reporting. The following files and directories are used:

IPSA_StartSPSS.cmd Located anywhere, it is used to start the reporting process (see Configuration). Instantiates two SPSS processes (spssw.exe, spsswin.exe) and IPSA_SPPS.exe <SABATCH> Batch queue file location, as specified in the IPSA_StartSPSS.cmd file (see Configuration).

IPSA_BatchQueue.txt Queue file that, if present, is passed to SPSS and contains batch report specifications. This file is deleted after being read by IPSA_SPSS.exe. See Adhoc.doc and graphs.doc for content explanations.

<SAADHOC> Adhoc queue file location, as specified in <SARPHME>\InputQueue\IPSA_Reporting_Config.txt (see Configuration).

IPSA_AdhocQueue.txt Queue file passed to SPSS that contains ad hoc report parameters. This file is created by the web interface (<WWW ROOT>\cgi-binadhoc.pl) and deleted after use by IPSA_SPSS.exe. See Adhoc.doc and graphs.doc for content explanations.

IPSA_AdHocQueue_Working_<instance>.txt

Adhoc working file with a unique IPSA_SPSS.exe instance number, <instance>, that is defined in IPSA_StartSPSS.cmd (see Configuration).

IPSA_ProcessTheBatchQueue.txt The presence of this file notifies IPSA_SPSS.exe to read <SABATCH>\IPSA_BatchQueue.txt and pass it to SPSS. This file is polled for every five seconds.

<SARPHME> The reporting home directory, as specified in the IPSA_StartSPSS.cmd file (see Configuration). All files needed to generate reports are located within this directory.

\InputQueue IPSA_SPSS.exe configuration and control files.

IPSA_Reporting_Config.txt

IPSA_SPSS.exe configuration file. Includes database location and login information, output directories and image format specification for the generated graphs (see Configuration).

IPSA_ControlQueue.txt Contains commands to be issued to IPSA_SPSS.exe during execution. Used for terminating the process.

```
\Logs     Log files generated from IPSA_SPSS.exe execution
     IPSA_VB_SPSS.log     Error messages from program execution.
\SPSS All SPSS related files.
\Macros                SPSS macros
!incdef.SPS
     !bargrph.SPS              bar graph
!bxgrph.SPS    boxplot
     !spect.SPS                spectrum graph
!xygrph.SPS    xy line graph
\Templates                    SPSS chart looks
avail.clo                     availabilty graph
bar.clo                       bar graph
box.clo                       boxplot
exception.clo                 exception graph
line.clo                      xy line graph
\Working Data Files           SPSS macros use this directory for temporary files.
\Web\HtmlTemplates            HTML fragments for use to dynamically produce HTML
     todays_urls_head_template.txt   batch TOC header
     todays_urls_detail_
     template.txt                    batch TOC report title
     todays_urls_tail_template.txt   batch TOC footer
     detail_urls_head_template.txt   batch/adhoc list-of-reports header
     detail_urls_detail_template.txt batch/adhoc list-of-reports details
     detail_urls_tail_template.txt   batch/adhoc list-of-reports footer
<SAWEB>                       The report output home
directory, as specified in <SARPHME>\InputQueue\IPSA_Reporting_
Config.txt (see Configuration).
\Adhoc\<date>_INFO            Adhoc reports issued on the date
<date> where <date> is of the form YYYYMMDD. This directory is
created by the report generation script.
     <adhoc_report_title><date><unique id>.html
                                    the generated adhoc report
\Batch\Daily                  Daily batch reports home directory
\<date>_INFO                  Generated batch reports. <date> is of
the form YYYYMMDD, but is the date prior to the date when the report
request was issued. This directory is created by the report generation
script.
```

-continued

| | |
|---|---|
| \Images | Images for the HTML pages |
|    Graph1.gif | list bullet |
|    SA1.gif | Service Assurance logo |
| <WEB ROOT> | Root directory of the web |
| server where the reports will be housed. | |
| bground.gif | background image for the adhoc |
| web pages | |
| \cgi-bin | Adhoc files location. This directory |
| must be accessible from a web browser via HTTP and have "execute" | |
| permission assigned to it. | |
| adhoc.pl | Perl script used to generate ad hoc reports. |
| This file is accessed via HTTP from a web browser to start the ad hoc | |
| report data gathering process. | |
| adhoc.setup.txt | Setup and configuration file for the |
| adhoc.pl script. Contains report types and descriptions. | |

Batch Request

Overview

To enable report generation, execute IPSA_StartSPSS.cmd. Both SPSS and a VB file-polling application are invoked in the form of IPSA_SPSS.exe, sppssw.exe, and spsswin.exe. These are processes that can be monitored using Window NT Task Manager. With report criteria specified in <SABATCH>IPSA_BatchQueue.txt, create the file <SAADHOC>IPSA_ProcessTheBatchQueue.txt. The contents of this file are unimportant, as only its presence is polled for. IPSA_SPSS.exe reads the contents of IPSA_BatchQueue.txt and passes it to SPSS. Graphs are generated in <SAWEB>\Batch\Daily\ as well as an HTML file that points to the images.

Multiple graphs will be generated if, for example, 100 elements are reported on and the maximum number of elements per axis has been set to 10. In this case, 10 graphs would be generated and the HTML file would link to each of them. To terminate the application, alter <SARPHME>\InputQueue\IPSA_ControlQueue.txt as stated in the "Controlling IPSA_SPSS during execution" section of this document.

Installation

Run SetupVisualBasicRuntime\Setup.exe to install needed Visual Basic runtime components to your system. The installation directory that you choose must be specified in IPSA_StartSPSS.cmd if you plan to use the command file.

Configuration

IPSA_StartSPSS.cmd is often used to start the reporting process. This command file changes to the IPSA installation directory and executes IPSA_SPSS.exe, passing three modifyable parameters:

| | |
|---|---|
| SARPHME: | <SARPHME>, reporting home directory |
| SABATCH: | <SABATCH>, location of batch input queue |
| INSTNCE: | <instance>, the unique instance of this IPSA_SPSS.exe |
| process | |

<SARPHME>\InputQueue\IPSA_Reporting_Config.txt contains reporting and environment configuration for both the VB and SPSS applications:
@{
SADSN = ipsa01 SAUID = spssuser
SAPWD = spssuser SASRVER = IPSA01
SAWEB = "C:\Inetpub\WWWroot"
SAWEBRL = "/web_reports"
SAADHOC = "c:\Data\Reporting\InputQueue"
DBESCPE = \MAXAXIS = 10 GRPHOUT = "JPEG File"
}@
SADSN: DSN for the database -continued SAUID: database user id
SAPWD: database password
SASRVER: database server
DBESCPE: escape character
SAWEB: the root directory of the web server (e.g. c:\InetPub\WWWroot).
SAWEBRL: report output directory, relative to <WEB ROOT> (e.g. if the reports will be in c:\InetPub\WWWroot\web_reports, use SAWEBRL = "/web_reports").
SAADHOC: directory location of the IPSA_AdhocQueue.txt file
MAXAXIS: maximum number of objects that can exist on any single axis.
GRPHOUT: type of graph image to be produced (valid values are "JPEG File" or "Windows Bitmap")
Set-Up Request
Update <SABATCH>IPSA_BatchQueue.txt with your report criteria. See adhoc.doc for content specification. This file is read by IPSA_SPSS.exe and the contents sent to SPSS to designate what data is pulled from the database and reported upon. If all four of the following fields are not specified, defaults are used for all four.
STRTYR, STRTMON, STRTDAY: default is all day yesterday
NUMDAYS: default is 1 day
In addition, the wildcards "*" and "?" may be used when specifying element names and locations:
ELMNM = "*" for multi-char
ELMLOC = "?" for one-char
Start SPSS
Run IPSA_Start_SPSS.cmd to start IPSA_SPSS.exe and instantiate SPSS. Run Windows Task Manager (taskmgr.exe) from Start/Run . . . to verify that the following Processes are running: IPSA_SPSS.exe, spssw.exe, and spsswin.exe.
note: An enhancement would be to have IPSA_SPSS.exe run as a Windows NT Service.
Propagate the Action
The presence of <SAADHOC>\IPSA_ProcessTheBatchQueue.txt will notify the IPSA_SPSS.exe to read <SABATCH>\IPSA_BatchQueue.txt and pass the report parameters to SPSS (see the next section "IPSA_SPSS Operation"). The content of this file does not matter, as only its presence is checked for. This file is deleted when IPSA_SPSS.exe has processed it.
note: This is problematic when multiple instances of IPSA_SPSS.exe exist and all are expected to wait for this file to be created. A possible solution is to have multiple copies of IPSA_ProcessTheBatchQueue.txt located in separate directories, each being accessed by a single IPSA_SPSS.exe process.
IPSA_SPPS Operation
This process polls for the existence of <SAADHOC>\IPSA_ProcessTheBatchQueue.txt. Once found, <SABATCH>\IPSA_BatchQueue.txt is read and its values passed to SPSS for processing.
The batch queue could be separate for each instance of this process. Two places that all instances must access are (1) Ad-hoc queue and (2), web documents dir.
Controlling IPSA_SPSS during execution
Commands may be issued to IPSA_SPSS.exe by creating <SARPHME>\InputQueue\IPSA_ControlQueue.txt and entering commands into it. IPSA_SPSS.exe reads this file (if it exists) and executes the commands contained within.
For example, the following file contents will terminate the SPSS and IPSA_SPSS.exe processes:
@{
SAQUIT = yes
}@

If this method is not used, the processes must be killed using Windows Task Manager (see 3.4). IPSA_ControlQueue.txt is deleted after use.

note: Currently the only command that IPSA_SPSS recognizes is "SAQUIT=yes" (see above).

note: This file currently resides in <SARPHME>\InputQueue\ but can be reconfigured to exist in the queue directory for multiple instances of IPSA_SPSS.exe.

Output

A table of contents for the generated graphs is created in <SAWEB>\Batch\Daily\<date>_INFO, as well as the graph image files. This table of contents is viewable in a web browser.

<SARPHME>\Logs\ will contain a log file named IPSA_VB_SPSS.log if any errors are encountered.

Updating the Setup Program

From the Visual Basic IDE, open the IPSA_SPSS.VBP project file. Make any needed code changes, then create IPSA_SPSS.EXE from the File menu. Close the IDE. From the Visual Basic program group, start the Application Setup Wizard. Open the IPSA_VB_SPSS.SWT template file and follow the prompts to create the setup program, answering "no" to all questions related to "remote automation components". When prompted, choose a destination output directory and create the setup files.

Once the setup program has been created, edit the SETUP.LST file in the destination output directory that you chose. Towards the end of the text, change all solitary occurrences of "SPSS" to "IPSA" (see below). Save and close the file when completed.

File9=1,,IPSA_SPSS.ex_,IPSA_SPSS.exe,$(AppPath),,,9/29/1999 16:14:09,153088, 1.0.0.0," ","IPSA","$(AppPath)\IPSA_SPSS.exe"

| [Setup] |
| --- |
| Title=IPSA |
| DefProgramGroup=IPSA |
| DefaultDir=$(ProgramFiles)\IPSA |
| Setup=setup1.exe |
| AppExe=IPSA_SPSS.exe |
| AppToUninstall=IPSA_SPSS.exe |
| AppPath= |

Ad hoc Request

Overview

The ad hoc reporting works in a manner practically identical to the batch reporting. A queue file is created with report parameters contained within it and IPSA_SPSS.exe polls for its presence. Once found, the report parameters are passed to SPSS, where the graphs are created. The only real difference is that the queue file is not created by hand, it is generated from a web-based interface. The presence of the EPSA_AdhocQueue.txt file is the trigger for the report generation. This is analogous to the IPSA_ProcessTheBatchFile.txt file from batch reporting.

Requirements

HTML 3.2 compliant web browser (e.g. Netscape Navigator 3.0 or higher, MS Internet Explorer 4.0 or higher).

adhoc.pl file located in the cgi-bin directory of a web server adhoc.setup.txt file located in the same directory as adhoc.pl (above)

Navigation

From the main Ad hoc screen 1700 located at http://<web_server>/cgi-bin/adhoc.pl, choose a metric class from the selection list and click Next 1702 (see FIG. 17A). If multiple graph types 1710 are available for the chosen metric, they are displayed next (see FIG. 17). After choosing a graph type, enter report criteria into the form (see FIG. 18). Exemplary fields include Title 1800, Element 1802, Location, etc. Specify multiple elements 1804 or locations 1806 by either typing their name in the entry field or selecting them from the drop-down list and clicking "Add". Acceptable wildcards are "*" for "all" and "?" for "zero or one". Choose multiple metrics by holding the CTRL key down while selecting each desired metric.

Click on Submit to create or update <SAADHOC>\IPSA_AdhocQueue.txt. IPSA_SPSS.exe reads its contents and pass the parameters to SPSS. The generated graphs are created in <SAWEB>\Adhoc\<date>_INFO and returned to the user via the browser. Upon graph generation, IPSA_AdhocQueue.txt is deleted.

Reporting Requirements Phase 2

The tables shown in FIGS. 19–22 detail the Batch Reports recommended, the eight generic report types, and the Adhoc requirements. The remainder of this section references these matrices several times. In particular, FIG. 19 illustrates exemplary batch reporting requirements. FIG. 20 lists some of the generic report types. FIG. 21 shows exemplary ad hoc reporting requirements. FIG. 22 illustrates sample metric information.

FIGS. 19–22 provide historical record of collected performance data and network events. Exception reporting is limited to views of events that occurred in real-time and does not include finding exceptions in the historical data by analyzing past data.

Batch Reporting

General Information (Example)

Daily batch report processing will be scheduled to occur at 1:00 am using Windows NT WinAT to execute SPSS reporting scripts.

Daily batch processing will include both performance and event reporting operations.

Examples of the eight generic report types referenced in this document and in FIGS. 19–22 can be found in FIGS. 23–30.

Daily performance reporting processing tasks

Import all ECM and Patroller comma-separated-value files into DBSE using SQL Loader. The data files will be moved to the data repository (i.e. data_feeds directory) by either the Patroller History Propagator or the Solaris cron facility (for ECM files).

Generate and publish (save) the 34 html-based report files listed in the matrix shown in FIGS. 19–22. The reports will be published to the documents directory of the web server.

Calculate daily roll-up statistics for each different metric collected and store the rolled-up statistics.

Delete expired daily detail data (metric records older than 40 days months).

Delete expired rolled-up data (rolled-up records older than 13 months).

Daily event reporting processing tasks

Analyze all availability-type events. These events include any event specified as an event signifying an outage. An event will be received when an object goes down and comes back up. These event pairs must be located, and an outage duration calculated.

Using the result of the above analysis, record an event for each day of the outage with an accurate daily outage duration.

Generate and publish the 4 exception reports listed in FIGS. 19–22.

Generate and publish the Network Availability, Process Availability and Service Availability reports listed in FIGS. 19–22.

Delete expired events data (event records older than 13 months).

Build and publish a daily web page with links to the 6 html event reports.

Other daily processing tasks (applies to both event and performance data)

Build and publish a daily web page with links to the 34 performance reports, the 4 exception reports, and the 2 availability reports. This page, and all batch reports must be available by 6 am the next day.

Delete expired html report files (older than 7 days)

Ad-Hoc Reporting

A web-based ad-hoc capability is required to produce reports of the same eight generic report types as the batch reports.

The adhoc utility should present a menu hierarchy as shown in the Adhoc Reports table of FIG. 21. In this table, the expressions <element name>, <element location> and <instance> can be input by the user in the following forms:

A single name, location, or instance (i.e. "nsmmrt03")

A list of names, locations, or instances (i.e. "nsmmrt03, nsmmrt04")

A variation of either a single name or list of names using * as a multi-character wildcard.

A variation of either a single name or list of names using ? as a single-character wildcard.

Once the online menu/form is completed by the user, a "Submit" button should execute a database query with the selected choices. The "Submit" button should also validate any data that is entered if applicable, for proper format (not for valid content, however).

The query should be able access detail and rolled-up data as recent as midnight the previous day. The previous day's detail and rolled-up data should be available for adhoc queries after 6 am the next day.

Report Type Examples

FIGS. 23–30 show simple examples of each of the eight recommended report types.

Graph Explanations and Requirements

This section is an overview of what the graphs, such as those found in FIGS. 23–30, are and what they do. There will be some tips as to how to change certain properties if needed, how to run the graphs from the script, and other useful information.

Graphs

Running graphs from the script

To run the graph from the script the script (macro) open and the script that passes in the parameters. The pairs that go together are:

!xygrph.sps & callxy.sps: xy-line graphs for daily details

!bargrph.sps & callbar.sps: bar graphs for daily availability

!bxgrph.sps & callbx.sps: boxplots for daily comparisons and monthly trends

!spect.sps & callsp.sps: spectrum graphs for event exceptions and daily availability (high level and detail)

To run these scripts (macros), first you need to have the macro window open (the file with the !name) and go under the menu bar Run>All. This will run a define on the macro. After the processor is done running the define, switch over to the call file (i.e. callxy.sps) and select only the area that has the parameters. (There are little headers in this file that describe what each parameter set will accomplish when sent to the macro) Then under the menu bar Run>Selection. This will then pass the parameters to the macro and produce the graph in an output window.

Exporting graphs manually from the output window

To export a graph using what is in the output window, first click on the graph to select the graph area. Go under the menu File>Export which will bring up a dialog box. Select in the drop down box if you wish to export charts only, the document as a whole, or the document (no charts). If you are just exporting a JPEG, charts only would be a good selection. If you wish to export a Windows Bitmap (BMP) then select the document as a whole. This will export the HTML file and the BMP. (It is easier to view a BMP in a HTML file because the BMP file will launch a paint program just to view it) Then after deciding on what you are going to export, click on the options button next to the drop down box and here you can make selections as to size, resolution, etc. Those optimal settings will be detailed later for each graph. Click OK to get back to the main dialog box. Next set the path for the exported chart by clicking on Browse. The path to the web server is O:\ipsa\product development\reporting\Web\WWWRoot.

Select your path, click OK, and then export the document. It should then be able to be viewed on twmmnt02.

Chart Properties

To change the chart properties (on IGRAPHs) and set it to a CHARTLOOK, double click on the graph in the output viewer. This will activate it into interactive mode. Go up to Format>Chart Properties in the menu bar and make necessary changes in the tabbed dialog box. Some changes include: Text size (the title and subtitle text size seems not to take in the CHARTLOOK option when set here—FYI), Font, Symbol attributes (shape, color, fill, etc), Axis attributes (line width, tick marks), colors (for legends, shapes, etc), and other features that need to be changed. After changing what you want, click Apply to view changes and OK to exit the dialog box. Then go to the menu bar Format>Chartlook and click on Save As with the "as displayed" feature highlighted in the box to the left. Save the chartlook to a location that can be called from the macro. This chartlook should then set the settings for the next graphs run with the /CHARTLOOK='file' subcommand in the IGRAPH syntax.

Figure 23:
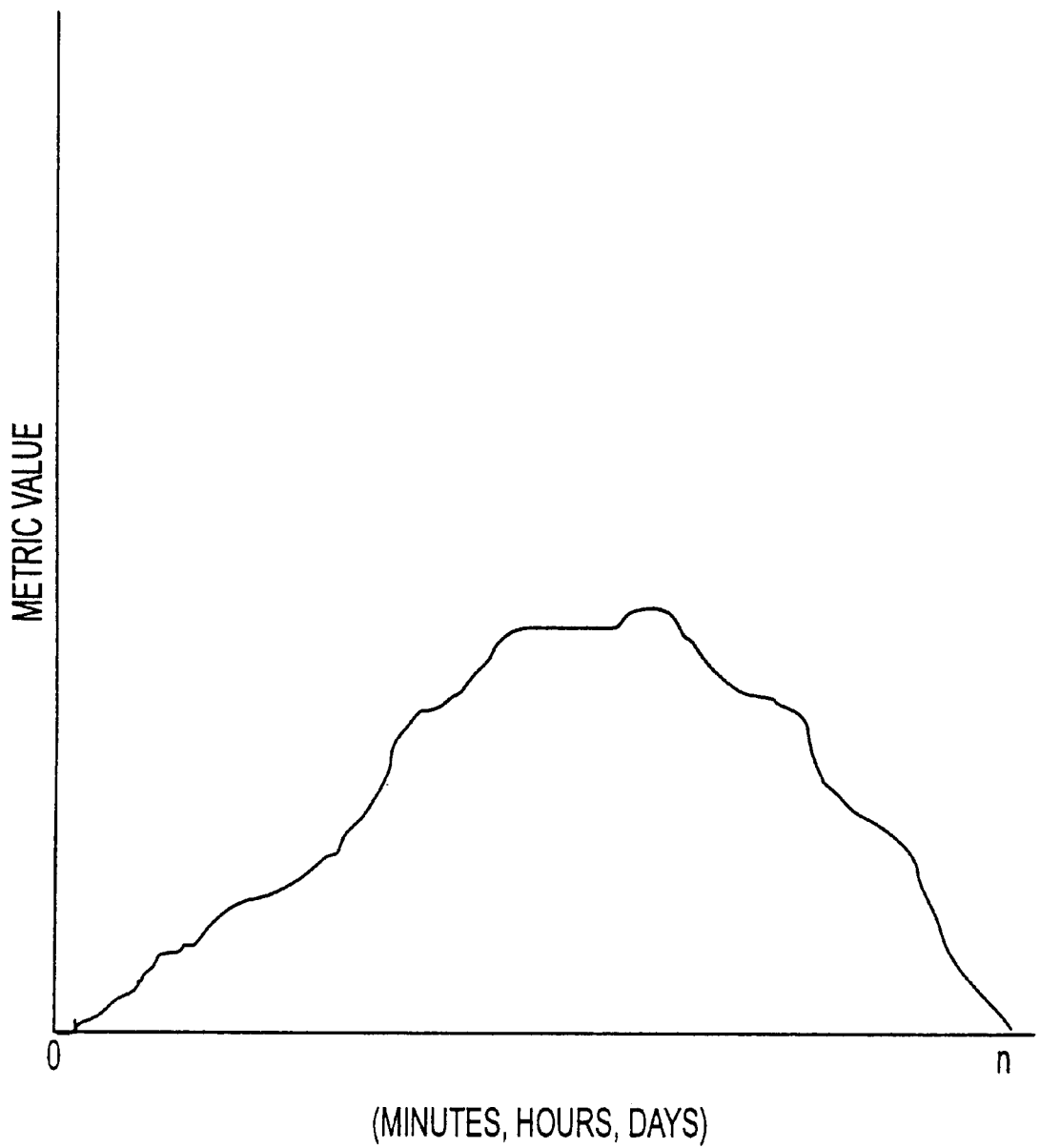
FIG. 23 depicts a line graph report in accordance with one embodiment of the present invention.
Figure 24:
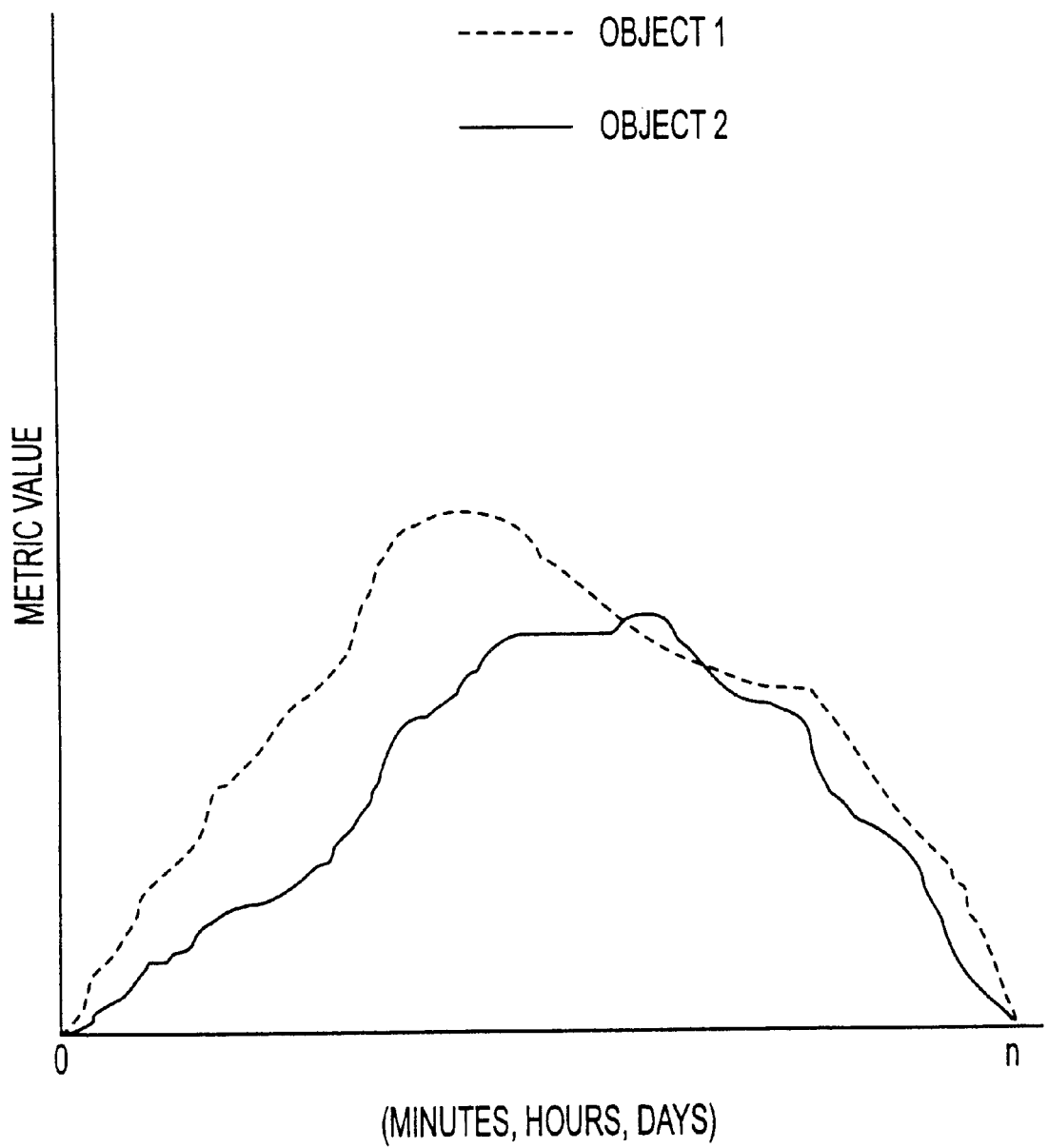
FIG. 24 shows a line graph report in accordance with one embodiment of the present invention.

XY-Line Graph (See FIGS. 23–24)

What it shows

The xy-line graph reports the daily details for CPU Utilization (for routers, Unix, and NT),Interface Utilization and Response Time for routers, Memory Utilization (for Unix and NT), Network I/O (for Unix and NT), Memory Utilization (Unix and NT), and eventually Reponse time for FTP, SMTP, NNTP, and HTTP.

Parameters

In the parameter call:

```
SET MPRINT ON.
!XYGRPH ELMNM = nsmmrt03 ELMTY = NT ELMLOC =
Minneapolis
METRCNM = CpuBusy_Percent STRTYR = 1999 STRTMON = 06
STRTDAY = 30 NUMDAYS = 1 SARPHME = "o:\IPSA\Product
Development\Reporting"
SADSN = "ipsa01" SAU1D = "spssuser" SAPWD = "spssuser"
SASRVER = "ipsa01".
```

The possible variables to pass in are as follows:

ELMNM (the element name) any elmnt_nm located in the Network_Elmnt_Tb. With our test data we have these elements available: nsmmrt03, gfinmnt03, nsmmws16, nsmmrt04, nsmmrt05, nsmmrt06, and nsmmrt07.

ELMTY (the element type) any elmnt_type_cd located in the Network_Elmnt_Tb. With our test data we have these types available: RT (router), UX (Unix) and NT (NT).

ELMLOC (the element location) any elmnt_city_nm located in the Elmnt_Loc_Tb.

METRCNM (the metric name) any metric_nm located in the Perf_Metric_Tb. With our test data we have these metrics available: CpuBusy_Percent, InterfaceUtilization_Percent, InterfaceUtilization_BPS, CpuUtilization_Percent, MemoryFree_Pages, NetworkTraffic_PPS, DiskBusy_Percent, CpuProcessorTime_Percent, MemoryFree_Mbytes, and DiskTime_Percent. Other metric names include FtpResponseTime_Seconds, SmtpResponseTime_Seconds, NntpResponseTime_Seconds, and HttpResponseTime_Seconds.

STRTYR (the year) any perf_yr located in the Perf_Metric_Time_Tb.

STRTMON (the month) any perf_mon located in the Perf_Metric_Time_Tb. With our test data we usually use 06 for the month of June. NOTE: Begin each one digit month with a zero!

STRTDAY (the day) any perf_day located in the Perf_Metric_Time_Tb. With our test data we usually use 30 for the day. NOTE: Begin each one digit day with a zero!

NUMDAYS (the number of days the data will include) any number valid (note that most graphs will be cluttered if too many days are spanned with the exception of a monthly detail graph set up specifically to handle that number of cases). For this DAILY graph, use the number 1.

SARPHME (path) This sets up the path to where certain files (if needed) can be saved or referenced from.

SADSN (DSN name) This specifies the DSN name used in the GET.

SAUID (User ID name) This specifies the User ID name used in the GET.

SAPWD (Password) This specifies the password used in the GET.

SASRVER (Server Name) This specifies the server used in the GET.

Manual Settings
For optimal output for the xy-line graph these settings should be made: (in the chart options in Export dialog box)
Resolution: 200×200
Size: 6×6 (or between 4×4 to 6×6)
Format: YCC Color
Quality: 100%
Color Translation: Normal
Operation: Progressive Chartlook
This graph calls the chartlook line.clo found in the O:\ipsa\product development\reporting\spss\templates directory.

Figure 27:
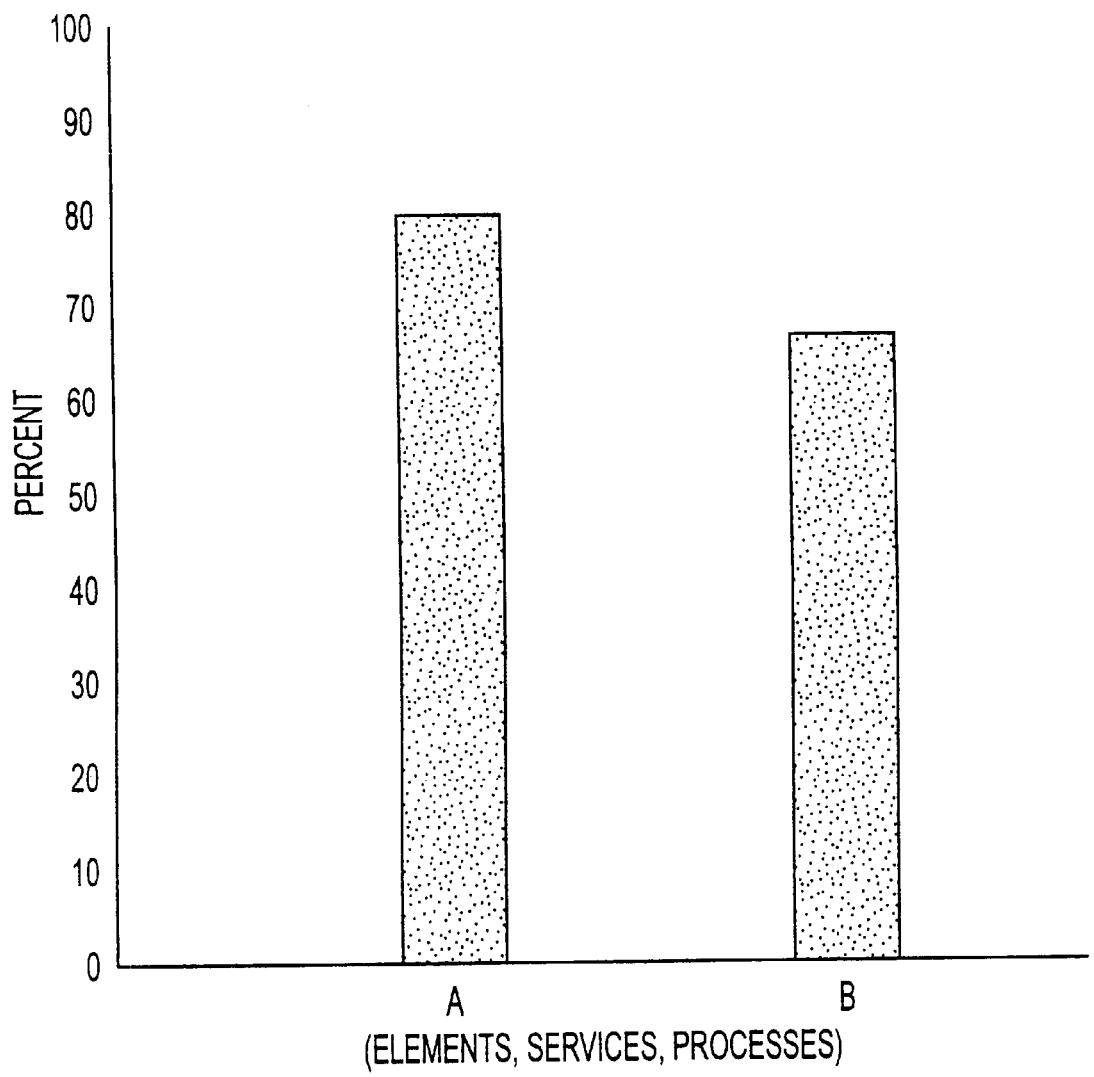
FIG. 27 depicts a bar graph report in accordance with an embodiment of the present invention.

Bar Graph (See FIG. 27.)
What it shows
The bar graph reports the daily availability for Network, Services, and Processes.
It calculates the percentage of the availability for all of the elements, representing them as bars with the percentage displayed within the bars.

Parameters
In the parameter call:

```
SET MPRINT ON.
!BARGRPH EVENT = "DNS Service Failed" ELMLOC = Minneapolis
STRTYR = 1999 STRTMON = 06 STRTDAY = 30 NUMDAYS = 1
SARPHME = "o:\IPSA\Product Development\Reporting"
SADSN = "ipsa01" SAUID = "spssuser" SAPWD = "spssuser"
SASRVER = "ipsa01".
```

The possible variables to pass in are the same as the xy-line graph except for:
EVENT (the event) any valid event_string_txt that is located in the Events_Fact_Tb.

Manual Settings
For optimal output for the bar graph these settings should be made: (in the chart options in Export dialog box)
Resolution: 200×200
Size: 3×3
Format: YCC Color
Quality: 100%
Color Translation: Normal
Operation: Progressive Chartlook
This graph calls the chartlook bar.clo found in the O:\ipsa\product development\reporting\spss\templates directory.

Figure 25:
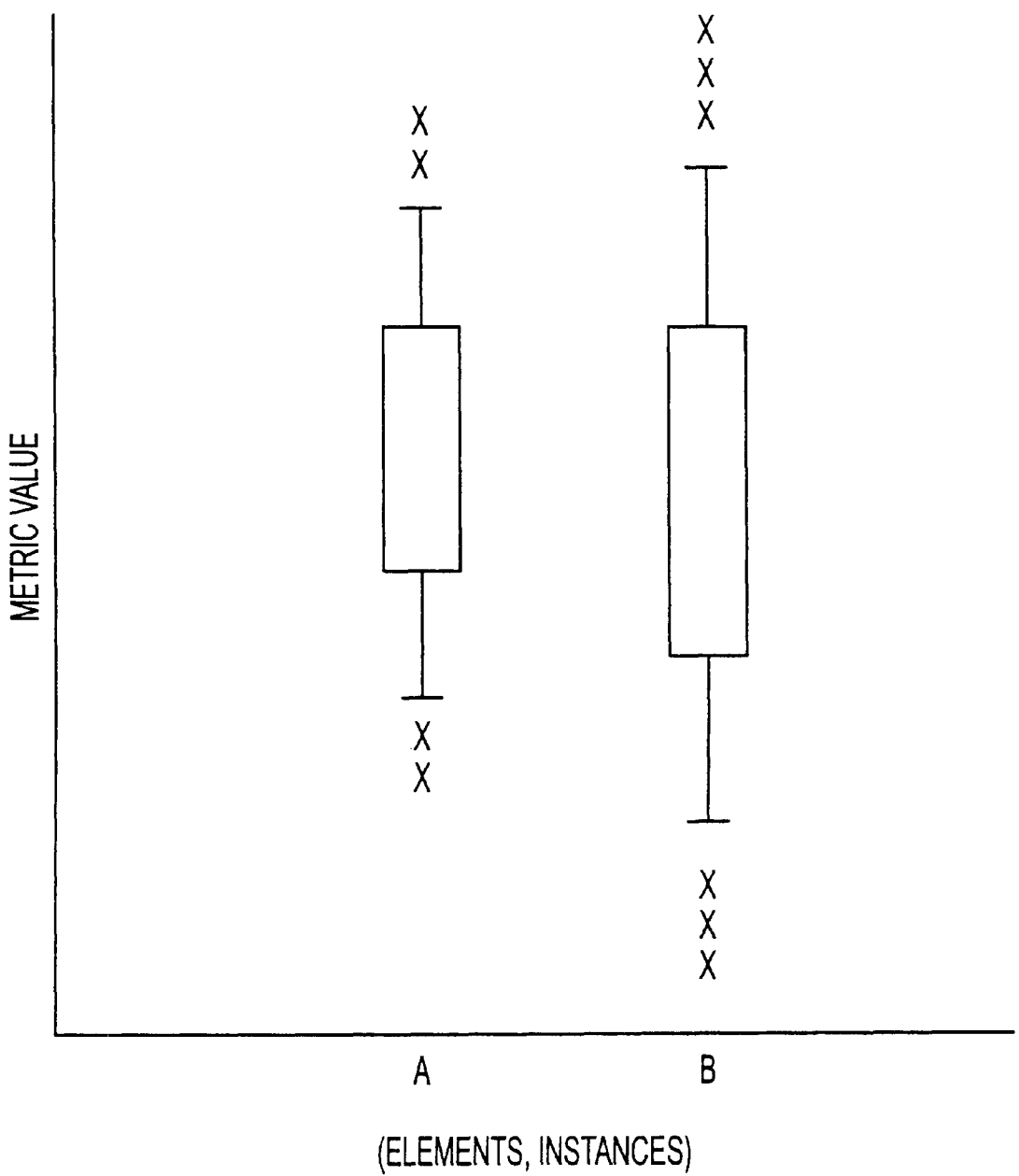
FIG. 25 depicts a comparison box-plot report in accordance with an embodiment of the present invention.
Figure 26:
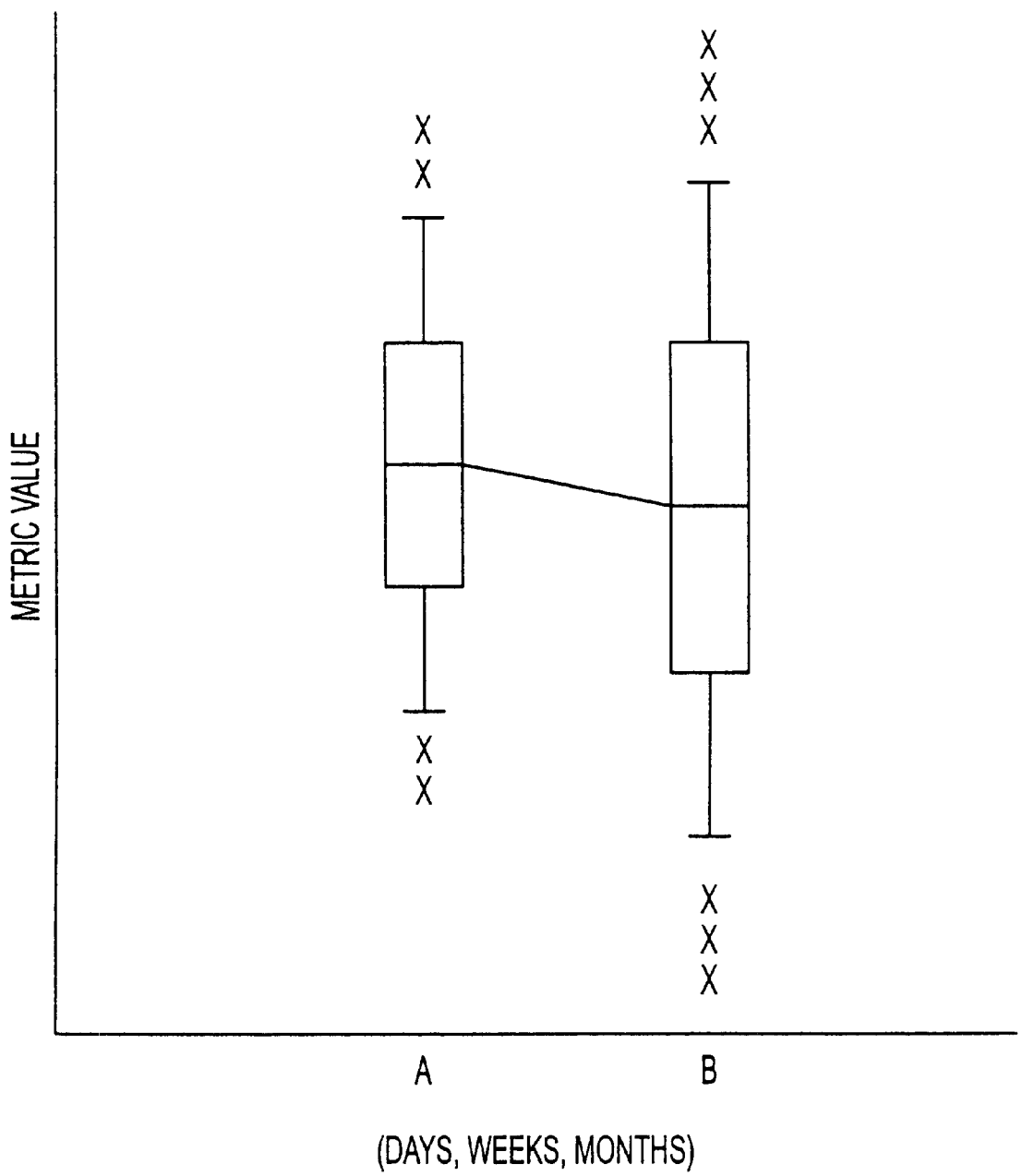
FIG. 26 illustrates a trend box-plot report in accordance with an embodiment of the present invention.

Boxplot Graph (See FIGS. 25–26.)
What it shows
The boxplot graph reports daily comparisons and monthly trends.

Parameters
In the parameter call:

```
****************************************
DAILY COMPARISON BOXPLOT
****************************************
SET MPRINT ON.
!BXGRPH ELMNM = (nsmmrt03 nsmmrt04 nsmmrt05) ELMTY = RT
    ELMLOC = Minneapolis METRCNM = CpuBusy_Percent
    STRTYR = 1999 STRTMON = 06 STRTDAY = 30 NUMDAYS = 1
CODE = 1
    SARPHME = "o:\IPSA\Product Development\Reporting"
    SADSN = "ipsa01" SAUID = "spssuser" SAPWD = "spssuser"
    SASRVER = "ipsa01".
****************************************
MONTHLY TREND BOXPLOT
****************************************
SET MPRINT ON.
!BXGRPH ELMNM = (nsmmrt05) ELMLOC = Minneapolis
METRCNM = CpuBusy_Percent
    STRTYR = 1999 STRTMON = 06 STRTDAY = 01
NUMDAYS = 30 CODE = 2
    SARPHME = "o:\IPSA\Product Development\Reporting"
    SADSN = "ipsa01" SAUID = "spssuser" SAPWD = "spssuser"
    SASRVER = "ipsa01".
```

The possible variables to pass in are the same as the xy-line graph except for:
ELMNM (element name) any valid elmnt_nm from the Network_Elmnt_Tb. It is given one or more names in the daily comparison and only one name for the monthly trend.

Manual Settings
For optimal output for the bar graph these settings should be made: (in the chart options in Export dialog box)
Resolution: 200×200

Size: 3×3
Format: YCC Color
Quality: 100%
Color Translation: Normal
Operation: Progressive
***NOTE: The monthly boxplot can be exported with these settings, but will NOT turn out very well. This type of graph will not have readable fonts until (hopefully) the next version of SPSS.

Chartlook

This graph calls the chartlook box.clo found in the O:\ipsa\product development\reporting\spss\templates directory.

Figure 28:
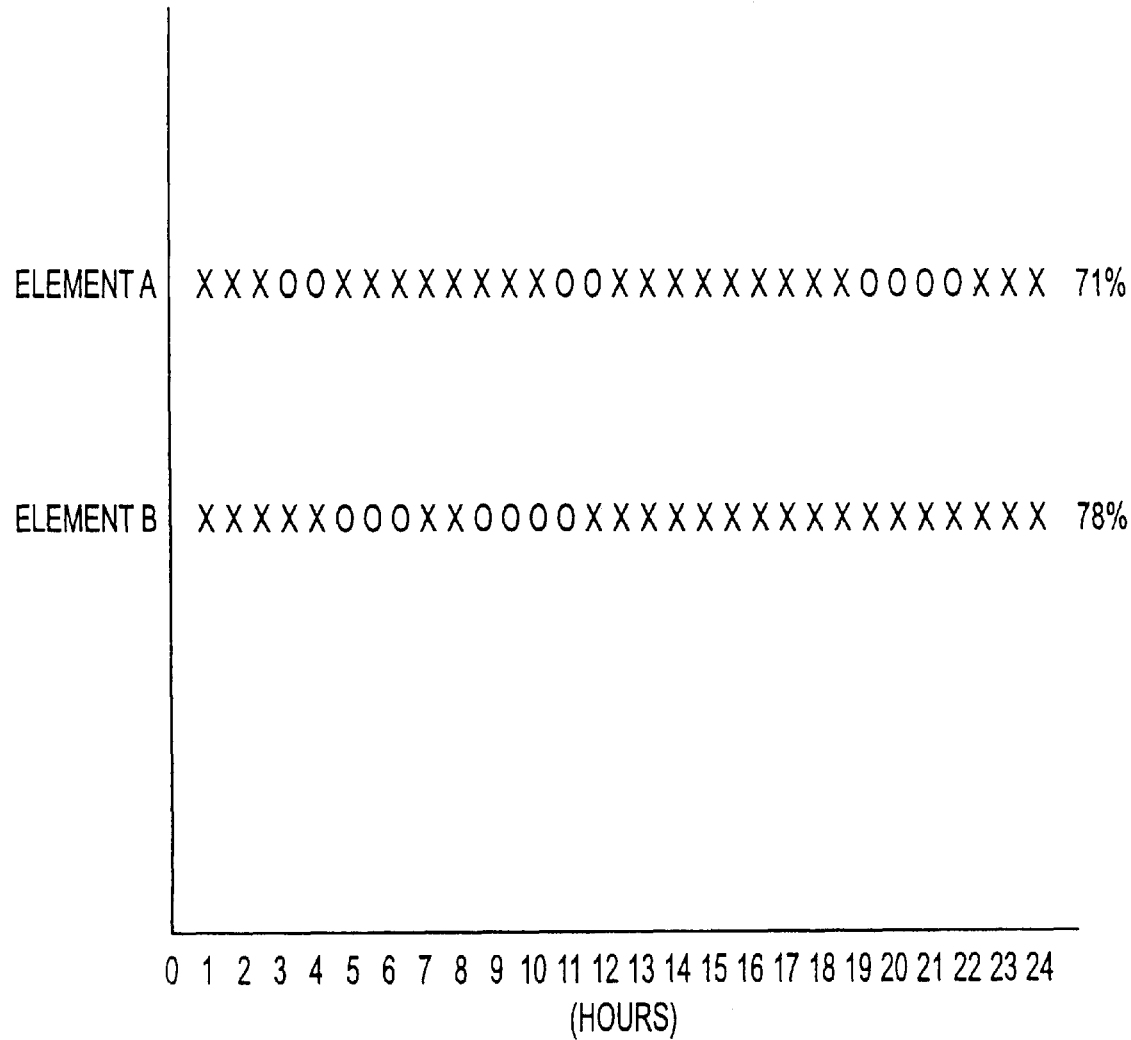
FIG. 28 shows an availability spectrum report in accordance with an embodiment of the present invention.
Figure 29:
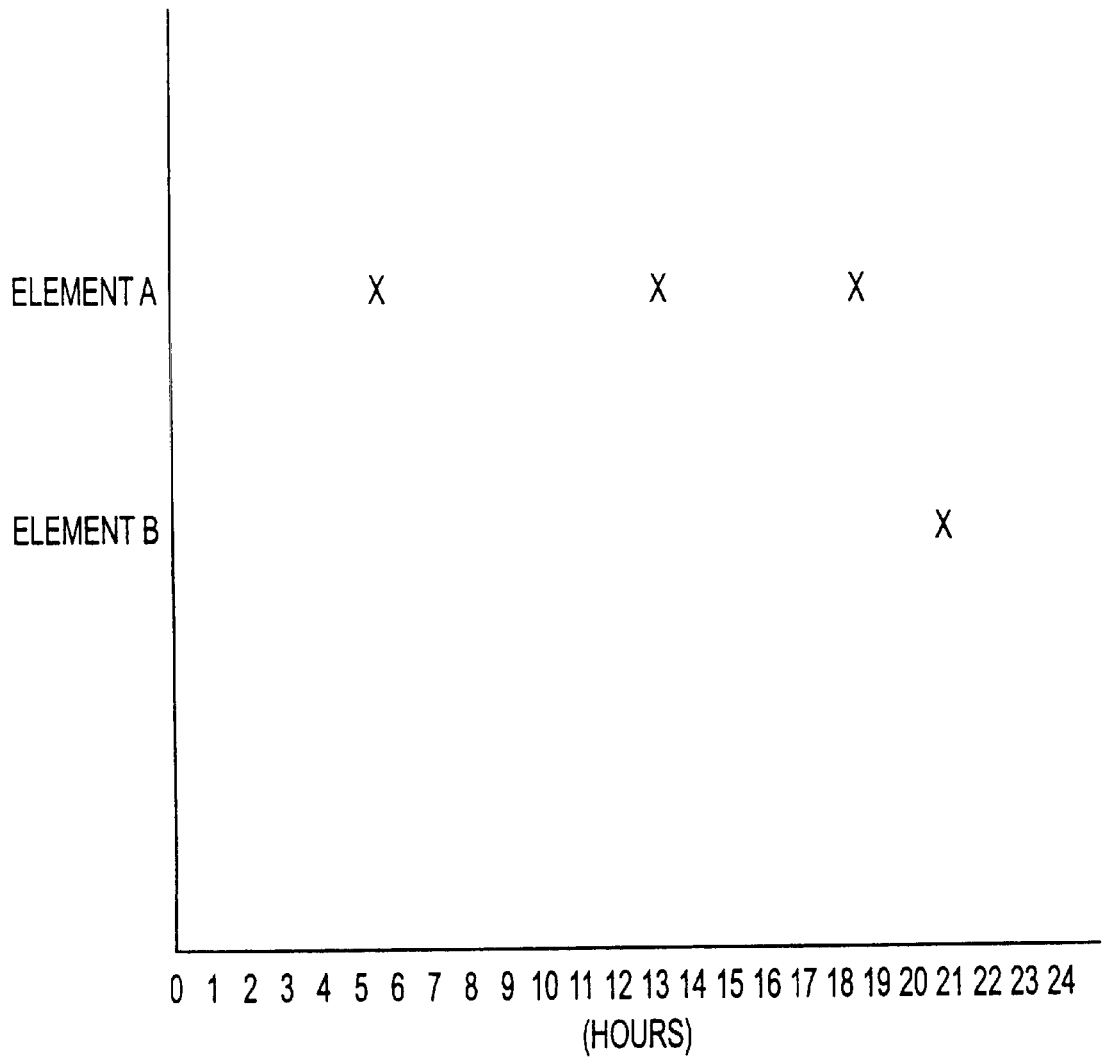
FIG. 29 illustrates an exception spectrum report in accordance with an embodiment of the present invention.

Exception Text Report (See FIG. 30)
Spectrum Graph (See FIGS. 28–29.)
What it shows This can make three chart types: Daily exception spectrums (for routers, Unix, and NT), Daily Availability Spectrums (High Level overview) for ALL Network, Service, and Process events, and Daily Availability Spectrums (Low Level overview) for EACH event under Network, Service, and Process detailing the elements that the event occurred upon.

Parameters

In the parameter call:

```
*********************************************
DAILY EVENT EXCEPTION GRAPH:
for elements: RT, UX, NT, etc.
*********************************************
SET MPRINT ON.
!EXCEPT ELMNM = (nsmmrt03 nsmmrt04 nsmmrt05) ELMT_TY = RT
ELMLOC = Minneapolis
    CODE = 1 STRTYR = 1999 STRTMON = 06 STRTDAY = 30
NUMDAYS = 1
    SARPHME = "o:\IPSA\Product Development\Reporting"
    SADSN = "ipsa01" SAUID = "spssuser" SAPWD = "spssuser"
    SASRVER = "ipsa01".
*************************************************************
DAILY EVENT AVAILABILITY GRAPH:
for Network, Service, and Process AS A WHOLE
*************************************************************
SET MPRINT ON.
!EXCEPT AVAIL = Service ELMLOC = Minneapolis CODE = 2
    STRTYR = 1999 STRTMON = 06 STRTDAY = 30 NUMDAYS = 1
    SARPHME = "o:\IPSA\Product Development\Reporting"
    SADSN = "ipsa01" SAUID = "spssuser" SAPWD = "spssuser"
    SASRVER = "ipsa01".
*************************************************
DAILY EVENT AVAILABILITY GRAPH:
for EACH Network, Service, and Process
*************************************************
SET MPRINT ON.
!EXCEPT EVENT = "DNS Service Failed" ELMLOC = Minneapolis
CODE = 3
    STRTYR = 1999 STRTMON = 06 STRTDAY = 30 NUMDAYS = 1
    SARPHME = "o:\IPSA\Product Development\Reporting"
    SADSN = "ipsa01" SAUID = "spssuser" SAPWD = "spssuser"
    SASRVER = "ipsa01".
```

The possible variables to pass in are the same as in the graphs detailed earlier, except for:

AVAIL (availability type) valid parameters include 'Network', 'Service', or 'Process'. This selects ALL events under these specifications, not just a single event type.

Manual Settings

For optimal output for the spectrum graph these settings should be made: (in the chart options in Export dialog box)

Resolution: 200×200
Size: 4.5×4.5
Format: YCC Color
Quality: 100%
Color Translation: Normal
Operation: Progressive Chartlook The exception graph calls the chartlook exception.clo and the availability graphs call the chartlook avail.clo found in the O:\ipsa\product development\reporting\spss\templates directory.

Adhoc Web Demo

The Ad hoc web demo demonstrates an HTML-based front end to the SA reporting tool. It allows the user to submit ad hoc reporting criteria from a user-friendly interface. This data is picked up by SPSS and the generated graph is displayed in the browser.

Requirements:

HTML 3.2 compliant web browser (e.g. Netscape Navigator 3.0 or higher, MS Internet Explorer 4.0 or higher).

adhoc.pl file located in the cgi-bin directory of a web server adhoc.setup.txt file located in the same directory as adhoc.pl (above)

<wwwroot>/BatchTest/ directory containing SPSS graphs

Overview:

From the main Ad hoc screen, a metric class is chosen and the Next button is clicked. If multiple graph types are available for the chosen metric, they are displayed to the user. After a graph type is chosen, the report criteria can be entered into the form that is displayed. Submitting the data will display a graph for the specified data.

Note: in this demo, only a minimal number of graphs exist, so only strict attention to detail will grant a valid report being displayed. If a report is requested that does not exist, the user will be told that no data points exist for the given criteria. Either use the "back" button to edit your criteria, or follow the hyperlink to create a new report query.

Bar Graph

Choose the Service Availability metric class

Title: <anything or nothing>

Element(s): gfmmnt03 nsmmrt03 nsmmrt04 nsmmrt05 nsmmrt06 nsmmrt07

Location: Minneapolis (default example)

Event: DNS Service Failed (default)

Press Submit

Box Plots

Daily Comparison Box Plot

Choose the Network Element Performance metric class

Choose Daily Comparison Boxplot

Title: <anything or nothing>

Elements: nsmmrt03 nsmmrt04 nsmmrt05

Metric(s): CPU Busy (%)

Location: Minneapolis (default)

Element Type: Router (default)

Press Submit

Monthly Trend Box Plot

Choose the Network Element Performance metric class

Choose Monthly Trend Boxplot

Title: <anything or nothing>

Elements: *

Metric(s): CPU Busy (%)

Location: Minneapolis (default)
Element Type: Router (default)
Press Submit
Exception Graphs
Daily Event Exceptions
Choose the Events metric class
Choose Daily event exceptions from the Occurrence and Availability menu
Title: <anything or nothing>
Location: Minneapolis (default)
Choose from any of the following three combinations:
Element(s): gfmmnt03

Element Type: NT
Element(s): nsmmrt03 nsmmrt04 nsmmrt05
Element Type: Router
Element(s): nsmmws16
Element Type: Unix
High Level Daily Event Exceptions
Choose the Events metric class
Choose High Level Daily event exceptions from the Occurrence and Availability menu
Title: <anything or nothing>
Location: Minneapolis (default)
Event Type: Network or Service

TABLE 16

Low Level Daily Event Exceptions

REQUIRED FILES FOR REPORTING

| File | Description |
|---|---|
| IPSA_StartSPSS.cmd | Located anywhere, it is used to start the reporting process (see Configuration). Instantiates two SPSS processes (spssw.exe, spsswin.exe) and IPSA_SPPS.exe |
| <SABATCH> | Batch queue file location, as specified in the IPSA_StartSPSS.cmd file (see Configuration). |
|   IPSA_BatchQueue.txt | Queue file that, if present, is passed to SPSS and contains batch report specifications. This file is deleted after being read by IPSA_SPSS.exe. See Adhoc.doc and graphs.doc for content explanations. |
| <SAADHOC> | Adhoc queue file location, as specified in <SARPHME>\InputQueue\IPSA_Reporting_Config.txt (see Configuration). |
|   IPSA_AdhocQueue.txt | Queue file passed to SPSS that contains ad hoc report parameters. This file is created by the web interface (<WWW ROOT>\cgi-bin\adhoc.pl) and deleted after use by IPSA_SPSS.exe. See Adhoc.doc and graphs.doc for content explanations. |
|   IPSA_AdHocQueue_Working_<instance>.txt | Adhoc working file with a unique IPSA_SPSS.exe instance number, <instance>, that is defined in IPSA_StartSPSS.cmd (see Configuration). |
|   IPSA_ProcessTheBatchQueue.txt | The presence of this file notifies IPSA_SPSS.exe to read <SABATCH>\IPSA_BatchQueue.txt and pass it to SPSS. This file is polled for every five seconds. |
| <SARPHME> | The reporting home directory, as specified in the IPSA_StartSPSS.cmd file (see Configuration). All files needed to generate reports are located within this directory. |
|   \InputQueue | IPSA_SPSS.exe configuration and control files. |
|     IPSA_Reporting_Config.txt | IPSA_SPSS.exe configuration file. Includes database location and login information, output directories and image format specification for the generated graphs (see Configuration). |
|     IPSA_ControlQueue.txt | Contains commands to be issued to IPSA_SPSS.exe during execution. Used for terminating the process. |
|   \Logs | Log files generated from IPSA_SPSS.exe execution |
|     IPSA_VB_SPSS.log | Error messages from program execution. |
|   \SPSS | All SPSS related files. |
|     \Macros | SPSS macros |
|       !incdef.SPS | |
|       !bargrph.SPS | bar graph |
|       !bxgrph.SPS | boxplot |
|       !spect.SPS | spectrum graph |
|       !xygrph.SPS | xy line graph |
|     \Templates | SPSS chart looks |
|       avail.clo | availabilty graph |
|       bar.clo | bar graph |
|       box.clo | boxplot |
|       exception.clo | exception graph |
|       line.clo | xy line graph |
|     \Working Data Files | SPSS macros use this directory for temporary files. |
|     \Web\HtmlTemplates | HTML fragments for use to dynamically produce HTML |
| | batch TOC header |
|       todays_urls_head_template.txt | |
| | batch TOC report title |

TABLE 16-continued

Low Level Daily Event Exceptions

REQUIRED FILES FOR REPORTING

| | |
|---|---|
| todays_urls_detail_template.txt | |
| | batch TOC footer |
| todays_urls_tail_template.txt | |
| | batch/adhoc list-of-reports header |
| detail_urls_head_template.txt | |
| | batch/adhoc list-of-reports details |
| detail_urls_detail_template.txt | |
| detail_urls_tail_template.txt | batch/adhoc list-of-reports footer |
| <SAWEB> | The report output home directory, as specified in <SARPHME>\InputQueue\IPSA_Reporting_Config.txt (see Configuration). |
| \Adhoc\<date>_INFO | Adhoc reports issued on the date <date> where <date> is of the form YYYYMMDD. This directory is created by the report generation script. |
| | the generated adhoc report |
| <adhoc_report_title><date><unique id>.html | |
| \Batch\Daily | Daily batch reports home directory |
| \<date>_INFO | Generated batch reports. <date> is of the form YYYYMMDD, but is the date prior to the date when the report request was issued. This directory is created by the report generation script. |
| \Images | Images for the HTML pages |
| Graph1.gif | list bullet |
| SA1.gif | Service Assurance logo |
| <WEB ROOT> | Root directory of the web server where the reports will be housed. |
| bground.gif | background image for the adhoc web pages |
| \cgi-bin | Adhoc files location. This directory must be accessible from a web browser via HTTP and have "execute" permission assigned to it. |
| adhoc.pl | Perl script used to generate ad hoc reports. This file is accessed via HTTP from a web browser to start the ad hoc report data gathering process. |
| adhoc.setup.txt | Setup and configuration file for the adhoc.pl script. Contains report types and descriptions. |

Choose the Events metric class
   Choose Low Level Daily event exceptions from the Occurrence and Availability menu
   Title: <anything or nothing>
   Location: Minneapolis (default)
   Event: DNS Service Failed or SMTP Service Failed
XY Line Graph
   Choose the Network Element Performance metric class
   Choose the Detail XY Line Graph report type
   Title: <anything or nothing>
   Element(s): nsmmrt03
   Location: Minneapolis (default)
   Metric(s): CPU Busy (%)
   Element Type: Router (default)
   Press Submit
IPSA_StartSPSS.cmd
   Located anywhere, it is used to start the reporting process (see Configuration). Instantiates two SPSS processes (spssw.exe, spsswin.exe) and IPSA_SPPS.exe
<SABATCH>
   Batch queue file location, as specified in the IPSA_StartSPSS.cmd file (see Configuration).
IPSA_BatchQueue.txt
   Queue file that, if present, is passed to SPSS and contains batch report specifications. This file is deleted after being read by IPSA_SPSS.exe. See Adhoc.doc and graphs.doc for content explanations.
<SAADHOC>
   Adhoc queue file location, as specified in <SARPHME>\InputQueue\IPSA_Reporting_Config.txt (see Configuration).
IPSA_AdhocQueue.txt
   Queue file passed to SPSS that contains ad hoc report parameters. This file is created by the web interface (<WWW ROOT>\cgi-bin\adhoc.pl) and deleted after use by IPSA_SPSS.exe. See Adhoc.doc and graphs.doc for content explanations.
IPSA_AdHocQueue_Working_<instance>.txt
   Adhoc working file with a unique IPSA_SPSS.exe instance number, <instance>, that is defined in IPSA_StartSPSS.cmd (see.Configuration).
IPSA_ProcessTheBatchQueue.txt
   The presence of this file notifies IPSA_SPSS.exe to read <SABATCH>\IPSA_BatchQueue.txt and pass it to SPSS. This file is polled for every five seconds.
<SARPHME>
   The reporting home directory, as specified in the IPSA_StartSPSS.cmd file (see Configuration). All files needed to generate reports are located within this directory.
\InputQueue
   IPSA_SPSS.exe configuration and control files.
   IPSA_Reporting_Config.txt IPSA_SPSS.exe configuration file. Includes database location and login information, output directories and image format specification for the generated graphs (see Configuration).
IPSA_ControlQueue.txt
   Contains commands to be issued to IPSA_SPSS.exe during execution. Used for terminating the process.

```
\Logs
Log files generated from IPSA_SPSS.exe execution
IPSA_VB_SPSS.log Error messages from program execution.
\SPSS
All SPSS related files.
\Macros            SPSS macros
!incdef.SPS
!bargrph.SPS       bar graph
!bxgrph.SPS        boxplot
!spect.SPS         spectrum graph
!xygrph.SPS        xy line graph
\Templates         SPSS chart looks
avail.clo          availabilty graph
bar.clo bar graph
box.cloboxplot
exception.clo      exception graph
line.clo           xy line graph
\Working Data Files   SPSS macros use this directory for temporary files.
\Web\HtmlTemplates                HTML fragments for use to
                                  dynamically produce HTML
todays_urls_head_template.txt     batch TOC header
todays_urls_detail_template.txt   batch TOC report title
todays_urls_tail_template.txt     batch TOC footer
detail_urls_head_template.txt     batch/adhoc list-of-reports header
detail_urls_detail_template.txt   batch/adhoc list-of-reports details
detail_urls_tail_template.txt     batch/adhoc list-of-reports footer
<SAWEB>
The report output home directory, as specified in
<SARPHME>\InputQueue\IPSA_Reporting_Config.txt (see
Configuration).
\Adhoc\<date>_INFO
Adhoc reports issued on the date <date> where <date> is of the form
YYYYMMDD. This directory is created by the report generation script.
<adhoc_report_title><date><unique id>.html
the generated adhoc report
\Batch\Daily   Daily batch reports home directory
\<date>_INFO Generated batch reports. <date> is of the form
YYYYMMDD, but is the date prior to the date when the report request
was issued. This directory is created by the report generation script.
\Images        Images for the HTML pages
Graph1.gif     list bullet
SA1.gif        Service Assurance logo
<WEB ROOT>  Root directory of the web server where the reports will
be housed.
bground.gif    background image for the adhoc web pages
\cgi-bin       Adhoc files location. This directory must be accessible
from a web browser via HTTP and have "execute" permission assigned
to it.
adhoc.pl       Perl script used to generate ad hoc reports. This file is
accessed via HTTP from a web browser to start the ad hoc report data
gathering process.
adhoc.setup.txt  Setup and configuration file for the adhoc.pl script.
Contains report types and descriptions.
``` adhoc.pl

Adhoc.pl is a CGI utility that builds HTML forms used for gathering ad hoc reporting information. This information is stored in a directory relative to $output_dir_root of the form YYYYMMDD_INFO in a text file defined by $output_file. This text file is opened, locked, and updated then closed and unlocked. A Visual Basic application feeds this queue file to SPSS to generate a report and creates an HTML file with links to the graph(s). The name of this HTML file is determined by appending the unique id generated from &unique_id onto the end of the report title and storing this in the text file. A link to this file is provided at process completion. Adhoc.pl may be written in Perl.

The report data that is created from this script includes
bar graph
trend box plot
comparison box plot
detail xy line graph
daily event exceptions
daily event exceptions (high level)
daily event exceptions (low level)

Configuration $output_dir_root—absolute path (including trailing slash) to the directory that the script should publish the data in. Note that backslashes (\) must be escaped (e.g. $output_dir_root="c:\\InetPub\\wwwroot\\";).

$output_dir_from_web_root—relative path (including trailing slash) from web root of the directory where the reports will be published. Used for creating the link to the user when report data entry is completed (e.g. $output_dir_from_web_root="/Adhoc/";).

$output_file—the name of the file to be generated from the script that contains all of the SPSS report information.

Adding a new report type

In it's current state the script would require a modification to each of its primary subroutines to accommodate a new graph type. The changes are as follows:

The section of the main routine commented as "write data to file" would need to have a new elsif block that validated the form values and called a subroutine to print the values to the text file in a format similar to the others.

Add another elsif block to choose_metric that checks the metric_class form value and calls a subroutine to either generate the appropriate HTML form or display a report type selection page—both of which would need to be written.

Add another elsif block to choose_report that calls the subroutine to create the HTML form.

Modify print_metric_options if a new metric class is needed.

As noted above, create a subroutine to generate the HTML form to gather report data from the user.

Adhoc

Lists, enclosed by parentheses and space delimited, are supported for the ELMNM, ELMLOC, and the METRCNM parameters.

Additionally

Wild cards, the "%" character for matching zero to many characters, and the "_" character for matching a single character, are supported for the ELMNM and the ELMLOC parameters

TABLE 17

Parameter descriptions

| | |
|---|---|
| RPTITLE | Any string you want to use to describe your query |
| ELMNM | Any elmnt_nm column in the network_elmnt_tb table |
| AVAIL | Logical grouping of related event types; can be set to Network, Service, or Process |
| EVENT | Any event_string_txt column in the events_fact_tb table |
| ELMTY | Any elmnt_type_cd column in the network_elmnt_tb table |
| ELMLOC | Any elmnt_city_nm column in the elmnt_loc_tb table |
| METRCNM | Any metric_nm column in the perf_metric_tb table |
| CODE | Identifies a code path through an SPSS macro. Only valid for the !EXCEPT and the !BXGRPH macros. For the !EXCEPT macro, use a value of one (1) for daily event exceptions, a value of two (2) for high level daily event availability, and a value of three (3) for low level daily event availability. For the !BXGRPH macro, use a value of one (1) for daily comparisons, and a value of two (2) for monthly trends |
| STRTYR | Four digit year spec |
| STRTMON | Two digit month spec |
| STRTDAY | Two digit day of the month spec |
| NUMDAYS | Two digit number used to specify a range of days |

Example—"adhoc" input queue file

This is a comment; each request begins with a line that contains only the "@{" characters \# and each request ends with a line that only contains the "}@" characters \# any line beginning with the "#" character is considered a comment line

```
@{
!BARGRPH RPTITLE = "Daily Availability Bar Chart"
  ELMNM = (gfmmnt03 nsmmrt03 nsmmrt04)
  EVENT = "DNS Service Failed" ELMLOC = Minneapolis
  STRTYR = 1999 STRTMON = 06 STRTDAY = 30 NUMDAYS = 1
}@
@{
!BXGRPH RPTITLE = "CPU Utilization Comparison"
  ELMNM = (nsmmrt03 nsmmrt04 nsmmrt05) ELMTY = RT
  ELMLOC = Minneapolis METRCNM = CpuBusy_Percent
  STRTYR = 1999 STRTMON = 06 STRTDAY = 30 NUMDAYS = 1
  CODE = 1
}@
@{
!BXGRPH RPTITLE = "CPU Utilization Trend"
  ELMNM = (nsmmrt05) ELMTY = RT
  ELMLOC = Minneapolis METRCNM = CpuBusy_Percent
  STRTYR = 1999 STRTMON = 06 STRTDAY = 01 NUMDAYS = 30
  CODE = 2
}@
@{
!EXCEPT RPTITLE = "Daily Event Exception"
  ELMNM = (nsmmrt03 nsmmrt04 nsmmrt05)
  ELMTY = RT ELMLOC = Minneapolis
  CODE = 1 STRTYR = 1999 STRTMON = 06 STRTDAY = 30
  NUMDAYS = 1
}@
@{
!EXCEPT RPTITLE = "Daily Event Availability (High level)"
  AVAIL = Service ELMLOC = Minneapolis CODE = 2
  STRTYR = 1999 STRTMON = 06 STRTDAY = 30 NUMDAYS = 1
}@
@{
!EXCEPT RPTITLE = "Daily Event Availability (Low level)"
  EVENT = "DNS Service Failed" ELMLOC = Minneapolis CODE = 3
  STRTYR = 1999 STRTMON = 06 STRTDAY = 30 NUMDAYS = 1
}@
@{
!XYGRPH RPTITLE = "Daily Detail XY-Line"
  ELMNM = nsmmrt03 ELMTY = RT ELMLOC = Minneapolis
  METRCNM = CpuBusy_Percent STRTYR = 1999 STRTMON = 06
  STRTDAY = 30 NUMDAYS = 1
}@
```

ECM Internal Reporting

This section out lines the procedure for generating internal alarm and poll reports from the Event Correlator and Manager.

Assumptions:

ECM is installed on NT.

User has Administrator rights on server in question.

Procedure only works on NT versions of ECM

Basic Procedure a. Turn on ECM client and log in to ECM server in question.

b. Once interface is enabled and client has fully logged into server, click on Admin and then Report List.

c. The Report List dialog will open.

d. Click on NC Alarm Definition Report and then click Run.

e. Once the report is generated click the print icon and the report will be generated at your default printer.

f. Close the NC Alarm Definition Report.

g. Go back to the ECM client and click on the NC Poll Report.

h. Next click Run.

i. Print this report and exit the system.

Analysis

This process generates line item reports of the user [re]defined alarms/polls in ECM. These are generated through a proprietary format of Seagate's Crystal Reports, and are possible due to the existence of the database that sits behind the ECM installation on NT systems. These reports can be modified externally through a copy of Crystal Reports, and can be added to through the ECM interface.

IIS (Internet Information Server) 3.0

Start Services

Open the control panel (Start>Settings>Control Panel)

Click on Services

Select "IIS Admin Service" and "World Wide Web Publishing Services" and click on the start button.

Set Root Directory

Create a folder to be your home directory. (i.e. We set one up called 'WWWRoot' in the path C:\Data\WWWRoot)

Open Microsoft Management Console (Start>Programs>Windows NT 4.0 Option Pack>Microsoft Internet Information Server>Internet Service Manager)

Open the Internet Information Server folder and then twmmnt02

Right click on Default Web Site and drag down to Properties

Go into the 'Home Directory' tab and change the 'local path' to the name of the root directory that you created Settings Open the Microsoft Management Console again Right click on Default Web Site again and under Properties change these settings:

Web Site Tab-

Change description name as desired (Service Assurance Web Site).

Change IP address to your own (149.122.57.21—it also happens to be in the drop down box)

Check 'enable logging' and under properties change the log file directory (C:\data\iislogs)

Home Directory Tab-

Change local path if you didn't already when setting up the root directory (C:\data\wwwroot)

Check 'directory browsing allowed' (if your default document isn't directly in the root directory)

Documents Tab-

Check 'enable default document' and change it to 'index.html'

Right click on Default FTP Web Site and under Properties change these settings:

Home Directory Tab-

Change local path to desired location (C:\data\ftproot)

FTP Site Tab-

Check 'enable logging' and under properties change the log file directory (C:\data\iislogs)

Change description name as desired (Service Assurance FTP Site).

Right click on Administration Web Site and under Properties change these settings:

Web Site Tab-
  Check 'enable logging' and under properties change the log file directory (C:\data\iislogs)
  Change description name as desired (Service Assurance Administration Web Site).
  Add a 'cgi-bin' folder into the directory where your http pages are located
  Go into the Microsoft Management Console and right click on the cgi-bin folder and go into Properties.
  Under the Directory Tab change the permissions to 'execute'.

SPSS Documentation
Set Up Instructions
Installing SPSS 8.0
  Follow the setup instructions until you can decide what type of installation you would like. Choose Custom and select all options.
  When you encounter the Personal Installation choice . . . choose it.
  When prompted to install Adobe Acrobat 3.0, choose yes and follow the installation instructions. This will be helpful to view the online tutorials.
Installing ODBC 3.5 SDK
  Go to the http://www.microsoft.com/data/odbc/download.htm website to download the ODBC 3.5 Software Development Kit (SDK) for Intel. Select 'Download the ODBC 3.5 SDK for Intel now' button. Save it to disk when prompted and follow instructions to download the application.
  Go into Windows NT Explorer to find the file (ODBC35IN.exe) that you just saved to disk. Execute it. After done generating your files, find the setup.exe icon. Click on setup.exe to finish the installation process. Choose all options for custom installation choices.
Downloading SPSS 8.0.1 Update Patch
  Open http://www.spss.com/tech/patches/SP-061198.htm.
  Select 801us.exe (US version).
  Save it to disk.
  Find the downloaded files on your disk and open 801us.exe, click Yes, and then click on Upgrade SPSS 8.0.
  Follow the upgrade instructions.
Associating a DSN Name With an ODBC Source
  Open the 32-bit ODBC Administrator.
  Programs>Odbc>32-bit ODBC Administrator
  Add a new user data source under the user DSN tab by clicking Add.
  Select a driver for which you want to set up a data source for.
  (In this case—Microsoft ODBC for Dbse)
  Click Finish.
  Enter the Data Source Name. (make up any name)
  Enter the Description. (can be same as Data Source Name)
  Enter your User name.
  Enter the Server. (In this case—IPSA01)
  Once this information is entered you will be brought back to the ODBC Data Source Administrator. Click OK.
Adding a Database Alias
  Open the SQL Net Easy Configuration.
  Programs>Dbse for Windows NT>SQL Net Easy Configuration
  Click on Add Database Alias and then OK.
  Enter the alias name (In this example: IPSA01)
  Choose the network protocol to be used when you connect to a remote database
  (In this case it is TCP/IP) then click OK.
  Enter the TCP/IP host name (ucmmdb02) and the database instance of the particular database you want to access. (In this example: IPSA01)
  Confirm that you want to add this Database Alias by Clicking Yes.
  This will bring you back to the SQL Net Easy Configuration where you can just click Cancel to exit.
Checking The Alias Setup
  Find your dbse home (Dbsnt) and open tnsnames.ora through this path:
    C:/Dbsnt/Network/Admin/tnsnames.ora. This is a SQL Net Configuration file which will have the names of the aliases that are set up. The one you just added will most likely be found at the end of the file.
Getting Started in SPSS
SPSS Database Capture Wizard
  In SPSS Data Editor go to Edit>Database Capture>New Query to open the ODBC Wizard.
  Choose data source to retrieve data and click Next.
  Drag table onto right box to see fields and click Next. (Can also select a subset of fields here)
  Limit Retrieved Cases page, click Next. (Can select a subset of cases based on conditional expressions in this dialog box)
  Define Variables page, click Next. (Can specify more user friendly variable names here)
  Results page. Change column names into SPSS Syntax to desired names. The names to use are located by opening SQL+ and on the command line typing the table name. i.e.>describe spss_test Example

---

GET CAPTURE ODBC /CONNECT='DSN=MSDN:
dbse;UID=solomoj;PWD=solomoj;SERVER=IPSA01;'/SELECT
"T0"."MON_DT" AS "MON_DT", "T0"."SYSTEM_NM" AS "SYSTEM_N",
"T0"."FILE_READ_OPS_AMT" AS "FILE_REA",
"T0"."FILE_WRITE_OPS_AMT" AS "FILE_WRI",
"T0"."FILE_CONTROL_OPS_AMT" AS "FILE_CON",
"T0"."FILE_READ_BYTES_AMT" AS "FILE_REA",
"T0"."FILE_WRITE_BYTES_AMT" AS "FILE_WRI", -continued

"T0"."FILE_CNTRL_BYTES_AMT" AS "FILE_CNT"
FROM "SPSS_TEST" "T0".

"T0"."FILE_READ_OPS_AMT" AS "FILE REA" //This displays the long column name and associates it with the short column name (8 chars). There is a comma and TWO spaces between items in the list. The 0 in "T0" is a zero, not the letter 'O'.

Click on "paste it into syntax editor" button.

Save query to file with a .spq extension and click Finish.

This should bring you to the syntax editor which should look something like this:

```
GET CAPTURE ODBC /CONNECT='DSN=MSDN:'+
'dbse;UID=solomoj;PWD=solomoj;SERVER=IPSA01;'/
SELECT "T0"."MON_DT" AS "MON_DT",
"T0"."SYSTEM_NM" AS "SYSTEM_N", "T0"."FILE_READ_OPS_AMT"
AS "FILE_REA", "T0"."FILE_WRITE_OPS_AMT" AS "FILE WRI",
"T0"."FILE_CONTROL_OPS_AMT" AS "FILE_CON",
"T0"."FILE_READ_BYTES_AMT"
AS "FILE_RBY", "T0"."FILE_WRITE_BYTES_AMT" AS "FILE WBY",
"T0"."FILE_CNTRL_BYTES_AMT" AS "FILE_CNT"
FROM "SPSS_TEST" "T0".
Execute.
VARIABLE LABELS MON_DT "MON_DT" SYSTEM_N "SYSTEM_NM"
FILE_WRI "FILE_WRITE_OPS_AMT" FILE_CON
"FILE_CONTROL_OPS_AMT"
FILE RBY "FILE_READ_BYTES_AMT" FILE_WBY
"FILE_WRITE_BYTES_AMT"
FILE_CNT "FILE_CNTRL_BYTES_AMT".
```

(Some syntax tips: In the select area, there is a comma and two spaces separating names. The '0' in "T0" is a zero, not the letter 'O'. In the variable labels, the short name (8 chars) is listed first with the long name in quotation marks, all separated by one space. The final name ends with one space and a period.)

Save the syntax file. It will have a .SPS extension.

Go to Run>All to execute the script. All warnings and errors will pop up in an output window for you to view. Otherwise the table will be shown in the SPSS Data Editor window with the correct column names and data.

Features of SPSS

Data Editor:

Displays contents of the working data file

Each row is a single case or observation

Each column is a single variable

Can enter and edit data in this editor

Unable to perform calculations or enter formulas here

Viewer Window:

Displays tables, statistics and charts

Opens automatically when you run a command that produces output

The left pane contains the outline view

The right pane contains statistical tables, charts and text outputs

Click on any item in the outline to go directly to the corresponding table or chart The open book icon indicates the item is currently visible in the right pane. Double click on the icon to hide the information (closed book icon will appear)

Change chart positions by highlighting the information and dragging it to desired location in the outline Tool Bars:

Both toolbars on the data editor and viewer window can be used

Can be moved by clicking on the tool bar (not on a button) and dragging it

Dialog Boxes:

Used to display information on variables

Click left mouse button on variable name, click right mouse button anywhere on the list and select 'Variable Information' from the pop-up menu Icons next to variable names describe the variable type: Numeric variables (# icon), Short string variables—8 characters or less ('A' icon with a (<) less than symbol), and Long string variables—greater than 8 characters ('A' icon with a (>) greater than symbol)

Interactive Chart Dialog Boxes:

Three variable types:
    1. Categorical (red, blue, and yellow icon)
    2. Scale (yellow ruler icon)
    3. Built-in (white ruler with a yellow circle)

Entering and Manipulating Data

Numeric:

Select cell and enter numeric number. It will then appear in the cell editor.

Press Enter to record the data.

If the variable hasn't been named, a unique variable name will be assigned to it.

Non-numeric:

Define the variable by double-clicking on the variable name or top of the column. This can also be done by selecting Data>Define Variable in the menu bar.

Click on Type in the dialog box.

Select the data type, click Continue, and then click OK.

Defining Data:

You can define descriptive values for data values to be used in statistical reports and charts, i.e. one can associate the number 1 with 'male' and number 2 with 'female'.

Open Data>Define Variable and click on Labels in the dialog box.

Enter the data value and label.

Click Add and then click Continue.

Showing Value Labels:

Open View>Value Labels or Ctrl-click on the cell you want to enter data into.

Double click on the value you would like to add.

The value will be entered and the value label displayed in the cell.

Reading ASCII Text Data Files:

Open File>Read Ascii Data>(Fixed Columns or Freefield)
1. Fixed format—each variable is in the same column location for each case.
2. Freefield—only the order of the variables is important.

Click Browse to select data file.

Enter a name for each variable

Enter a starting and ending column location for the variable. (data values can appear anywhere within the column range)

If there is more than one line of data for each case, enter the record number for each variable. (this indicates the line number within the case)

Select a data type and click Add.

Transforming Data Files:

Open Transform>Compute.

Enter name of the target variable.

Enter numeric expression
1. You can paste variables from the source list
2. Numbers and operators are on the calculator pad
3. Functions are located in the function list The new variable will be added to the end of the data file.

Making Reports in SPSS (Charts)

Creating a Chart:

Select Graphs>(type of chart).

Choose an icon for specified type of chart you want and indicate how your data are organized.

Click Define.

Follow the define dialog box and click OK.

Editing Charts:

Double click on the chart in the viewer. This will display the chart in a chart window.

You can edit by using the menu, toolbar, or double-clicking on the object you want to edit.
1. In the menu select Chart>(choose selection) and edit in the resulting dialog box.
2. Click on chart element, click on a tool in the toolbar, and follow the dialog box that appears.
3. Double click on an object to edit in the chart window and an appropriate dialog box will appear.

Changing scale axis

Double click on the axis.

In the dialog box, change the range or values on the axis accordingly.

Changing color

Click on the chart element you want to change.

Click on color tool in the tool bar (crayon shape).

Select a color and then click Apply.

Swapping chart axes

Click on swap axes tool in the toolbar.

Change chart types

Open Gallery>(new chart type) in the chart editor.

Select type of chart in the dialog box that appears and click Replace.

Select variables for the new chart and click OK.

Interactive Graphs:

In the SPSS data editor open Graphs>Interactive>(Choose method) to create a report on the data entered in your table.

Drag variable names into the axes boxes to compare them and click OK.

The SPSS Viewer will appear with the graph. Double click on the graph to activate it so you able to interact with the data.

Several options will appear as buttons around the graph. Activate them by clicking on the appropriate button.

Assign graph variables to axes and legends with the first button in the corner depicted with a ruler and other items. This can assign variables to various roles in a chart. Variables can be assigned to axes, color, style, and size. You can also change the graph into a 2D or 3D coordinate system in this window. If a 3D coordinate system is chosen a rotation device window will appear to rotate the graph to show the information better.

The next button to the right is a pull down menu that will change the graph type.

The Display Chart Manager is the next one over. It gives easy access to all of the separate components that make up the chart. You can select the item and then edit, delete, or hide them.

There are two buttons that changes the axes orientation to horizontal or vertical.

On the vertical button row you are able to change colors, lines, and fills, as well as symbol style, symbol size, line style, line weight, and connector style.

Making Reports in SPSS (Tables)

To run a procedure, open from the SPSS data editor Statistics>(Select a Category)>(Select a Procedure). i.e. Statistics>Summarize>Frequencies.

Select variables from source list and use the arrow button to move variables to target lists. Click OK.

The results will be displayed in the Viewer.

Pivot Tables:

Double click on the table in the viewer.

Select pivoting trays from pivot menu. Pivot>Pivoting Trays.

Click and drag pivot icon from one dimension (column, row, layer) to another to alter table.

You can also change order of elements in the table by moving the pivot icons around and swapping them.

Editing Pivot Tables:

Changing font or alignment

Double click on the table.

Click on table cell or label to modify.

Use the formatting toolbar to change desired attributes.

Modifying text

Double click on the text to modify.

Edit as you would in a text editor or word processing program.

(if you change numeric values . . . the row and column totals will not be recalculated)

Hiding rows and columns

Double click on the table.

Ctrl-Alt-Click on the label of the row or column to hide.

Click the right mouse button and select Hide Category from the pop-up window.

View>Show All will bring the information back into view.

Changing data display formats

Select the column by doing a Ctrl-Alt-Click on the column label.

Click the right mouse button on the label of the column and select Cell Properties from the pop-up menu.

Change desired display format. i.e. Change decimals to 0.

Click OK.

Customizing tables

Double click on table.

Open Format>TableLooks.

Select a table style.

To create a new table style, choose a table format close to what you want.

Click Edit Look button.

Edit the attributes you wish from the dialog box and click OK.

Click Save As in TableLooks dialog box to save the new table style.

Pasting results as metafiles

Select the item either in the output or contents pane.

Select Edit>Copy.

In the other application you are pasting into select Edit>Paste Special.

Select Picture from the dialog box.

Pasting results as unformatted text

Select the item either in the output or contents pane.

Select Edit>Copy.

In the other application you are pasting into select Edit>Paste Special.

Select Unformatted text from the dialog box.

Layering a Table:

To collapse a large 2D table into 3D layers double click on the table.

Select pivoting trays from pivot menu. Pivot>Pivoting Trays.

Drag any pivot icon from the row or column tray into the layer tray.

To view the different layers on the table you can either click the arrows on the layer pivot icon in the pivot tray or select a category from the drop down list on the table.

Export Format and Chart Templates

Export format controls the export format for output documents. Charts should be exported in a suitable format for inclusion in HTML documents. (i.e. JPEG)

Pivot tables can be exported as HTML tables, as tab separated text, or as space separated text.

Text output can be exported as preformatted HTML or space separated text.

Exported chart names are based on the production job filename, a sequential number, and extension of the selected format. (i.e. PROBJOB1.WMF)

Use File>Export to change text and chart export options.

When in the Export Output dialog box, click on the Options button. Then in the JPG Output Filter Setup dialog box, click on the Chart Options button. Some settings to make that will enhance the HTML output are:

1. Resloution=200×200 pels/in.
2. Size=3×3 in.
3. Quality=100%
4. Operation=Progressive
5. Format=ycc color To change production options from production facility menu select Edit>Options after double-clicking on the chart to activate it. Under the Chart tab, change the Aspect Ratio to 1.25 and under the Viewer tab change the Text Output Font to 12 pt. Other options are also available to change in this dialog box.

Viewer Options:

Viewer output display options affect only new output produced after you change the settings. Output already displayed in the Viewer is not affected by changes in these settings.

Initial Output State controls which items are automatically displayed or hidden each time you run a procedure and how items are initially aligned. You can control the display of the following items: log, warnings, notes, titles, pivot tables, charts, and text output (output not displayed in pivot tables). You can also turn the display of commands in the log on or off. You can copy command syntax from the log and save it in a syntax file for use with the automated production facility.

To change the viewer output display options:

Open Edit>Options.

Select the Viewer tab.

In the initial output state box, make sure that the log, warnings, and notes are all bulleted as 'contents initially hidden'.

Click Apply.

In the Draft Viewer tab of that same dialog box, make sure that in the 'display output items' box, log, commands in log, warnings, and notes are not selected (checked).

Click Apply.

All output items are displayed left-aligned in the Viewer. Only the alignment of printed output is affected by the justification settings. Centered and right-aligned items are identified by a small symbol above and to the left of the item.

All of these viewer options that you change will appear in the output window. If you export the object into HTML using the production facility, everything will be displayed regardless of what you changed in the viewer options.

Chart Templates:

You can apply many of the attributes and text elements from one chart to another. This allows you to modify one chart, save that chart, and then use it as a template to create a number of other similar charts. For example, if the old chart is a clustered bar chart with bar colors modified to yellow and green and the new chart is a multiple line chart, the lines will be yellow and green.

To create a new template:

Create a chart as detailed earlier.

Edit the chart to contain the attributes you want to save in a template (text format, color/fills, titles, subtitles, etc.) by selecting it and using the chart window.

Open File>Save Chart Template from the chart window menu. (double-click on the chart to display the chart window)

To apply a template to a chart already in a chart window:

Select the chart by double-clicking on it to bring up the chart window.

Open Format>Apply Chart Template.

Select a file to use as a template in the dialog box that appears.

To apply a template using command syntax:

By applying a chart template using command syntax, you can modify your chart to the set attributes in the template very quickly and easily. This would be helpful when running syntax files to produce customized output in the production facility as well.

Create or locate a chart template.

You will need to preserve the default option settings that the template will be modifying. To do so, add the PRESERVE command before applying the template.

To set the template, use the command SET CTEMPLATE="filename". Where file name is the absolute path of the chart template you want to apply.

Next, add syntax for the chart(s) you wish to include.

Use the RESTORE command to reset the option settings to what was saved when you issued the PRESERVE command earlier.

Example Syntax Using CTEMPLATE

```
GET CAPTURE ODBC
/CONNECT='DSN=MSDN:'+
'dbse;UID=solomoj;PWD=solomoj;SERVER=IPSA01;'
/SELECT "T0"."MON_DT" AS "MON_DT",
"T0"."SYSTEM_NM" AS "SYSTEM_N", "T0"."FILE_READ_OPS_AMT"
AS "FILE_REA", "T0"."FILE_WRITE_OPS_AMT" AS "FILE_WRI",
"T0"."FILE_CONTROL_OPS_AMT" AS "FILE_CON",
"T0"."FILE_READ_BYTES_AMT"
AS "FILE_RBY", "T0"."FILE_WRITE_BYTES_AMT" AS "FILE_WBY",
"T0"."FILE_CNTRL_BYTES_AMT" AS "FILE_CNT"
FROM "SPSS_TEST" "T0".
Execute.
VARIABLE LABELS MON_DT "MON_DT" SYSTEM_N "SYSTEM NM"
FILE_WRI "FILE_WRITE_OPS_AMT" FILE_CON
"FILE_CONTROL_OPS_AMT"
FILE_RBY "FILE_READ_BYTES_AMT" FILE_WBY
"FILE_WRITE_BYTES_AMT"
FILE_CNT "FILE_CNTRL_BYTES_AMT"
PRESERVE.
SET CTEMPLATE = "c:\spss\test2.sct".
*Sequence Charts
TSPLOT VARIABLES=file_rby
/ID=mon_dt
/NOLOG
/FORMAT NOFILL NOREFERENCE
RESTORE.
```

Command Syntax

A syntax file is a text file that contains commands. You can just type in the commands, but the software can help you build your syntax file by:

Pasting command syntax from dialog boxes

Copying syntax from the output log

Copying syntax from the journal file

Rules When Editing and Writing Command Syntax

Keep in mind the following simple rules when editing and writing command syntax:

Each command must begin on a new line and end with a period (.).

Most subcommands are separated by slashes (/). The slash before the first subcommand on a command is usually optional.

Variable names must be spelled out fully.

Text included within apostrophes or quotation marks must be contained on a single line.

Each line of command syntax cannot exceed 80 characters.

A period (.) must be used to indicate decimals, regardless of your Windows regional settings.

Variable names ending in a period can cause errors in commands created by the dialog boxes. You cannot create such variable names in the dialog boxes, and you should generally avoid them.

Command syntax is case insensitive, and three-letter abbreviations can be used for many command specifications. You can use as many lines as you want to specify a single command. You can add space or break lines at almost any point where a single blank is allowed, such as around slashes, parentheses, arithmetic operators, or between variable names. For example,

```
FREQUENCIES
VARIABLES=JOBCAT GENDER
/PERCENTILES=25 50 75
```

-continued

```
/BARCHART.
and
freq var=jobcat gender /percent=25 50 75 /bar.
are both acceptable alternatives that generate the same results.
```

Creating Command Syntax from Dialog Boxes

The easiest way to build a command syntax file is to make selections in dialog boxes and paste the syntax for the selections into a syntax window. Then in the syntax window, you can run the pasted syntax, edit it, and save it in a syntax file.

Open the dialog box and make selections. (i.e. when making a graph or table)

Click on the Paste button and the command syntax will be pasted directly into the designated syntax window, or if a syntax window isn't open it will create a new syntax window automatically to paste your commands into.

Using Command Syntax from the Output Log

You can copy command syntax from the log that appears in the Viewer.
Open Edit>Options.
Select the Viewer tab and select 'Display commands in the log'. (As you run analyses, the commands for your dialog box selections are recorded in the log)
Open a syntax file by File>New>Syntax.
In the Output Viewer, double-click on the log item to activate it. (If it is hidden, click on the closed book icon of the log to display it)
Highlight the syntax you want to copy.

Edit>Copy.
In the syntax window choose Edit>Paste.
Using Command Syntax from the Journal File
All commands executed during a session are recorded in a journal file named spss.jnl. You can edit the journal file and save it as a syntax file that you can use to repeat a previously run analysis, or you can run it in an automated job with the production facility.
Open File>Open.
Locate the journal file spss.jnl (by default located in the temp directory)
Edit the file to remove any error messages or warnings, indicated by the>sign.
Save the edited journal file using a different filename (with the extension .sps for a syntax file).
Defining the Working Data File
The file that appears in the Data Editor window is the working data file. When you open a data file, it becomes the working data file. All analysis is performed on the working data file, and most analytical commands are unavailable unless you have a working data file.
The working data file is the data file you build to use in the current session. You can retrieve an SPSS-format data file using GET, which in effect makes a working copy of the specified file. The working data file is not created until SPSS encounters a command (usually a procedure) that causes it to read the data. At this point, SPSS executes all of the preceding data definition and transformation commands and the command that causes the data to be read. The working data file is then available for further transformations and procedures, and it remains available until replaced by a new working data file or until the end of the session.
Any transformations and statistical analyses you request during a session are performed on the working data file.

Transformations performed during a session apply to the working data file only. Changes to the file are lost if the working data file is erased or replaced before you have saved it.

Example Syntax Defining the Working Data File

```
GET CAPTURE ODBC
/CONNECT='DSN=MSDN:'+
'dbse;UID=solomoj;PWD=solomoj;SERVER=IPSA01;'
/SELECT "T0"."MON_DT" AS "MON_DT",
"T0"."SYSTEM_NM" AS "SYSTEM_N", "T0"."FILE_READ_OPS_AMT"
AS "FILE_REA", "T0"."FILE_WRITE_OPS_AMT" AS "FILE_WRI",
"T0"."FILE_CONTROL_OPS_AMT" AS "FILE_CON",
"T0"."FILE_READ_BYTES_AMT"
AS "FILE_RBY", "T0"."FILE WRITE_BYTES_AMT" AS "FILE_WBY",
"T0"."FILE_CNTRL_BYTES_AMT" AS "FILE_CNT"
FROM "SPSS_TEST" "T0".
Execute.
VARIABLE LABELS MON_DT "MON_DT" SYSTEM_N "SYSTEM_NM"
FILE_WRI "FILE_WRITE_OPS_AMT" FILE_CON
"FILE_CONTROL_OPS_AMT"
FILE_RBY "FILE_READ_BYTES_AMT" FILE_WBY
"FILE_WRITE_BYTES_AMT"
FILE_CNT "FILE_CNTRL_BYTES_AMT".
FREQUENCIES
    VARIABLES=file_wri file_rby file_cnt
    /ORDER ANALYSIS.
```

(***This includes the GET CAPTURE command that retrieves data from a database and converts them to a format that can be used by program procedures. GET CAPTURE retrieves data and data information and builds a working data file for the current session.)
CONNECT subcommand is required to access any database that has an installed Microsoft ODBC driver. You cannot specify the connection string directly in the syntax window, but you can paste it with the rest of the command from the Results dialog box, which is the last of the series of dialog boxes opened with the Database Capture command from the File menu.
SELECT specifies any SQL select statement accepted by the database you access.
Running Command Syntax
Highlight the commands you want to run in the syntax window.
Click the Run button (the right-pointing triangle) on the syntax window toolbar.
OR
Open Run>(select command).
1. All—runs all commands in the syntax window
2. Selection—runs the currently selected commands
3. Current—runs the command where the cursor is currently located
4. To End—runs all commands from the current cursor location to the end of the file
The Scripting Facility
The scripting facility allows you to automate tasks, including:
1. Automatically customize output in the Viewer.
2. Open and save data files.
3. Display and manipulate dialog boxes.

4. Run data transformations and statistical procedures using command syntax.

5. Export chars as graphic files in a number of formats.

Scripts

Many scripts are included with the software. You can use these scripts as they are or you can customize them to your needs. If you want to create your own scripts, you can begin by choosing from a number of starter scripts.

To Create a Script:

Open New>Script.

Select a starter script if you want to begin with one.

If you do not want to use a starter script, click Cancel.

To Edit a Script:

Open File>Open.

Look in j:\myproducts\spss\scripts or j:\myproducts\spss\scripts\starter to find a SPSS Script (*.sbs) to open.

Modify the script. (The starter scripts are helpful in that they are commented with hints on how to customize the script to your particular needs)

Save your new script.

To Run a Script:

To apply a script to a table, click on the table to select it in the Output Viewer window.

Open Utilities>Run Script.

Select the script from the dialog box you wish to execute and click Run.

Example Script

File Name: CleanOutput.sbs

Begin Description

End Description

SPSS Autoscript file

Do not edit the text between HeaderBegin and HeaderEnd

HeaderBegin

HeaderEnd

'************************************************

Use this Starter Script if you want to remove items from the Navigator.

This Starter Script can be modified to delete items based on their type (e.g., Note, Warning, Log, Chart, Pivot, Table, Text, Title, or All)

This is a modified version of the starter script (Delete Navigator 'Items.sbs located in the Starter folder) that will delete the Log, Notes, Text and Warnings from the Navigator for better output when making HTML output items.

```
Option Explicit
Public Const ALL_ITEMS As Integer = 10
Sub Main
    Declare variables that will be used in this procedure
    Dim intTypeToDelete As Integer
    Dim intTypeToErase As Integer
    Dim intTypeToDiscard As Integer
    Dim intTypeToEliminate As Integer
    Dim strSearchForLabel As String
    '****Modification to original starter script****
    'because only one item is allowed to be deleted at a time due to only one
    'variable declared (intTypeToDelete), by creating separate variable names
    'for each of the items you wish to delete, you can call the function
    'several times With the various variables and delete multiple items within
    'this script.
    '*************************************************************
    intTypeToDelete = SPSSLog
    intTypeToErase = SPSSNote
    intTypeToDiscard = SPSSText
    intTypeToEliminate = SPSSWarning
    '*Call the DeleteAllByType function for each variable you produced***
    Call DeleteAllByType(intTypeToDiscard)
    Call DeleteAllByType(intTypeToEliminate)
    Call DeleteAllByType(intTypeToDelete)
    Call DeleteAllByType(intTypeToErase)
End Sub
Sub DeleteAllByType(intDeleteType As Integer)
'Purpose: Deletes all items that are a specific type, regardless of whether
'they are selected.
'Assumptions: The items are in the designated output document
'Effects: Deletes all the items that are a specific type (e.g., Note, 'Warning)
'Inputs: The type of item to delete (intDeleteType)
'Return Values: None
'declare SPSS object variables that will be used in this procedure
    Dim objOutputDoc As ISpssOutputDoc
    Set objOutputDoc = objSpssApp.GetDesignatedOutputDoc
'Clear all selections so that some items aren[001b]'t inadvertently deleted
    obj OutputDoc.ClearSelection
'determine what type the parameter refers to
'then select all of the items of that type
    Select Case intDeleteType
        Case SPSSChart
            objOutputDoc.SelectAllCharts
        Case SPSSLog
            objOutputDoc.SelectAllLogs
        Case SPSSNote
```

-continued

```
    objOutputDoc.SelectAllNotes
  Case SPSSPivot
    objOutputDoc.SelectAllTables
  Case SPSSText
    objOutputDoc.SelectAllText
  Case SPSSTitle
    objOutputDoc.SelectAllTitles
  Case SPSSWarning
    objOutputDoc.SelectAllWarnings
  Case ALL_ITEMS
    objOutputDoc.SelectAll
  End Select
  'Now only those items that should be deleted are selected, so delete them
  objOutputDoc.Remove
EndSub
```

Including Scripts in Syntax Documents:

To have a script run within a syntax document, use the SCRIPT command.

The syntax is: SCRIPT 'filename' [(quoted string)]

The basic specification is keyword SCRIPT with a filename. The filename is required. The optional quoted string, enclosed in parentheses, can be passed to the script.

Example Syntax

```
GET CAPTURE ODBC
/CONNECT='DSN=MSDN:'+
dbse;UID=solomoj;PWD=solomoj;SERVER=ISPA01;'
/SELECT "T0"."MON_DT" AS "MON_DT",
"T0"."SYSTEM_NM" AS "SYSTEM_N" "T0"."FILE_READ_OPS_AMT"
AS "FILE_REA", "T0"."FILE_WRITE_OPS_AMT" AS "FILE_WRI",
"T0"."FILE_CONTROL_OPS_AMT" AS "FILE_CON",
"T0"."FILE_READ_BYTES_AMT"
AS "FILE_RBY", "T0"."FILE_WRITE_BYTES_AMT" AS "FILE_WBY",
"T0"."FILE CNTRL_BYTES_AMT" AS "FILE_CNT"
FROM "SPSS_TEST" "T0".
Execute.
VARIABLE LABELS MON_DT "MON_DT" SYSTEM_N "SYSTEM_NM"
FILE_WRI "FILE_WRITE_OPS_AMT" FILE_CON
"FILE_CONTROL_OPS_AMT"
FILE_RBY "FILE_READ_BYTES_AMT" FILE_WBY
"FILE_WRITE_BYTES_AMT"
FILE_CNT "FILE_CNTRL_BYTES_AMT".
FREQUENCIES
VARIABLES=file_con file_wby file_wri
/ORDER ANALYSIS.
SCRIPT 'j:\myproducts\spss\scripts\cleanoutput.sbs'.
```

(This particular SCRIPT command will call the cleanoutput.sbs script which is coded to remove all unwanted items from the exported output. It is put at the end of the code so it can remove the items generated by the output of the FREQUENCIES command.)

Autoscripts

Autoscripts run automatically when triggered by the creation of a specific piece of output by a given procedure. For example, an autoscript can automatically make the 'Totals' row or column in a table into bold typeface and highlighted in the color blue each time a frequency table is created.

Creating Autoscripts:

You create an autoscript by starting with the output object that you want to serve as the trigger. For example, to create an autoscript that runs whenever a frequency table is produced, create a frequency table in the usual manner.

Single-click the table in the Output Viewer to select it.

Right-click and select Create/Edit Autoscript or use Utilities>Create/Edit Autoscript from the menu.

(If no autoscript exists for the selected object, a new autoscript is created. If an autoscript already exists, the existing script is displayed).

Type in code.

Open Edit>Options to enable or disable the autoscript under the Script tab.

The Autoscript File

All autoscripts are saved in a single file. Any new autoscripts you create are also added to this file. The name of the current autoscript file is displayed on the Scripts tab in the Options dialog box. The Options dialog box also displays all of the autoscripts in the currently selected autoscript file, allowing you to enable and disable individual scripts. The default autoscript file is autscript.sbs. You can specify a different autoscript file, but only one can be active at a time.

The Production Facility

The production facility helps run programs in an automated mode. It runs unattended and terminates after executing the last command, so you can run other tasks while it runs. This production mode is useful if you often run the same set of analyses like weekly reports.

Running an Automated Production Job

Create a command syntax file (in the syntax editor) which is a simple text file containing command syntax.

Select from the Start menu, Start>Programs>SPSS 8.0 Production Facility.

Click Add to select the command syntax files you want to include in the production job.

After you create syntax files and include them in a production job, you can view and edit them from the production facility.

Save the production job and click the Run button on the tool bar (button with the right arrow) or select Run>Production Job from the menu bar to run the production job. Each production run produces an output file with the same name as the production job and the extension .SPO. i.e. the production job file: PROD-JOB.SPP would become PRODJOB.SPO.

You can then automatically print the results at the end of the production run, specify the location for the production results, export output and charts in external formats, and create user prompts that enable you to use the same syntax files for multiple data files and analyses.

Production Facility syntax files and INCLUDE Files

For command files run via the Production Facility or the INCLUDE command, the syntax rules are slightly different:

Each command must begin in the first column of a new line

Continuation lines must be indented at least one space

The period at the end of the command is optional

If you generate command syntax by pasting dialog box choices into a syntax window, the format of the commands is suitable for any mode of operation.

Running Production Jobs From a Command Line

Command line switches enable you to schedule production jobs to run at certain times with scheduling utilities like the one available in Microsoft Plus!. You can run production jobs from a command line with the following switches:

-r Runs the production job. If the production job has any user prompts, you must supply the requested information before the production job will run.

-s Runs the production job and suppresses any user prompts or alerts. The default user prompt values are used automatically.

To get to the command line . . . just open Start>Run. The command line will then appear. Another option is opening up the DOS shell and typing the command in there at the prompt. You should provide the full path for both the production facility (SPSSPROD.EXE) and the production job. Both should be enclosed in quotes with the desired switch last.

---

"c:\program files\spss\spssprod.exe"
"c:spss\datajobs\prodjob.spp"-s

---

Changing HTML Output Format

To change what is displayed in the HTML document when it is exported from the automated production facility, several steps need to be followed.

Write a script that executes the desired commands. Open J:\myproducts\spss\scripts\starter\delete navigator items.sbs and modify the script to your desired specifications using the comments in the code to help you.

This code only allows you to delete one feature at a time (log, notes, charts, pivot, text, title, warnings, or all items). If you want to remove the log AND notes feature you can:

1. Write two different scripts, each deleting one feature and include them both in the syntax file using two SCRIPT commands.
2. Modify the one script to accommodate removing both features by redefining one of the variables and calling the remove function twice (this is done so you don't overwrite the first value). In the second function, use the new variable name as the parameter.

--- i.e.
'define variables as so . . .
    intTypeToDelete = SPSSLog
    intTypeToErase = SPSSNote
'then call the functions . . .
    Call DeleteAllByType(intTypeToDelete)
    Call DeleteAllByType(intTypeToErase)

---

Save the script (or scripts).

Include the script (or scripts) in the syntax document you want to apply it to by using the SCRIPT command. This will automatically run the script that you created when the syntax command is encountered. The effect is the same as opening the script file in the Script Editor and running it from there. The syntax is SCRIPT 'filename'.
i.e. SCRIPT 'j:\myproducts\spss\scripts\deletetest.sbs'.
Make sure that this command is located after all of the commands on the working data file. This will ensure that it will run on all of the output you designated.

Save the syntax file.

Open the production facility, add the syntax file you just made, and follow the steps outlined earlier to complete the automated production of your new formatted HTML file.

Other starter scripts are available in the J:\myproducts\spss\scripts\starter directory. Each script supplies code for one or more common procedures and is commented with hints on how to customize the script to your particular needs.

AT Command

The AT command schedules commands and programs to run on a computer at a specified time and date. The Schedule service must be running to use the at command. To check this, go into your control panel and open Services. Scroll down to find the scheduler to check its status.

The syntax for the AT command is as follows.

--- at [\\computername] [[id] [/delete [/yes]]
at [\\computername] time [/interactive] [/every:
    date[, . . .] |/next:date[, . . .]] "command"

---

Type these command in the command line found by opening Start>Run, or enter it at the prompt in the DOS shell.

Parameters none

Used without parameters, at lists scheduled commands.

\\computername

Specifies a remote computer. If this parameter is omitted, the commands are scheduled on the local computer.

id

Is an identification number assigned to a scheduled command.

\delete

Cancels a scheduled command. If id is omitted, all the scheduled commands on the computer are canceled.

\yes

Forces a yes answer to all queries from the system when deleting scheduled events.

time

Specifies the time when command is to run. Time is expressed as hours:minutes in 24-hour notation (00:00 [midnight] through 23:59).

\interactive

Allows the job to interact with the desktop of the user who is logged on at the time the job runs.

\every:date[, . . . ]

Runs the command on every specified day(s) of the week or month (for example, every Thursday, or the third day of every month). Specify date as one or more days of the week (M,T,W,Th,F,S,Su) or one or more days of the month (using numbers 1 through 31). Separate multiple date entries with commas. If date is omitted, the current day of the month is assumed.

\next:date[, . . . ]

Runs the specified command on the next occurrence of the day (for example, next Thursday). Specify date as one or more days of the week (M,T,W,Th,F,S,Su) or one or more days of the month (using numbers 1 through 31). Separate multiple date entries with commas. If date is omitted, the current day of the month is assumed.

"command"

Is the Windows NT command, program (.EXE or .COM file) or batch program (.BAT or .CMD file) to be run. When the command requires a path as an argument, use the absolute path, that is, the entire pathname beginning with the drive letter. If command is on a remote computer, specify the server and sharename, rather than a remote drive letter. You may use quotation marks around the command, whether you are using at at the command line or in a batch file. If the command includes switches that are used by both the command and at, you must enclose command in quotation marks. If the command is not an executable (.EXE) file, you must precede the command with cmd /c; for example cmd /c dir>c:\test.out.

At—Notes

The AT command requires you be a member of the local Administrator group. Also, the AT command does not automatically load cmd, the command interpreter, before running commands. Unless you are running an executable (.EXE) file, you must explicitly load CMD.EXE at the beginning of the command; for example, cmd /c dir>c:\test.out.

Viewing Scheduled Commands:

The AT command has two displays. When you use at without options, you see a display similar to the following:

| STATUS ID | Day | Time | Command Line |
|---|---|---|---|
| 0 | Each F | 04:39 PM | net send group leads status due |
| 2 | Each M | 12:00 AM | chkstor>check.fil |
| 3 | Each F | 11:59 PM | backup2.bat |

When you include the identification number for the command, the display provides information for a single entry and is similar to the following:

| Task ID: | 0 |
|---|---|
| Status: | OK |
| Schedule: | Each F |
| Time of Day: | 04:30 PM |
| Command: | net send group leads status due |

After you schedule a command with at (especially a command that has option variables), check that the command is entered properly by typing at without options. If the information in the "Command Line" column isn't correct, delete the command and retype it. If it still isn't correct, retype the command with fewer option variables.

Viewing Results:

Commands scheduled with the AT command run as background processes, so no output is displayed on the computer's screen. To redirect output to a file, use the redirection symbol (>). If you redirect output to a file, enclose the name of the command you are scheduling in quotation marks. The current directory for the executing command is the %systemroot% directory.

Changing System Time:

If you change the system time at a computer after scheduling a command to run with at, synchronize the AT scheduler with the revised time by typing at without options.

Storing Commands:

Scheduled commands are stored in the registry, so scheduled tasks are not lost if you have to restart the Schedule service.

Connecting to Network Drives:

Scheduled jobs that access the network should not use redirected drives made by the user. The Schedule service may not be able to access these drives and they may not be present if a different user is logged on at the time the scheduled job runs. Instead, scheduled jobs should use UNC paths. For example, at 1:00 pm my_backup \\server\share
and not
at 1:00 pm my_backup x:
where x: is a connection made by the user.

If you schedule an AT command that uses a drive letter to connect to a shared directory, you should include an AT command to disconnect the drive when you are finished using it. If the drive is not disconnected, the drive letter assigned will not be available or seen at the command prompt.

At—Examples

To display a list of commands scheduled on the server MARKETING, type
at \\marketing To learn more about a command with the identification number 3 on the server CORP, type
at \\corp 3

To schedule a net share command to run on the CORP server at 8:00 A.M., and redirect the listing to the server MAINTENANCE, shared directory REPORTS, and file CORP.TXT, type
at \\corp 08:00 "cmd /c net share reports= d:\marketing\reports>>\\maintenance\reports\corp.txt"

To back up the MARKETING server's hard disk to a tape drive at midnight every five days, create a batch program (ARCHIVE.CMD) containing the backup commands. Then schedule the batch program to run by typing at \\marketing 00:00 \every:5,10,15,20,25,30 archive To cancel all commands scheduled on the current server, clear the at schedule information by typing at \delete Running a Production Job Using AT Go into Services in the Control Panel and highlight the scheduler.

Click on Stop button to interrupt the scheduler.

Now double-click on the scheduler to bring up a dialog box.

Make sure in the dialog box that appears, that the "Log on as" is your correct domain and user name (used to log on to NT) and password. (i.e. CSCOE\solomoj and password: xxxxxx)

Click OK.

Now restart the scheduler by clicking on the Start button and then Close the dialog box.

Make a .bat file that contains the command to run the production facility. This command will include the path name to the production facility executable (spssprod.exe) <space> path name to the production job (command.spp) <space> with any switches appended to the end. If any of these commands are located on a different server, use the server and sharename rather than a remote drive letter to specify the path name.

i.e. \\nsmnnt10\solomoj\myproducts\spss\spssprod.exe c:\spss\command.spp -s where \\nsmmnt10\solomoj\myproducts\spss\spssprod.exe is the path to the production facility c:\spss\command.spp is the path to the production job -s is the switch that runs the production job and suppresses any user prompts or alerts.

To run the AT command from the DOS command shell, at the prompt type your at command calling the .bat file using the specified parameters as noted earlier.

at 13:40 "c:\temp\test.bat"

This schedules test.bat to run at 12:40 p.m. on the local computer. To check if it was scheduled correctly, type at (with no parameters) to see a listing of all of the commands scheduled to run, or type at <id>, where 'id' is the identification number given to the scheduled command when you entered it. The latter will just give information on the command specified.

To run the AT command from the Winat.exe application, open up the application. From the menu open Edit>Add. In the dialog box that occurs, enter the time, days, and frequency information and type the "c:\temp\test.bat" command into the command line. Click OK and it will appear as a scheduled command.

When the specified time/times occur, the production facility will run the production job and export the output to the directory that is specified in the production job.

HTML Information

Customizing HTML

You can automatically add customized HTML code to documents exported in HTML format, including:

HTML document titles

Document type specification

Meta tags and script code (for example, JavaScript)

Text displayed before and after exported output

To customize HTML documents, you need to create or modify a text file that contains the custom HTML (htmlfram.txt—located in the directory in which SPSS is installed).

Contents and format of the text file for customized HTML:

The HTML code that you want to add automatically to your HTML documents must be specified in a simple text file that contains six fields, each delimited by two open angle brackets on the preceding line (<<):

<<

Text or code that you want to insert at the top of the document before the <HTML> specification (for example, comments that include document type specifications)

<<

Text used as the document title (displayed in the title bar)

<<

Meta tags or script code (for example, JavaScript code)

<<

HTML code that modifies the <BODY> tag (for example, code that specifies background color)

<<

Text and/or HTML code that is inserted after the exported output (for example, copyright notice)

<<

Text and/or HTML code that is inserted before the exported output (for example, company name, logo, etc.)

Sample Text file for Customized HTML:

```
<<
<!DOCTYPE HTML PUBLIC"-//W3C//DTD HTML 3.2//EN">
<<
NVI, Inc.
<<
<META NAME="keywords" CONTENT="gizmos, gadgets, gimcracks">
<<
bgcolor="#FFFFFF"
<<
<H4 align=center>This page made possible by . . .
<br><br>
<IMG SRC="spss2.gif" align=center></H4>
<<
<h2 align=center>NVI Sales</h2>
<h3 align=center>Regional Data</h3>
```

To Use a Different File or Location for Custom HTML Code

If you change the name or location of HTMLFRAM.TXT, you must modify the system registry to use the file in customized HTML output.

From the Windows Start menu choose Run, type regedit, and click OK.

In the left pane of the Registry Editor, choose:

```
HHKEY_CURRENT_USER
    Software
        SPSS
            SPSS for Windows 8.0
            Spsswin
```

In the right pane, double-click the string HTMLFormatFile.

For Value data, enter the full path and name of the text file containing the custom HTML specifications (for example, C:\MYFILES\HTMLSTUF.TXT).

Sample HTML source for customized HTML:

```
<!DOCTYPE HTML PUBLIC "-//W3C//DTD HTML 3.2//EN">
<HTML>
<HEAD>
<TITLE>
NVI Sales, Inc.
</TITLE>
<META NAME="keywords" CONTENT="gizmos, gadgets, gimcracks">
</HEAD>
<BODY bgcolor="#FFFFFF">
<h2 align=center>NVI Sales</h2>
<h3 align=center>Regional Data</h3>
[Exported output]
<H4 align=center>This page made possible by . . .
<br><br>
<IMG SRC="spss2.gif" align=center></H4>
</BODY>
</HTML>
```

Oracle
Installing Oracle Client 7.3.4
  Follow instructions in the install mode up until the dialog box which asks what you wish to install.
  Choose 'Custom Installation' and in the new dialog box that appears, highlight the following for installation:
    1. Oracle Call Interface
    2. SQL+
    3. Oracle 7 32 bit ODBC Driver
    4. Oracle 7 Utilities
    5. Oracle Network Products
    6. Oracle Client Configuration Manager
  Finish up the installation by following the rest of the dialog boxes.
Inserting Data Into a Table
  To change the date and time configuration for the session:
    >alter session set nls_date_format='dd_mon_rr hh24:mi:ss';
    >insert into spss_test values ('01-mar-99 00:40:26', 'NSMMNT10', 0.047, 0.173, 59.468, 51.039, 24.7, 0);
    (The values for the table are put inside parentheses in order of the data found in the table. Date/Time and Character variables are put in single quotes and numeric values can stand alone. Each data entry is separated by a comma)
    >select * from spss_test;
    This command will show the table with the values.
    >commit
    Type this command at the end of the session to commit all of the information that you entered into the table.

TABLE 18

| SNMP/PATROLLER METRICS | DESCRIPTION | PLATFORM | UNITS |
|---|---|---|---|
| busyPer | Provides the percent of CPU usage over the first 5 second period in the scheduler. | Router | percentage |
| ifInOctets | The total number of octets received on the interface, including framing characters. | Router Interface | octets |
| ifOutOctets | The total number of octets transmitted out of the interface, including framing characters. | Router Interface | octets |
| ifSpeed | An estimate of the interface's current bandwidth in bits per second. For interfaces which do not vary in bandwidth or for those where no accurate estimation can be made, this object should contain the nominal bandwidth. | Router Interface | bits per second |
| CPUCpuUtil | Displays the percentage of CPU utilization. | UNIX | percentage |
| MEMFreeMem | Displays the number of pages of memory available. | UNIX | pages |
| NET-PacketsIn | Displays the total number of incoming packets within a sample interval. | UNIX | packets |
| NET-PacketsOut | Displays the total number of outgoing packets within a sample interval. | UNIX | packets |
| DSK-Percent-Busy | Displays the percentage of time that the device is busy servicing a transfer request. | UNIX | percentage |
| CPUprcr-Processor-Time-Percent | Displays a percentage of the elapsed time that a processor is busy executing a non-idle thread. | NT | percentage |
| MEM-mem-Available-Bytes | Displays the size of the virtual memory currently on the zeroed, free, and standby memory lists. | NT | megabytes |
| NETni-Pckts-PerSec | Displays the rate that the packets are sent and received on the network. | NT | packets per second |
| PDpd-DiskTime-Percent | Displays the percentage of elapsed time that the disk spends servicing read or write requests. | NT | percentage |

Project Event Handling
Creating Event Correlation Alarms With ECM as the Event Correlator and Manager
Introduction
  This section is intended as a lessons-learned encapsulation for ECM environment configurations.
  This section is intended as an aid in the creation and modification of event correlation models/alarm definitions in ECM.
  Included in this section are references to event correlation models/alarm definitions and PERL scripts that were devised in the development of this component of the Service Assurance final phase 2 deliverable. These pieces are included in the phase 2 repository for importation into an install of ECM.
Declarations
  1. Items enclosed in greater/less than symbols (<>) contain installation dependent data.
  2. Items enclosed in single quotes are as seen on the screen.
Definitions
  HPOV—Hewlett Packard's OpenView Network Node Manager
  IDE—Interactive Development Environment
  OID—Object Identifier
  ECM—Event Correlator and Manager
ECM Event Correlation Components
The Theory
  The various components of ECM allow for the graphical creation of event correlation maps. These maps contain alarms, polls and traps, and inside each given alarm reside various states and transitions.

To fully comprehend the essence of the correlation utilities contained within ECM would require a primer on state transition diagrams. This falls out of the scope of this document, but a brief overview is in order.

Each alarm consists of a separate state transition diagram. The orderly composition of the states and transitions defines the boundaries of the diagram, the actions on the transitions define the outputs, and the SNMP polls and SNMP trap masks define the inputs. Therefore, the masks and polls bring in data for correlation. The data enters an alarm and through its unique course through the diagram (the unique set of states through which it transitions) a specific result is generated. This result consists of the actions that are generated by the transitions that it passes through.

The Components

The theory behind the software generates three distinct functional areas to the diagrams. These functional areas contain a distinct series of components that are the user-modifiable pieces of ECM. These are as follows:

1. Inputs

Polls—Are an SNMP request for information from a management station to a managed node.

Traps—Are SNMP variables that have been "pushed" from managed node to management station.

2. Alarms

States—Are actual, defined points of being in a system.

Transitions—The passages from one state to the next.

3. Results

Traps—Same as above, but are instead sent out either to another management station or a managed node.

There are others, but they fall out of the scope of this document.

Creating New Polls

The New Poll Definition

Begin by running the ECM client and logging in as appropriate to your designed environment. Open the 'Admin' then the 'Poll List' menu options, and the '<Server Name>: Poll List' dialog window is opened. At the bottom of this window is a series of buttons. Look for the button labeled 'New' and click on it. A new window will appear with the title reading '<Server Name>: Alarm Definition'.

This window is tabbed with two panels. The lead panel is the 'Poll' with the second tab being the 'Poll Condition'. On the 'Poll' panel resides a number of basic interface components. The simplest of these components are obvious in that they are the name, poll rate, enabled, port and the true/false trigger that is fired when the poll is run. The important thing to realize here is that the triggers can either be reused from elsewhere in the program or else created right here by entering an arbitrary, previously unused, new trigger name. As with the name, these items should be part of a larger naming convention in order to simplify their utilization (i.e. <project name>_<associated alarm>_<descriptive poll name>).

More complicated are the 'Property' drop-down and the 'Poll Condition' tab. The property string in this case is important as one of the core tenets that drives ECM is that of the property string and it's relation to the observed node.

The property string has to be in the node's property group.

The different property groups work as containers. In this way, the string that you choose must have a correspondence with the node(s) being observed. (i.e. the string must either be already inside of the given node's property group, or else added to the property group at a later time).

Lastly is the 'Poll Condition' tab. This is straightforward to use, and consists of choosing the necessary base object and checking the attributes that you would like to monitor. To do the very minimum, and grab variables for entry into logs, you would simply select the attribute in question and select 'present' (if more select 'AND' then select the next attribute and 'present' and so on).

NOTE that the base object that you used in your poll needs to be specified in the property group that is used by your node(s).

The base object has to be in the property group.

Use this last statement as a guideline for developing your polls. Just put any base object used inside the corresponding property group ANY time you use one in a poll used.

Creating New SNMP Trap Masks

New Trap Mask Definitions

Begin by running the ECM client and logging in as appropriate to your designed environment. Open the 'Admin' then the 'Mask List' menu options, and the '<Server Name>: Mask List' dialog window is opened. At the bottom of this window is a series of buttons. Look for the button labeled 'New' and click on it. A new window will appear with the title reading '<Server Name>: Alarm Definition'.

This window is tabbed with two panels. The lead panel is the 'Mask' with the second tab being the 'Trigger Function'. On the 'Mask' panel resides a number of basic interface components. The simplest of these components is the name of the mask. These items should be part of a larger naming scheme in order to simplify their utilization (i.e. <project name>_<associated alarm>_<descriptive poll name>).

In the next field comes the 'Generic' trap ID. This is a value from negative one to positive six and represents a number of standardized responses as well as industry/vendor specific predefined (SNMP) values. In most modified occasions, this is going to be six.

Next comes the 'Enterprise' OID field. Each received trap comes with an SNMP enterprise OID that allows for specificity with regards to the data's base object. This can be found in numerous ways, but one possible way to discover this information is to enable the 'TrapLogger' alarm and its' associated poll. Once activated, this alarm will log all incoming traps to a file predefined to be 'alltraps.log'. This can be found in the /<base directory>/seasoft/userfiles/logs directory, and is in flat text file format (i.e. more or cat will work).

Once the mask is defined, the next test is to define whether you are interested in a simple trigger call or a more complex trigger function. While describing the trigger function falls outside the scope of this paper, one note that can be shared is that the PERL functionality in this release is quite limited. The trigger function is focused on little more than extended 'if else' statements that fire triggers.

If the trigger function is not required then the use of a simple trigger allows for the creation of new or reused triggers. As stated earlier, these triggers should be created under a naming scheme.

Creating New Alarm Models

The New Alarm Canvas—Interface Basics

Begin by running the ECM client and logging in as appropriate to your designed environment. Open the 'Admin' then the 'Alarm Definition List' menu options, and the '<Server Name>: Alarm Definition List' dialog window is opened. At the bottom of this window is a series of buttons. Look for the button labeled 'New' and click on it. A new window will appear with the title reading '<Server Name>: Alarm Definition'.

The basic layout of this window begins in the upper left corner with a four-button toolbar that allows for the creation of new alarm components. Below this is the alarm canvas that usually opens with a single state listed. This state is labeled 'Ground'.

Beneath the canvas section are three textbox/drop-down listboxes. The textbox labeled 'Name' is nothing more than the name chosen for the new alarm. Select a name that is appropriate for your project. It is extremely easy to get lost in the alarm definitions so it is vehemently suggested to keep everything standardized around a naming convention.

The list-box immediately to the right of 'Name' is that of 'Property'. This is an extremely important piece of the ECM design puzzle. The property group is termed as being a 'container for properties'. While all these kinds of theoretical understandings are important, keep in mind that the individual alarm's property needs to appear in the main property group under which your nodes will appear. It is in this manner that the property groups work as "keys" to allow various nodes to adhere to various property groups. The more complex the scheme, the more important this understanding becomes.

Our next interface component is that of the 'Scope' which appears immediately to the right of the 'Property' drop-down box. This has three options labeled 'Subobject', 'Node', and 'Enterprise'.

Subobject applies to an alarm configured to observe multiple instances of a single type of object attached to a single node.

Node applies to an alarm configured to observe various objects attached to an individual node.

Enterprise applies to instances that come from various nodes.

Essentially this scheme allows for "grading" alarms across the entire installation. Some alarms can be focused on a given router for instance while other alarms may be correlating across multiple nodes.

Below these interface components are various other components, but short of the 'Save', 'Cancel', and 'Enabled' sections, there is nothing of extreme importance.

One final note is that of saving. ANY time a new trigger or a major change is made to the system, save as soon as possible. There are various flaws with the IDE which will appear when you create various new interface pieces (i.e. triggers, state) that don't appear in the choice boxes for implementation until AFTER a save is made.

Building The Alarm

Utilizing the toolbar, building basic new alarms is quite simple, but make sure that the totality of the design is understood before undertaking more extreme alarms. In any case, in this creation phase there are a number of important points to take into account.

Begin with state creation. In the eventuality that ECM is being interfaced with HPOV, the state creation itself becomes important. The color chosen for the state in question is what will appear on the IPMap in HPOV. This again falls into the realm of "prior proper planning" to make the best utilization of the available colors. HPOV has five available, and ECM has many, many more. These must be distilled properly for the interaction to occur.

Transition definition is just as important from a planning perspective. Once the transition trigger has been selected, the actions attached to it should be chosen carefully. Please remember to save frequently (especially if you notice a missing trigger in the drop down list after you just created it).

An important note is that the given transition must be pending for the trigger to be generated. This is what ECM refers to as 'Smart Polling'. This design says that the individual poll or trap mask will NOT occur unless the trigger that they generate is waiting on a transition in an active alarm in the product. The polls do not occur unless they could possibly generate a transition. Therefore, even if all the polls were enabled in the product. If they did not have an attached transition waiting to occur, then they would wait idly until a transition necessitated their action.

The actions associated with any given transition fall into two categories. That of PERL subroutines, and then everything else. It is conceivable that whole transitions could consist of vast PERL subroutines that would generate all the triggers and maintain all the correlation required by the product/installation. PERL subroutines will be considered in a separate section of this document, but their existence as a transition action is of extreme importance in defining your state transition diagrams.

If the use of PERL on the transition seems overkill for your needs then the remaining actions fall into internal and external categories:

Internal—Action Router, Alarm Counter, Clear Trigger, Delete Node, Fire Trigger, Set Attribute and Notes External—Beep, Command, EventLog, Inform, Inform OpC, Log to File, Log To dB, Microsoft Mail, Paging, Send Trap, SNMP Set and SMTP Mail These actions should be examined thoroughly in defining what requirements are set for your alarm in particular.

The Patroller To Event Correlator and Manager Interface—SNMP Method

An Introduction

For application and server monitoring, the patroller is used. This creates a monitoring layer that resides on individual systems in the form of agents. These agents poll for user-defined information on pre-selected intervals and typically push this data up to a central point of control. From this point of control the data can be collated and correlated to provide historical data on the performance of the systems in the environment.

Another possibility with the system is that SNMP traps can be generated. These traps are typically generated in dealing with thresholds that have been defined for their agents, and upon their generation ECM can receive and handle these much like any other trap that would come in.

The Specifics

Remember that ECM has mask definitions. These mask definitions allow "screens" to be established that observe incoming SNMP trap information and "screen" out the information that you require. Remember also that there were three important sections to the mask. There was the generic and specific trap ID's as well as the enterprise OID. It is through these specifics that the mask definition is set-up to watch for data that it needs.

Using the generic trap number of '6' and the enterprise OID of 1.3.6.1.4.1.1031, the traps can be received and handled through mask definitions. The actual configuration of the traps to be sent is outside the scope of this document, but the specific trap ID is set during the PATROLLER configuration and implementation. For instance, in the case of the development environment, ID's 41 and 42 were used. Once a mask is configured for these parameters, the traps can be received into ECM for correlation.

As in most cases, it is probably a good idea to enable the 'AllTraps' alarm to receive the traps and write them to log. With the 'log to file' action enabled in the alarm, you can set the action to verbose and actually see the incoming traps as they are written. From these logs you can derive the necessary modifications to the masks that you wish to produce.

The PATROLLER Trap—Handling The Trap

Once the actual trap has been received into the system, the parsing of the trap has to be done through PERL in most cases. There are other means to deal with traps, but PERL is native to ECM. This led to its' use in the phase two development of this product for the Service Assurance project.

ECM has reserved a number of "special" variables. These variables allow for interaction with the incoming trap, and provide a means by which to parse the trap without having to resort to all manner of regular expressions or some other form of tawdry pattern matching. Of particular interest is the "Vb" series of variables.

Utilizing these "Vb" variables, you can get at the variable bindings that are appended to the end of the SNMP trap that was transmitted via PATROLLER. As this is where the actual data resides, these variables make extraction and correlation a breeze. PATROLLER builds its' variable bindings in a single dimension, and to retrieve this data requires nothing more than extraction of the 'VbValue(0)' variable. This comes in as straight text in the form of "Application-:Instance:Parameter:State:Value".

Parsing requires the 'split' function from the PERL libraries, and with some simple logic and variable creation, the values can be parsed quite easily. There are some problems with ECM at this point though. Refer to the section on PERL that is contained in this document for more information.

With the trap parsed in this manner, the values can be easily correlated. This step can be imbedded in a PERL function and reused across multiple alarms with relative ease. One precaution that must be stated again is that of naming conventions. This point can not be belabored enough. Make sure that you put the PERL that is created into some kind of standardized format both by name and by the comments placed within.

PERL—Notes And Addenda

The Pluses

The installation of PERL that comes with ECM has much to offer to the correlation model designer. The flexibility is just about boundless, and with the addition of external PERL modules, the boundaries that do exist are spread even further away.

The PERL variables allow for deep SNMP trap broadcasts. Through the variable bindings that are attached, the extraction of this data is basic. The included functions allow for interaction both with the ECM structure (the FireTrigger and AssignPropertyGroup functions) as well as system level or beyond (limitless PERL modules). In our case we even went to the extreme of handling SNMP outbound traps through a PERL 'system' call to an external trap generation utility.

The Minuses

PERL is gawky and complex to the uninitiated, and the code can be somewhat complex to operate. ECM also has a buggy interpreter that causes some concern with regards to larger scale subroutines. This buggy-ness results in open statements that only work in particular ways (i.e. open(LOG, "filename\.log");).

In addition to the above weaknesses, the lack of a sensible IDE makes for some extremely time consuming code development. Liberal use of 'echo' statements is just about the only way to achieve a solution for broken code.

Also, there is the extreme problem of testability as noted above. Either through the lack of a debugger or the lack of a test environment, this weakness creates some time consuming development of code. Do not attempt to get around this by writing code out of the IDE either. Regular PERL code doesn't work most of the time in ECM. The differences are subtle, but as you experience larger and larger code, the differences become more problematic.

The Reality

Coding can be difficult anywhere. The flexibility that PERL offers within the product seems to outweigh this though. The predefined transition functions will only get you so far. PERL has to pick up the pace and carry models beyond this. One may build in some basic functionality, but without the impetus of an API into the toolset, adaptation of these functions is limited. Some of the more basic features are extremely useful (i.e. FireTrigger and AlarmCounter), but more advanced functionality screams PERL.

Some Notes

There is no native way to get timing. The way that was utilized in phase two design was with the 'localtime' PERL function.

Traps and masks have somewhat different formats (i.e. not trap parameters)

Keep in mind that the namespace/environment variables are normally global for the entire ECM environment. To this end, any alarm out there can access variables from any other alarm that is in existence with the installation. Liberal use of the 'my' scope limiter will allow for some separation of the variables in theory, but this theory has not been put to the test. The best idea is to logically separate variables through some sort of naming convention. This kind of organization is difficult but recommended.

Loading the Archived Models

The models and associated materials created in the phase 1 and 2 development environments were subsequently exported to two files currently located in the \\nsmmnt10\IPSA\Product Development\Phase 2 Deliverables\Event Handling System directory. These files are SA_Phase2_Models.mod and .txt. Below are listings of their contents and instructions on the importation process.

To import the files into your ECM installation.

Gain filesystem access to the above listed files.

Open an ECM client and log in to the system that will serve as your host ECM server.

Go to Server on the menu bar.

Click on Import.

Enter the full path and name of the .mod file.

The files will be imported and established within ECM.

A listing of the imported files and attachments (this was derived from the SA_Phase2_Models.txt file).

--- exportAlarmMap contains 10 items:
    alarm SA_ifEntry_Logger is Off
   alarm SA_allTraps_Logger is On
    alarm SnmpStatus is On
    alarm IcmpStatus is On
    alarm SA_NodeMonitor is On
    alarm SA_lsystem_Logger is On
    alarm SA_ifEntry_C2Rate_Util is On
    alarm SA_CorrEnt_Final is On
    alarm SA_CorrEnt_BusyPerMon is On
    alarm Test is Off
exportPropertyMap contains 23 items:
   property udpEntry
   property udp
   property tcpConnEntry
   property tcp
   property snmp
   property ipRouteEntry
   property ipNetToMediaEntry
   property ipAddrEntry -continued

```
    property egp
    property atEntry
    property nl-ping
    property system
    property NO_PROP
    property ip
    property interfaces
    property icmp
    property egpNeighEntry
    property ifEntry
    property SA_Router_Collection_Property
    property lsystem
    property SA_Normal_Snmp
    property SA_CheckLater
    property icmpStatus
exportPropGroupMap contains 35 items:
    group Icmp
    group CHIPCOM-MIB
    group SYNOPTICS-ATM-ETHERCELL-MIB
    group UNGERMAN-BASS-MIB
    group SYNOPTICS-LINKSWITCH-MIB
    group SYNOPTICS-5000-MIB
    group SYNOPTICS-3000-MIB
    group RETIX-MIB
    group ODS-MIB
    group FIBERMUX-MIB
    group COMPAQ-MIB
    group ATT-SMARTHUB-MIB
    group Mib-II-router-sub1
    group Mib-II-sub1
    group Mib-II
    group HP-UNIX-MIB
    group CISCO-ROUTER-11.x-MIB
    group CISCO-ROUTER-10.x-MIB
    group RFC1289-phivMIB
    group Router
    group CISCO-ROUTER-9.x-MIB
    group XYPLEX-MIB
    group WELLFLEET-SERIES7-MIB
    group WELLFLEET-MIB
    group SUN-MIB
    group NAT-MIB
    group EPIX-MIB
    group DEC-ELAN-MIB
    group 3COM-ECSV2-MIB
    group NETLABS-PING-MIB
    group RFC1213-MIB2-MIB
    group SA_Router_Collection_Group
    group lesgroup
    group SA_Normal_Snmp
    group SA_CheckLater
exportOIDToGroupMap contains 0 items:
exportPollMap contains 6 items:
    poll SA_ifEntry is On
    poll SA_NodeMonitor_freeMem is On
    poll SA_NodeMonitor_busyPer is On
    poll SA_lsystem is On
    poll SA_CorrEnt_busyPer is On
    poll Test is Off
exportMaskMap contains 2 items:
    mask PatrolTrapsClear is On
    mask PatrolTrapsAlarm is Off
exportTriggerMap contains 34 items:
    trigger NO_TRIGGER
    trigger coldStart
    trigger warmStart
    trigger allTraps
    trigger PatrolNamedFailure
    trigger PatrolNamedRecovery
    trigger SA_CorrEnt_Recover
    trigger SA_CorrEnt_PATROLLERRecover
    trigger nodeUp
    trigger nodeUpFast
    trigger agentUpFast
    trigger agentUp
    trigger SA_ifEntry
    trigger SS_ICMP_Failed
    trigger SA_CorrEnt_busyPer_Alarm
    trigger SA_CorrEnt_busyPer_Recovery
```

```
    trigger SA_lsystem
    trigger SA_NodeMonitor_busyPer_Recovery
    trigger SA_NodeMonitor_freeMem_Recovery
    trigger SA_NodeMonitor_busyPer_Alarm
    trigger SA_NodeMonitor_freeMem_Alarm
    trigger Test
    trigger IS_ICMPFailed
    trigger TestA
    trigger SA_CorrEnt_XOver
    trigger SA_CorrEnt_AlarmFail
    trigger SA_NodeMonitor_NotifyHPOV
    trigger SA_NodeMonitor_BuildTrap
    trigger NODE_UNREACHABLE
    trigger ICMP_TIMEOUT
    trigger NET_UNREACHABLE
    trigger PORT_UNREACHABLE
    trigger SNMP_TIMEOUT
    trigger RESPONSE
exportSeverityMap contains 5 items:
    severity Normal
    severity Critical
    severity Major
    severity Minor
    severity Warning
exportRuleMap contains 0 items:
exportOpcMaskMap contains 0 items:
exportperlSubMap contains 16 items:
    perl subroutine Test
    perl subroutine SA_Parameters_TestScript
    perl subroutine SA_NodeMonitor_RecoverHPOV
    perl subroutine SA_NodeMonitor_NotifyHPOV
    perl subroutine SA_NodeMonitor_BuildTrap
    perl subroutine SA_iEntry_C2Rate_Util
    perl subroutine SA_CorrEnt_VerifyNode
    perl subroutine SA_CorrEnt_RecoverHPOV
    perl subroutine SA_CorrEnt_PATROLLERID
    perl subroutine SA_CorrEnt_NotifyHPOV
    perl subroutine SA_allTraps_EventCodeScreen
    perl subroutine PatrolTrapsAlarm
    perl subroutine SA_SnmpStatus_RecoverHPOV
    perl subroutine SA_SnmpStatus_NotifyHPOV
    perl subroutine SA_IcmpStatus_RecoverHPOV
    perl subroutine SA_IcmpStatus_NotifyHPOV
```

The above contains all of the actual modifications that were made to ECM during phase 2 and 1 of the IPSA development effort. In addition to these files are any tangential pieces that were "touched" by the modified ECM components (models, polls, et.al.).

External Applications

Trapgen

This is an executable that allows for manual trap generation through either the command line or PERL. The set-up used in phase 2 consists of the following:

trapgen nsmmws16 1.3.6.1.4.1.78 nsmmws17 6 3 105 1.3.6.1.4.1.78.0.3 octetstringascii 'string'

Of particular interest is the 'octetstringascii' option. This allows strings to be collated and passed through the utility. Note that this was being passed across to an HPOV receiver that had to be configured separately.

Establishing this requires some HPOV experience and falls out of the scope of this document, but one heads up would be that you need to go inside the 'Event Configuration Utility' inside HPOV. Once inside, either build a new enterprise instance or adapt an old one. After picking the enterprise though, you need to create an event instance that fits the event id that you choose in your trapgen command line (i.e. the 1.3.6.1.4.1.78.0.3 part of the example above).

Once finished, you should be able to pass events via traps from ECM to HPOV. To observe these events, open the 'Events Browser', and they should be listed in date received order.

MIB Browser

A component of the HPOV toolset is the SNMP MIB browser. This is a useful tool for exploring the base objects that we have access to through ECM. Gain access to this tool from the HPOV manager, and you can use it to explore remote MIB's, and dig through the available MIB's for objects of interest.

Remember that the compiled MIB's that are engaged with ECM limit the number of base objects to the ones specified in the ASN.1 file that was specified at compile time. These optional MIB's extend and expand the capabilities of the polls and alarms, thus allowing for more specificity in SNMP data collections.

TABLE 19

Identify and Describe Requirement

| | |
|---|---|
| Description: | Provide information regarding the requirements, plan and implementation of Incident Reporting on the SA project |
| Scenarios: | |
| Type: | |
| Business Process Flow: | |
| Overall Rating: | |
| Business Need Desc: | |
| Affected Parties: | Service Assurance Team |
| Project Sponsor: | Network Line of Business |
| Existing/New: | |
| External Dependencies: | |
| Method for Verification: | |
| In Scope: | Service Assurance Internal Initiative (Phase 2) |

Complete after Requirements are Scheduled into a Release:

TABLE 20

| |
|---|
| Increment: |
| App/Subsyst Desc/Flow: |

TABLE 21

Required if Modifications are made after the Requirement has been signed-off

| |
|---|
| Change Request: |

Event Handling Requirements

Figure 31:
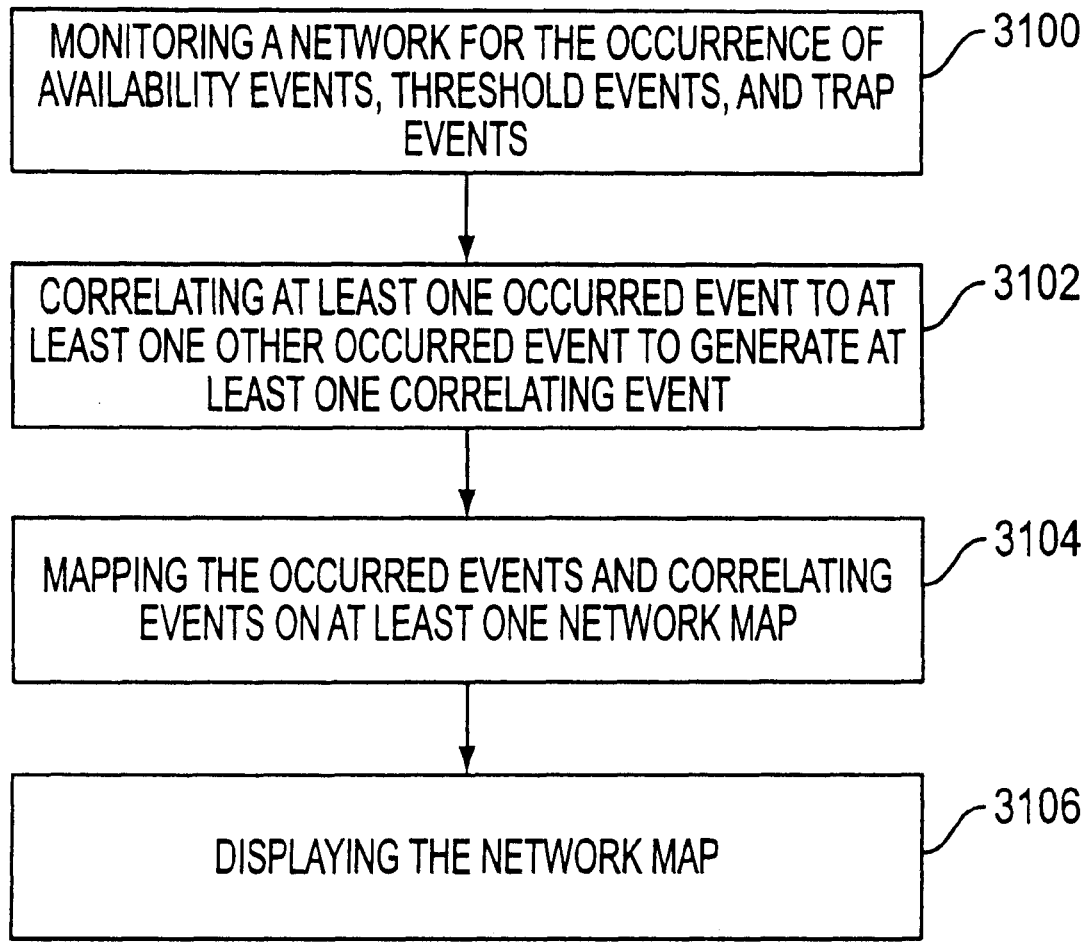
FIG. 31 illustrates an embodiment of the present invention which maps events on a network with service assurance capabilities.

FIG. 31 illustrates an embodiment of the present invention which maps events on a network with service assurance capabilities. In operation 3100, a network is monitored for the occurrence of availability events, threshold events, and trap events. At least one occurred event is correlated to at least one other occurred event in operation 3102 to generate at least one correlating event. In operation 3104, the occurred events and correlating events are mapped on at least one network map. The network map is subsequently displayed in operation 3106.

In one embodiment of the present invention, the step of monitoring the network further comprises: tracking the availability of individual components of network for events, tracking the availability of individual services of the network for events, tracking the availability of individual processes of an operating system of the network for events, tracking the status of agent processes on individual components of the network for events, monitoring the operating system and application performance of network for threshold events, and monitoring traps of the network for events.

In yet another embodiment, the network map is a node level map and/or an event level map. The node level map displays node responding events, agent not responding events, and/or node down events. The step of mapping the occurred events and correlating events when the network map comprises the event level map further comprise of additional steps. In particular, the occurred events and correlating events may be filtered based upon predetermined criteria. The filtered events may also be mapped on the event level map. In still yet another embodiment, at least one notification action is generated based upon the occurred events and/or correlating events.

Availability Events

This section details the three availability events monitored. Node Up and Node Down/Interface Up and Interface Down—Tracking an individual network component (such as a router, server, workstation, etc.). This will be tracked using Network Node Manager and ECM. We will track all nodes which we monitor on the test network, including the following: nsmmws16, nsmmws09, twmmnt02, twmmdb02, nsmmrt03, nsmmrt04. When a Node or Interface fails to respond to a ping, a Node or Interface Down event for the specific node will be generated. When a Node or Interface responds to a ping after immediately after failing to respond to a ping, a Node or Interface Up for the specific node event will be generated.

Service Up and Service Down—Tracking an individual network service (FTP, NNTP, POP3, SMTP, DNS, HTTP, and RADIUS (RADIUS is tracked as a probe only)). This will be tracked using the Collector Internet Service Monitor. When a service fails to respond to the ISM a Service Down event for the specific service will be generated. When a Service responds to the ISM immediately after failing to respond to the ISM, a Service Up event for the specific service will be generated.

Process Up and Process Down—Tracking an individual process on a Windows NT or UNIX system. This will be tracked using Patroller Process KMs. When the number of specific processes with a specific name running under a specific owner changes from a preset number, a Process Down event will be generated for the specific process, owner, and number of processes. When the number of specific processes with a specific name running under a specific owner changes back to the preset number from another number, a Process Up event event will be generated for the specific process, owner, and number of processes.

SNMP Agent Up and SMMP Agent Down—Tracking the status of the SNMP agent process on individual nodes. This will be tracked using ECM. When an SNMP agent fails to respond to a ECM SNMP status query, an SNMP Agent Down event will generated for the specific node. When an SNMP agent responds to a ECM SNMP status query after immediately after failing to respond to a SNMP status query, an SMP Agent Up event will be generated for the specific node.

Operating System and Application Performance Threshold Events

This section details the operating system threshold events and the application performance threshold events monitored. Patroller will be used to monitor processes and send a Parameter High event for a specific parameter and node when a parameter crosses a threshold by increasing its value and send a Parameter Low event for a specific parameter and node when a parameter crosses a threshold by decreasing its value.

The following parameters should be monitored for Phase 2. Note that these parameters are for proof of concept only, as parameters can be added or removed very easily.

TABLE 22

| Patroller Metrics (Generic Name) | | UNIX Server Parameter |
|---|---|---|
| CPU Utilization increased to >= n% | CPUprcrProcessorTimePercent | CPUCpuUtil |
| CPU Utilization decreased to < n% | CPUprcrProcessorTimePercent | CPUCpuUtil |
| Memory Utilization increased to >= n% | MEMmemAvailableBytes | MEMFreeMem |
| Memory Utilization decreased to < n% | MEMmemAvailableBytes | MEMFreeMem |

SNMP Performance Threshold Events

This section details the operating system threshold events and the application performance threshold events monitored. ECM will be used to monitor SNMP variables and send a Parameter High event for a specific parameter and node when a parameter crosses a threshold by increasing its value and send a Parameter Low event for a specific parameter and node when a parameter crosses a threshold by decreasing its value.

The following parameters should be monitored and possibly more:

TABLE 23

| Patroller Metrics (Generic Name) | SNMP Object Name |
|---|---|
| Interface Util increased to >= 20% | ? |
| Interface Util decreased to < 20% | ? |

Generic SNMP Traps Events

This section details the requirements for monitoring any MIB defined trap from any monitored SNMP device. The SNMP trap will by generated asynchronously by any monitored node and will be translated into an event.

TABLE 24

| Event Name | SNMP Object Name |
|---|---|
| Standard: Cold Start | ? |
| Enterprise Specific: Cisco 7500: ? | ? |
| Generic Trap sent by NNM's sendmsg | ? |

Event Correlation

This section details the requirements for Event Correlation. The architecture will allow arbitrary correlation of any of the above events with regard to each other and time. This means that we will be able to generate new, correlated events based upon any combination of the above events. We will use ECM for all correlation in Phase 2; we may also use Collector for limited non SNMP-correlation in later phases. For Phase 2, we will perform the following correlations:

ICMP/SNMP Status—We will determine the status of both the ICMP and SNMP agent status of nodes. We will then generate one or more events based upon this combined status.

Downstream Suppression—We will suppress node down events from nodes behind a certain network elements (for Phase 2, routers) when the network element is down.

Availability/Service/Process Status—Suppress service events and process events when a node is down.

Event Notification

This section details the requirements for Event Notification. Each event must be able to trigger one or more notification actions. A notification action consists of:

An alphanumeric text page to an arbitrary pager

An internet email to an arbitrary account

An initiation of an arbitrary script on the network management workstation (remote script initiations will not be imeplemted in Phase 2)

Open a Remedy trouble ticket with arbitrary information

Configuring what actions should be taken as a result of what events will be configurable with pattern matching of Element Names, Event Codes, and schedule (including day and time).

Additionally, actions will not be taken when an Element is listed in Scheduled Downtime table with the same Event Code and occurs within the Downtime window.

Network Maps

This section details the requirements for the network maps. There will be two network maps:

Node Level Map—a node level map may be provided by HP Open View Network Node Manager. It will display each managed in one of three different colors, corresponding to Node Responding, SNMP Agent Not Responding, and Node Down.

Event Level Map—an event level map can be provided by Collector Objective View. It will display entities driven by arbitrary event filters, but will not contain a node level view. These entities will be set to monitor specific groups of events and will change color to match the most critical severity of any event in the event filter.

Event Correlator and Manager (ECM) Model PERL Scripts

This section outlines the PERL scripts utilized in the alarm models from the Event Correlator and Manager for phase 2.

Description

The below listed scripts delineate the entirety of the final development effort of the IPSA phase 2 ECM installation. These scripts have been culled together and separated at the version header contained at their beginning. The individual headers begin with # Subroutine: and continue with a number of # separated comments describing the following script. Look for each of these as separators for the individual scripts.

```

# Subroutine: SA_allTraps_EventCodeScreen
# Overview: Simple screening mechanism for associating
#     event codes with incoming trapped events.
#     Once the incoming event is matched with a
#     corresponding event code, the event is
#     wrapped into an SNMP trap variable binding
#     and fired into HP OpenView.
#     Fires 'Alarm' trap into HP OpenView for
processing using the PERL 'system'
function and the 'trapgen' command.

#————————————————

# Configuration OfVariables

# Instantiate Local Variables
# - Make the variables ("my") local to keep them out of
# the global name space. Single step alarm, so no
# need for global variables.

my @VbVals,$EventCode,$AlarmCode,$SnmpTrapVbValue;
my $EpochTime=0;
my@DaysPerMonth = (31, 28, 31, 30, 31, 30, 31, 31, 30, 31, 30, 31);
my $year,$mon,$day,$hour,$min,$sec;
my $TZAdjust,$DSTAdjust;
my $ShowDebug,$NumLeapYears,$SecondsThisInterval;
```

-continued

```
my $SnmpTrapTimestamp,$SnmpTrapNode;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
# THIS IS CURRENTLY IMPLEMENTED POORLY, IT SHOULD
USE ACTUAL TIME ZONE CODES
$TZAdjust = "5:00";
if($TZAdjust =~/ ^ (-?)(\d):(\d*)$/) {
    # Time Zone adjustment needs to subtract
    if($1) {
        $EpochTime -= ($2 * 60 * 60) + ($3 * 60);
    } else {
        $EpochTime += ($2 * 60 * 60) + ($3 * 60);
    }
}
# Adjust for day light savings time
$SnmpTrapNode = $A;
$SnmpTrapVbValue = VbValue(0);
@VbVals = split /:/, $SnmpTrapVbValue;
# Main Event Code Correlation Loop

# Event Codes Are Standardized For Phase 2 Development
# In Local Document In Repository.

if ((ContainsString($VbVals[2], "root@named")) &&
(ContainsString($VbVals[3], "ALARM"))) {
    $EventCode = "1002000";
    $AlarmCode = "Alarm";
} elsif((ContainsString($VbVals[2], "root@named")) &&
(ContainsString($VbVals[3], "OK"))) {
    $EventCode = "1002001";
    $AlarmCode = "Recover";
} elsif((ContainsString($VbVals[2], "CPUCpuUtil")) &&
(ContainsString($VbVals[3], "ALARM"))) {
    $EventCode = "1003000";
    $AlarmCode = "Alarm";
} elsif((ContainsString($VbVals[2], "CPUCpuUtil")) &&
(ContainsString($VbVals[3], "OK"))) {
    $EventCode = "1003001";
    $AlarmCode = "Recover";
} elsif ((ContainsString($VbVals[2], "CPUprcrProcessorTimePercent"))
&&
(ContainsString($VbVals[3], "ALARM"))) {
    $EventCode = "1003000";
    $AlarmCode = "Alarm";
} elsif ((ContainsString($VbVals[2], "CPUprcrProcessorTimePercent"))
&&
(ContainsString($VbVals[3], "OK"))) {
    $EventCode = "1003001";
    $AlarmCode = "Recover";
} elsif((ContainsString($VbVals[2], "MEMmemAvailableBytes")) &&
(ContainsString($VbVals[3], "ALARM"))) {
    $EventCode = "1003002";
    $AlarmCode = "Alarm";
} elsif((ContainsString($VbVals[2], "MEMmemAvailableBytes")) &&
(ContainsString($VbVals[3], "OK"))) {
    $EventCode = "1003003";
    $AlarmCode = "Recover";
}
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

if(ContainsString($AlarmCode, "Alarm")) {
    system("/opt/seasoft/bin/trapgen nsmmws16 1.3.6.1.4.1.78
$SnmpTrapNode 6 3 105 1.3.6.1.4.1.78.0.3 octetstringascii $EventCode
1.3.6.1.4.1.78.0.3 octetstringascii $EpochTime 1.3.6.1.4.1.78.0.3
octetstringascii 5");
} else {
    system("/opt/seasoft/bin/trapgen nsmmws16 1.3.6.1.4.1.78
$SnmpTrapNode 6 4 105 1.3.6.1.4.1.78.0.4 octetstringascii $EventCode
1.3.6.1.4.1.78.0.4 octetstringascii $EpochTime 1.3.6.1.4.1.78.0.4
octetstringascii 1");
}

# Subroutine: SA_CorrEnt_NotifyHPOV
# Overview: Fires alarm trap notifying the
NMS that the enterprise alarm is
instantiated.

Fires 'Alarm' trap into HP OpenView for
processing using the PERL 'system'
function and the 'trapgen' command.

# _____

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $year,$mon,$day,$hour,$min,$sec;
my $TZAdjust,$DSTAdjust;
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
```

```
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
$TZAdjust = "5:00";
if($TZAdjust =~/^ (-?)(\d):(\d*)$/) {
    # Time Zone adjustment needs to subtract
    if($1) {
        $EpochTime -= ($2 * 60 * 60) + ($3 * 60);
    } else {
        $EpochTime += ($2 * 60 * 60) + ($3 * 60);
    }
}
# Adjust for day light savings time
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

system("/opt/bin/trapgen nsmmws16 1.3.6.1.4.1.78 nsmmws09 6 3 105
1.3.6.1.4.1.78.0.3 octetstringascii 5000000 1.3.6.1.4.1.78.0.3
octetstringascii
$EpochTime 1.3.6.1.4.1.78.0.3 octetstringascii 5");

# Subroutine: SA_CorrEnt_PATROLLERID
# Overview: Stores Environment Variable For Further
#     Usage In System Code

#_____

$SA_CorrEnt_PATROLLERID = $A;

# Subroutine: SA_CorrEnt_RecoverHPOV
# Overview: Fires recovery trap notifying the
NMS that the enterprise alarm is
recovered.

Fires 'Alarm' trap into HP OpenView for
processing using the PERL 'system'
#     function and the 'trapgen'
#     command.

#_____

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $year,$mon,$day,$hour,$min,$sec;
my $TZAdjust,$DSTAdjust;
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
```

```
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
$TZAdjust = "5:00";
if ($TZAdjust =~/ ^ (-?)(\d):(\d*)$/) {
    # Time Zone adjustment needs to subtract
    if($1) {
        $EpochTime -= ($2 * 60 * 60) + ($3 * 60);
    } else {
        $EpochTime += ($2 * 60 * 60) + ($3 * 60);
    }
}
# Adjust for day light savings time
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

system("/opt/bin/trapgen nsmmws16 1.3.6.1.4.1.78 nsmmws09 6 4 105
1.3.6.1.4.1.78.0.4 octetstringascii 5000001 1.3.6.1.4.1.78.0.4
octetstringascii
$EpochTime 1.3.6.1.4.1.78.0.4 octetstringascii 1");

# Subroutine: SA_CorrEnt_VerifyNode
# Overview: Node verification subroutine to keep
#       alarm restrained to single node instances.

# _____

if(ContainsString($SA_CorrEnt_BusyPerID,$A)) {
    FireTrigger("SA_CorrEnt_Recover");
}elsif(ContainsString($SA_CorrEnt_PATROLLERID,$A)) {
    FireTrigger("SA_CorrEnt_PATROLLERRecover");
}

# _____

# Subroutine: SA_IcmpStatus_NotifyHPOV
# Overview: Fires alarm trap notifying the
NMS that the enterprise alarm is
instantiated.

Fires 'Alarm' trap into HP OpenView for
processing using the PERL 'system'
function and the 'trapgen' command.

# _____

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $year,$mon,$day,$hour,$min,$sec;
my $TZAdjust,$DSTAdjust;
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
# THIS SHOULD USE ACTUAL TIME ZONE CODES
$TZAdjust = "5:00";
if($TZAdjust =~/ ^ (-?)(\d):(\d*)$/) {
    # Time Zone adjustment needs to subtract
    if($1) {
        $EpochTime -= ($2 * 60 * 60) + ($3 * 60);
    } else {
        $EpochTime += ($2 * 60 * 60) + ($3 * 60);
    }
}
# Adjust for day light savings time
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

system("/opt/bin/trapgen nsmmws16 1.3.6.1.4.1.78 $A 6 3 105
1.3.6.1.4.1.78.0.3 octetstringascii 1000002 1.3.6.1.4.1.78.0.3
octetstringascii
$EpochTime 1.3.6.1.4.1.78.0.3 octetstringascii 5");

# Subroutine: SA_IcmpStatus_RecoverHPOV
# Overview: Fires recovery trap notifying the
NMS that the enterprise alarm is
recovered.

Fires 'Alarm' trap into HP OpenView for
processing using the PERL 'system'
function and the ECM 'trapgen'
command.

```

-continued

```perl

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $year,$mon,$day,$hour,$min,$sec;
my $TZAdjust,$DSTAdjust;
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
# THIS SHOULD USE ACTUAL TIME ZONE CODES
$TZAdjust = "5:00";
if($TZAdjust =~/ ^ (-?)(\d):(\d*)$/) {
    # Time Zone adjustment needs to subtract
    if($1) {
        $EpochTime -= ($2 * 60 * 60) + ($3 * 60);
    } else {
        $EpochTime += ($2 * 60 * 60) + ($3 * 60);
    }
}
# Adjust for day light savings time
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

system("/opt/seasoft/bin/trapgen nsmmws16 1.3.6.1.4.1.78 $A 6 4 105
1.3.6.1.4.1.78.0.4 octetstringascii 1000003 1.3.6.1.4.1.78.0.4
octetstringascii
$EpochTime 1.3.6.1.4.1.78.0.4 octetstringascii 1");

# Subroutine: SA_ifEntry_C2Rate_Util
# Overview: Counter To Rate Conversion Script
# Builds Utilization Percentage And
# Rate For Interface Instances.

# Configuration

# Declare Local Variables
my $ifSpeed,$Old_ifInOctets,$Old_ifOutOctets;
my $New_ifInOctets,$New_ifOutOctets;
my $Old_ifInOctets,$Old_ifOutOctets;
my $Delta_ifInOctets,$Delta_ifOutOctets;
my $Summed_Octets,$Converted_To_Bits;
my $New_Timestamp,$Old_Timestamp,$Delta_Time;
my $BPS,$Utilization_Percentage;
my $sec,$min,$hour,$mday,$mon,$year,$wday,$yday,$isdst;
my $Maximum_Counter_Size = 4294967295;
# Construct Initial Time Variables
($sec,$min,$hour,$mday,$mon,$year,$wday,$yday,$isdst) =
localtime(time);
# Fix 19xx Year
$year = 1900 + $year;
$New_Timestamp = "$year-$mon-$mday $hour:$min:$sec";
$Old_Timestamp = $Saved Timestamp{$pollkey};
# Get New Interface Values
$ifSpeed = ifEntry.ifSpeed;
$New_ifInOctets = ifEntry.ifInOctets;
$New_ifOutOctets = ifEntry.ifOutOctets;
# Retrieve Old Interface Values
$Old_ifInOctets = $Saved_ifInOctets{$pollkey};
$Old_ifOutOctets = $Saved_ifOutOctets{$pollkey};

# Data Manipulation

# Gather And Build ifInOctets Delta

$Delta_ifInOctets = $New_ifInOctets - $Old_ifInOctets;
if($Delta_ifInOctets < 0){
    $Delta_ifInOctets = ($Maximum_Counter_Size -
$Old_ifInOctets) + $New_ifInOctets;
}
# Gather And Build ifOutOctets Delta

$Delta_ifOutOctets = $New_ifOutOctets - $Old_ifOutOctets;
if($Delta_ifOutOctets<0) {
    $Delta_ifOutOctets = ($Maximum_Counter_Size -
$Old_ifOutOctets) + $New_ifOutOctets;
}
# Gather And Build Timestamp Delta
# - Octets Are Made Of 8 Bits - i.e. The Conversion

$Summed_Octets = $Delta_ifInOctets + $Delta_ifOutOctets;
$Converted_To_Bits = $Summed_Octets * 8;
$Delta_Time = SubtractTime($Old_Timestamp,$New_Timestamp);
# Do The Math - Create Deliverable Values (Rate And Counter)

$BPS = $Converted_To_Bits/$Delta_Time;
$Utilization_Percentage = ($BPS/$ifSpeed) * 100;
```

-continued

```

# Report Data Findings To Log File

# Open The Log File And Write The Data To Disk

# Open(LOG,">>/opt/seasoft/userfiles/logs/SA_ifEntry_C2Rate_
Util.dat");
if(LOG) {
printf LOG
"%s,InterfaceUtilization_Percent,%s,%s,%.3f\n",$N,$OI,
$New_Timestamp, $Utilization_Percentage;
printf LOG
"%s,InterfaceUtilization_BPS,%s,%s,%.3f\n",$N,$OI,
$New_Timestamp,$B
PS;
close LOG;
} else {

# If An Error On Opening The Log File Then Open Error File
# And Write To Disk

open(LOG,">>/usr/seasoft/userfiles/logs/SA_if_Entry_C2Rate_
Util.err");
print LOG "$New_Timestamp:Unable To Write To Log
SA_ifEntry_C2Rate_Util.log";
close LOG;
}

# Update The Global Data Hashes

$Saved_ifInOctets{$pollkey} = $New_ifInOctets;
$Saved_ifOutOctets {$pollkey} = $New_ifOutOctets;
$Saved_Timestamp {$pollkey} = $New_Timestamp;

# Subroutine - Builds Deltas For Use By Main Handler
#      Script. Inputs timestamps in form of
#      'YYYY-MM-DD hh:mm:ss' and returns
#      delta in form of seconds elapsed.

sub SubtractTime {
    # Declare Local Variables
    my $date1,$date2,$year1,$year2,$months1;
    my $months2;
    my $days1,$days2,$time1,$time2,$hours1;
    my $hours2,$mins1,$mins2,$secs1,$secs2;
    my $result1,$result2,$DifferenceInSeconds;
    # assuming YYYY-MM-DD hh:mm:ss format
    # (24hr representation)
    # Convert Date/Time To Seconds
    ($date1,$time1) = split(" ",$_[0]);
    ($year1,$months1,$days1) = split("-",$date1);
    ($hours1,$mins1,$secs1) = split(":",$time1);
    $result1 =
$year1*31104000+$months1 *2592000+$days1*86400+$hours1*3600+
$mins1*60+$secs1;
    # assuming YYYY-MM-DD hh:mm:ss format
    # (24hr representation)
    # Convert Date/Time To Seconds
    ($date2,$time2) = split(" ",$_[1]);
    ($year2,$months2,$days2) = split("-",$date2);
    ($hours2,$mins2,$secs2) = split(":",$time2);
    $result2 =
$year2*31104000+$months2*2592000+$days2*86400+$hours2*3600+
$mins2*60+$secs2;
    # Get Delta
    $DifferenceInSeconds = $result2 - $result1;
    return($DifferenceInSeconds);
}

# Subroutine: SA_NodeMonitor_BuildTrap
# Overview: Trap VarBind Builder

```

```
# Configuration

# Delcare Local Variables

my $sec,$min,$hour,$mday,$mon,$year,$wday,$yday,$isdst;
($sec,$min,$hour,$mday,$mon,$year,$wday,$yday,$isdst) =
localtime(time);
my $Timestamp,$Node;
# Assign Values To Variables

$Node = $A;
$year = 1900 + $year;
$Timestamp = "$year-$mon-$mday $hour:$min:$sec";
# Build The Trap VarBind

$SA_NodeMonitor_varBind {$Node} =
"Alarm|3000000|$Timestamp|$Node";

# Subroutine: SA_NodeMonitor_NotifyHPOV
# Overview: Fires 'Alarm' trap into HP OpenView for
#      processing using the PERL 'system'
function and the ECM 'trapgen'
command.

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $year,$mon,$day,$hour,$min,$sec;
my $TZAdjust,$DSTAdjust;
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
```

```
            $NumLeapYears--;
        }
    }
    $SecondsThisInterval += $NumLeapYears * 24 * 60 * 60;
    $EpochTime += $SecondsThisInterval;
    # Determine number of seconds for months so far
    while($mon--) {
        $EpochTime += $DaysPerMonth[$mon] * 24 * 60 * 60;
    }
    # Determine number of seconds for days so far
    $EpochTime += ($day - 1) * 24 * 60 * 60;
    # Determine number of seconds for hours so far
    $EpochTime += $hour * 60 * 60;
    # Determine number of seconds for minutes so far
    $EpochTime += $min * 60;
    # Determine number of seconds for seconds so far
    $EpochTime += $sec;
    # Adjust for time zone (which should be of the form-12:00 .. 12:00)
    # THIS SHOULD USE ACTUAL TIME ZONE CODES
    $TZAdjust = "5:00";
    if($TZAdjust =~/^ (-?)(\d):(\d*)$/) {
        # Time Zone adjustment needs to subtract
        if($1) {
            $EpochTime -= ($2 * 60 * 60) + ($3 * 60);
        } else {
            $EpochTime += ($2 * 60 * 60) + ($3 * 60);
        }
    }
    # Adjust for day light savings time
    # Fire The Trap Into HP OpenView
    #
    # The 6th value on the trapgen string (right next to
    # the generic trap number (6)) is the specific trap
    # number. This has to be associated with some event
    # configured in HP OpenView. (i.e. 6 3 105 - The '3'
    # is the specific trap ID)
    #
    system("/opt/seasoft/bin/trapgen nsmmws16 1.3.6.1.4.1.78 $A 6 3 105
    1.3.6.1.4.1.78.0.3 octetstringascii 3000000 1.3.6.1.4.1.78.0.3
    octetstringascii
    $EpochTime 1.3.6.1.4.1.78.0.3 octetstringascii 5");
    #_____
    #
    # Subroutine: SA_NodeMonitor_RecoverHPOV
    # Overview: Fires 'Recover' trap into HP OpenView for
    #       processing using the PERL 'system'
    #       function and the ECM 'trapgen'
    #       command.
    #
    #_____
    # Variable Declarations
    #
    #
    # Configuration OfVariables
    #
    # Instantiate Local Variables
    # - Make the variables ("my") local to keep them out of
    # the global name space. Single step alarm, so no
    # need for global variables.
    #
    my $EpochTime=0;
    my @DaysPerMonth = (31, 28, 31, 30, 31, 30, 31, 31, 30, 31, 30, 31);
    my $year,$mon,$day,$hour,$min,$sec;
    my $TZAdjust,$DSTAdjust;
    my $ShowDebug,$NumLeapYears,$SecondsThisInterval;
    my
    $SnmpTrapTimestamp,$SnmpTrapNode,
    $SA_CorrEnt_NotifyOvTrapString
    ;
    # Initialize Date/Time Variables
    # - 2d line turns year into 4-digit year (i.e. 19xx)
    # as localtime function returns year-1900. Timestamp
    # design is standard for phase 2 development.
    #
    $year = ((localtime( ))[5]);
    $mon = ((localtime( ))[4]);
    $day = ((localtime( ))[3]);
    $hour = ((localtime( ))[2]);
    $min = ((localtime( ))[1]);
    $sec = ((localtime( ))[0]);
    # Determine number of seconds for years
    if($year < 200) {
        # year is in two digit form
        if($year < 90) {
            # year is presumably in the 21st century
            $year += 2000;
        } else {
            # year is presumably in the 20th century
            $year += 1900;
        }
    }
    # Do not return negatives - and if2100 or later, add to leap year calcs
    if($year < 1970 || $year >= 2100) {
        return 0;
    }
    $year -= 1970;
    $SecondsThisInterval = $year * 365 * 24 * 60 * 60;
    # leap year calculations
    $NumLeapYears = int(($year+2)/4);
    if(($year+2) % 4 == 0) {
        # this is a leap year (assuming 1970-2099)
        # check if we have hit feb 29 yet:
        # recall, mon is 0-based
        if($mon <= 1) {
            # we need to subtract a year, as this is jan
            $NumLeapYears--;
        }
    }
    $SecondsThisInterval += $NumLeapYears * 24 * 60 * 60;
    $EpochTime += $SecondsThisInterval;
    # Determine number of seconds for months so far
    while($mon--) {
        $EpochTime += $DaysPerMonth[$mon] * 24 * 60 * 60;
    }
    # Determine number of seconds for days so far
    $EpochTime += ($day - 1) * 24 * 60 * 60;
    # Determine number of seconds for hours so far
    $EpochTime += $hour * 60 * 60;
    # Determine number of seconds for minutes so far
    $EpochTime += $min * 60;
    # Determine number of seconds for seconds so far
    $EpochTime += $sec;
    # Adjust for time zone (which should be of the form-12:00 .. 12:00)
    # THIS SHOULD USE ACTUAL TIME ZONE CODES
    $TZAdjust = "5:00";
    if($TZAdjust =~/^ (-?)(\d):(\d*)$/) {
        # Time Zone adjustment needs to subtract
        if($1) {
            $EpochTime -= ($2 * 60 * 60) + ($3 * 60);
        } else {
            $EpochTime += ($2 * 60 * 60) + ($3 * 60);
        }
    }
    # Adjust for day light savings time
    # Fire The Trap Into HP OpenView
    #
    # The 6th value on the trapgen string (right next to
    # the generic trap number (6)) is the specific trap
    # number. This has to be associated with some event
    # configured in HP OpenView. (i.e. 6 3 105 - The '3'
    # is the specific trap ID)
    #
    system("/opt/bin/trapgen nsmmws16 1.3.6.1.4.1.78 nsmmws09 6 4 105
    1.3.6.1.4.1.78.0.4 octetstringascii 3000001 1.3.6.1.4.1.78.0.4
    octetstringascii
    $EpochTime 1.3.6.1.4.1.78.0.4 octetstringascii 1");
    #_____
    #
    # Subroutine: SA_Parameters_TestScript
    # Overview: Simple test script to show variable
    #       values in an ECM environment
    #
    #_____
    open (LOG1,">/opt/userfiles/logs/testTmp");
    print LOG1 "nodeName = nodeName\n";
    print LOG1 "community string of the transition = $COM\n";
    print LOG1 "property group of the transition's node = $NPG\n";
    print LOG1 "address of the transition's node = $trapPduAgentAddress\n";
```

-continued

```
print LOG1 "NAL = $NAL\n";
print LOG1 "property listed in the alarm definition's property field =
$APG\n";
print LOG1 "Alarm definition name = $ADN\n";
print LOG1 "State name where transition begins - the origination state =
$OSN\n";
print LOG1 "NC severity of the origination state = $OSS\n";
print LOG1 "State name where transition ends - the dest state = $DSN\n";
print LOG1 "NC severity of the dest state = $DSS\n";
print LOG1 "Platform sev name for the orig. state = $POSS\n";
print LOG1 "Platform sev name for the dest. state = $PDSS\n";
print LOG1 "Max NC sev of the orig. state = $MOSS\n";
print LOG1 "Max NC sev of the dest. state = $MDSS\n";
print LOG1 "Max platform sev name for the orig. state = $MPOSS\n";
print LOG1 "Max platform sev name for the dest. state = $MPDSS\n";
print LOG1 "Trigger name = $TRN\n";
print LOG1 "The trigger's base obj. = $ON\n";
print LOG1 "Instance info of the base obj = $OI\n;
print LOG1 "pollkey = $pollkey\n";
print LOG1 "Trap generic = $TGN\n";
print LOG1 "Trap specific = $TSN\n";
print LOG1 "Trap enterprise = $TEN\n";
print LOG1 "Trap timestamp = $TTN\n";
print LOG1 "Trap community = $TCS\n";
print LOG1 "VbObject = $VbObject(0)\n";
print LOG1 "VbAttrib = $VbAttribute(0)\n";
print LOG1 "VbValue = $VbValue(0)\n";
close LOG1;

# Subroutine: SA_SnmpStatus_NotifyHPOV
# Overview: Fires alarm trap notifying the
NMS that the enterprise alarm is
instantiated.

Fires 'Alarm' trap into HP OpenView for
processing using the PERL 'system'
function and the ECM 'trapgen'
command.

#_____

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $Year,$mon,$day,$hour,$min,$sec;
my $TZAdjust,$DSTAdjust;
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
```

-continued

```
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970–2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
# THIS SHOULD USE ACTUAL TIME ZONE CODES
$TZAdjust = "5:00";
if($TZAdjust =~/ ^ (-?)(\d):(\d*)$/) {
    # Time Zone adjustment needs to subtract
    if($1) {
        $EpochTime -= ($2 * 60 * 60) + ($3 * 60);
    } else {
        $EpochTime += ($2 * 60 * 60) + ($3 * 60);
    }
}
# Adjust for day light savings time
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

system("/opt/seasoft/bin/trapgen nsmmws16 1.3.6.1.4.1.78 $A 6 3 105
1.3.6.1.4.1.78.0.3 octetstringascii 1001014 1.3.6.1.4.1.78.0.3
octetstringascii
$EpochTime 1.3.6.1.4.1.78.0.3 octetstringascii 5");

# Subroutine: SA_SnmpStatus_RecoverHPOV
# Overview: Fires recovery trap notifying the
NMS that the enterprise alarm is
recovered.

Fires 'Alarm' trap into HP OpenView for
processing using the PERL 'system'
function and the ECM 'trapgen'
command.

#_____

# Configuration OfVariables

# Instantiate Local Variables
# - Make the variables ("my") local to keep them out of
# the global name space. Single step alarm, so no
# need for global variables.

my $EpochTime=0;
my @DaysPerMonth = (31, 28, 31, 30, 31, 30, 31, 31, 30, 31, 30, 31);
my $year,$mon,$day,$hour,$min,$sec;
my $TZAdjust,$DSTAdjust;
```

-continued

```
my $ShowDebug,$NumLeapYears,$SecondsThisInterval;
my
$SnmpTrapTimestamp,$SnmpTrapNode,
$SA_CorrEnt_NotifyOvTrapString
;
# Initialize Date/Time Variables
# - 2d line turns year into 4-digit year (i.e. 19xx)
# as localtime function returns year-1900. Timestamp
# design is standard for phase 2 development.

$year = ((localtime( ))[5]);
$mon = ((localtime( ))[4]);
$day = ((localtime( ))[3]);
$hour = ((localtime( ))[2]);
$min = ((localtime( ))[1]);
$sec = ((localtime( ))[0]);
# Determine number of seconds for years
if($year < 200) {
    # year is in two digit form
    if($year < 90) {
        # year is presumably in the 21st century
        $year += 2000;
    } else {
        # year is presumably in the 20th century
        $year += 1900;
    }
}
# Do not return negatives - and if2100 or later, add to leap year calcs
if($year < 1970 || $year >= 2100) {
    return 0;
}
$year -= 1970;
$SecondsThisInterval = $year * 365 * 24 * 60 * 60;
# leap year calculations
$NumLeapYears = int(($year+2)/4);
if(($year+2) % 4 == 0) {
    # this is a leap year (assuming 1970-2099)
    # check if we have hit feb 29 yet:
    # recall, mon is 0-based
    if($mon <= 1) {
        # we need to subtract a year, as this is jan
        $NumLeapYears--;
    }
}
$SecondsThisInterval += $NumLeapYears * 24 * 60 * 60;
$EpochTime += $SecondsThisInterval;
# Determine number of seconds for months so far
while($mon--) {
    $EpochTime += $DaysPerMonth[$mon] * 24 * 60 * 60;
}
# Determine number of seconds for days so far
$EpochTime += ($day - 1) * 24 * 60 * 60;
# Determine number of seconds for hours so far
$EpochTime += $hour * 60 * 60;
# Determine number of seconds for minutes so far
$EpochTime += $min * 60;
# Determine number of seconds for seconds so far
$EpochTime += $sec;
# Adjust for time zone (which should be of the form-12:00 .. 12:00)
# THIS SHOULD USE ACTUAL TIME ZONE CODES
$TZAdjust = "5:00";
if($TZAdjust =~/^(-?)(\d):(\d*)$/) {
    # Time Zone adjustment needs to subtract
    if($1) {
        $EpochTime -= ($2 * 60 * 60) + ($3 * 60),
    } else {
        $EpochTime += ($2 * 60 * 60) + ($3 * 60);
    }
}
# Adjust for day light savings time
# Fire The Trap Into HP OpenView

# The 6th value on the trapgen string (right next to
# the generic trap number (6)) is the specific trap
# number. This has to be associated with some event
# configured in HP OpenView. (i.e. 6 3 105 - The '3'
# is the specific trap ID)

system("/opt/bin/trapgen nsmmws16 1.3.6.1.4.1.78 $A 6 4 105
```

```
1.3.6.1.4.1.78.0.4 octetstringascii 1001015 1.3.6.1.4.1.78.0.4
octetstringascii
$EpochTime 1.3.6.1.4.1.78.0.4 octetstringascii 1");
```

Collector Process Control

This section provides information regarding Collector Process Control.

Description

Collector Process Control is used to start and stop Collector components and monitor their execution. It allows for a single point of control for the components of the system. The process control system contains the following elements:

Process Control Agents, which are programs installed on each host with the responsibility of managing processes.

A set of command line utilities to provide an interface to process management

The process control agents cooperate automatically and have memory for their configuration.

Configuration

All configuration for Collector Process Control is done in NCO_PA.conf. This file is referenced at start-up time to establish configuration information. The file is made up of a number of records each of which contain various attributes and associated values. One should edit this file directly to add any new processes or modify configuration information. There are three sections to the NCO_PA.conf file:

Processes:
    Processes are programs that are executed by a process control agent.
    Processes can be configured to be dependent on each other.
    Process definitions take on the following format:

```
nco_process 'MasterObjectServer'
{
    Command '/opt/ECM/bin/nco_objserv -name NCOMS -pa
    NCO_PA' run as 0
    Host         =   'twmmdb02'
    Managed      =   True
    RestartMsg   =   'Master Object Server running as ${EUID}
    has been restored on
                     ${HOST}.'
    AlertMsg     =   'Master Object Server running as ${EUID} has
    died on ${HOST}.'
                     RetryCount = 0 ProcessType =
                     PaPA_AWARE
}
```

Services:
    A service is made up of several processes, which are executed by process control agents.
    A service may be configured to start up automatically when the process control agent starts or to wait until the service is started manually.
    There are two grades of service: master and non-master. These grades are used when services are automatically started.
    A master service will have its processes started before a non-master service.

Service definitions have the following format:

```
nco_service 'Core'
{
        ServiceType = Master
        ServiceStart = Auto
        process 'MasterObjectServer' NONE
}
```

Agent Hosts:

Used to specify the available hosts to contact

Host definitions have the following format:

```
nco_routing
{
        host 'twmmdb02' 'NCO_PA'
}
```

Commands
NCO_PAD

The NCO_PAD command is used to begin COllector Process Control. In order to start process control the following comand should be entered:

Nco_pad -name NCO_PA -debug 1

This command begins the process agent named NCO_PA with a debug option of 1. Error and debug information is listed in the nco_pa.log file located in the /opt/Collector/log directory.

Collector Gateway
Description of Use

The Collector Gateway is used to integrate the Collector system with databases. The gateway is made up of three items: readers, writers and routes. The readers extract alerts from the object server, while the writer is used to forward the alerts to the database. Routes create the link between the readers and writers.

Configuration

The configuration information for the Collector Gateway is stored in the COLLECTOR_GATE.conf file in the /opt/Collector/etc directory. In this file, mappings are created. The mappings tell the gateway which fields from the Object Server table should be placed in the database and with what name. It is important to make sure that the number of items detailed in the mapping configuration equals the number and name of fields setup in the database. This file also contains configuration information for the readers, writers and routes. Below is an example Gateway configuration file:

```
CREATE MAPPING COLLECTOR_MAP
(
    'ELEMNT_KEY_CD' = '@DatabaseElementKey',
    'EVENT_KEY_CD' = '@EventCode',
    'PERF_TIME_KEY_CD' = '@LastOccurrence',
    'EVENT_DURATION_VALUE' = '@Duration',
    'EVENT_STRING_TXT' = '@Summary',
    'EVENT_SVRTY_CD' = '@OriginalSeverity'
);
# Start up the reader - connect to the Object Server NCOMS
CREATE FILTER LOG AS 'LoggedToDatabase = 0';
START READER COLLECTOR_READ CONNECT TO NCOMS USING
FILTER LOG
ORDER BY 'Serial asc' AFTER IDUC DO 'update alerts.status set
LoggedToDatabase=1';
# Start up the writer

START WRITER COLLECTOR_WRITE
(
    TYPE = COLLECTOR,
    REVISION = 1,
    MAP = COLLECTOR_MAP,
    USERNAME = 'Collector',
    PASSWORD = 'Collector',
    STATUS_TABLE = 'EVENTS_FACT_TB',
    FORWARD_INSERTS = TRUE,
    FORWARD_UPDATES = TRUE,
    FORWARD_DELETES = TRUE
);
# Add a route from the reader to the writer so the info gets passed
ADD ROUTE FROM COLLECTOR_READ TO COLLECTOR_WRITE;
```

Commands
NCO_GATE

The NCO_GATE command is used to startup the Collector gateway. The syntax of the command is as follows:

opt/Collector/bin/Nco_gate -name COLLECTOR_GATE -debug 1;

The debug option sends debug and error information to the file opt/ECM/log/COLLECTOR_GATE.log.

NCO_XIGEN

The NCO_XIGEN command is used to access the Servers Editor window to edit port and name configuration of the Collector Gateway. The command syntax is as follows:

opt/Collector/bin/nco_xigen

You will need to add the Collector Gateway to the Servers Editor window with its own port number in order for the gateway to communicate with the Object Server as well as the Databases.

Environment Variables

In order for the gateway to open and communicate with databases, environment variables must be set before starting the gateway. In order to do this, a wrapper script was created around the nco_gate command in order to set the environment variables as well as start the gateway. The wrapper script is located in the directory /opt/Collector/bin. When run from the command line the script sets the needed variables and starts the Collector gateway. The environment variables set within the script are as follows:

```
COLLECTOR_SID=IPSA01
COLLECTOR_HOME=/files0/ipsa/vendor/Collector/product/7.3.4
COLLECTOR_BASE=/files0/ipsa/vendor/Collector
LD_LIBRARY_PATH=/files0/ipsa/vendor/Collector/product/7.3.4/lib
TNS_ADMIN=/files0/ipsa/vendor/Collector/product/7.3.4/network/admin
```

Collector Internet Service Monitoring (ISM)

This section will discuss the Service Assurance test environment specific details of the Collector Internet Service Monitors (ISM's) and requirements for a remote installation.
Internet Service Monitors Remote Installation
  Location of the Collector ISM's
  The remote installation of the ISM's in on nsmmws09. The ISM's are installed in the /opt/Collector directory.
  Prerequisites for a remote installation of the ISM's
  In order to create all of the required directories and shared libraries for the ISM's an installation of Collector must proceed the ISM's installation on the same remote host.
  Probes and Process Control should be the only two components selected for the Collector installation on the remote host.
  Even if the use of Probes is not required on the remote host, selecting Probes will create the directories required by components that allow the ISM's to run properly (Collector/etc and Collector/var directories and required API libraries).
  The Collector/etc directory is where the interfaces file (discussed bellow) will be placed. The Collector/var directory is where all event data is kept while any Monitors are in Store and Forward mode (when the ObjectServer is off-line).
  Process Control will insure that the Monitors are restarted in the event they unexpectedly go down.
  Remote Communication Between the ISM's and Collector (Objectserver)
  The Collector installation comes with a file (/opt/Collector/etc) that generates interfaces.platform files, where platform is the OS of the machine remote Collector components (software) will be installed on. The interfaces.platform files contain information on where to look for the license server as well as how and were to communicate with the Collector ObjectServer.
  The interfaces.platform file should be placed in the ECM/etc directory of the remote installation for use by remote components.
Internet Service Monitoring Configuration
Extended Use of the On-Line Configuration Tool
  The on-line configuration tool, if run from a web server, requires the start java.sh script (/opt/Collector/monitors/config) to be running. This script has a timeout line, which by default is set to ten minutes (in seconds). If the on-line configuration tool is idle for more than ten minutes, a server error will be generated the next time the tool is requested. Running the script from the command line is required before using the tool again. For a work around, the timeout value has been set to 3600 seconds (one hour) to increase the time the configuration tool can be accessed.
Store and Forward Function
  Store and forward is a function that allows monitors and probes to record all event messages to an ObjectServer.store file while the Objectserver is down. This file will be located in the Collector/var directory.

The store and forward function is set to 0 (off) by default with the ISM's. The store and forward function has been turned on for the ISM's installed on nsmmws09 by using VI to set store and forward to 1 (on). This is done in the monitor.props files (/opt/Collector/monitors/solaris2).

HTTP Service

The Web Servers on twmmnt02 (Microsoft IIS) and nsmmws09 (Netscape Fast-Track Server) are being monitored. The polling interval is set at fifteen minutes.

A method of sending intentional "Server down" events to Collector is to stop the Fast-Track Server on nsmmws09. This can be done by running the start-admin script in the /opt/netscape/suitespot directory. Then open a Netscape browser and enter http://nsmmws09:26339 (username: webadmin password: same as noc) which opens the on-line, Fast-Track Server administration page. This page contains an on/off switch for the server.

FTP Service (file transfer protocol)

FTP service will be tested on nsmmws16. The service is downloading a 3mb file from nsmmws16 (/sa/dev/dat/tmp/ism_test_data) to nsmmws09 (/opt/Collector/ftp_test_file)

NNTP Service (network news transport protocol)

Comp.protocols.snmp has been used as the news group to test. The polling interval is set at fifteen minutes.

SMTP Service (simple mail transport protocol)

The polling interval is set at fifteen minutes.

POP-3 Service (post office protocol)

The polling interval is set at fifteen minutes.

Collector Configuration

Object Server Customizations

The customizations to the object server include alterations to the alerts.status tables, custom triggers, and custom automations.

Table Customizations: alerts.status table

The structure of all the object server tables is defined in the file NCOMS.sql. The following table lists all the additional fields added to the object server table alerts.status:

TABLE 25

| Field Name | Data Type | Description |
| --- | --- | --- |
| EventCode | int | Unique event code |
| Duration | int | |
| CheckedNotify | int | |
| SustainedAlert | int | 0 = No regeneration needed<br>1 = This event has been regenerated<br>2 = This event needs to be regenerated |
| NotifyAction | char(255) | |
| NotifyPending | int | |
| LoggedToDatabase | int | −2 = Do not log this event<br>−1 = Wait<br>0 = This event is ready to be logged<br>1 = This event has been logged |
| DatabaseElementKey | int | |
| DatabaseTimeKey | int | |
| OpenTicket | int | 0 = Do not open a ticket for this event<br>1 = Open a ticket for this event |
| TicketNumber | char(64) | Remedy trouble ticket number |
| OriginalSeverity | int | |
| AlertType | int | 0 = This event is non-paired<br>1 = This event is a paired alert start<br>2 = This event is a paired alert stop |
| AlertStopTime | int | |
| OriginalOccurrence | Int | |
| TimeKeyLogged | Int | |
| MidnightTime | Int | Time (in epoch seconds) of the first previous midnight |
| RegenMidnightTime | Int | |
| RegenIdentifier | char(255) | |
| TempInt | Int | |
| TempChar | char(64) | |
| DebugFieldInt | Int | |
| DebugFieldChar | char(64) | |

Custom Triggers and Automations

```
Event Expiration
    Trigger: DeleteClears
delete from alerts.status where Severity = 0 and StateChange < (getdate − 129600);
    Action: None
Match alert stops
    Trigger: FindAlertStops
select * from alerts.status where AlertType = 2;
    Action: RemoveAlertStops
update alerts.status set Severity = 0, AlertStopTime = @FirstOccurrence,
DebugFieldChar = \'RemoveAlertStops ran\' where Severity <> 0 and AlertType = 1
and Node = \'@Node\' and EventCode = @EventCode − 1 ','and LastOccurrence <=
@LastOccurrence; delete from alerts.status where Serial = @Serial;
Duration Calculation
    Trigger: CalculateDuration
select * from alerts.status where AlertType = 1 and Severity = 0 and Duration = −1;
    Action: SetDuration
update alerts.status set LoggedToDatabase = 0,DebugFieldChar = \'SetDuration just
ran\',Identifier = \'@Node.@EventCode.@FirstOccurrence\',Duration =
(@AlertStopTime − @FirstOccurrence) whereSerial = @Serial;
Regenerate Events
    Trigger1: FindEventsToRegen1
select * from alerts.status whereAlertType = 1 andDuration = 0 andFirstOccurrence
> getdate − (hourofday*60*60) − (minuteofhour*60) − 86400 − 60
andFirstOccurrence < getdate − (hourofday*60*60) − (minuteofhour*60) − 60;
    Action1: ModifyAlertToRegen
update alerts.statussetDuration = 86400 − (@FirstOccurrence − @MidnightTime),
AlertStopTime = @MidnightTime + 86400, RegenIdentifier = \'@Node
@EventCode @MidnightTime\', RegenMidnightTime = @MidnightTime + 86400,
SustainedAlert = 2,',' DebugFieldChar = \'ModifyAlertToRegen\' whereSerial =
@Serial;
    Trigger2: FindEventsToRegen2
select * from alerts.status whereSustainedAlert = 2;
    Action2: InsertRegenAlert
update alerts.statussetSustainedAlert = 1, Severity = 0whereSerial = @Serial;insert
into alerts.status values(\'@RegenIdentifier\' ,0 ,\'@Node\' ,\'@NodeAlias\'
,\'@Manager\' ,\'@Agent\' ,\'@AlertGroup\' ,',\'@AlertKey\' ,@Severity
```

-continued

```
,\'@Summary\' ,0 ,@RegenMidnightTime ,@RegenMidnightTime ,0 ,@Poll
,@Type ,0 ,@Class ,@Grade ,\'@Location\' ,@OwnerUID ,@OwnerGID
,@Acknowledged ,@Flash ,\'@S','erverName\' ,@ServerSerial ,@EventCode ,0
,@CheckedNotify ,1 , \'@NotifyAction\' ,@NotifyPending ,0
,@DatabaseElementKey ,0 ,@OpenTicket ,\'@TicketNumber\' ,@OriginalSeverity
,@AlertType ,0 ,',''@OriginalOccurrence ,@TimeKeyLogged
,@RegenMidnightTime ,0 ,\'\' ,0 ,\'\' ,0 ,\'InsertRegenAlert\' );
Logging Time Key
      Trigger: TimeKeyLogged
select * from alerts.status where TimeKeyLogged=0;
      Action: GenerateTimeKey
update alerts.status setTimeKeyLogged=1 whereSerial=@Serial;
Notifications
      Trigger: AgetEventsToNotify
select * from alerts.status where NotifyPending = 1;
      Action: TakeNotifyAction
update alerts.statussetNotifyPending = 0whereSerial = @Serial;
      AND
/opt/cOLLECTOR/utils/notify_spooler.pl @Node @EventCode @LastOccurrence
@Summary
Database logging
      Trigger: SelectLoggedToDbse
select * from alerts.status where LoggedToDatabase=0andDatabaseElementKey<>0;
      Action: ChangeLoggedToDbse
update alerts.status set LoggedToDatabase=1 whereSerial=@Serial;
NCOMS.sql
--
-- Collector definition file
--
--
create database master;
use database master;
create table names
(
      Name              char(64),
      UID               int,
      GID               int,
      Passwd            char(64),
      Type              int,
      unique ( Name ),
      permanent
);
create table profiles
(
      UID               int,
      HasRestrictionint,
      Restrict1         char(255),
      Restrict2         char(255),
      Restrict3         char(255),
      Restrict4         char(255),
      AllowISQL         int,
      unique ( UID ),
      permanent
);
create table groups
(
      Name              char(64),
      GID               int,
      unique ( Name ),
      permanent
);
create table members
(
      KeyField          char(64),
      UID               int,
      GID               int,
      unique( KeyField ),
      permanent
);
--
-- The following table controls the statistics option
-- Remove the comments to enable statistics gathering. Currently, this data
-- is gathered but not used.
--
-- You can comment out individual fields to stop that statistic being recorded
-- but the StatTtime must be present for the statistics gather to work
      -- permanent
-- );
create database auto;
```

-continued

```
use database auto;
create table triggers
(
    Name            char(64),
    Cond1           char(255),
    Cond2           char(255),
    Cond3           char(255),
    Cond4           char(255),
    AutoExec        char(64),
    DecExec         char(64),
    OwnerUID        int,
    Active          int,
    Level           int,
    EvalPeriod      int,
    Threshold       int,
    Hits            int,
    ProcessAllHits  int,
    Comment1        char(255),
    Comment2        char(255),
    Comment3        char(255),
    Comment4        char(255),
    unique ( Name ),
    permanent
);
create table actions
(
    Name            char(64),
    HasData         int,
    Data1           char(255),
    Data2           char(255),
    Data3           char(255),
    Data4           char(255),
    HasExec         int,
    ExecPath        char(255),
    ExecArgs        char(255),
    ExecHost        char(64),
    EUID            int,
    HasPhone        int,
    PhoneArgs1      char(255),
    PhoneArgs2      char(255),
    PhoneArgs3      char(255),
    PhoneArgs4      char(255),
    Comment1        char(255),
    Comment2        char(255),
    Comment3        char(255),
    Comment4        char(255),
    unique ( Name ),
    permanent
);
create database alerts;
use database alerts;
create table status
(
    Identifier      char(255),
    Serial          incr,
    Node            char(64),
    NodeAlias       char(64),
    Manager         char(64),
    Agent           char(64),
    AlertGroup      char(64),
    AlertKey        char(64),
    Severity        int,
    Summary         char(255),
    StateChange     optime,
    FirstOccurrence time,
    LastOccurrence  ltime,
    InternalLast    timestamp,
    Poll            int,
    Type            int,
    Tally           opcount,
    Class           int,
    Grade           int,
    Location        char(64),
    OwnerUID        int,
    OwnerGID        int,            -- Groups Option
    Acknowledged    int,
    Flash           int,            -- Flash Option
    ServerName      char(64),
    ServerSerial    int,
```

-continued

```
        EventCode           int,
        Duration            int,
        CheckedNotify       int,
        SustainedAlert      int,
        NotifyAction        char(255),
        NotifyPending       int,
        LoggedToDatabase    int,
        DatabaseElementKey  int,
        DatabaseTimeKey     int,
        OpenTicket          int,
        TicketNumber        char(64),
        OriginalSeverity    int,
        AlertType           int,
        AlertStopTime       int,
        OriginalOccurrence  int,
        TimeKeyLogged       int,
        MidnightTime        int,
        RegenMidnightTime   int,
        RegenIdentifier     char(255),
        TempInt             int,
        TempChar            char(64),
        DebugFieldInt       int,
        DebugFieldChar      char(64),
        unique ( Identifier ),
        notify on ( change ),
        iduc on ( Serial ),
        permanent
);
create table objclass
(
        Tag                 int,
        Name                char(64),
        Icon                char(255),
        Menu                char(64),
        unique ( Tag ),
        permanent
);
create table objmenus
(
        Menu                char(64),
        Columns             int,
        unique ( Menu ),
        permanent
);
create table objmenuitems
(
        KeyField            char(255),
        Menu                char(64),
        Sequence            int,
        Title               char(64),
        Command1            char(255),
        Command2            char(255),
        Command3            char(255),
        Command4            char(255),
        RedirectStdin       int,
        RedirectStdout      int,
        RedirectStderr      int,
        unique ( KeyField ),
        permanent
);
create table resolutions
(
        KeyField            char(255),
        Tag                 int,
        Sequence            int,
        Title               char(64),
        Resolution1         char(255),
        Resolution2         char(255),
        Resolution3         char(255),
        Resolution4         char(255),
        unique ( KeyField ),
        permanent
);
create table journal
(
        KeyField            char(255),
        Serial              int,
        UID                 int,
        Chrono              time,
```

-continued

```
    Text1              char(255),
    Text2              char(255),
    Text3              char(255),
    Text4              char(255),
    Text5              char(255),
    Text6              char(255),
    Text7              char(255),
    Text8              char(255),
    Text9              char(255),
    Text10             char(255),
    Text11             char(255),
    Text12             char(255),
    Text13             char(255),
    Text14             char(255),
    Text15             char(255),
    Text16             char(255),
    unique ( KeyField ),
    permanent
);
create table conversions
(
    KeyField           char(255),
    Colname            char(255),
    Value              int,
    Conversion         char(255),
    unique ( KeyField ),
    permanent
);
create table col_visuals
(
    Colname            char(255),
    Title              char(255),
    DefWidth           int,
    MaxWidth           int,
    TitleJustify       int,
    DataJustify        int,
    unique ( Colname ),
    permanent
);
create table details
(
    KeyField           char(255),
    Identifier         char(255),
    AttrVal            int,
    Sequence           int,
    Name               char(255),
    Detail             char(255),
    unique ( KeyField ),
    permanent
);
```

-This table is required for the NT desktop
create table colors

```
    (
        Severity           int,
        AckedRed           int,
        AckedGreen         int,
        AckedBlue          int,
        UnackedRed         int,
        UnackedGreen       int,
        UnackedBlue        int,
        unique( Severity ),
        permanent
    );
```

- The following database and table is required for the additional features
- to support the Internet Service Monitors create database service;

use database service;

create table status

```
(
    Name            char(255),    -- Service Name
    CurrentState    int,          -- Good, Marginal, Bad, Unknown
    StateChange     time,         -- Time of last service state change
    LastGoodAt      time,         -- Time service was last good
    LastBadAt       time,         -- Time service was last bad
    LastMarginalAt  time,         -- Time service was last marginal
    LastReportAt    time,         -- Time of last service status report
    unique ( Name ),
    permanent
);
```

- This database and table support the Java Event List and the Java JELD.
- It is maintained via the JACE configuration tool.

create database jel;

use database jel;

create table jel_props

```
(
    KeyField         incr,
    ConfigName       char(127),
    PropSet          char(127),
    PropName         char(127),
    PropVal          char(255),
    unique ( KeyField ),
    permanent
);
```

- This database and tables are required for the NT desktop
create database tools;
use database tools;
create table actions

```
(
    ActionID         int,
    Name             char(64),
    Owner            int,
    Enabled          int,
    Description1     char(255),
    Description2     char(255),
    Description3     char(255),
    Description4     char(255),
    HasInternal      int,
    InternalComp1    char(255),
    InternalComp2    char(255),
    InternalComp3    char(255),
    InternalComp4    char(255),
    HasExternal      int,
    ExternalComp1    char(255),
    ExternalComp2    char(255),
    ExternalComp3    char(255),
    ExternalComp4    char(255),
    ForEachSelected  int,
    HasRemote        int,
    RemoteComp1      char(255),
    RemoteComp2      char(255),
    RemoteComp3      char(255),
    RemoteComp4      char(255),
    HasURL           int,
    URLComp1         char(255),
    URLComp2         char(255),
    URLComp3         char(255),
    URLComp4         char(255),
    Platform         int,
    JournalText1     char(255),
    JournalText2     char(255),
    JournalText3     char(255),
    JournalText4     char(255),
```

-continued

```
    HasForcedJournal  int,
    unique ( ActionID ),
    permanent
);
``` create table action_access

```
(
    ActionID         int,
    GID              int,
    ClassID          int,
    ActionAccessID   int,
    unique ( ActionAccessID ),
    permanent
);
``` create table menus

```
(
    MenuID           int,
    Name             char(64),
    Owner            int,
    Enabled          int,
    unique ( MenuID ),
    permanent
);
``` create table menu_items

```
(
    KeyField         char(32), -- menu_id:menu_item_id
    MenuID           int,
    MenuItemID       int,
    Title            char(64),
    Description      char(255),
    Enabled          int,
    InvokeType       int, -- What type of invocation: Action/Submenu
    InvokeID         int,
    Position         int,
    Accelerator      int,
    unique ( KeyField ),
    permanent
);
```

NCOMS.auto.triggers.dat
(Blank lines added to enhance readability.)

use database auto;
insert into triggers values ( 'FindSpecifcSerial','select * from alerts.status whereSerial >= 4691 andSerial <= 4693;','','','','DebugChangeField','',10431,0,1,60,0,0,1,'','','','' );
insert into triggers values ( 'DetectUnknownServices','select * from service.status where LastReportAt < getdate - 3600;','','','','SetServiceUnknown','',0,0,0,600,0,0,1,'This trigger detects services which have not been reported forthe given period. The associated action sets these services intothe unknown state. It is only needed with the Internet Service Monitors.','','','' );
insert into triggers values ( 'CleanDetailsTable','delete from alerts.details where Identifier not in ((select Identifier from alerts.status));','','','','',0,1,1,601,0,0,0,'This is a standard automation for clearing old entries from the details table.','','','' );
insert into triggers values ( 'DeleteAllEvents','delete from alerts.status where Serial < 4700;','','','','',10431,0,1,60,0,0,1,'','','','' );
insert into triggers values ( 'AGetEventsToNotify','select * from alerts.status where NotifyPending = 1;','','','','TakeNotifyAction','',10431,1,1,1,0,0,1,'','','','' );

-continued insert into triggers values ( 'SelectLoggedToDbse','select * from alerts.status where LoggedToDatabase=0andDatabaseElementKey<>0;',",",",'ChangeLoggedToDbse',", 0,0,1,5,0,0,1,",",",");
insert into triggers values ( 'EscalateOff','update alerts.status set Flash = 0, Grade = 0 where ((Flash = 1 or Grade > 0) and Acknowledged = 1) or (Severity = 0);',",",",",",0,0,1,6,0,0,0,'Will set Flash field to 0 (not flashing) and Grade to 0 (not escalated in this example) when an event that has previously had the Flash field set to 1 or greater is either Acknowledged or Cleared (Severity = 0). ',",",");
insert into triggers values ( 'TimeKeyLogged','select * from alerts.status whereTimeKeyLogged=0;',",",",'GenerateTimeKey',",0,1,1,5,0,0,1,'99Overview: This trigger selects all records from the alert_status table who have a TimeKeyLogged value equal to zero. It then takes these records and runs the script TimeKeyGen','erator for each row.',",");
insert into triggers values ( 'FindAlertStops','select * from alerts.status where AlertType = 2;',",",",'RemoveAlertStops',",0,1,1,1,0,0,1,'Overview:',",",");
insert into triggers values ( 'FlashNotAck','update alerts.status set Flash = 1, Grade = 1 where Flash = 0 and Acknowledged = 0 and Severity = 5 and FirstOccurrence <= (getdate − 600);',",",",",",0,0,1,31,0,0,0,'Will set Flashing on (Flash=1) for events that are Critical (Severity=5)and are 10 minutes old but haven\'t been acknowledged by a user yet(Acknowledge = 0). It sets Grade to 1 as a further indication of the events escalation status.',",",");
insert into triggers values ( 'GenericClear','select * from alerts.status where Type = 2 and Severity > 0;',",",",'GenericClear',",10431,0,1,5,0,0,1,'This is a standard Automation for correlating two problem/resolutionevents, ie correlating a Device Up event with a Device Down event. This is done by checking the contents of the following fields;Type 1=Problem event, 2=Resolution eventLastO','ccurrence ensure resolution is more recent then problemAlertGroup same Type of event, ie Device Up/DownManager same source, same Probe reported both eventsNode same device reported both eventsAlertKey same sub-device (link, disk pa','rtition etc) reported both events',");
insert into triggers values ( 'MailOnCritical','select * from alerts.status where Severity = 5 and Grade < 2 and Acknowledged = 0 and LastOccurrence <= (getdate − (60 * 30));',",",",'MailOnCritical',",0,0,1,33,0,0,1,'Finds all events which are Critical (Severity=5) that are 30 minutes oldbut still haven\'t been Acknowledged (or escalated to level 2, Grade=2). The \'via\'@Identifier\'\' command is used The Action sets Grade = 2 to show the new escalation status','. The \'via \'@Identifier\'\' command is used for improved lookup performance. The Action then activates the external script $OMNIHOME/utils/nco_mail and passes data from the event to that script. The script is a simple script which will insert t','he events data into a mail message and mail to a user (in this example \'root\' user on the local machine). NOTE: This tool is UNIX specific unless an equivalent NT mailer is available.',");
insert into triggers values ( 'FindEventsToRegen1','select * from alerts.status whereAlertType = 1 andDuration = 0 andFirstOccurrence > getdate − (hourofday*60*60) − (minuteofhour*60) − 86400 − 60 andFirstOccurrence < getdate − (hourofday*60*60) − (minuteofhour*60) − 60;',",",",'ModifyAlertToRegen',",10431,1,1,1,0,0,1,",",",");
insert into triggers values ( 'FindEventsToRegen2','select * from alerts.status whereSustainedAlert = 2;',",",",'InsertRegenAlert',",0,1,1,1,0,0,1,",",",");
insert into triggers values( 'CalculateDuration','select * from alerts.status where AlertType = 1 andSeverity = 0 andDuration = − 1;',",",",'SetDuration',",0,1,1,1,0,0,1,'Overview:',",",");
insert into triggers values ( 'Expire','select * from alerts.status where Type > 10 and Severity > 0;',",",",'Expire',",10431,0,1,65,0,0,1,'This is a standard Automation for finding events that have passed their\'Expire\' time (stored in the Type field). The Action sets the events toClear (Severity 0).',",",");
insert into triggers values ( 'CleanJournalTable','delete from alerts.journal where Serial not in ((select Serial from alerts.status));',",",",",",0,1,1,602,0,0,0,'This is a standard automation for clearing old entries from the journal table.',",",");
insert into triggers values ( 'DeleteClears','delete from alerts.status where Severity = 0 and StateChange < (getdate − 129600);',",",",",",10431,1,1,67,0,0,0,'This is a standard Automation for deleting Cleared events from the ObjectServer. When using in conjunction with Internet ServiceMonitors (ISMs) amend the where statement as follows;...where Severity = 0 and StateChange < (getdate − 120) and Manage','rnot like\'ISM\';bloomje:I changed this to remove cleared events after 36 hours of no state change, not two minutes',",");
set recovery_sequence for triggers to 0; -- DO NOT CHANGE OR REMOVE THIS LINE !

NCOMS.auto.actions.dat (Blank lines added to enhance readability.)

use database auto;
insert into actions values ( 'InsertRegenAlert',1,'update

-continued alerts.statussetSustainedAlert = 1,
Severity = 0whereSerial = @Serial;
insert into alerts.status values(\'@RegenIdentifier\' , 0 ,\'@Node\' ,\'@NodeAlias\' ,\'@Manager\' ,\'@Agent\' ,\'@AlertGroup\' ,',\'@AlertKey\' ,@Severity ,\'@Summary\' ,0

-continued

```
,@RegenMidnightTime ,@RegenMidnightTime ,0 ,
@Poll ,@Type ,0 ,@Class
,@Grade ,\'@Location\'
,@OwnerUID ,@OwnerGID ,@Acknowledged ,@Flash
,\'@S','erverName\'
,@ServerSerial ,@EventCode ,0 ,@CheckedNotify , 1 ,
\'@NotifyAction\'
,@NotifyPending ,0 ,@DatabaseElementKey ,0 ,@OpenTicket
,\'@TicketNumber\' ,@OriginalSeverity
,@AlertType ,0 ,','@OriginalOccurrence
,@TimeKeyLogged ,@RegenMidnightTime ,0
,\'\' ,0 ,\'\' ,0
,\'InsertRegenAlert\'
);',0,",",",0,0,",",",",",",",",",");
insert into actions values ( 'GenerateTimeKey',
1,'update alerts.status
setTimeKeyLogged=1 whereSerial=@Serial;
',",",",1 ,'/opt/ECM/bin/bloomje/GenerateTimeKey.pl',
'@LastOccurrence','twmmdb02',0,0,",",",",
This script takes the field LastOccurrence and translates it into day,
month, year, hour, min, seconds.',",",");
insert into actions values ( 'DebugChangeField',0,'update
alerts.statussetSummary =
\'Blooms @Summary\'whereSerial =
@Serial;',",", ",0,",",",0,0,",",",",",",",",");
insert into actions values ( 'ModifyAlertToRegen',
1,'update alerts.statussetDuration = 86400 -
(@FirstOccurrence - @MidnightTime),
AlertStopTime = @MidnightTime + 86400,
RegenIdentifier = \'@Node
@EventCode @MidnightTime\',
RegenMidnightTime = @MidnightTime + 86400,
SustainedAlert = 2,',' DebugFieldChar =
\'ModifyAlertToRegen\' whereSerial =
@Serial;',",",0,",",",0,0,",",",",",",",", );
insert into actions values ( 'SetDuration',1,'update alerts.status set
LoggedToDatabase = 0,DebugFieldChar = \'SetDuration
just ran\',Identifier =
\'@Node.@EventCode.@FirstOccurrence\' ,
Duration = (@AlertStopTime -
@FirstOccurrence) whereSerial =
@Serial;',",",",0,",",",0,0,",",",",",",",", );
insert into actions values ( 'GenericClear',0,'update
alerts.status set Severity = 0
where Severity > 0 and Type = 1 and
LastOccurrence < @LastOccurrence and
AlertGroup = \'@AlertGroup\' and
Manager = \'@Manager\' and
Node = \'@Node\'
and AlertKey = \'@AlertKey\';
update alerts.status set
Severity = ','0 where Serial = @Serial;
',", ",0,",",",0,0,",",",",",This
is a standard Automation for correlating two
problem/resolutionevents, ie correlating a Device Up event
with a Device Down event. This is done by checking the contents
of the following fields;
Type 1=Problem event, 2=Resolution eventLastO',
'ccurrence ensure resolution is more recent then
problemAlertGroup same Type of event, ie Device Up/DownManager
same source, same Probe reported both eventsNode same device
reported both eventsAlertKey same sub-device
(link, disk pa','rtition etc) reported both events',", );
insert into actions values ('MailOnCritical',1,'update alerts.status
via \'@Identifier\'
setGrade=2;',",",",1,'$OMNIHOME/utils/
nco_mail','@Node @Severity
NCO_MAIL_MESSAGE root@omnihost
\'@Summary\",'omnihost',0,0,",",",",",",",",");
insert into actions values ( 'RegenAlerts',0,'update
alerts.statussetSeverity = 0,Duration = 86400 -
(@LastOccurrence - @MidnightTime),AlertStopTime =
@MidnightTime + 86400,TempChar = \'@OldIdentifier
(@MidnightTime)\',TempInt = @MidnightTime + 86400,
DebugFieldChar = \'Reg','enAlerts ran
on me\'whereSerial =
@Serial;',",",0,",",",0,0,",",",",",",",", );
insert into actions values ( 'SetServiceUnknown',1,'svc
update \'@Name\'
```

-continued

```
3;',",",",0,",",",0,0,",",",",This
action sets the state of the given service to be
Unknown. It is only needed with the Internet
Service Monitors.',",",");
insert into actions values ( 'TakeNotifyAction', 1 ,'update
alerts.statussetNotifyPending = OwhereSerial =
@Serial;',",",1,'/opt/ECM/utils/notify_spooler.p1',
\'"@Node\" \"@EventCode\"
\"@LastOccurrence\" \"@Summary\"',
'twmmdb02',0,0,",",",",",",");
insert into actions values ( 'ChangeLoggedToDbse',0,'update
alerts.status set
LoggedToDatabase=1whereSerial=@Serial;
',",",",0,",",",0,0,",",",",",",",",");
insert into actions values ('Expire',1,'update
alerts.status set Severity = 0 where
Serial = @Serial and LastOccurrence < (getdate -
@Type);',",",",0,",",",0,0,",",",",",This
is a standard Automation for finding events that
have passed their\'Expire\' time (stored in the Type field).
The Action sets the events toClear (Severity 0).',",",");
insert into actions values ( 'RemoveAlertStops',1,'update alerts.status
set Severity = 0, AlertStopTime = @FirstOccurrence,
DebugFieldChar = \'RemoveAlertStops ran\'
where Severity <> 0 and AlertType = 1 and
Node = \'@Node\'
and EventCode = @EventCode - 1 ','and
LastOccurrence <= @LastOccurrence;
delete from alerts.status where Serial =
@Serial; ',",",0,",",",0,0,",",",",",",",", );
set recovery_sequence for actions to 0; -- DO NOT CHANGE
OR REMOVE THIS LINE!
```

Sample Event Codes

General Information

This section is defined to allow for a single point of definition for event codes within the Service Assurance project.

These codes are defined for event handling through the Collector network the toolset.

TABLE 26

Table of Events

|  | AlertPairs | Asynch |
|---|---|---|
| Uncorr | 1,000,000 | 2,000,000 |
|  | 1,999,999 | 2,999,999 |
| Node-Corr | 3,000,000 | 4,000,000 |
|  | 3,,999,999 | 4,999,999 |
| Enter-Corr | 5,000,000 | 6,000,000 |
|  | 5,999,999 | 6,999,999 |

Uncorrelated Paired Events

These consist of <Event Code >|<Event>|<Severity >.

TABLE 27

|  | Network Availability Events |  |
|---|---|---|
| 1000000 | Test Alert Start | 1 |
| 1000001 | Test Alert Stop | 5 |
| 1000002 | Node Down | 5 |
| 1000003 | Node Up | 1 |
| 1000004 | Interface Down | 5 |
| 1000005 | Interface Up | 1 |

| | Service Availability Events | |
|---|---|---|
| 1001000 | DNS Service Failed | 5 |
| 1001001 | DNS Service Succeeded | 1 |
| 1001002 | POP3 Service Failed | 5 |
| 1001003 | POP3 Service Succeeded | 1 |
| 1001004 | FTP Service Failed | 5 |
| 1001005 | FTP Service Succeeded | 1 |
| 1001006 | SMTP Service Failed | 5 |
| 1001007 | SMTP Service Succeeded | 1 |
| 1001008 | MNTP Service Failed | 5 |
| 1001009 | NNTP Service Succeeded | 1 |
| 1001010 | HTTP Service Failed | 5 |
| 1001011 | HTTP Service Succeeded | 1 |
| 1001012 | RADIUS Service Failed | 5 |
| 1001013 | RADIUS Service Succeeded | 1 |
| 1001014 | SNMP Service Failed | 5 |
| 1001015 | SNMP Service Succeeded | 1 |

| | Process Availability Events | |
|---|---|---|
| 1002000 | DNS Process Failed | 5 |
| 1002001 | DNS Process Succeeded | 1 |
| 1002002 | POP3 Process Failed | 5 |
| 1002003 | POP3 Process Succeeded | 1 |
| 1002004 | FTP Process Failed | 5 |
| 1002005 | FTP Process Succeeded | 1 |
| 1002006 | SMTP Process Failed | 5 |
| 1002007 | SMTP Process Succeeded | 1 |
| 1002008 | NNTP Process Failed | 5 |
| 1002009 | NNTP Process Succeeded | 1 |
| 1002010 | HTTP Process Failed | 5 |
| 1002011 | HTTP Process Succeeded | 1 |
| 1002012 | RADIUS Process Failed | 5 |
| 1002013 | RADIUS Process Succeeded | 1 |

| | Threshold Events | |
|---|---|---|
| 1003000 | CPU Util Threshold Warn | 5 |
| 1003001 | CPU Util Threshold Normal | 1 |
| 1003002 | Mem Util Threshold Warn | 3 |
| 1003003 | Mem Util Threshold Normal | 1 |
| 1003004 | Interface Util Threshold Warn | 3 |
| 1003005 | Interface Util Threshold Normal | 1 |

TABLE 28

| | Correlated Paired Events | |
|---|---|---|
| 3000000 | SA_NodeMonitor (Mem/Cpu-State Failure) | 5 |
| 3000001 | SA_NodeMonitor (Mem/Cpu-State Recovery) | 1 |

TABLE 29

| | Enterprise Paired Event | |
|---|---|---|
| 5000000 | SA_CorrEnt (PATROLLER/busyPer-State Failure) | 5 |
| 5000001 | SA_CorrEnt (PATROLLER/busyPer-State Recovery) | 1 |

TABLE 30

| | Uncorrelated Asynchronous Events | |
|---|---|---|
| 2000000 | ColdStart | 3 |
| 2000001 | WarmStart | 3 |
| 2000002 | LinkDown | 5 |
| 2000003 | LinkUp | 1 |
| 2000004 | AuthFail | 5 |
| 2000005 | EgpNeighLoss | 5 |

TABLE 31

| | Correlated Asynchronous Events | |
|---|---|---|
| 4000000 | Test Alert Start | 5 |
| 4000001 | Test Alert Stop | 1 |

TABLE 32

| | Enterprise Asynchronous Events | |
|---|---|---|
| 6000000 | Test Alert Start | 5 |
| 6000001 | Test Alert Stop | 1 | exportAlarmMap contains 10 items:

alarm SA_Entry_Logger is Off
    alarm SA_allTraps_Logger is On
    alarm SnmpStatus is On
    alarm IcmpStatus is On
    alarm SA_NodeMonitor is On
    alarm SA_1system_Logger is On
    alarm SA_ifEntry_C2Rate_Util is On
    alarm SA_CorrEnt_Final is On
    alarm SA_CorrEnt_BusyPerMon is On
    alarm Test is Off exportPropertyMap contains 23 items:

property udpEntry
    property udp
    property tcpConnEntry
    property tcp
    property snmp
    property ipRouteEntry
    property ipNetToMediaEntry
    property ipAddrEntry
    property egp
    property atEntry
    property nl-ping
    property system
    property NO_PROP
    property ip
    property interfaces
    property icmp
    property egpNeighEntry
    property ifEntry
    property SA_Router_Collection_Property
    property 1system
    property SA_Normal_Snmp
    property SA_CheckLater
    property icmpStatus exportPropGroupMap contains 35 items:

group Icmp
    group CHIPCOM-MIB
    group SYNOPTICS-ATM-ETHERCELL-MIB
    group UNGERMAN-BASS-MIB
    group SYNOPTICS-LINKSWITCH-MIB

```
                                              group SYNOPTICS-5000-MIB
                                              group SYNOPTICS-3000-MIB
                                                    group RETIX-MIB
                                                     group ODS-MIB
                                                 group FIBERMUX-MIB
                                                  group COMPAQ-MIB
                                               group ATT-SMARTHUB-MIB
                                               group Mib-II-router-sub1
                                                   group Mib-II-sub1
                                                      group Mib-II
                                                  group HP-UNIX-MIB
                                             group CISCO-ROUTER-11.x-MIB
                                             group CISCO-ROUTER-10.x-MIB
                                                group RFC1289-phivMIB
                                                      group Router
                                             group CISCO-ROUTER-9.x-MIB
                                                   group XYPLEX-MIB
                                              group WELLFLEET-SERIES7-MIB
                                                 group WELLFLEET-MIB
                                                     group SUN-MIB
                                                     group NAT-MIB
                                                    group EPIX-MIB
                                                  group DEC-ELAN-MIB
                                                 group 3COM-ECSV2-MIB
                                                group NETLABS-PING-MIB
                                                 group RFC1213-MIB2-MIB
                                            group SA Router_Collection_Group
                                                    group lesgroup
                                                group SA_Normal_Snmp
                                                 group SA_CheckLater
exportOIDTo-
GroupMap
contains 0 items:
exportPollMap
contains 6 items:
                                                  poll SA_ifEntry is On
                                             poll SA_NodeMonitor_freeMem is On
                                             poll SA_NodeMonitor_busyPer is On
                                                   poll SA_lsystem is On
                                              poll SA_CorrEnt_busyPer is On
                                                     poll Test is Off
exportMaskMap
contains 2 items:
                                              mask PatrolTrapsClear is On
                                              mask PatrolTrapsAlarm is Off
exportTriggerMap
contains 34 items:
                                                  trigger NO_TRIGGER
                                                    trigger coldStart
                                                    trigger warmStart
                                                    trigger allTraps
                                               trigger PatrolNamedFailure
                                               trigger PatrolNamedRecovery
                                               trigger SA_CorrEnt_Recover
                                           trigger SA_CorrEnt_PATROLLERRecover
                                                    trigger nodeUp
                                                   trigger nodeUpFast
                                                  trigger agentUpFast
                                                    trigger agentUp
                                                   trigger SA_ifEntry
                                                  triggerSS_ICMP_Failed
                                            trigger SA_CorrEnt_busyPer_Alarm
                                            trigger SA_CorrEnt_busyPer Recovery
                                                  trigger SA_lsystem
                                         trigger SA_NodeMonitor_busyPer_Recovery
                                         trigger SA_NodeMonitor_freeMem_Recovery
                                          trigger SA_NodeMonitor_busyPer_Alarm
                                          trigger SA_NodeMonitor_freeMem_Alarm
                                                      trigger Test
                                                 trigger IS_ICMPFailed
                                                     trigger TestA
                                                trigger SA_CorrEnt_XOver
                                               trigger SA_CorrEnt_AlarmFail
                                            trigger SA_NodeMonitor_NotifyHPOV
                                            trigger SA_NodeMonitor_BuildTrap
                                               trigger NODE_UNREACHABLE
                                                 trigger ICMP_TIMEOUT
                                                trigger NET_UNREACHABLE
                                               trigger PORT_UNREACHABLE
                                                 trigger SNMP_TIMEOUT
                                                   trigger RESPONSE
exportSeverity-
Map contains
5 items:
                                                    severity Normal
                                                    severity Critical
                                                    severity Major
                                                    severity Minor
                                                    severity Warning
exportRuleMap
contains 0 items:
exportOpc-
MaskMap
contains 0 items:
exportPerl-
SubMap
contains 16 items:
                                                  perl subroutine Test
                                       perl subroutine SA_Parameters_TestScript
                                     perl subroutine SA_NodeMonitor_RecoverHPOV
                                      perl subroutine SA_NodeMonitor_NotifyHPOV
                                      perl subroutine SA_NodeMonitor_BuildTrap
                                       perl subroutine SA_ifEntry_C2Rate_Util
                                        perl subroutine SA_CorrEnt_VerifyNode
                                       perl subroutine SA_CorrEnt_RecoverHPOV
                                       perl subroutine SA_CorrEnt_PATROLLERID
                                       perl subroutine SA_CorrEnt_NotifyHPOV
                                      perl subroutine SA_allTraps_EventCodeScreen
                                             perl subroutine PatrolTrapsAlarm
                                      perl subroutine SA_SnmpStatus_RecoverHPOV
                                      perl subroutine SA_SnmpStatus_NotifyHPOV
                                      perl subroutine SA_IcmpStatus_RecoverHPOV
                                      perl subroutine SA_IcmpStatus_NotifyHPOV
```

Development Environment

Configuration Strategy Proposal and Prioritization

Some of the problems with Phase 1 are:

a) Multiple configuration files b) Multiple variables for the same path/file c) Utilization of different script languages This section addresses proposed solutions for the development of a better configuration facility. These include the utilization of Perl as the scripting language, exclusively. It also includes the use of one runtime configuration file, and common methods across platforms.

Body Section

One Configuration File

Maintainability

Having one file will create an environment that is more easily maintained because all the information will be in one file. There will be no confusion where things reside and where they need to be changed, if necessary.

Configurability

With creating a common file structure (see the file structure below) in one file, the scripts, logs, etc are easily identifiable. Additionally, there is no platform dependency, which therefore, creates an environment that is more easily configurable.

Portability

Again, with one file and a common file structure, the system is more easily portable.

Exemplary File Structure

```
[Runtime Directories]
LOG =
OUT =
TEMP =
EXEC =
SYS =
[Runtime Extensions]
LOG = LG (may add 0–9, A–Z, or both)
IN = IN
OUT = TO
TEMP = TP
[Runtime Extension Sequence]
SEQ = 0–Z ... (0–9) or (A–Z) or (0–Z) to be determined
[Application Paths]
APPS = SPSS, HPOVNNM, PATROLLER,
ECM, COLLECTOR, WEB ...
[SPSS]
.
.
.
[HPOVNNM]
.
.
.
[PATROLLER]
.
.
.
```

Common Prep Command

Consistency

With the utilization of a common command (e.g. include, source, or require), the potential changes that need to be made will be consistent in each script. Or, if a common command for each platform is needed in each script, it will be a consistent change to activate the appropriate command.

Maintainability

If each script is utilizing the same command, the maintenance is minimal. There will not be a need to make different changes to different scripts.

Portability

With all scripts following the same command script, the only change necessary across platforms may be in the path.

Note:

We could avoid the use of a common command in each script if:

1) All scripts are written in Perl
2) Perl allows us to set or change environment variables within a Perl script.

If so, we can set definitions with an environment variable.

Common Code/Methods

Use common cross-platform items (e.g. environment variables, command line arguments, files, DOS, Unix, NT, and 95 ANSI C compliant).

Through the use of an initiate_setup script we could pull in the configuration file.

Common Scripting Language—Perl

The use of a common scripting language will help contribute to a common prep command if needed. Additionally, the barriers associated with awk, sed, and c-shell scripts will be avoided, providing improved maintainability. Any scripting changes that might be required cross-platform will be minimized. The knowledge needed to work with the scripts is minimized as well as the time associated with ramp-up, configuration, troubleshooting and testing.

File type/configuration file type/file location

This would help with platform independence. The configuration file would reside in a database, like Oracle, as a table. It would then be pulled into a file format. The format would depend on the platform.

Priority

The following priority list is generated by what value each item will bring to the project.

1) 1 common file
2) Pull in the configuration file (file name independence, directory independence)
3) Common Code/Methods
4) Separate variables (remove multiples)
5) All common script languages
6) File type/configuration file type/file location The IPSA project will gain the greatest value by implementing procedures and changes that make significant improvement over the current situation without jeopardizing deliverable deadlines.

Determination

One configuration file. SACommon.pm located in the /sa/usr/mod directory with a symbolic link from /usr/local/lib/per15/site_perl on twmmdb02, nsmmws09 and nsmmws16. Variables are defined as shown in Table KK. With the use of this module, each script that references it must also contain a "use" command and each variable must be referenced appropriately. See Table LL.

TABLE KK

SACommon variable definition example

```
#These variable is used with the data retrieval script
$NodeList = "/sa/dev/glueware/bin/node_list.def";
$DestDir = "/sa/dat";
$DestHost = "twmmdb02";
$CopyCommand = "rcp -p";
```

Table LL (the bold commands are examples used with SACommon.pm) use SACommon;

open (NODE_F, $SACommon::NodeList) || die "error could not open $SACommon::NodeList";

TABLE 33

Identify and Describe Requirement

Description: Development Environment Requirements
Scenarios:
Type:
Business Process Flow:
Overall Rating:
Business Need Desc:
Affected Parties:
Project Sponsor:
Existing/New:
External Dependencies:
Method for Verification:
In Scope:

Complete after Requirements are Scheduled into a Release

TABLE 34

Increment:
App/Subsyst Desc/Flow:

Required if Modifications are made after the Requirement has been signed-off

TABLE 35

Change Request:

General Information

The SA internal Initiative is using a homegrown version control system that is based on sccs. It is anticipated that future releases will use cccHarvest for both version controlling and configuration management.

Requirements for the Development Environment

The ability to check in and check out files so that only one person is editing a file at a time The following will be tracked on each file that is being version controlled. date of creation, date of last modification, version, and change history (annotated with date, rev, user, and comments).

The ability to associate revision numbers with development environment (the environment can be set to 'dev', 'tst', or 'prd'). This make is it make it possible to develop multiple releases at one time.

The ability to retrieve previous versions of a component or sub-component for either edit or review.

Support for multiple development languages.

Ability for users to operate in a separate environment. This includes operations on the users 'own' test data and executables.

Backup and recovery of source code, documentation, test data, etc...

Tools to aid in the debugging of components and sub-components. This would include generation of test data and unit test conditions.

Documentation for users on how to use the tools under different conditions and situations.

Ability to tie SIR or defect number to all components and sub-components that are.

Ability to migrate components and sub-components between environments.

Documented coding standards for each type of development language used).

Provide shells as a starting point for each coding language used.

Strategy for software distribution.

Determine Release Strategy Requirements

From the /sa directory we will extract the version of each file that has been tagged as production.

Determine Installation Strategy Requirements

Installation of an exemplary Service Assurance Toolkit can be broken down into two parts.

1. Installation and configuration of software.

Network Node Manager

Event Correlator and Manager

Collector

Patroller

Database Software

Telalert

Server Software

SPSS

Internet Information Server

2. Installation and customization of Service Assurance Glueware.

Determination of an appropriate directory structure.

Customization of all environment specific settings in the Glueware scripts. This includes variables that are local to each script as well as global variables from the SACommon.pm Perl Module. Also, care should be taken regarding hard coded environment specific information in each script.

Determine Build/Test Environment Requirements

The directory structure will be stored on ucmmfs02:files5. The directory /sa will be the mount point to nsmmws09, nsmmws16, and twmmdb02. The binary files for the vcs will need to be added to each users path. This will be done as a modification to each users .cshrc file. All code developing activities should only be done as the developer. In other words DO NOT develop code as the user noc. Each user's .cshrc file will be set up to source a file called sa.cshrc. The sa.cshrc file will be stored in /sa/usr. The file sa.cshrc will contain the code needed to switch the user's environment to and from dev, tst, or prd.

dev

This is the primary development environment. All code will be developed and component tested in the /dev directory. Successful component testing will result in the promotion of the code to the /tst directory.

tst

This is the primary testing environment. All code once successfully component tested will be migrated to the /tst directory for assembly level testing. Successful assembly testing will result in the promotion of the code to the /prd directory. Unsuccessful testing of the code will result in the demotion of the code to /dev for bug fixes.

prd

This is the primary production directory. All code that has passed both component and assembly testing will be promoted to the /prd directory. If a bug is found in the production environment the code will be demoted to either /tst or /dev for bug fixing.

Determine Implementation Language

Perl is recommended as the implementation language for phase 2. Perl is recommended for the following reasons:

Excellent support of text processing

Widely used

Extremely flexible

Efficient executables

Free

Many support libraries exist

Maintainable

ECM already uses perl

Determine Change Control Requirements

Change Control requirements include:

Outline the proper communication channels to ensure prompt and efficient change implementation Ability to view:

All tasks

Downtime tasks only

Tasks by assigned to

Tasks by affected groups

Tasks by current status

Identify the appropriate information required for a change to be handled effectively Assigned to Task description Priority (1, 2, 3)

Start Date

Complete Date

Operations Group or Area creating the request (Sales & Marketing, Product Development. . . )

Status of request (new, on hold, scheduled, work done, completed)

Effects (downtime, limited use, no effects on use)

Time Range

Affected Components and Groups

Type (Removal, upgrade, new install, configuration change)

Additional Information (contacts, requirements, implementation...)

Creating Author

Creation Date

Last Revised By

Date Last Revised

Allow change in the development environment while maintaining system stability

Schedule downtime to minimize service outage

Determine Incident Reporting Requirements

Incident Management needs to:

facilitate the review, approval or rejection, and prioritization of changes facilitate communication between development cells to ensure that changes are implemented correctly and migrated to the proper environment in a timely manner.

Allow updates/fixes in the development environment while maintaining system stability Schedule downtime to minimize service outage sort tickets by:
1. Current Status
2. Person assigned the task
3. Incident ticket number identify the appropriate information required for a incident to be handled effectively
1. Incident Number
2. Current Status (open, new, approved, disapproved)
3. Priority (low, medium, high, emergency)
4. People/Groups affected
5. Target Completion Date
6. Comments
7. Status Reason for rejected status
8. Business Reason for Change
9. Total hours needed to complete the implementation of fix or repair Include sections for Origination (initial information when ticket is logged), Analysis (information obtained after reviewing the incident ticket), and Implementation (information gathered during implementation)

Determine Backup/Recovery Requirements

A person should be designated to receive nightly backup confirmations. Two confirmations are sent per machine, one is for full backup and the other is for incremental backup. Incremental backups may be run every night and full backups can be run once a week between Friday evening and Monday morning.

Directory Structure

Figure 32:
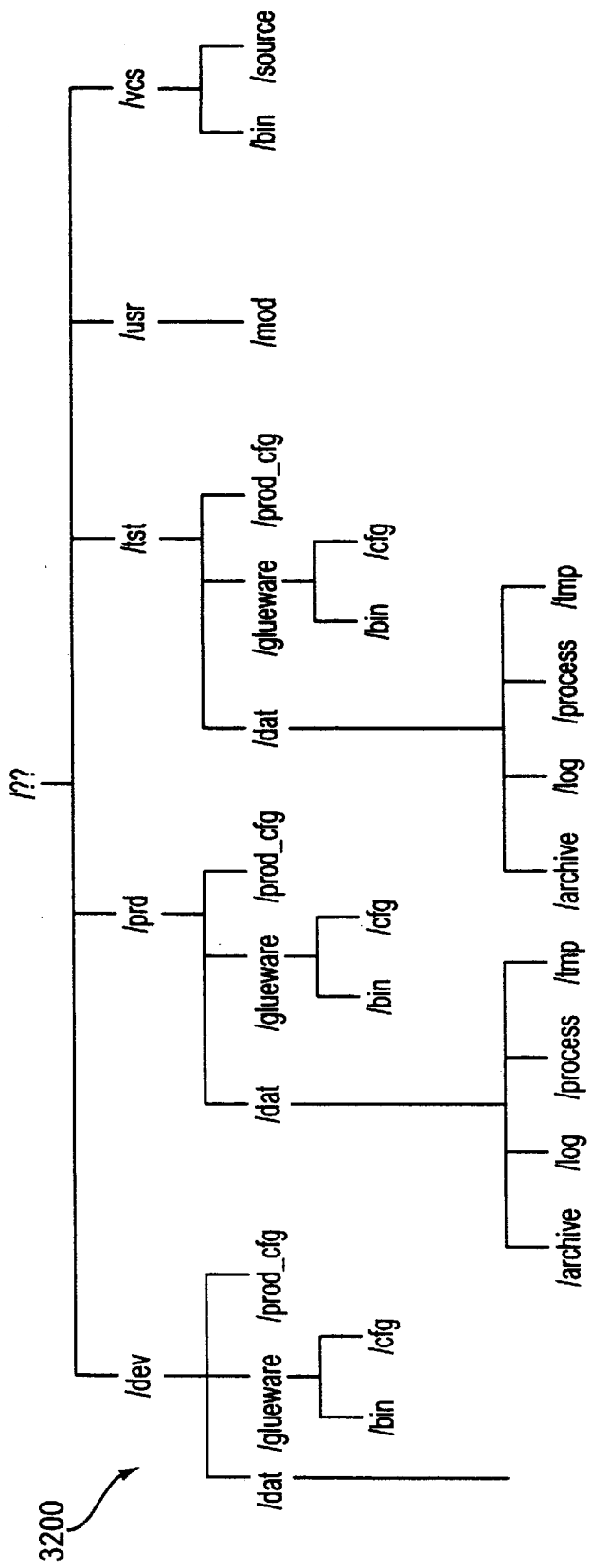
FIG. 32 depicts an exemplary data/directory structure in accordance with one embodiment of the present invention.

The following directory structure will be used to store code and configurations on the unix servers. See also FIG. 32, which illustrates an exemplary data structure 3200.

```
/sa
  /dev
    /dat
```

```
      /archive
      /log
      /process
      /tmp
      /glueware
        /bin
        /cfg
        /prod_cfg
  /prd
    /dat
      /archive
      /log
      /process
      /tmp
      /glueware
        /bin
        /cfg
        /prod_cfg
  /tst
    /dat
      /archive
      /log
      /process
      /tmp
      /glueware
        /bin
        /cfg
        /prod_cfg
  /usr
    /mod
  /vcs
    /bin
    /source
```

The Directories /dev /prd and /tst correspond to the build and test environments discussed earlier. Below each environment directory there will be a data directory called /dat. /dat will contain the following directories:

/archive—Directory to store any files that are compressed and no longer essential to development.

log—Log files that are created during the processing cycle.

/process—Files that are currently in the processing cycle.

/tmp—Temporary location to store files that have finished being processed.

Beneath /glueware there will be /bin and /cfg. /bin stores the binary 'glueware' files. Glueware is the term for custom scripts to tie together the packaged applications. /cfg holds any application configuration files. The /usr directory holds user command as well as the /mod directory for perl modules. /vcs holds the /bin, executables for the version control system, and the /source directory for storing the version controlled files.

TABLE 36

Identify and Describe Requirement

Description: Hardware inventory, Software install locations, and memory/disk-space reqs
Scenarios:
Type:
Business Process Flow:
Overall Rating:
Business Need Desc:
Affected Parties: Service Assurance Team
Project Sponsor: Network Line of Business
Existing/New:
External Dependencies:
Method for Verification:
In Scope:

Complete after Requirements are Scheduled into a Release

TABLE 37

| Increment: |
| --- |
| App/Subsyst Desc/Flow: |

TABLE 38

| Required if Modifications are made after the Requirement has been signed-off |
| --- |
| Change Request: |

Scope

This section is intended to list the hardware inventory, software instalation locations, and software requirements of the Service Assurance development test network. This section will summarize the detailed findings of an Excel workbook that is accessible in:

Functional Repository→Capability Analysis→Hardware/Software Expense

TABLE 39

Service Assurance Application Memory and System Requirements

| Program | Suggested Memory Requirements | Suggested System Requirements | | | | | | | |
| --- | --- | --- | --- | --- | --- | --- | --- | --- | --- |
| Collector | RAM: Object Server: 50 Mbytes per server (dependant upon number of events in the Object server) Desktops: 10 Mbytes per desktop (standard user), 15 Mbytes per desktop (standard user plus objective view), 20 Mbytes per desktop (above plus administrator tools) Probes: 5 Mbytes per probe Gateways: 15 Mbytes per gateway Java Event List: 5 Mbytes per daemon Web server: 2.5 Mbytes per user typical web server, will vary) | Hardware Requirements: SUN Workstations: will run all components of Collector. SPARC 20 or better, Ultra 1 or better, with appropriate RAM and disk. (recommended system for desktop only: SPARC 5 or better. HP Workstations: will run all components of Collector. C110 workstation or better, D230, K210, T520 servers or better, with appropriate RAM and disk. AIX Workstations: AIX v3.2 will run Generic, NetView and Syslog probes, with appropriate RAM and disk. AIX 4.1.2 and above will run all 3.2.1 components. NT Workstations: NT probes and EventList at present, with appropriate RAM and disk. Disk Space: The following table lists the amount of disk storage required to store components of the Collector system. In some cases, further economies may be possible, i.e., by discarding unused probes. | | | | | | | |
| | | Platform/OS | Common Files | Desktop | Object Server | Process Control | Gate way | Probes (all) | JEL daemon |
| | | SunOS 4.1.x | 0.7 M | 30 M | 1.8 M | 1 M | 1.5 M | 19 M | 7 M |
| | | Sun Solaris 2.x | 0.9 M | 12 M | 2.5 M | 1.4 M | 2.0 M | 23 M | 7 M |
| | | HP-UX 9.07 | 0.8 M | 11 M | 1.9 M | 1 M | 1.6 M | 18 M | 7 M |
| | | HP-UX 10.10 and 10.20 | 0.8 M | 11 M | 2.0 M | 1 M | 1.6 M | 16 M | 7 M |
| | | AIX | 0.8 M | — | — | 1.5 M | — | 4 M | — |
| | | Windows NT | — | — | — | — | — | 6 M | — |
| | | In addition 10–20 Mb should be allowed for logging space on systems running Gateways, Object Servers, Probes or Process Control. | | | | | | | |
| Reporter | It is recommended that you run the Collector server with a minimum of 128 MB and a maximum of 256 MB of memory. These values recommendations but if you have the potential for large amounts of data to report on, this is going to be vital to the efficiency of the application. This section describes what action to take on the server if you do not have these values set | | | | | | | | |

TABLE 39-continued

Service Assurance Application Memory and System Requirements

| Program | Suggested Memory Requirements | Suggested System Requirements |
|---|---|---|
| | and you are getting memory errors while running Collector/Reporter. See page 32 of the Admin/user guide of Reporter for making adjustments to memory for UNIX. | |
| PATROLLERLER | The PATROLLERLER Console should be run on a machine with at least 64 MB of memory. | CPU and Operating System Requirements:<br>Sun SPARC; Solaris2; Min version 2.4; Solaris2-sun4<br>Sun SPARC; Solaris2; Min version 2.5; Solaris25-sun4<br>nls is a system prerequisite for Sun O/S 4.xx installations<br>Disk Space:<br>Each PATROLLERLER Console requires about 20 MB of disk space. The Console also requires an additional 31 MB of disk space for the supporting files such as icon images and online help files. You will need an additional 27 MB of disk space if you choose to install the optional background images for European country maps.<br>Each PATROLLERLER Agent requires about 10 MB of disk space.<br>Each PATROLLERLER Event Manager (PEM) Console requires about 5 MB of disk space. If the PEM Console is installed independently of the PATROLLER Console, then an additional 24 MB of disk space is required for the supporting files such as icon images and online help files. PATROLLERLER Module space requirements vary. The installation script furnishes an estimate of each module's requirements: |
| Event Correlator and Manager | ii.<br>48 MB for the server<br>32 MB for the client<br>NT<br>32 MB RAM | Hardware Configuration: (minimum UNIX)<br>200 MB disc space color monitor 1024 × 768<br>Solaris 2.5.1 or HP/UX 10.20<br>Hardware Configuration: (minimum NT)<br>P5-166 Intel Processor, 40 MB disc space, color monitor 1024 × 768<br>Microsoft Windows NT 4.0<br>Note: Supports the following:<br>OpenView Network Node Manager - versions 4.11 and 5.01<br>OpenView IT/Operations - version 4.0 for HP-UX |
| HP OpenView Unix Version 5.01 NT Version 5.02 | iii.<br>64 Mbytes recommended minimum<br>32 Mbytes minimum for NNM 250<br>Note: The amount of RAM in your NNM management station should be based on the number of nodes which you wish to manage. Additional RAM may also be required to run third-party OpenView applications on top of NNM. See the Network Node Manager Performance and Configuration Guide for assistance in calculating for the optimum amount of RAM.<br>iv.<br>32 Mbytes of RAM to manage 250 nodes and, 48 Mbytes of RAM to manage up to 2500 nodes.<br>Note: You will need | Unix<br>Computer:<br>Use one of the following computers as the NNM Management Station.<br>HP 9000 Series 700<br>HP 9000 Series 800, J and K models<br>Sun SPARCstation 5,10,20,2000<br>Sun SPARCclassics<br>Sun Servers<br>Graphics Dipslay<br>X Terminal or Workstation graphics display with 1280 × 1024 resolution, 8 color planes (recommended) 1024 × 768 resolution, 6 color planes (minimum) 20" display<br>Installation Device<br>CD-ROM drive<br>Disk Space<br>The minimal disk space for NNM installation is shown below<br>HP-UX 9.x - 85 Mbytes<br>HP-UX 10.x - 85 Mbytes<br>Solaris 2.x - 130 Mbytes<br>Operating System<br>One of the operating systems listed below must be running on the NNM mgmt system.<br>HP-UX 9.0-9.07 (9.x)<br>HP-UX 10.01, 10.10, and 10.20 (10.x)<br>Solaris 2.4 and 2.5.x<br>Networking Subsystem<br>The appropriate TCP/IP networking subsystems (e.g. LAN Link, ARPA Services) found within the operating system must be installed and configured to yield TCP/IP network connectivity<br>connectivity. |

TABLE 39-continued

Service Assurance Application Memory and System Requirements

| Program | Suggested Memory Requirements | Suggested System Requirements |
| --- | --- | --- |
| | to have a minimum amount of paging file size (available virtual memory) configured. If NNM is being installed as a remote console, Paging Files is checked to be at least 50 Mbytes. If this is not a remote console installation, 60 Mbytes will be the minimum. | Windowing Subsystem<br>HP-UX: X Windows/Motif<br>Solaris: OpenWindows<br>SNMP Agent<br>The NNM management station must be running an SNMP agent. An SNMP agent is shipped with NNM for HP-UX 9.x and Solaris systems, and is automatically installed when installing NNM. HP-UX 10.x systems use the SNMP agent shipped with the operating system.<br>NT<br>Operating System<br>You should be running Windows NT 3.51 or Windows NT 4.0 for NNM or higher to run successfully<br>Graphics Display<br>Your screen resolution must be at least 600 × 800 to support NNM display objects.<br>Networking Subsystem<br>You should have TCP/IP services installed. |
| Platinum Technology CCC/Harvest | v.<br>Server<br>16 Mb main memory<br>It is recommended that 2 Mb of virtual memory is allocated for each user<br>Client (Solaris)<br>SPARCstation or SPARCserver running Solaris 2.5 (SunOS 5.5) or with X-Windows System Version 11R5.<br>Approximately 50 MB of disk space is required for the installation process of the CCC/Harvest product files.<br>vi.<br>Server<br>At least 12 Mb of free hard drive space<br>A minimum of 32 Mb main memory. The Oracle database and CC/Harvest Broker together require about 14 Mb, with an additional 3.5 Mb for each server process.<br>Client<br>At least 8 Mb of RAM, 16 recommended.<br>Win95 or WinNT - minimum of 14 Mb of hard disk space | VCI (important component of CCC/Harvest)<br>Microsoft Windows 95 or Windows NT<br>Tool that supports Microsoft's Common Source Code Control (SCC) Interface. Following is a partial list of SCC-compliant tools:<br>Visual C++ 4.2 and 5.0<br>Visual Basic 4.0 and 5.0<br>Visual J++ 1.1<br>Paradigm Plus 3.5.1<br>PowerBuilder 5.0.03<br>Unix<br>CD-ROM drive, 8 mm tape drive, 4 mm DDS cartridge, or ¼ inch cartridge tape drive<br>Oracle RDBMS version 7.3 or beyond, including the following options:<br>SQL*Plus, PL/SQL, SQL*Loader, Pro-C, SQL*Net<br>Note: HP-UX 10 requires Oracle 7.3.4 or beyond.<br>NT<br>IBM-compatible computer with a 486, or Pentium processor<br>Network connection to a Unix or Windows NT-based server using the TCP/IP protocol |
| TelAlert | | SERVERS:<br>AIX (IBM RS/6000)<br>AT&T GIS Unix SVR4 MP-RAS (AT&T/NCR System 3000<br>Digital Unix (Alpha)<br>DYNIX/ptx (Sequent)<br>HP-UX (9.x/10.x Series 300,400,700 and 800)<br>Linux<br>MIPS ABI |

TABLE 39-continued

Service Assurance Application Memory and System Requirements

| Program | Suggested Memory Requirements | Suggested System Requirements |
|---|---|---|
| | | SCO Unix |
| | | SGI Irix |
| | | Solaris (Sun Sparc) |
| | | SunOS (Sun Sparc) |
| | | Windows NT |
| | | CLIENTS: |
| | | All of the above, as well as: |
| | | MPE/V (HP 3000) |
| | | MPE/IX (HP 3000) |
| | | OpenVMS (Alpha) |
| | | OpenVMS (VAX) |
| | | Platforms which are supported for clients, but are not delivered on the standard TelAlert distribution include: |
| | | OS/400 |
| | | MVS |

Exemplary Patroller Configuration

TABLE 40

Consoles + Agents/Modules:

| Host Name | Machine Type | Host ID | IP Address |
|---|---|---|---|
| nsmmws16 | Sun Sparc 20 | 7235a79f | 149.122.57.25 |
| nsmmws09 | Sun Sparc 10 | 7260a126 | 149.122.57.56 |

TABLE 41

Agents/KMS only:

| Host Name | Machine Type | IP Address |
|---|---|---|
| nsmmws17 | Sun Sparc 5 | 149.122.57.26 |
| nsmmws18 | Sun Sparc 5 | 149.122.57.26 |
| nsmmws01 | Sun Sparc 5 | 149.122.57.68 |
| nsmmpc56 | Compaq LTE5300 | *149.122.57.178 |
| nsmmpc23 | Compaq LTE5300 | *149.122.57.247 |
| nsmmpd39 | Compaq LTE5300 | *149.122.57.221 |
| nsmmpc39 | Compaq XL6150 | *149.122.57.180 |
| nsmmpd48 | Compaq XL6150 | *149.122.57.223 |
| nsmmpd93 | Compaq XL6150 | *149.122.57.234 |
| mpclc1005 | Compaq Proliant 2500 | 149.122.61.29 |
| mpclc1006 | Compaq Proliant 2500 | 149.122.61.30 |
| nsmmnt01 | Compaq Proliant 2500 | 149.122.61.24 |
| nsmmnt02 | Compaq Proliant 2500 | 149.122.62.12 |
| nsmmnt03 | Compaq Proliant 2500 | 149.122.57.37 |
| nsmmnt04 | Compaq Proliant 2500 | 149.122.57.38 |

*Denotes a dynamic (DHCP supplied) IP address

Determine Backup/Recovery Requirements

This section will list Service Assurance's responsibilities to an exemplary network to insure timely backup and recovery.

Body Section

Changes to monitoring and backups should be logged as a trouble ticket with the computer related service center.

An individual from the project should be identified to receive backup completion notices. These notices are mailed at the completion of each nightly backup cycle. This person should then verify that all Service Assurance servers were adequately backed up the previous night.

SA Environment Build Index

This section provides an overview of exemplary steps to build the Service Assurance environment. The procedures are presented as an ordered list, and unless denoted by '*', should be performed in their respective order. Procedures denoted by '*' are independent, and can be performed out of order with respect to other procedures at their respective level in the hierarchy.

| Building the Service Assurance Environment |
|---|
| Network Management Station System Build |
|   Verify system requirements |
|   Create 'noc' user |
|   Create 'netman' group |
|   Install HP OpenView Network Node Manager (NNM) |
|   Install Patroller |
|     Patroller Product Licensing |
|     Install Patroller Console |
|     Install PatrolView |
|     Install Patroller Agents |
|   Install ECM |
|   Install SAS* |
|   Telalert Installation & Configuration* |
|   Install Netscape FastTrack Server* |
|   Install Oracle* |
|   Install Perl* |
|   Install Perl Modules* |
|   Install custom scripts |
|   Event Handling System (EHS) setup and configuration |
|   EHS component test |
|   Network Availability (NA) setup and configuration |
|   NA component test |
|   Process Availability (PA) setup and configuration |
|   PA component test |
|   Service Availability (SA) setup and configuration |
|   SA component test |
|   Reporting System (RS) setup and configuration |
|   RS component test (Reporting Test Cases.doc) |

Moving /sa Directory Structure Between Machines

This is a short explanation of the steps and commands recommended to move the /sa directory structure from one machine to another.

| Body Section |
|---|
| Use the unix tar command to create an archive of/sa<br>   ex: tar -cvfp <archive destination file> <source directory><br>Copy or FTP the files to the destination machine.<br>Use the unix tar command to extract the archive for netman and vcs.<br>   ex: tar -xvfp <tar_file> REMEMBER: This will keep the<br>   relative directory structure that was used when creating the<br>   archives. Also, all untarred files will have the correct<br>   permissions and will take the uid and gid of the user issuing<br>   the untar command<br>NSF mount the /sa directory into the root of other directories.<br>Confirm that the vcs/bin directory is in the noc users path. |

Remote Shell & .rhost Configuration

This section will be a very brief overview of starting a remote shell between unix servers.

Body Section

The rhosts file is used to control access between unix servers also known as remote authentication (see also /etc/hosts.equiv).

The .rhosts file is placed in the root of the noc users home. This will allow noc to rlogin from the specified host without a password.

Example: The .rhosts file on twmmdb02 contains the following line:

nsmmnm09+noc

This allows the local noc account on nsmmnm09 to connect to twmmdb02 using rlogin and no password. Also, we could explicitly deny access to the local noc user on nsmmnm09 with the line:

nsmmnm09−noc

Solaris System Build

Depending on the policies in place at the client, the system build and administration will very likely be handled exclusively by their operations group. For this reason guidelines are provided here that should be followed, but specific instructions will not be provided.

This section specifically discusses Sun Solaris 2.x systems. Specifics will be different, but the concepts and processes are similar for HP-UX 10.x and higher.

Body Section

Hardware Requirements

The base requirements to run all of the Service Assurance applications concurrently on one Sun Solaris system are:

Sun Ultra 2 server

Dual 200 MHz (or faster) CPUs

768 MB RAM

2–4GB Internal SCSI disks (mirrored) for system

~20 GB external disk storage (mirrored and striped)

Having a single CPU system should not be considered due to the high number of applications and processes that will be running on the system. Based on prior experience, lower amounts of system memory can severely degrade performance.

External disk storage will vary based on the size of the environment being monitored. The 20 GB listed above should be sufficient for a medium sized environment (~500 monitored nodes).

Hardware Setup & Configuration

As discussed in the requirements section, dual (or more) CPUs and a large amount of physical RAM are crucial to the performance of the system. Mirroring of the system disk is critical for maintaining availability of the Service Assurance system. Mirroring and striping is crucial on the external drives to provide the performance and throughput required by the real-time data gathering portions of the system.

OS Install

Install the Base OS

Install the Solaris 2.x operating system as explained in the Solaris manual or the Teleworks—NSM procedure. You will want to ensure that the system has adequate swap space on the system disks.

Install recommended and security patches

You will want to install any recommended vendor patches so that you have an up to date system.

Install any patches that are required by applications

Some of the applications you will be installing may require specific operating system patches. If this is the case, it is easier to install the patches immediately.

Details of using the Version Control System (VCS)

The VCS should only be used on files that use '#' to denote comments. This is due to the vcs header being framed with '#'.

Ownership of the files will be noc:twsa, twsa is a nis group to which members of the Service Assurance team belongs.

The ability to check in and check out files so that only one person is editing a file at a time. A lock file is created in the /sa/vcs/source which controls usage.

When a file is checked in; its file permissions are 544.

When a file is checked out; its file permissions are 744.

Each time a file is checked out, edited and checked back in; the revision of that file is incremented. For Example, when version 1.9 is checked back in it becomes version 1.10.

Applications that will exist as part of the Version Control System vcsclear

Clears a file lock so the file can be edited or restored by a person other than the person who checked it out. This command should be used rarely and only as required for code maintenance.

vcsedit

This is the primary command for checking a file out (for editing purposes) of the vcs. A lock on the specified file is created and file permissions are set to allow the user to edit the file. The user must manually call vi (or text editor of choice) to edit the file. This command can also be used to retrieve a previous version of a file.

vcsenv

Provides information on which version of a file belongs to which environment. Also, allows changes to be made to environment/revision associations.

vcsget

Retrieves a read-only copy of a file for viewing purposes. No lock file is created. This command can be used to get a copy offile for off-line editing in a user's home directory. This command can also be used to retrieve a previous version of a file or recover when a file has been accidently deleted.

vcsinfo

Provides information on a file that is being version controlled, including name and location of the vcs record file as well as whether the file has been locked and who has it locked.

vcsput

This is the primary command for checking a file back into the vcs after editing or when it is first created. The file permissions are reset and the lock file is removed.

Examples of Using the VCS

Creating a new file that needs to be version controlled.
prompt% vi foo.pl

Create the file and add content. Save the file and exit.
prompt% vcsput foo.pl

The file is added to the vcs for the first time. User will be prompted for username and a comment. The file permissions are updated and a record file is started.
prompt% vcsedit foo.pl This creates a lock file for foo.pl and the user can now safely edit the file.
Informational Commands of the vcs
prompt% vcsinfo foo.pl Indicates whether a record file currently exists and if it is locked or not.
prompt% vcsenv foo.pl Indicates which version of a file belongs in which environment. Also, allows the user to make changes to environment and version association.
Other vcs commands
prompt% vcsclear foo.pl A previous user forget to check a file back in after a vcsedit command. This allows the lock file to be cleared so the next user can edit the file. Changes to the file from the previous user are lost.
prompt% vcsget foo.pl A user wishes to work on a copy of a file in their home account for testing purposes. This will create a copy of the latest version of the file in the current directory without locking the file. If the file is later copied back into the development environment care must be taken not overwrite the version of the file already there.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for providing service assurance for a network to maintain a predetermined agreed upon Quality of Service, comprising the steps of:
    (a) generating an alarm to indicate a status of a network; wherein the step of generating an alarm to indicate a status of a network further comprises the steps of: selecting a parameter of the network that is to be monitored, determining a triggering level of the parameter, monitoring the parameter of an occurrence of the triggering level, and initiating an alarm notification upon the monitored occurrence of the triggering level;
    (b) dispatching network event information of the network upon generation of the alarm;
    (c) mapping the network event information;
    (d) manipulating data collected on the status of the network, wherein manipulating data comprises:
        (i) concatenating data collected on a network into a master file;
        (ii) reformatting the concatenated data into a standardized format;
        (iii) translating the standardized data to key codes;
        (iv) sorting the translated data according to predetermined criteria; and
        (v) concatenating the sorted data together;
    (e) storing the manipulated data in a database; and
    (f) graphically conveying availability of the network.

2. A method as recited in claim 1, wherein the step of dispatching network event information of the network upon generation of the alarm further comprises the steps of: monitoring a network for an event; generating at least one notification action based upon the occurrence of the event, wherein the notification action comprises at least one of: an alphanumeric page, an e-mail message, a resolution script, a remedy trouble ticket, and a log message; and transmitting the notification action to notify a recipient about the occurrence of the event.

3. A method as recited in claim 1, wherein the step of mapping the network event information further comprises the steps of: monitoring a network for the occurrence of availability events, threshold events, and trap events, correlating at least one occurred event to at least one other occurred event to generate at least one correlating event, mapping the occurred events and correlating events on at least one network map; and displaying the network map.

4. A method as recited in claim 1, wherein the step of graphically conveying availability of the network further comprises the steps of: selecting report parameters relating to availability of monitored elements, services, and processes of a network, polling a database for data that matches the report parameters, generating a graph from the data that matches the report parameters, and displaying the generated graph to graphically represent the monitored elements, services, and processes of the network.

5. A computer program embodied on a computer readable medium for providing service assurance for a network to maintain a predetermined agreed upon Quality of Service, comprising:
    (a) a code segment for generating an alarm to indicate a status of a network; wherein the code segment for generating an alarm to indicate a status of a network is further adapted for selecting a parameter of the network that is to be monitored, determining a triggering level of the parameter, monitoring the parameter of an occurrence of the triggering level, and initiating an alarm notification upon the monitored occurrence of the triggering level;
    (b) a code segment for dispatching network event information of the network upon generation of the alarm;
    (c) a code segment for mapping the network event information;
    (d) a code segment for manipulating data collected on the status of the network, wherein manipulating data comprises:
        (i) concatenating data collected on a network into a master file;
        (ii) reformatting the concatenated data into a standardized format;
        (iii) translating the standardized data to key codes;
        (iv) sorting the translated data according to predetermined criteria; and
        (v) concatenating the sorted data together;
    (e) a code segment for storing the manipulated data in a database; and
    (f) a code segment for graphically conveying availability of the network.

6. A computer program as recited in claim 5, wherein the code segment for dispatching network event information of the network upon generation of the alarm is further adapted for monitoring a network for an event; generating at least one notification action based upon the occurrence of the event, wherein the notification action comprises at least one of: an alphanumeric page, an e-mail message, a resolution script, a remedy trouble ticket, and a log message; and transmitting the notification action to notify a recipient about the occurrence of the event.

7. A computer program as recited in claim 5, wherein the code segment for mapping the network event information is further adapted for monitoring a network for the occurrence of availability events, threshold events, and trap events, correlating at least one occurred event to at least one other occurred event to generate at least one correlating event, mapping the occurred events and correlating events on at least one network map; and displaying the network map.

8. A computer program as recited in claim 5, wherein the code segment for graphically conveying availability of the network is further adapted for selecting report parameters relating to availability of monitored elements, services, and processes of a network, polling a database for data that matches the report parameters, generating a graph from the data that matches the report parameters, and displaying the generated graph to graphically represent the monitored elements, services, and processes of the network.

9. A system for providing service assurance for a network to maintain a predetermined agreed upon Quality of Service, comprising:
   (a) logic for generating an alarm to indicate a status of a network; wherein the logic for generating an alarm to indicate a status of a network is further adapted for selecting a parameter of the network that is to be monitored, determining a triggering level of the parameter, monitoring the parameter of an occurrence of the triggering level, and initiating an alarm notification upon the monitored occurrence of the triggering level;
   (b) logic for dispatching network event information of the network upon generation of the alarm;
   (c) logic for mapping the network event information;
   (d) logic for manipulating data collected on the status of the network, wherein manipulating data comprises:
      (i) concatenating data collected on a network into a master file;
      (ii) reformatting the concatenated data into a standardized format;
      (iii) translating the standardized data to key codes;
      (iv) sorting the translated data according to predetermined criteria; and
      (v) concatenating the sorted data together;
   (e) logic for storing the manipulated data in a database; and
   (f) logic for graphically conveying availability of the network.

10. A system as recited in claim 9, wherein the logic for dispatching network event information of the network upon generation of the alarm is further adapted for monitoring a network for an event; generating at least one notification action based upon the occurrence of the event, wherein the notification action comprises at least one of: an alphanumeric page, an e-mail message, a resolution script, a remedy trouble ticket, and a log message; and transmitting the notification action to notify a recipient about the occurrence of the event.

11. A system as recited in claim 9, wherein the logic for mapping the network event information is further adapted for monitoring a network for the occurrence of availability events, threshold events, and trap events, correlating at least one occurred event to at least one other occurred event to generate at least one correlating event, mapping the occurred events and correlating events on at least one network map; and displaying the network map.

12. A system as recited in claim 9, wherein the logic for graphically conveying availability of the network is further adapted for selecting report parameters relating to availability of monitored elements, services, and processes of a network, polling a database for data that matches the report parameters, generating a graph from the data that matches the report parameters, and displaying the generated graph to graphically represent the monitored elements, services, and processes of the network.

* * * * *